(12) United States Patent
Huang et al.

(10) Patent No.: US 11,577,241 B2
(45) Date of Patent: Feb. 14, 2023

(54) ACOUSTOFLUIDIC SYSTEMS INCLUDING ACOUSTIC WAVE GENERATORS FOR MANIPULATING FLUIDS, DROPLETS, AND MICRO/NANO OBJECTS WITHIN A FLUID SUSPENSION AND RELATED METHODS

(71) Applicant: Duke University, Durham, NC (US)

(72) Inventors: Tony Jun Huang, Durham, NC (US); Peiran Zhang, Durham, NC (US)

(73) Assignee: Duke University, Durham, NC (US)

( * ) Notice: Subject to any disclaimer, the term of this patent is extended or adjusted under 35 U.S.C. 154(b) by 600 days.

(21) Appl. No.: 16/700,482

(22) Filed: Dec. 2, 2019

(65) Prior Publication Data

US 2020/0276579 A1 Sep. 3, 2020

Related U.S. Application Data

(60) Provisional application No. 62/774,502, filed on Dec. 3, 2018.

(51) Int. Cl.
*B01L 3/00* (2006.01)
*G01N 29/22* (2006.01)
*B01F 31/80* (2022.01)
*B01F 31/86* (2022.01)

(52) U.S. Cl.
CPC .......... *B01L 3/50273* (2013.01); *B01F 31/84* (2022.01); *B01F 31/86* (2022.01); *G01N 29/222* (2013.01); *B01L 2400/0436* (2013.01)

(58) Field of Classification Search
CPC ...................................................... B01F 31/86
See application file for complete search history.

(56) References Cited

U.S. PATENT DOCUMENTS

| | | | |
|---|---|---|---|
| 4,071,225 A | * | 1/1978 | Holl .................. B01F 25/50 366/127 |
| 8,120,770 B2 | | 2/2012 | Huang et al. |
| 8,320,049 B2 | | 11/2012 | Huang et al. |
| 8,573,060 B2 | | 11/2013 | Huang et al. |
| 8,941,826 B2 | | 1/2015 | Nawaz et al. |

(Continued)

FOREIGN PATENT DOCUMENTS

| | | |
|---|---|---|
| WO | 2015134831 A1 | 9/2015 |
| WO | 2017176211 A1 | 10/2017 |
| WO | 2019046483 A1 | 3/2019 |

OTHER PUBLICATIONS

J. Bardeen, W. H. Brattain, "The Transistor, A Semi-Conductor Triode," Phys. Rev. 74, 230-231 (1948).

(Continued)

*Primary Examiner* — Anshu Bhatia
(74) *Attorney, Agent, or Firm* — Olive Law Group, PLLC

(57) ABSTRACT

Acoustofluidic systems including acoustic wave generators for manipulating fluids, droplets, and micro/nano objects within a fluid suspension and related methods are disclosed herein. According to an aspect, an acoustofluidic system includes a substrate including a substrate surface. The system also includes an acoustic wave generator configured to generate acoustic streaming within an acoustic wave region of the substrate surface. Further, the acoustic wave generator is controllable to change the acoustic streaming for movement of a droplet or other micro/nano object on a fluid suspension about the acoustic wave region.

28 Claims, 64 Drawing Sheets

(56) References Cited

U.S. PATENT DOCUMENTS

| | | | |
|---|---|---|---|
| 9,096,823 B1* | 8/2015 | Branch | B01L 3/5027 |
| 9,606,086 B2 | 3/2017 | Ding et al. | |
| 9,608,547 B2 | 3/2017 | Ding et al. | |
| 9,757,699 B2 | 9/2017 | Ahmed et al. | |
| 9,797,897 B2 | 10/2017 | Johnson et al. | |
| 2011/0176964 A1* | 7/2011 | Murakami | B01F 31/86 |
| | | | 422/68.1 |
| 2015/0017023 A1 | 1/2015 | Huang et al. | |
| 2015/0104845 A1* | 4/2015 | Huang | B01L 3/502761 |
| | | | 435/173.9 |
| 2017/0232439 A1 | 8/2017 | Huang et al. | |
| 2017/0281530 A1* | 10/2017 | Bennett | B01F 31/86 |
| 2019/0031999 A1 | 1/2019 | Suresh et al. | |
| 2019/0292565 A1* | 9/2019 | Tandon | B01L 3/50273 |

OTHER PUBLICATIONS

G. Katsikis, J. S. Cybulski, M. Prakash, "Synchronous universal droplet logic and control," Nat. Phys. 11, 588-596 (2015), Macmillian Publishers Limited.

J. C. Baret, O. J. Miller, V. Taly, M. Ryckelynck, A. El-Harrak, L. Frenz, C. Rick, M. L. Samuels, J. B. Hutchison, J. J. Agresti, D. R. Link, D. A. Weitz, A. D. Griffiths "Fluorescence-activated droplet sorting (FADS): Efficient microfluidic cell sorting based on enzymatic activity," Lab Chip. 9, 1850-1858 (2009), The Royal Society of Chemistry.

O. D. Velev, B. G. Prevo, K. H. Bhatt, "On-chip manipulation of free droplets," Nature. 426, 515-516 (2003), Nature Publishing Group.

M. G. Pollack, R. B. Fair, A. D. Shenderov, "Electrowetting-based actuation of liquid droplets for microfluidic applications," Appl. Phys. Lett. 77, 1725-1726 (2000), American Institute of Physics.

A. R. Wheeler, "Chemistry: Putting electrowetting to work," Science. 322, 539-540 (2008), AAMS.

J. Li, N. S. Ha, T. Liu, R. M. Van Dam, C.-J. Kim, "Ionic-surfactant-mediated electro-dewetting for digital microfluidics," Nature. 572, 507-510 (2019).

E. H. Trinh, "Compact acoustic levitation device for studies in fluid dynamics and material science in the laboratory and microgravity," Rev. Sci. Instrum. 56, 2059-2065 (1985), American Institute of Physics.

A. Marzo, B. W. Drinkwater, "Holographic acoustic tweezers," Proc. Natl. Acad. Sci. 116, 84-89 (2019).

A. Wixforth, C. Gauer, J. Scriba, M. Wassermeier, R. Kirchner, "Flat fluidics: A new route toward programmable biochips," Microfluidics, BioMEMS, and Medical Microsystems, 4982, 235 (2003).

S. Collignon, J. Friend, L. Yeo, "Planar microfluidic drop splitting and merging," Lab Chip. 15, 1942-1951 (2015).

P. Li, Z. Ma, Y. Zhou, D. J. Collins, Z. Wang, Y. Ai, "Detachable Acoustophoretic System for Fluorescence-Activated Sorting at the Single-Droplet Level," Anal. Chem. 91, 9970-9977 (2019), ACS Publications.

D. J. Collins, T. Alan, K. Helmerson, A. Neild, "Surface acoustic waves for on-demand production of picoliter droplets and particle encapsulation," Lab Chip. 13, 3225-3231 (2013), The Royal Society of Chemistry.

J. Reboud, Y. Bourquin, R. Wilson, G. S. Pall, M. Jiwaji, A. R. Pitt, A. Graham, A. P. Waters, J. M. Cooper, "Shaping acoustic fields as a toolset for microfluidic manipulations in diagnostic technologies," Proc. Natl. Acad. Sci. U. S. A. 109, 15162-15167 (2012).

D. Foresti, M. Nabavi, M. Klingauf, A. Ferrari, D. Poulikakos, "Acoustophoretic contactless transport and handling of matter in air," Proc. Natl. Acad. Sci. U. S. A. 110, 12549-12554 (2013).

C. N. Baroud, M. R. De Saint Vincent, J.-P. Delville, "An optical toolbox for total control of droplet microfluidics," Lab Chip. 7, 1029 (2007),The Royal Society of Chemistry.

C. Yang, G. Li, "A novel magnet-actuated droplet manipulation platform using a floating ferrofluid film," Sci. Rep. 7, 15705 (2017).

E. De Jong, Y. Wang, J. M. J. Den Toonder, P. R. Onck, "Climbing droplets driven by mechanowetting on transverse waves," Sci. Adv. 5, eaaw0914 (2019), American Association for the Advancement of Science.

T. Thorsen, R. W. Roberts, F. H. Arnold, S. R. Quake, "Dynamic Pattern Formation in a Vesicle-Generating Microfluidic Device," Phys. Rev. Lett. 86, 4163-4166 (2001), The American Physical Society.

S.-Y. Teh, R. Lin, L.-H. Hung, A. P. Lee, "Droplet microfluidics," Lab Chip. 8, 198 (2008), The Royal Society of Chemistry.

J. Li, Q. H. Qin, A. Shah, R. H. A. Ras, X. Tian, V. Jokinen,, "Oil droplet self-transportation on oleophobic surfaces," Sci. Adv. 2, e1600148 (2016), American Association for the Advancement of Science.

J. Li, X. Zhou, J. Li, L. Che, J. Yao, G. McHale, M. K. Chaudhury, Z. Wang, "Topological liquid diode," Sci. Adv. 3, eaao3530 (2017), American Association for the Advancement of Science.

W. Lei, G. Hou, M. Liu, Q. Rong, Y. Xu, Y. Tian, L. Jiang, "High-speed transport of liquid droplets in magnetic tubular microactuators," Sci. Adv. 4, eaau8767 (2018), American Association for the Advancement of Science.

A. M. Klein, L. Mazutis, I. Akartuna, N. Tallapragada, A. Veres, V. Li, L. Peshkin, D. A. Weitz, M. W. Kirschner, "Droplet barcoding for single-cell transcriptomics applied to embryonic stem cells," Cell. 161, 1187-1201 (2015), Elsevier Inc.

R. H. Cole, S.-Y. Tang, C. A. Siltanen, P. Shahi, J. Q. Zhang, S. Poust, Z. J. Gartner, A. R. Abate, "Printed droplet microfluidics for on demand dispensing of picoliter droplets and cells," Proc. Natl. Acad. Sci. 114, 8728-8733 (2017).

M. Prakash, N. Gershenfeld, "Microfluidic bubble logic," Science. 315, 832-835 (2007), American Association for the Advancement of Science.

P. N. Duncan, T. V Nguyen, E. E. Hui,, "Pneumatic oscillator circuits for timing and control of integrated microfluidics," Proc. Natl. Acad. Sci. 110, 18104-18109 (2013).

H. Mertaniemi, R. Forchheimer, O. Ikkala, R. H. A. Ras, "Rebounding Droplet-Droplet Collisions on Superhydrophobic Surfaces: from the Phenomenon to Droplet Logic," Adv. Mater. 24, 5738-5743 (2012), Wiley-VCH Verlag GmbH & Co., KGaA, Weinheim.

T. Thorsen, S. J. Maerkl, S. R. Quake,, "Microfluidic large-scale integration," Science. 298, 580-584 (2002).

V. N. Luk, G. C. H. Mo, A. R. Wheeler, "Pluronic Additives: A Solution to Sticky Problems in Digital Microfluidics," Langmuir. 24, 6382-6389 (2008), American Chemical Society.

P. Gruner, B. Riechers, B. Semin, J. Lim, A. Johnston, K. Short, J. C. Baret, "Controlling molecular transport in minimal emulsions," Nat. Commun. 7, 10392 (2016).

A. S. Basu, Y. B. Gianchandani, "A 128-pixel digitally-programmable microfluidic platform for non-contact droplet actuation using marangoni flows," Transducers Eurosens. XXVII, Int. Conf. Solid-State Sens., Actuators Microsyst. 771-774 (2007).

X. Y. Du, M. E. Swanwick, Y. Q. Fu, J. K. Luo, A. J. Flewitt, D. S. Lee, S. Maeng, W. I. Milne, "Surface acoustic wave induced streaming and pumping in 128° Y-cut LiNbO 3 for microfluidic applications," J. Micromech. Microeng. 19, 35016 (2009), Journal of Micromechanics and Microengineering.

M. Alghane, B. X. Chen, Y. Q. Fu, Y. Li, J. K. Luo, A. J. Walton, "Experimental and numerical investigation of acoustic streaming excited by using a surface acoustic wave device on a 128° YX-LiNbO3 substrate," J. Micromech. Microeng. 21, 15005 (2011), IOP Publishing Ltd.

A. Karimi, S. Yazdi, A. M. Ardekani, "Hydrodynamic mechanisms of cell and particle trapping in microfluidics," Biomicrofluidics. 7, 21501 (2013), American Institute of Physics.

S. Boluriaan, P. J. Morris, "Acoustic Streaming: From Rayleigh to Today," Int. J. Aeroacoustics. 2, 255-292 (2003).

M. K. Aktas, B. Farouk, "Numerical simulation of acoustic streaming generated by finite-amplitude resonant oscillations in an enclosure," J. Acoust. Soc. Am. 116, 2822-2831 (2004), Acoustical Society of America.

G. D. West, "Circulations occurring in acoustic phenomena," Proc. Phys. Soc. Sect. B. 64, 483-487 (1951).

(56) References Cited

OTHER PUBLICATIONS

U. Ingrd, S. Labate, "Acoustic Circulation Effects and the Nonlinear Impedance of Orifices," J. Acoust. Soc. Am. 22, 211-218 (1950), The Journal of the Acoustical Society of America.
Y. C. Tung, A. Y. Hsiao, S. G. Allen, Y. S. Torisawa, M. Ho and S. Takayama, "High-throughput 3D spheroid culture and drug testing using a 384 hanging drop array," Analyst, 2011, 136, 473-478, The Royal Society of Chemistry.
H. W. Hou, M. E. Warkiani, B. L. Khoo, Z. R. Li, R. A. Soo, D. S. W. Tan, W. T. Lim, J. Han, A. A. S. Bhagat and C. T. Lim,"Isolation and retrieval of circulating tumor cells using centrifugal forces," Sci. Rep., 2013, 3, 1259.
H. Tsutsui, and C. M., Ho,"Cell separation by non-inertial force fields in microfluidic systems," Mech. Res. Commun., 2009, 36, 92-103, Elsevier, Ltd.
T. Thorsen, S. J. Maerkl and S. R. Quake,"Microfluidic Large-Scale Integration," Science, 2002, 298, 580-584, American Association for the Advancement of Science.
V. Srinivasan, V.K. Pamula and R. B. Fair,"An integrated digital microfluidic lab-on-a-chip for clinical diagnostics on human physiological fluids," Lab Chip, 2004, 4, 310-315, The Royal Society of Chemistry.
J. Lee, H. Moon, J. Fowler, T. Schoellhammer and C.J. Kim, "Electrowetting and electrowetting-on-dielectric for microscale liquid handling," Sensors and Actuators, A, 2002, 95, 259-268, Elsevier Science B.V.
E. H. Trinh,"Compact acoustic levitation device for studies in fluid dynamics and material science in the laboratory and microgravity," Rev. Sci. Instrum., 1985, 56, 2059-2065, American Institute of Physics.
M. K. Khaw, C. H. Ooi, F. Mohd-Yasin, R. Vadivelu, J. St John and N. T. Nguyen, ,"Digital microfluidics with a magnetically actuated floating liquid marble," Lab Chip, 2016, 16, 2211-2218, The Royal Society of Chemistry.
O. D. Velev, B. G. Prevoand and K. H. Bhatt,"On-chip manipulation of free droplets—Tiny free-floating drops can be driven across a liquid medium by an electric field," Nature, 2003, 426, 515, Nature Publishing Group.
A. S. Basu and Y. B. Gianchandani,"A Programmable Array for Contact-Free Manipulation of Floating Droplets on Featureless Substrates by the Modulation of Surface Tension," J. Microelectromech. Syst., 2009, 18, 1163-1172, IEEE.
S. K. Chung and E. H. Trinh, , "Containerless protein crystal growth in rotating levitated drops," J. Cryst. Growth, 1998, 194, 384-397, Elsevier Science B.V.
L. Y. Yeo and J. R. Friend,"Surface Acoustic Wave Microfluidics," Annu. Rev. Fluid Mech., 2014, 46, 379-406.
A. Ozcelik, J. Rufo, F. Guo, Y. Gu, P. Li, J. Lata, and T. J. Huang , "Acoustic tweezers for the life sciences," Nat. Methods, 2018, 15, 1021-1028, Springer Nature America.
Z. Tian, S. Yang, P. H. Huang, Z. Wang, P. Zhang, Y. Gu, H. Bachman,"Wave number-spiral acoustic tweezers for dynamic and reconfigurable manipulation of particles and cells," Sci. Adv., 2019, 5, 6062, American Association for the Advancement of Science.
D. J. Collins, C. Devendran, Z. Ma, J. W. Ng, A. Neild and Y. Ai "Acoustic tweezers via sub-time-of-flight regime surface acoustic waves," Sci. Adv., 2016, 2, 1600089.
J. P. Armstrong, S. A. Maynard, I. J. Pence, A. C. Franklin, B. W. Drinkwater and M. M. Stevens,"Spatiotemporal quantification of acoustic cell patterning using Voronoi tessellation," Lab Chip, 2019, 19, 562-573, The Royal Society of Chemistry.
P. Glynne-Jones, C. E. Demore, C. Ye, Y. Qiu, S. Cochran and M. Hill,"Array-Controlled Ultrasonic Manipulation of Particles in Planar Acoustic Resonator," IEEE Trans. Ultrason. Eng., 2012, 59, 1258-1266.
H. Bruus,"Acoustofluidics 7: The acoustic radiation force on small particles," Lab Chip, 2012, 12, 1014-1021, The Royal Society of Chemistry.
S. M. Naseer, A. Manbachi.M. Samandari.P. Walch,Y. Gao, Y. S. Zhang, F. Davoudi, W. Wang, K. Abrinia, J.M. Cooper and A. Khademhosseini,"Surface acoustic waves induced micropatterning of cells in gelatin methacryloyl (GelMA) hydrogels," Biofabrication, 2017, 9, 015020, IOP Publishing Ltd.
G. Destgeer, J. H. Jung, J. Park, H. Ahmed, K. Park, R. Ahmad and H. J. Sung, ,"Acoustic impedance-based manipulation of elastic microspheres using travelling surface acoustic waves," RSC Adv., 2017, 7, 22524-22530, The Royal Society of Chemistry.
P. H. Huang, N. Nama, Z. Mao, P. Li, J. Rufo, Y. Chen, Y. Xie, C. H. Wei, L. Wang and T. J. Huang,"A reliable, programmable acoustofluidic pump powered by oscillating sharp-edge structures," Lab Chip, 2014 14, 4319-4323, The Royal Society of Chemistry.
L. Schmid, A. Wixforth, D. A. Weitz and T. Franke,"Novel surface acoustic wave (SAW)-driven closed PDMS flow chamber," Microfluid. Nanofluid., 2012, 12, 229-235, Springer.
R. Shilton, M. K. Tan, L. Y. Yeo and J. R. Friend,"Particle concentration and mixing in microdrops driven by focused surface acoustic waves," J. Appl. Phys., 2008, 104, 014910, American Institute of Physics.
A. R. Rezk, O. Manor, J. R. Friend and L. Y. Yeo, ,"Unique fingering instabilities and soliton-like wave propagation in thin acoustowetting films," Nat. Comm., 2012, 3, 1167, Macmillian Publishers, Ltd.
Z. Guttenberg, H. Müller, H. Habermüller, A. Geisbauer, J. Pipper, J. Felbel, M. Kielpinski, J. Scribaand A. Wixforth,"Planar chip device for PCR and hybridization with surface acoustic wave pump," Lab Chip, 2005, 5, 308-317,The Royal Society of Chemistry.
D. Ahmed, A. Ozcelik, N. Bojanala, N. Nama, A. Upadhyay, Y. Chen, W. Hanna-Rose and T. J. Huang,"Rotational manipulation of single cells and organisms using acoustic waves," Nat. Comm., 2016, 7, 11085.
Z. Yang, K. L. Cole, Y. Qiu, I. M. Somorjai, P. Wijesinghe, J. Nylk, S. Cochran, G. C. Spalding, D. A. Lyons and K. Dholakia,"Light sheet microscopy with acoustic sample confinement," Nat. Comm., 2019, 10, 669, Springer Nature.
M. Wu, Y. Ouyang, Z. Wang, R. Zhang, P. H. Huang, C. Chen, H. Li, P. Li, D. Quinn, M. Dao, S. Suresh, Y. Sadovsky, and T. J. Huang, "Isolation of exosomes from whole blood by integrating acoustics and microfluidics," Proc. Natl. Acad. Sci. U. S. A., 2017, 114, 10584-10589.
C. W. Shields IV, L. M. Johnson, L. Gao and G. P. López,"Elastomeric Negative Acoustic Contrast Particles for Capture, Acoustophoretic Transport, and Confinement of Cells in Microfludic Systems," Langmuir, 2014, 30, 3923-3927.
T. Laurell, F. Petersson, and A. Nilsson,"Chip integrated strategies for acoustic separation and manipulation of cells and particles," Chem. Soc. Rev., 2007, 36, 492-506, The Royal Society of Chemistry.
D. J. Collins, Z. Ma, J. Han and Y. Ai,"Continuous micro-vortex-based nanoparticle manipulation via focused surface acoustic waves," Lab Chip, 2017, 17, 91-103, The Royal Society of Chemistry.
L. Ren, S. Yang, P. Zhang, Z. Qu, Z. Mao, P. H. Huang, Y. Chen, M. Wu, L. Wang, P. Li and T. J. Huang,"Standing Surface Acoustic Wave (SSAW)-Based Fluorence-Activated Cell Sorter," Small, 2018, 14, 1801996, Wiley-VCH Verlag GmbH & Co., Weinheim.
Z. Ma, Y. Zhou, D. J. Collins and Y. Ai,"Fluorescence activated cell sorting via a focused traveling surface acoustic beam," Lab Chip, 2017, 17, 3176-3185, The Royal Society of Chemistry.
O. Youssefi and E. D. Diller, "Contactless Robotic Micromanipulation in Air Using a Magneto-Acoustic System," IEEE Robot. Autom. Lett., 2019.
A. Watanabe, K. Hasegawa and Y. Abe,"Contactless Fluid Manipulation in Air: Droplet Coalescence and Active Mixing by Acoustic Levitation," Sci. Rep., 2018, 8, 10221, Springer Nature.
M. A. Andrade, T. S. Camargo and A. Marzo,Automatic contactless injection, transportation, merging, and ejection of droplets with a multifocal point acoustic levitator, Rev. Sci. Instrum., 2018, 89, 125105, AIP Publishing.
A. Marzo and B. W. Drinkwater,"Holographic acoustic tweezers," Proc. Natl. Acad. Sci. U. S. A., 2018, 116, 84-89.
A. Marzo, S. A. Seah, B. W. Drinkwater, D. R. Sahoo, B. Long and S. Subramanian,"Holographic acoustic elements for manipulation of levitated objects," Nat. Comm., 2015, 6, 8661, Macmillian Publishers Limited.

(56) References Cited

OTHER PUBLICATIONS

P. Zhang, T. Li, J. Zhu, X. Zhu, S. Yang, Y. Wang, X. Yin and X. Zhang, "Generation of acoustic self-bending and bottle beams by phase engineering," Nat. Commun., 2014, 5, 4316, Macmillian Publishers Limited.

D. Foresti, M. Nabavi, M. Klingauf, A. Ferrari and D. Poulikakos, "Acoustophorectic contactless transport and handling of matter in air," Proc. Natl. Acad. Sci. U. S. A., 2013, 110, 12549-12554.

T. Vasileiou, D. Foresti, A. Bayram, D. Poulikakos and A. Ferrari,"Toward Contactless Biology: Acoustophoretic DNA Transfection," Sci. Rep., 2016, 6, 20023.

K. Melde, A. G. Mark, T. Qiu and P. Fischer,"Holograms for acoustics," Nature, 2016, 537, 518-522, Macmillian Publishers Limited.

M. Wiklund, R. Green and M. Ohlin,"Acoustofluidics 14: Applications of acoustic streaming in microfluidic devices," Lab Chip, 2012, 12, 2438-2451, The Royal Society of Chemistry.

Y. Q. Fu, X. Y. Du, J. K. Luo, A. J. Flewitt, W. I. Milne, D. S. Lee, N. M. Park, S. Maeng, S. H. Kim, Y. J. Choi and J. Park,"Recent developments on ZnO films for acoustic wave based bio-sensing and microfluidic applications: a review," Sensors, 2007, 478-483, Elservier.

S. P. Zhang, J. Lata, C. Chen, J. Mai, F. Guo, Z. Tian, L. Ren, Z. Mao, P. H. Huang, P. Li, S. Yang and T. J. Huang,"Digital acoustofluidics enables contactless and programmable liquid handling," Nat. Comm., 2018, 9, 2928, Springer Nature.

C. Chen, S. P. Zhang, S. Z. Mao, N. Nama, Y. Gu, P. H. Huang, Y. Jing, X. Guo, F. Costanzo and T. J. Huang, ,"Three-dimensional numerical simulation and experimental investigation of boundary-driven streaming in surface acoustic wave microfluidics," Lab Chip, 2018, 18, 3645-3654, The Royal Society of Chemistry.

N. Bertin, H., Chraibi, R., Wunenburger, J. P., Delville and E., Brasselet, "Universal Morphologies of Fluid Interfaces Deformed by the Radiation Pressure of Acoustic or Electromagnetic Waves," Phys. Rev. Lett., 2012, 109, 244304, American Physical Society.

B. Issenmann, R. Wunenburger, H. Chraibi, M. Gandil and J. P. Delville,"Unsteady deformations of a free liquid surface caused by radiation pressure,"J. Fluid Mech., 2011, 682, 460-490, Cambridge University Press.

C. A. Macrae and R. T., Peterson,"Zebrafish as tools for drug discovery," Nat. Rev. Drug Discovery, 2015, 14, 721, Macmillian Publishers Limited.

Ramsey, J. "The burgeoning power of the shrinking laboratory." Nat Biotechnol, 1999, 1061-1062, 17, Nature America Inc., New York. (2 pages).

Squires, T.M. et al. "Microfluidics: Fluid physics at the nanoliter scale." Rev. Mod. Phys., 2005, 977-1026, 77(3), The American Physical Society, United States of America. (50 pages).

Marx, V. "Pouring over liquid handling." Nat Methods, 2014, 33-38, 11, Nature America Inc., New York. (6 pages).

Hayden, E. "The automated lab." Nature, 2014, 131-132, 516, Macmillan Publishers Limited, New York. (2 pages).

Unger, M. et al., "Monolithic Microfabricated Valves and Pumps By Multilayer Soft Lithography." Science, 2000, 113-116, 288(5463), American Association for the Advancement of Science, Washington D.C. (5 pages).

Treutlein, B. et al. "Reconstructing lineage hierarchies of the distal lung epithelium using single-cell RNA-seq." Nature, 2014,371-375, 509, Macmillan Publishers Limited, New York.(16 pages).

Cho, S. et al. "Creating, Transporting, Cutting, and Merging Liquid Droplets by Electrowetting-Based Actuation for Digital Microfluidic Circuits." J. of Microeletromechanical Systems, 2003, 70-80, 12(1), Institute of Electrical and Electronics Engineers (IEEE), New York. (11 pages).

Choi, K. et al. "Digital Microfluidics." Annual Rev. Anal. Chem., 2012, 413-440, 5, Annual Reviews, United States of America. (30 pages).

Elrod, S.A. , Hadimioglu, B., Khuri-Yakub, B.T., Rawson, E.G., Richley, E., Quate, C.F., Mansour, N.. N., and Lundgren, T.S. "Nozzleless droplet formation with focused acoustic beams." J. App. Phys., 1989, 3441-3447, 5(9), AIP Publishing, United States of America. (8 pages).

Gedge, M. et al. "Acoustofluidics 17: Theory and applications of surface acoustic wave devices for particle manipulation." Lab Chip, 2012, 2998-3007, 12(17), Royal Society of Chemistry, United States of America. (10 pages).

Wiklund, M. et al. "Acoustofluidics 14: Applications of acoustic streaming in microfluidic devices." Lab Chip, 2012, 2438-2451, 12(14), Royal Society of Chemistry, United States of America. (14 pages).

Stroock, A. et al. "Chaotic Mixer for Microchannels." Science, 2002, 647-651, 295(5555), AAAS, Washington, D.C. (6 pages).

Kim, H. et al. "Submillisecond organic synthesis: Outpacing Fries rearrangement through microfluidic rapid mixing." Science, 2016, 691-694, 395(6286), AAAS, Washington, D.C. (5 pages).

Gossett, D. et al. "Hydrodynamic stretching of single cells for large population mechanical phenotyping." PNAS, 2012, 7630-7635, 109(20), National Academy of Sciences, Washington, D.C. (6 pages).

Paulsen, K. et al. "Optofluidic fabrication for 3D-shaped particles." Nat Commun, 2015, 6976, 6, Macmillan Publishers Limited, New York. (9 pages).

Qasaimeh, M. et al. "Microfluidic quadrupole and floating concentration gradient." Nat Commun, 2011, 464, 2, Macmillan Publishers Limited, New York. (8 pages).

Aussillous, P. et al. "Liquid marbles." Nature, 2011, 924-927,411, Macmillan Magazines Ltd., New York. (4 pages).

Li, P. et al. "Acoustic separation of circulating tumor cells." PNAS, 2015, 4970-4975, 112(16), National Academy of Sciences, Washington, D.C. (6 pages).

Guo, F. et al. "Three-dimensional manipulation of single cells using surface acoustic waves." PNAS, 2016, 1522-1527, 113(6), National Academy of Sciences, Washington, D.C. (6 pages).

Ding, X. "Surface acoustic wave microfluidics." Lab Chip, 2013, 3626-3649,13(81), Royal Society of Chemistry, United States of America. (24 pages).

Melde, K. et al. "Holograms for acoustics." Nature, 2016, 518-522, 537, Macmillan Publishers Limited, New York. (16 pages).

Fu, Y.Q. et al. "SAW Streaming in ZnO Surface Acoustic Wave Micromixer and Micropump." Sensors, 2007, 477-483, IEEE, New York. (6 pages).

Vella, D.et al. "The "Cheerios" Effect." Am. J. Phys., 2005, 817-825, 73(9), American Association of Physics Teachers, United States of America (10 pages).

Mattiasson, B. et al. "Perfluorochemicals in biotechnology." Tibtech, 1987,250-254, 5, Elsevier Inc., United States of America. (5 pages).

Dash, P. et al. "Biomarkers for the Diagnosis, Prognosis, and Evaluation of Treatment Efficacy for Traumatic Brain Injury." Neurotherapuetics, 2010, 100-114, 7(1), The American Society for Experimental NeuroTherapeutics, Inc., United States of America. (15 pages).

Adachi, H. et al. "Protein crystal growth with a two-liquid system and stirring solution." J. Synchrotron Rad., 2004, 121-124, 11(1), International Union of Crystallography, United Kingdom. (4 pages).

\* cited by examiner

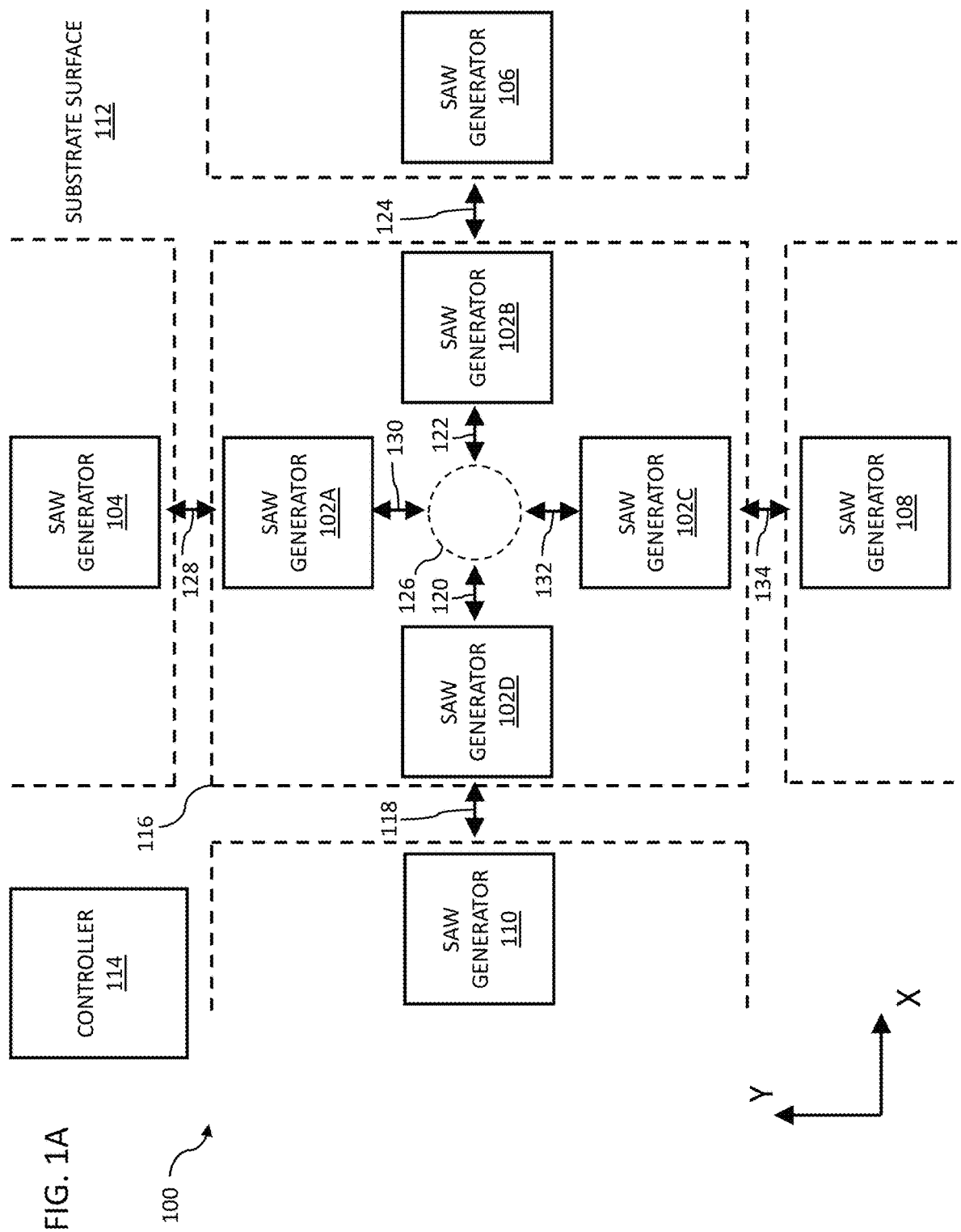

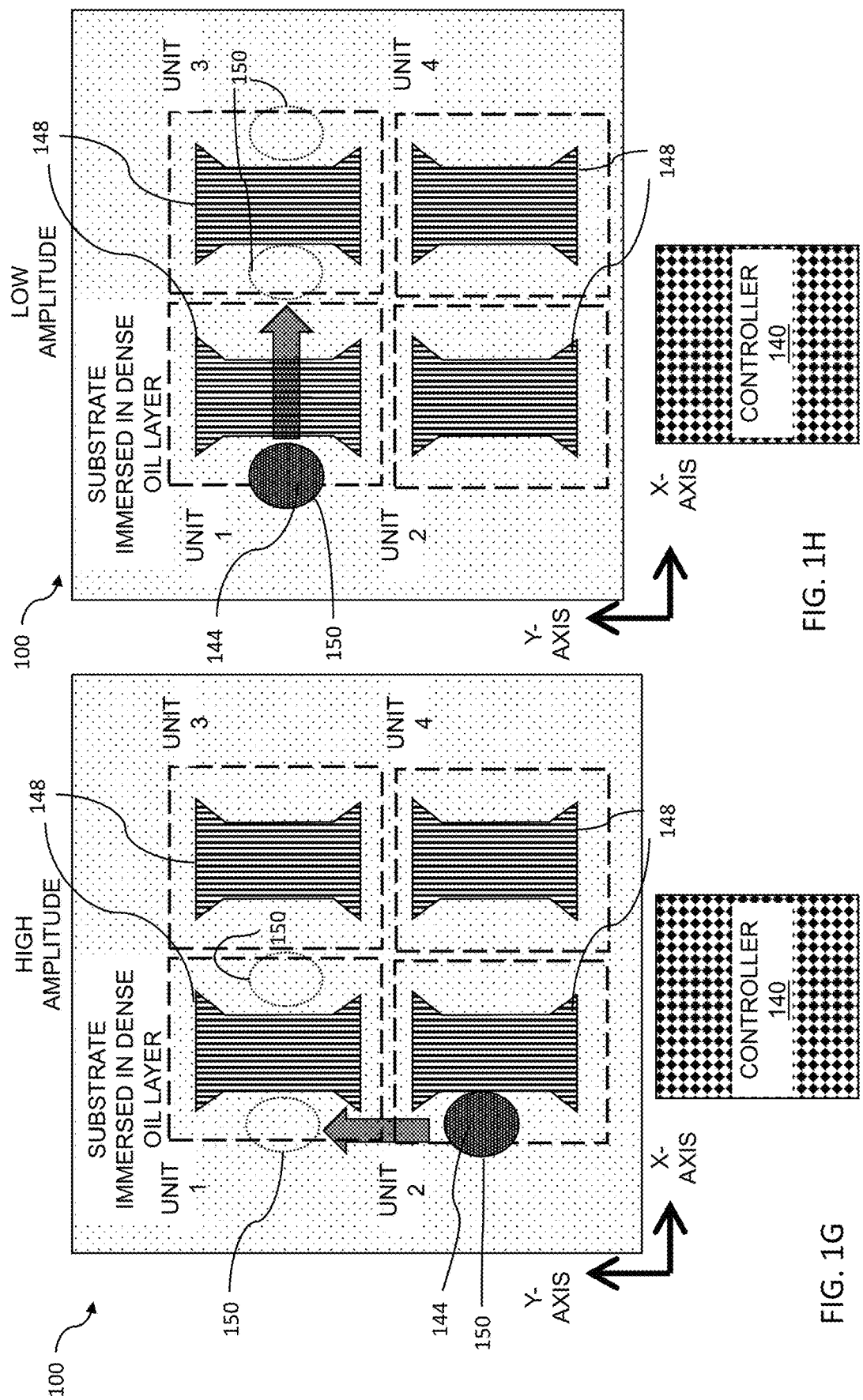

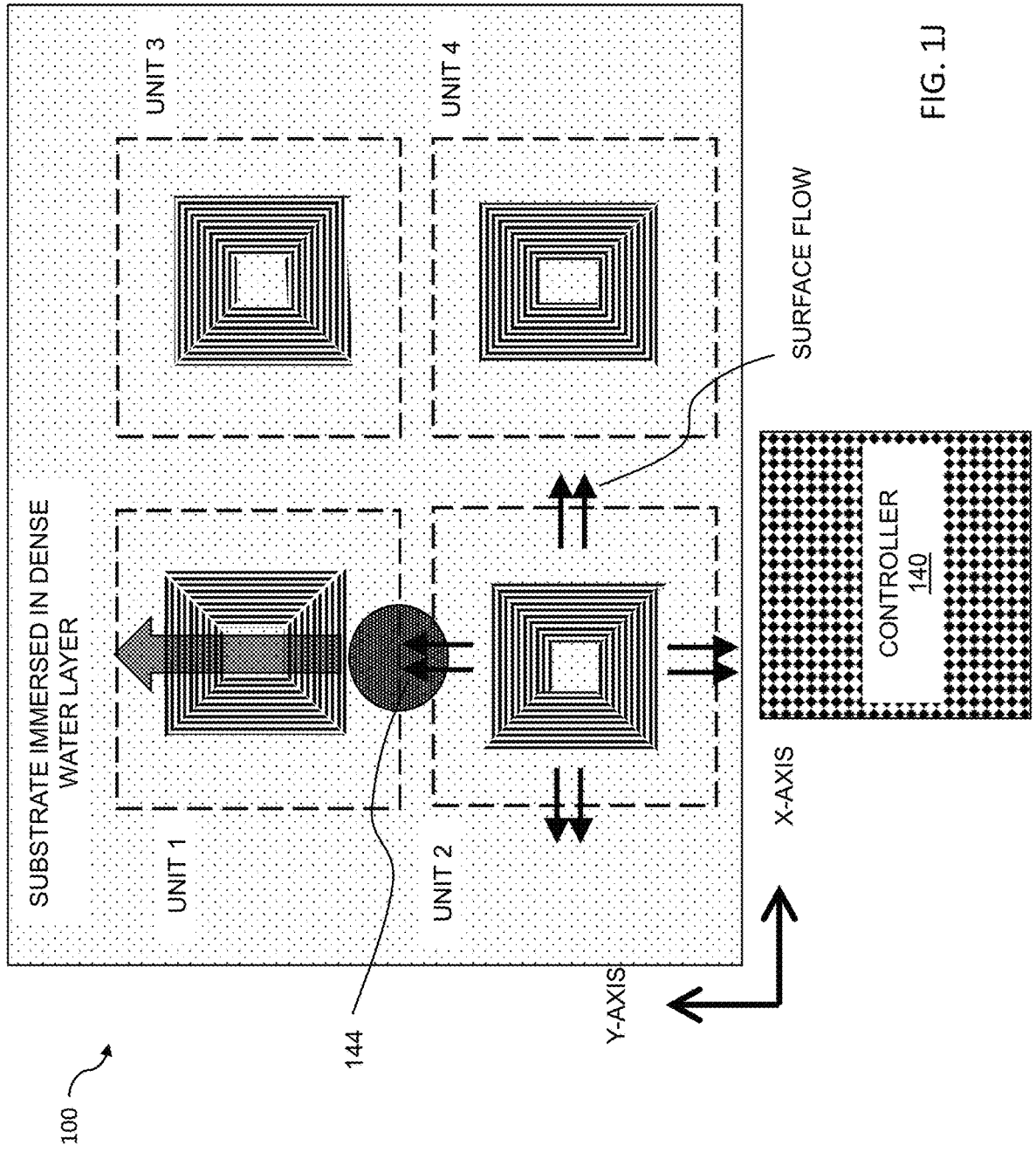

ACOUSTOFLUIDIC SYSTEMS INCLUDING ACOUSTIC WAVE GENERATORS FOR MANIPULATING FLUIDS, DROPLETS, AND MICRO/NANO OBJECTS WITHIN A FLUID SUSPENSION AND RELATED METHODS

CROSS REFERENCE TO RELATED APPLICATION

This application claims priority to U.S. Patent Application No. 62/774,502, filed Dec. 3, 2018, and titled DEVICES, SYSTEMS AND METHODS FOR DIGITAL ACOUSTOFLUIDICS, the content of which is incorporated herein by reference in its entirety.

FEDERALLY SPONSORED RESEARCH OR DEVELOPMENT

This invention was made with government support under grant numbers R01 GM112048, R33 EB019785, and R01GM132603 awarded by National Institutes of Health (NIH), grant numbers CBET-1438126, IDBR-1455658, and ECCS-1807601 awarded by National Science Foundation (NSF), and grant number W81XWH-18-1-0242 awarded by U.S. Army Medical Research Acquisition Activity. The government has certain rights to this invention.

TECHNICAL FIELD

The presently disclosed subject matter relates generally to transporting, merging, mixing, and splitting fluids, droplets, and particles. Particularly, the presently disclosed subject matter relates to acoustofluidic systems including acoustic wave generators for manipulating fluids, droplets, and micro/nano objects within a fluid suspension and related methods.

BACKGROUND

Handling of liquids is essential in a majority of applications associated with chemical, biological, and biomedical protocols. Current automated fluid processing technologies have brought unprecedented accuracy, speed, and repeatability to biomedical research and the pharmaceutical industry, such as the preparation of sequencing libraries, clinical diagnostics, and large-scale compound screening. A myriad of different liquid handling mechanisms, including robotics, micro-droplets, pneumatic valves, electrical, acoustics, hydrodynamics, magnetics, and liquid marbles, have been applied to numerous fluid-processing scenarios. Among all these mechanisms, the robotic pipetting system (e.g., Cloud Lab available from Transcriptic Inc.) is, by far, the most widely adopted solution for automation, yet it requires considerable expense, space, and maintenance. Lab-on-a-chip solutions miniaturize the bulky wet lab onto a compact chip, but are generally optimized for specific reaction protocols and hence lack programmability and dynamic reconfigurability since all channel designs are fixed after fabrication. Digital microfluidics offers an appealing solution for efficient automation by programmable manipulation of nano- to pico-liter droplets on a miniaturized device using electro-wetting forces. It has demonstrated remarkable programmability in terms of reaction automation, particularly for reaction protocols that require serial addition of reagents or precise temporal control.

Despite these strengths, most current methods suffer from a fundamental constraint. They generally rely on physical contact with a solid structure in order to contain, transport, or manipulate liquid reagents. Therefore, traces of a reagent inevitably adsorb onto the contact surface and can possibly later dissolve into another liquid sample. Thus, the risk of cross-contamination due to this undesirable "fouling of the surface" intrinsically limits the transport surfaces to a single type of working liquid plus reagent combination, and restricts the repetitive actuation of liquids with sticky biomolecules (e.g., undiluted blood). Thus, a matrix of successive cascading interaction experiments requires an exponential number of available channel paths, as well as a complex, multi-layered array of independently-actuated switches, to avoid cross contamination.

Contactless liquid-handling methods, in contrast, eliminate surface adsorption by employing long-range forces to isolate liquid reagents from solid structures, allowing for massively scalable, dynamic, multi-path fluidic processing due to the custom programmable and rewritable nature of the fluidic channels. The rewritability (i.e., the ability to reuse the same fluidic path without cross contamination) enables the use of multi-path routing and test optimization with respect to time and space when applied to the testing of large matrices of experimental variables. This advantage may be referred to as "droplet rewritability" since there can be many different possible reagent combinations within a droplet which is enabled by reusable paths for transportation or mixing, even with a small array of acoustic transducers. Recently, there has been renewed interest in acoustics as a straightforward and promising solution for liquid handling owing to its contactless operation, label-free selectivity, and high biocompatibility. An embodiment of contactless, acoustic-based liquid handling was in the form of ultrasonic levitation. This technique used a standing bulk acoustic wave to suspend liquid drops at pressure nodes in open air. These acoustic mechanisms have evolved to either holographic or digital manipulation of levitated objects or droplets. However, with its limited resolution, low controllability, and bulky transducer size, ultrasonic levitation is not suitable for manipulation in small scales. Not only does ultrasonic levitation have difficulties in accurately manipulating small objects (e.g., microparticles or nanoliter droplets), it also presents significant challenges when trying to load or collect these objects from the device.

In view of the foregoing, there is a continuing need for improved systems and techniques for digitally transporting, merging, mixing, and splitting reagents within aqueous droplets or other biosamples in a contamination-free, biocompatible manner.

BRIEF DESCRIPTION OF THE DRAWINGS

Figure 1B:
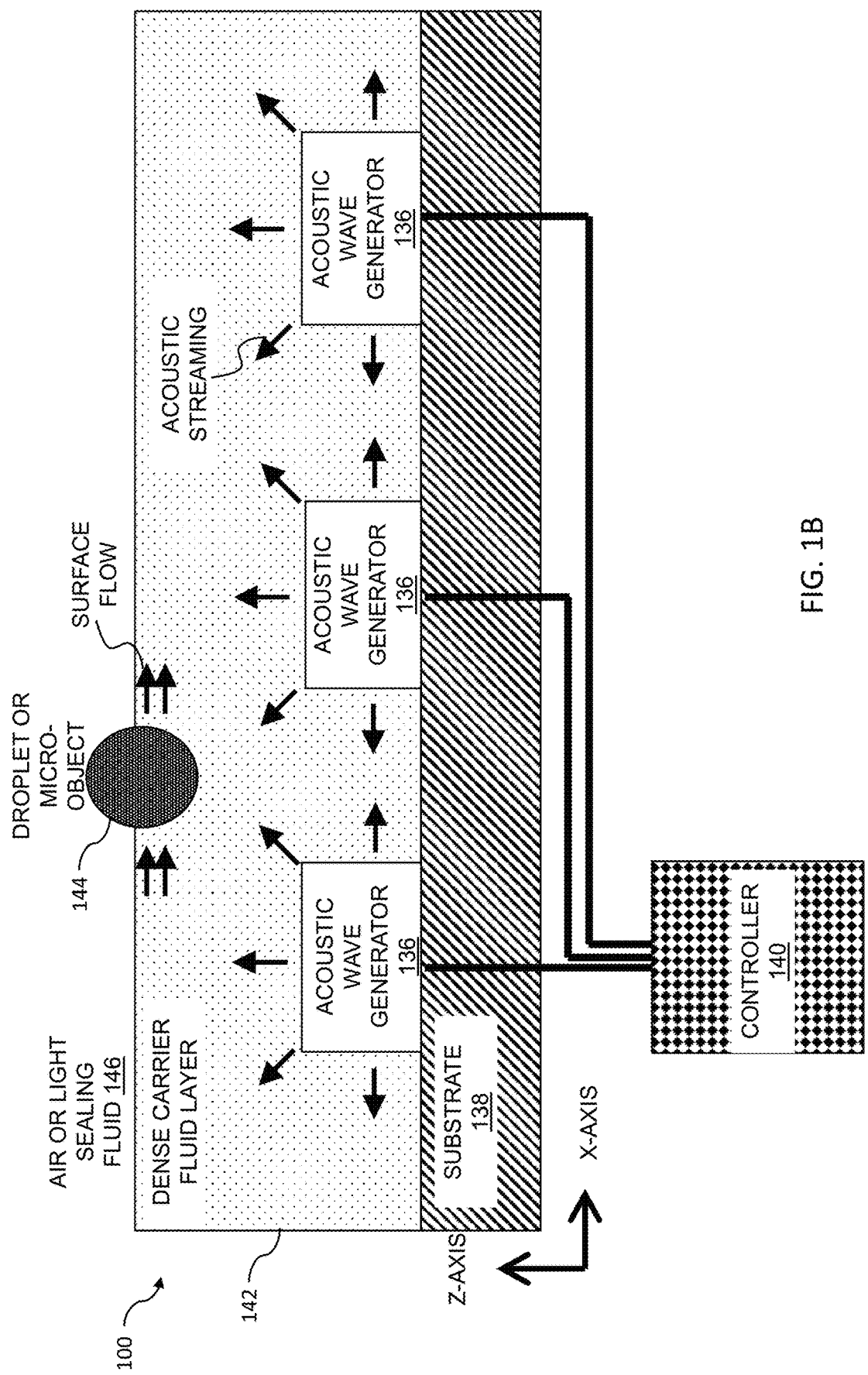
Figure 1C:
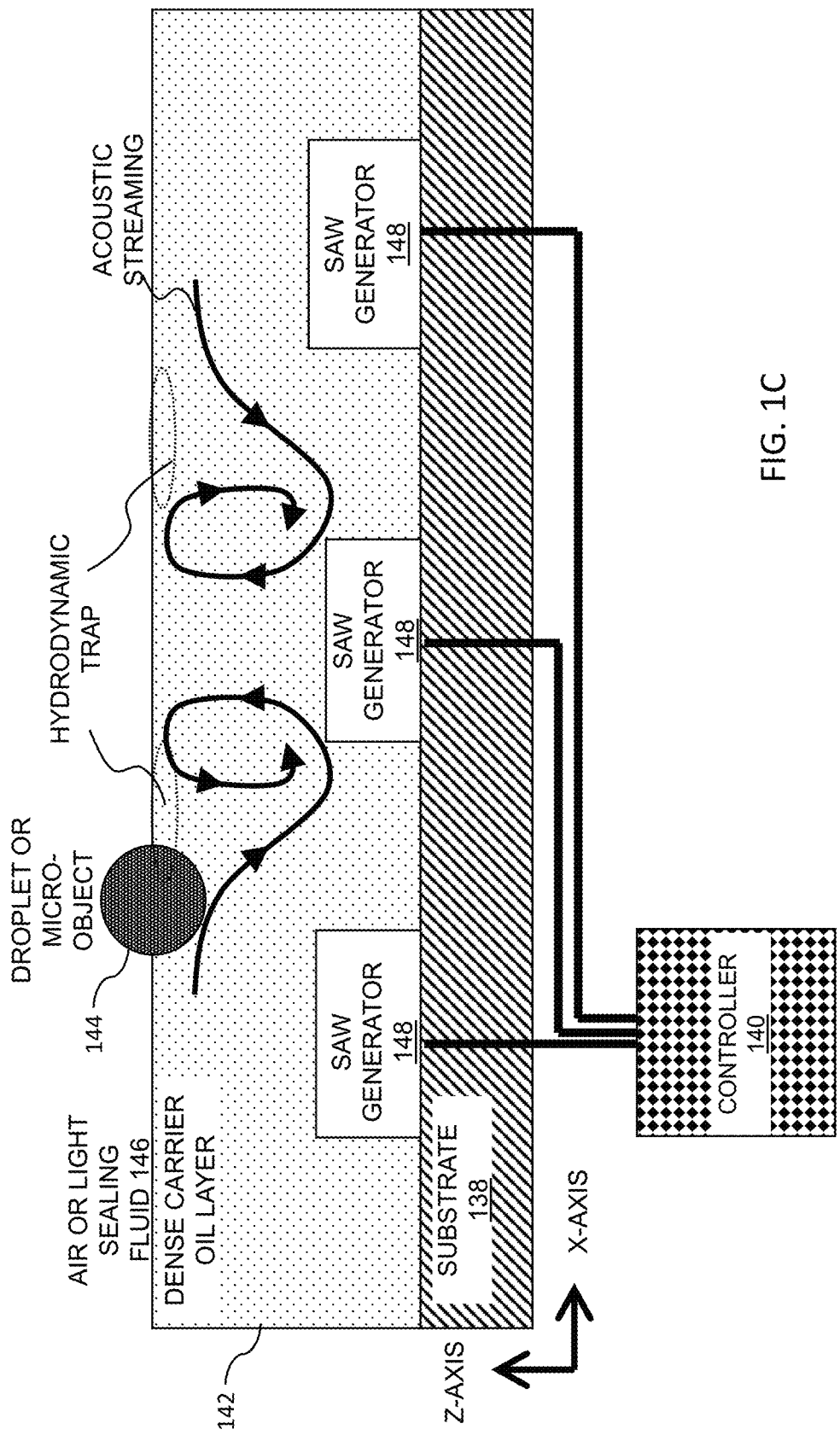
Figure 1D:
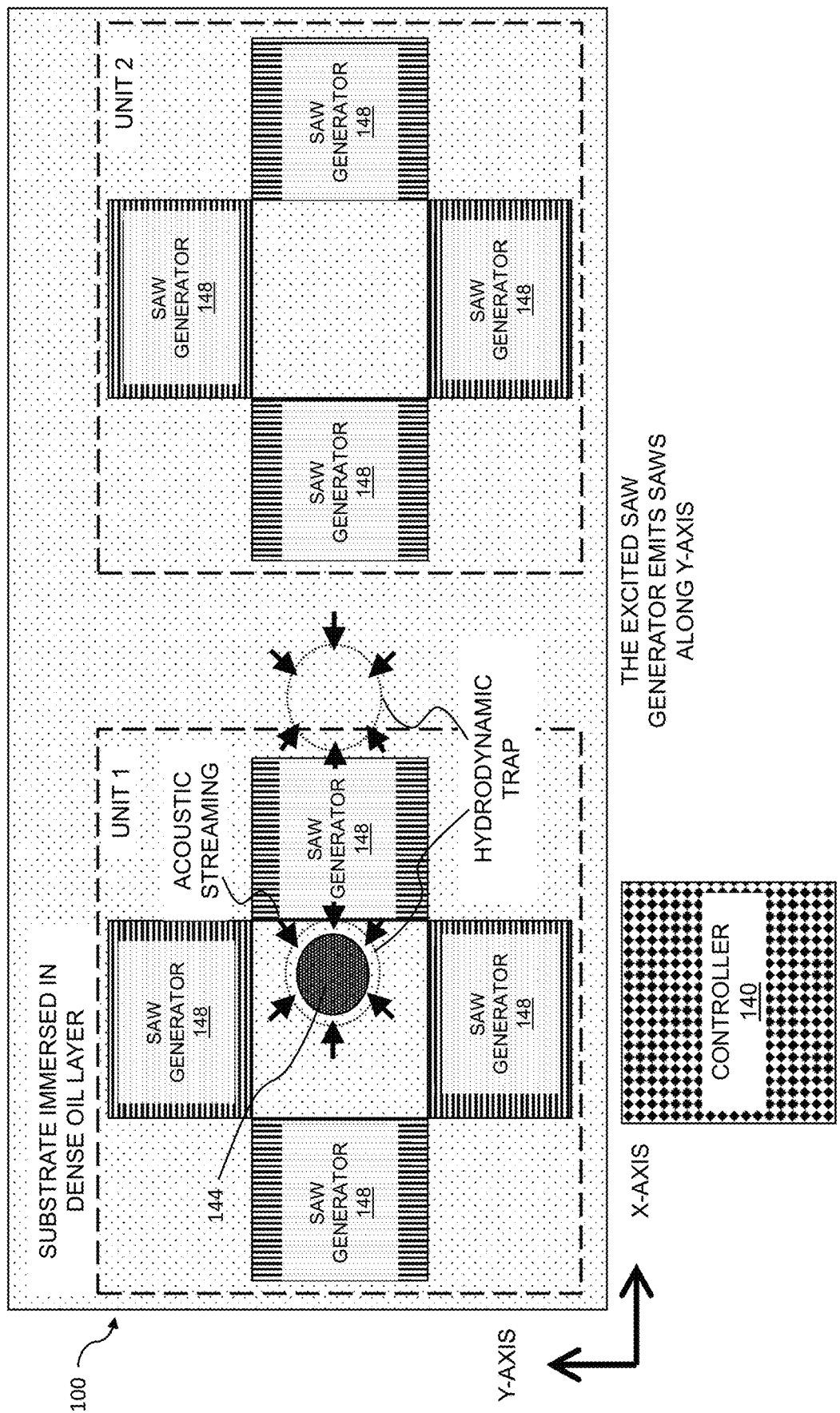
Figure 1E:
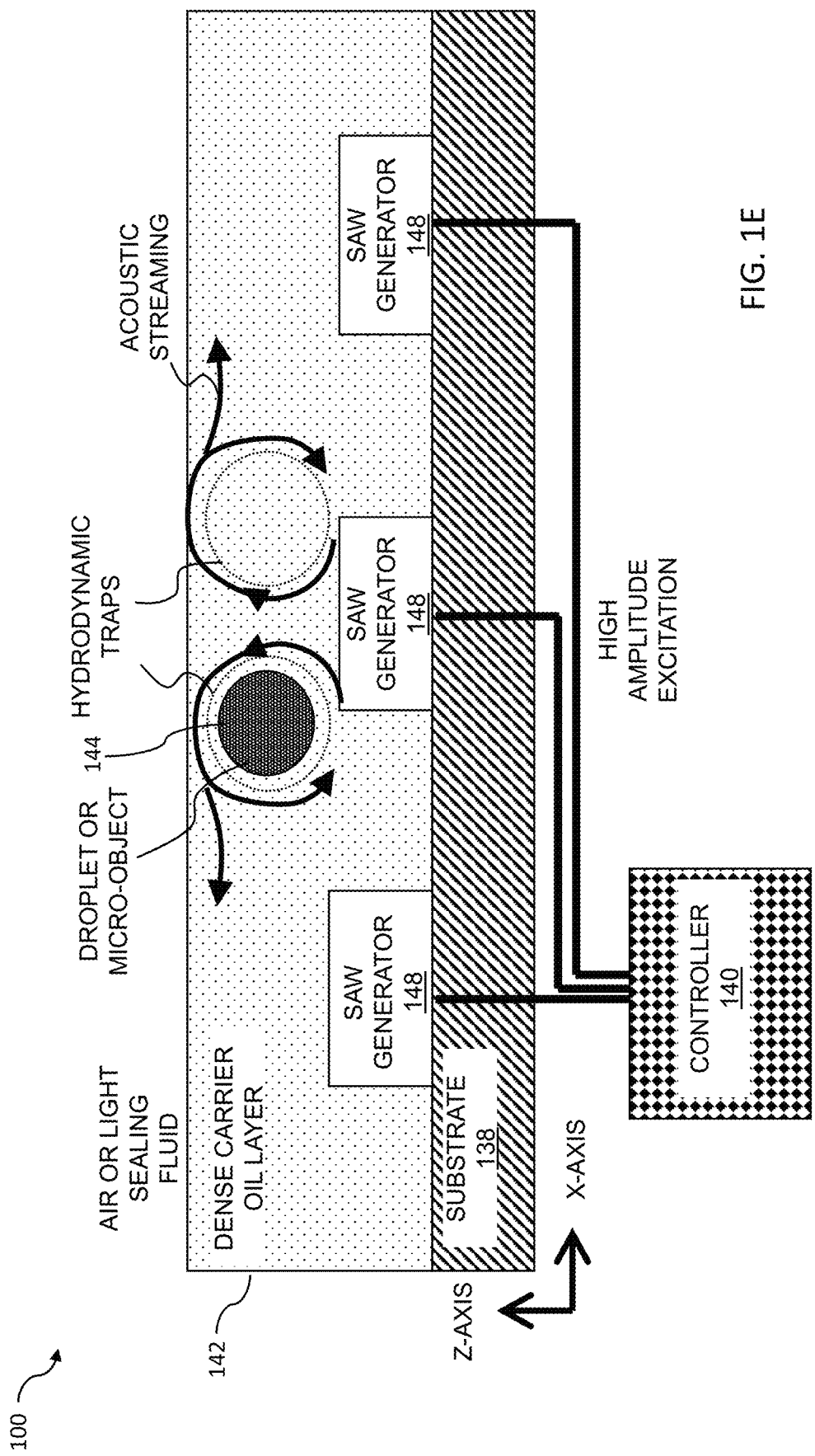
Figure 1F:
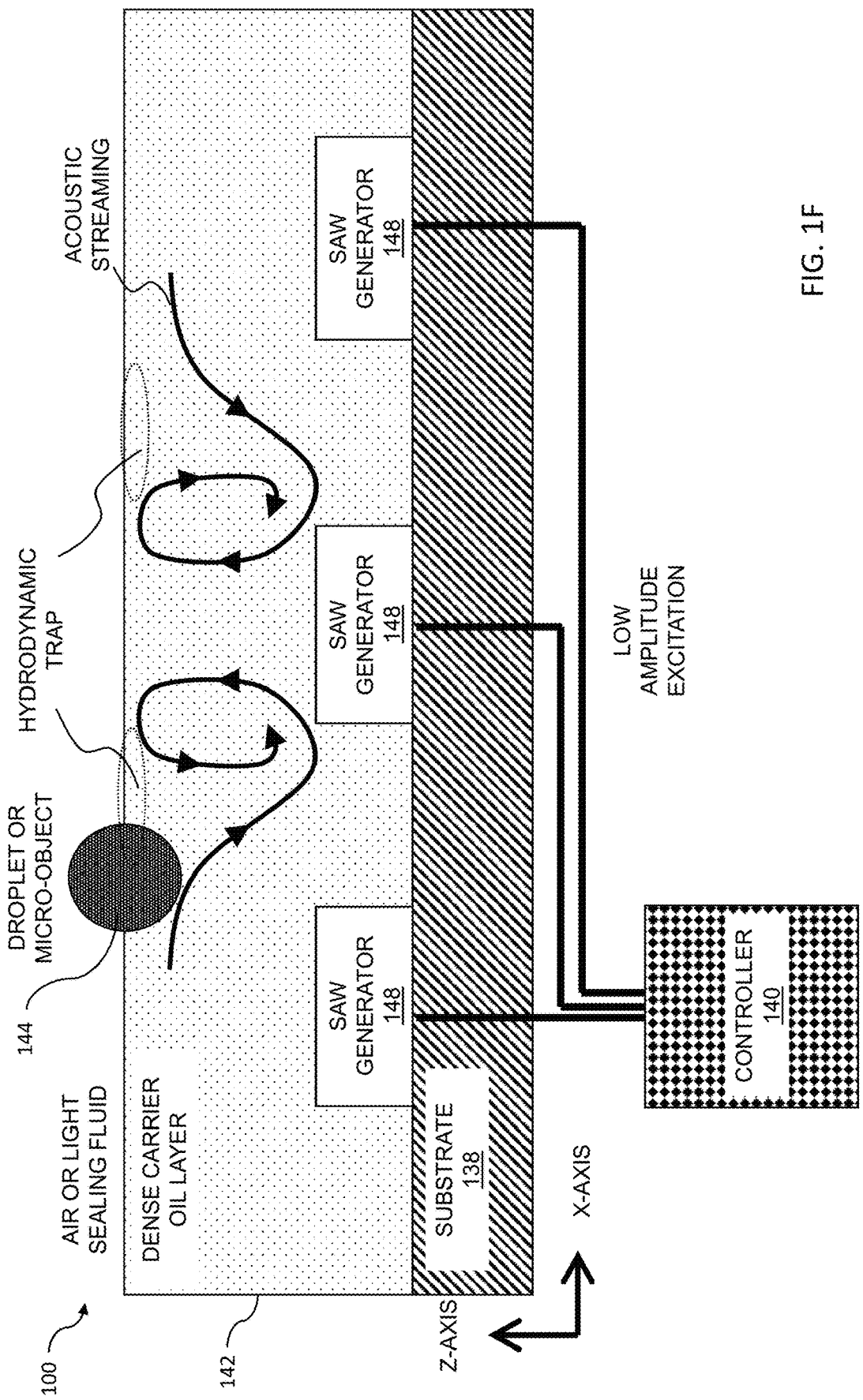
Figure 1I:
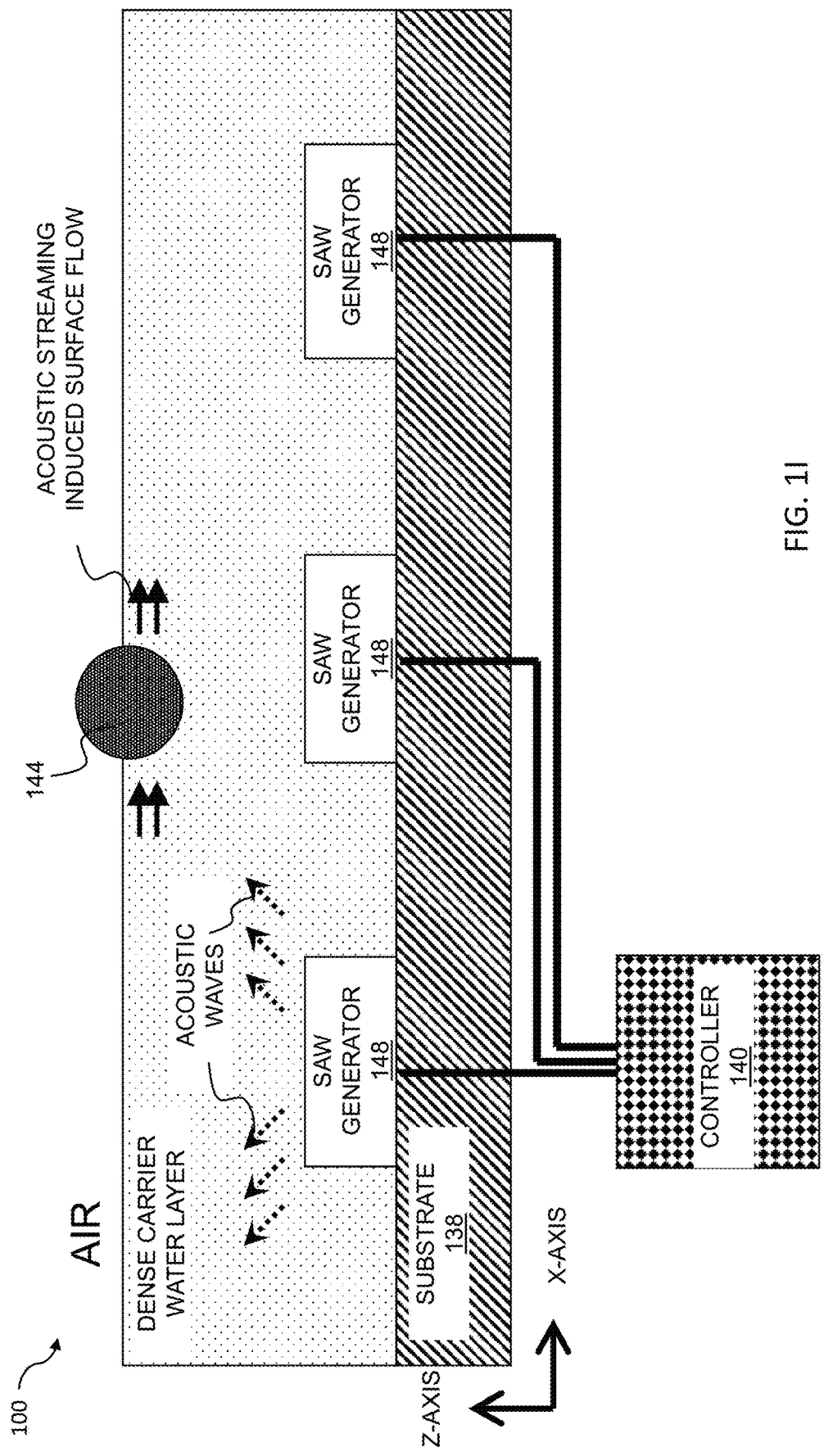
Figure 1K:
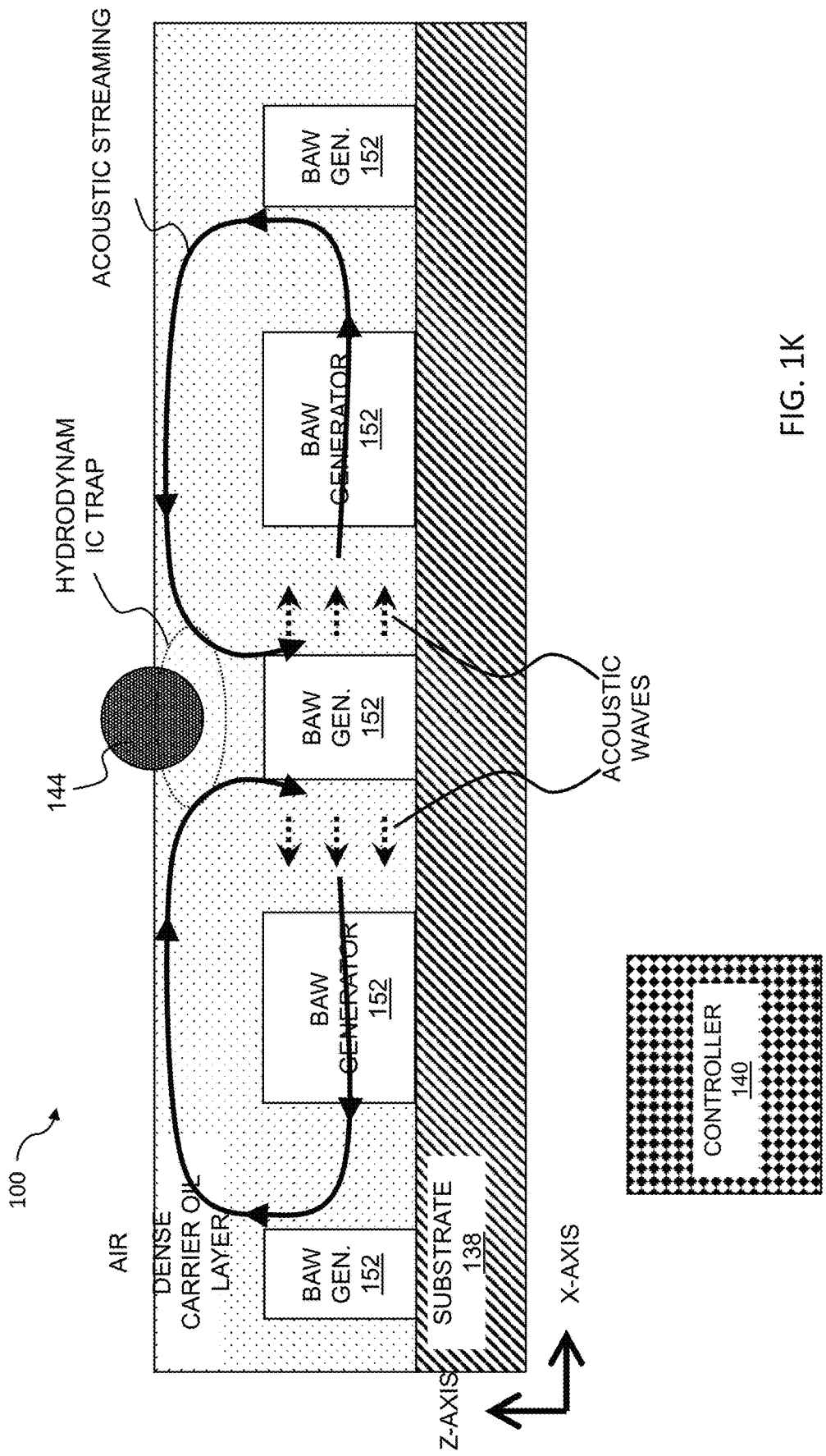
Figure 1L:
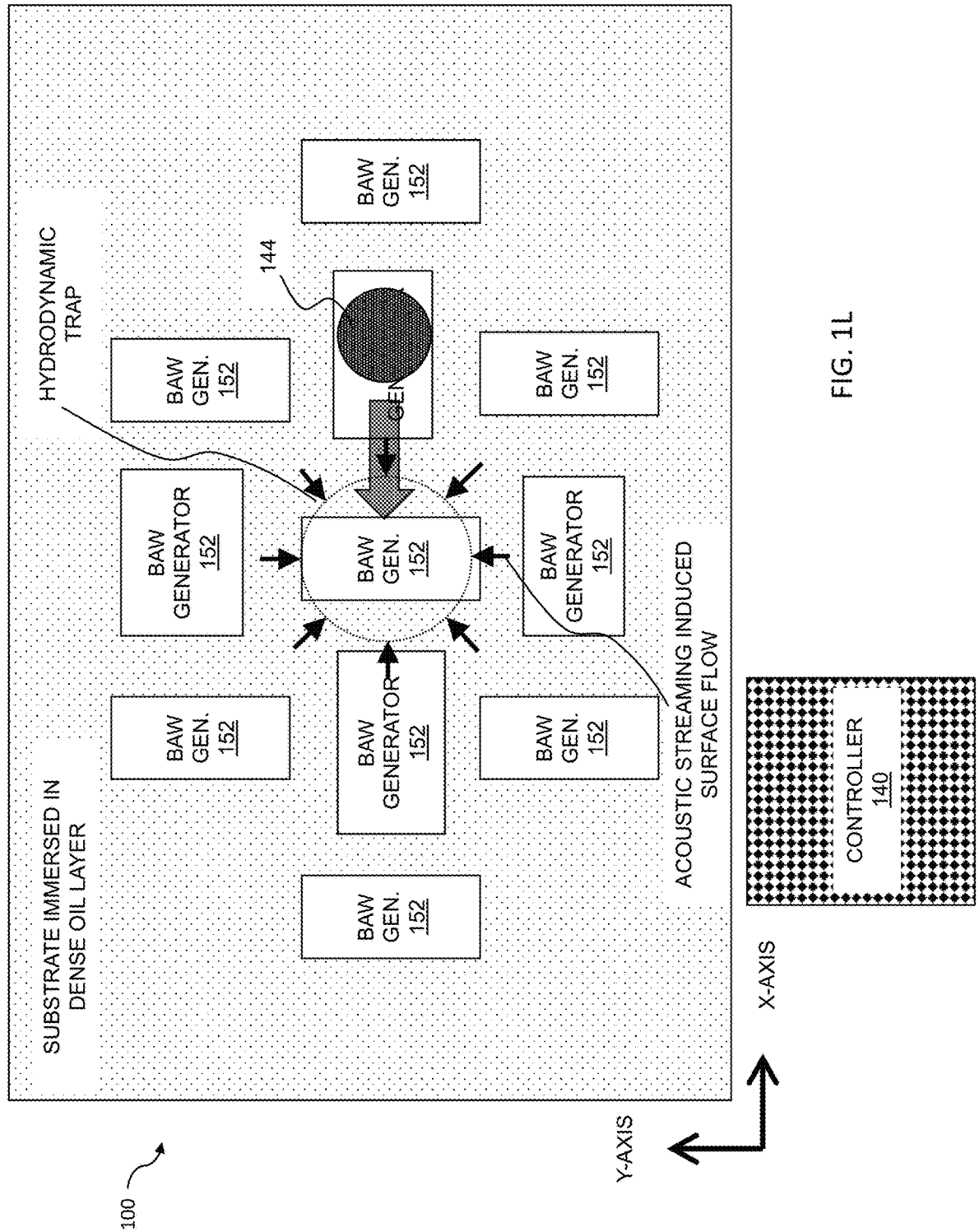
Figure 2B:
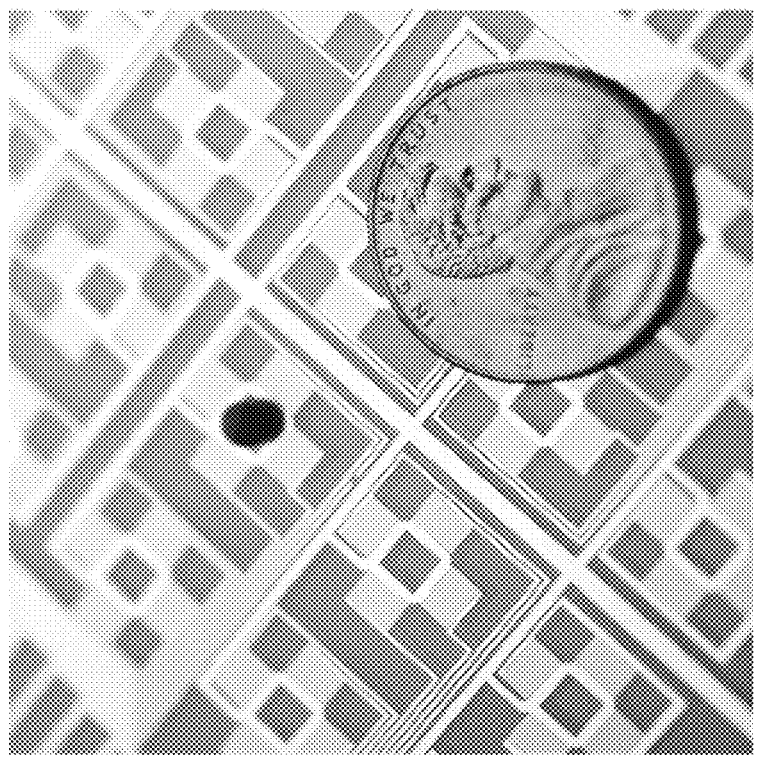
Figure 2A:
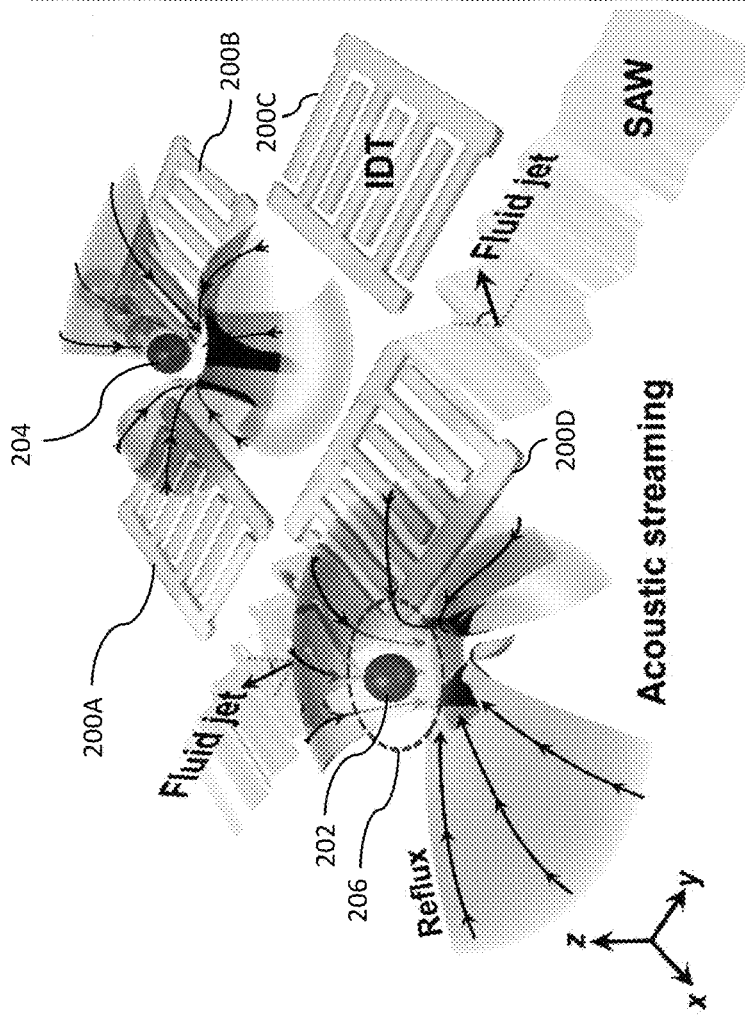
Figure 3:
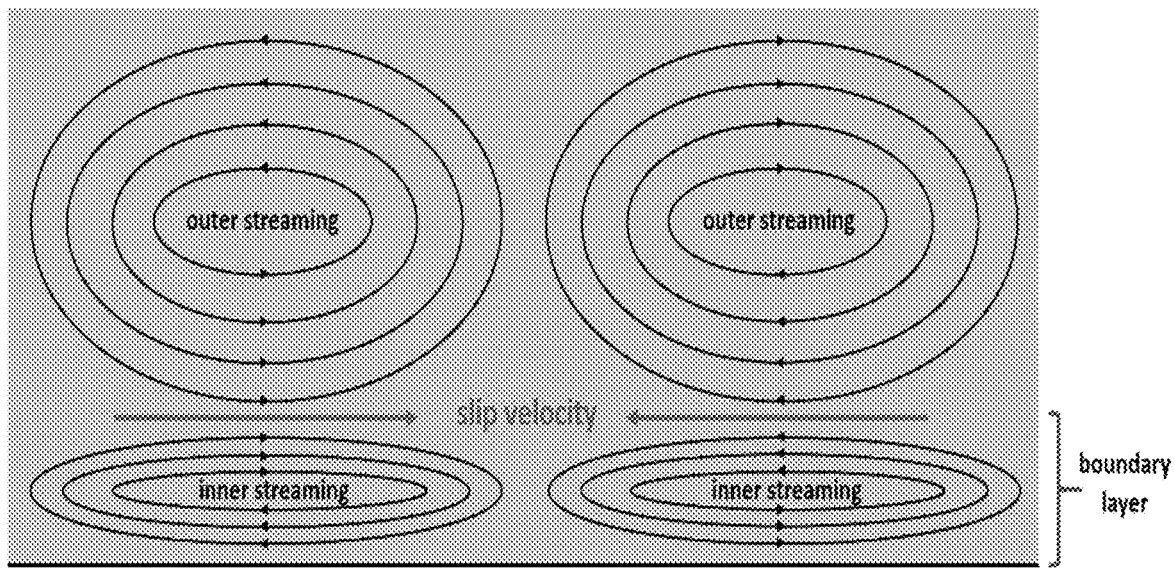
Figure 4:
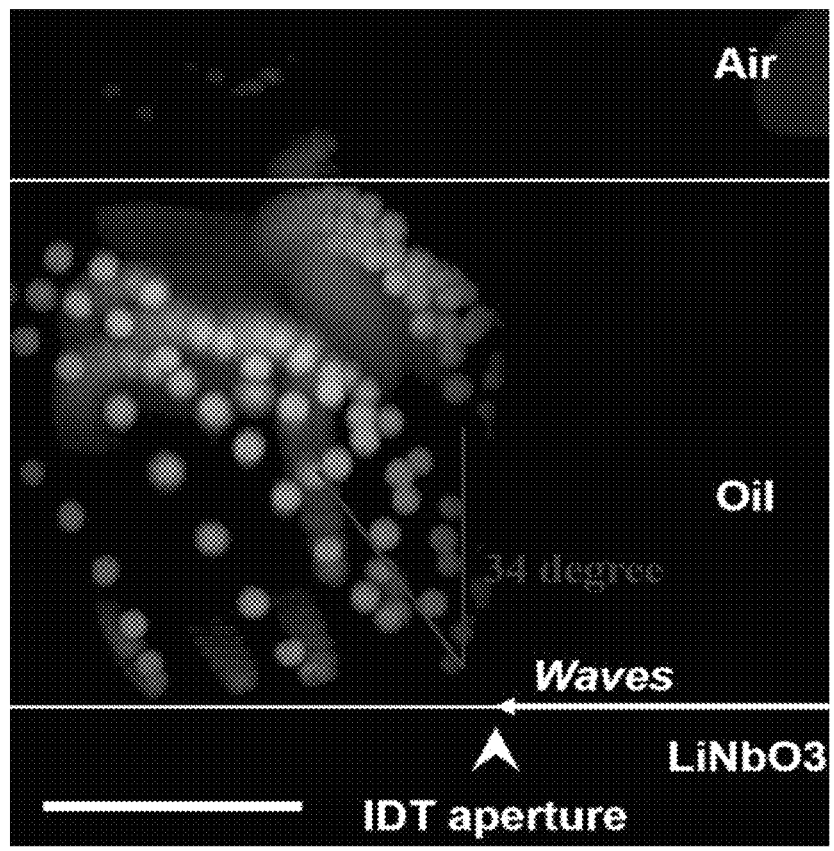
Figure 5B:
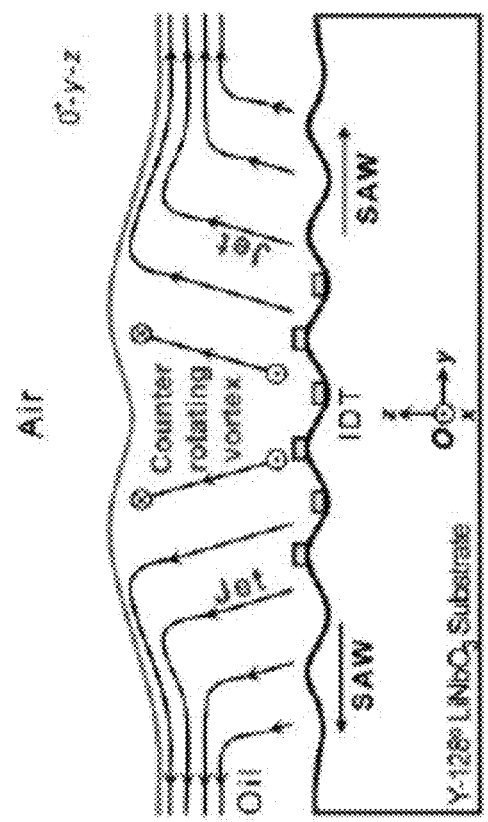
Figure 5A:
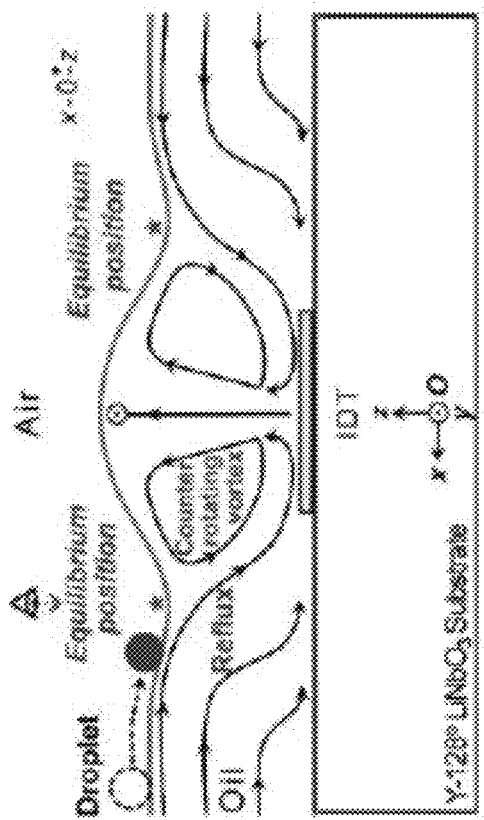
Figure 6B:
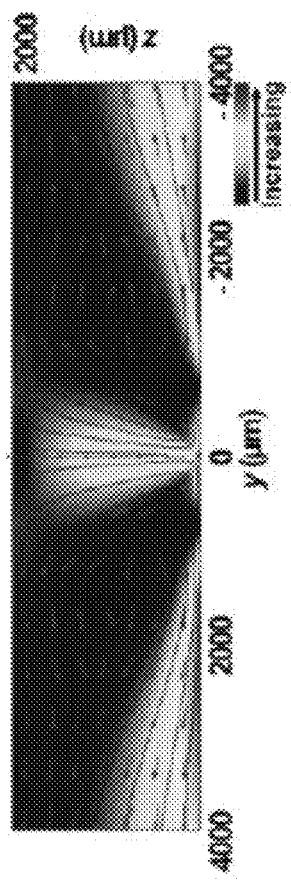
Figure 6A:
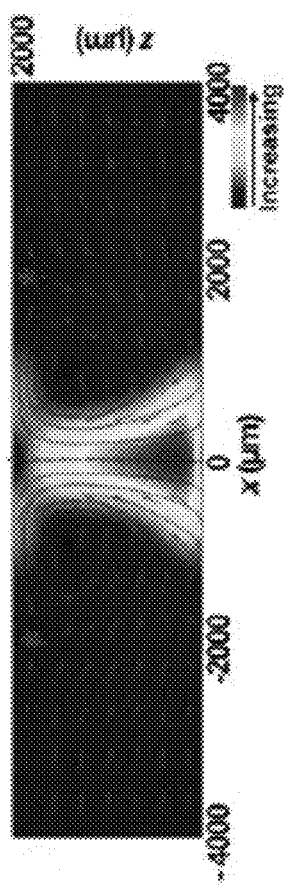
Figure 7A:
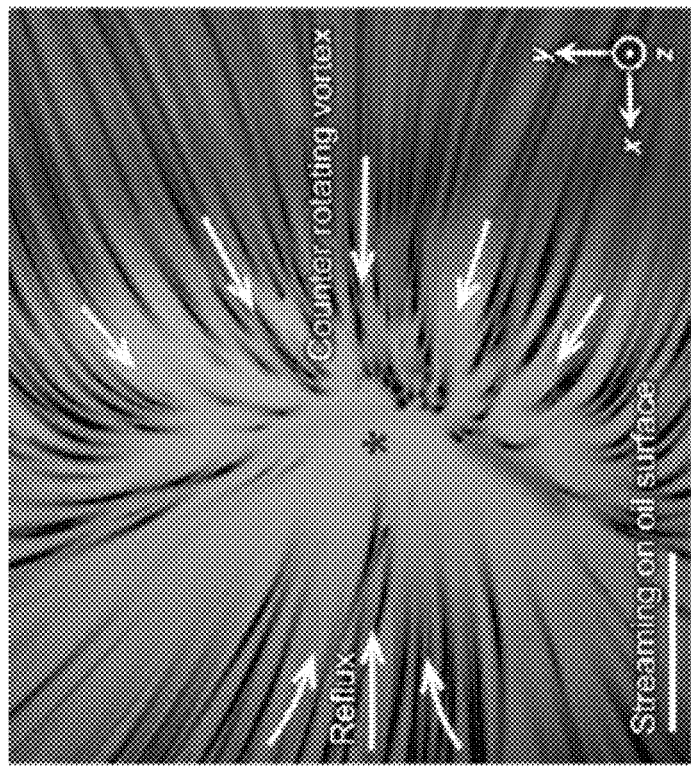
Figure 7B:
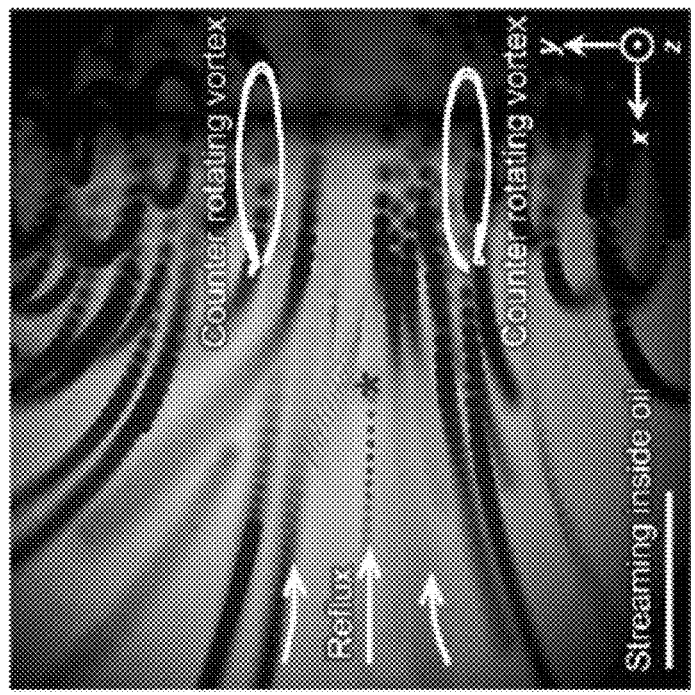
Figure 8C:
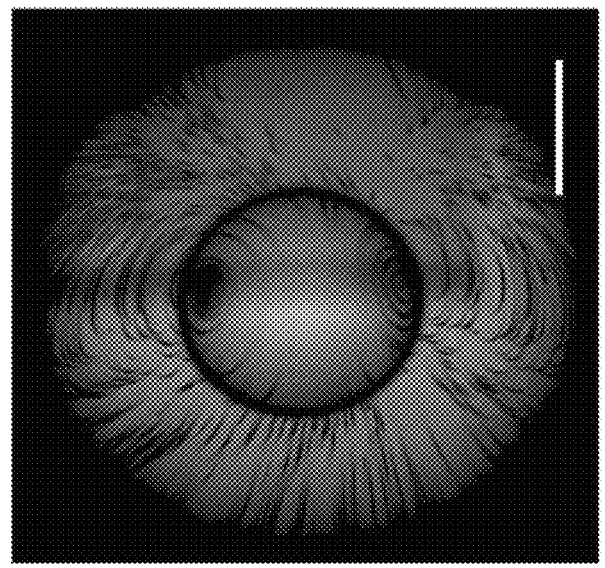
Figure 8B:
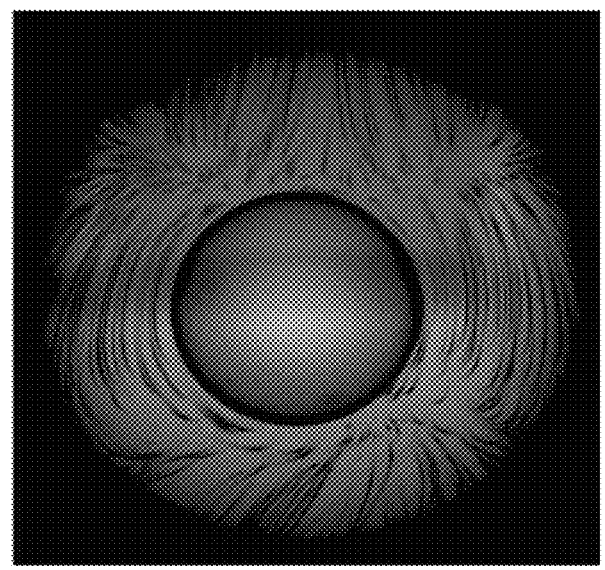
Figure 8A:
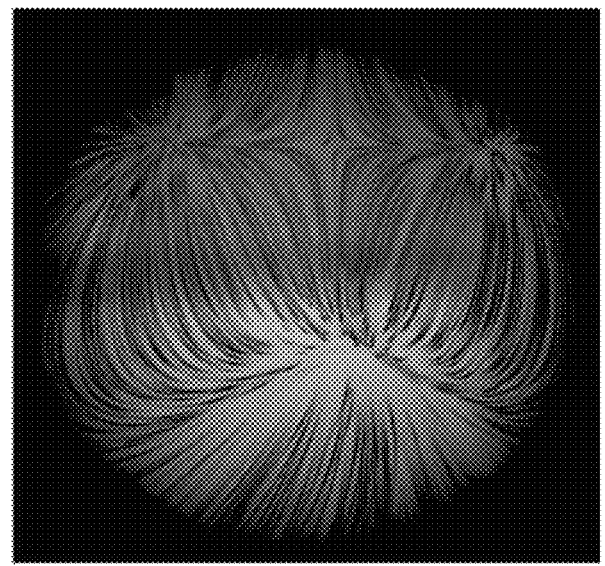
Figure 9A:
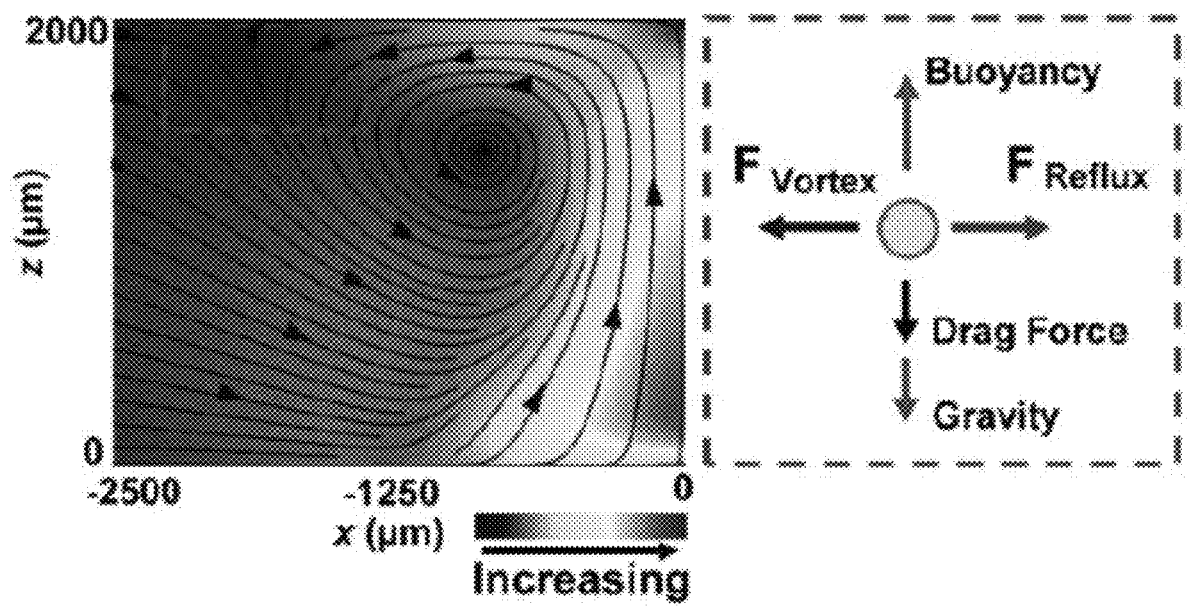
Figure 9B:
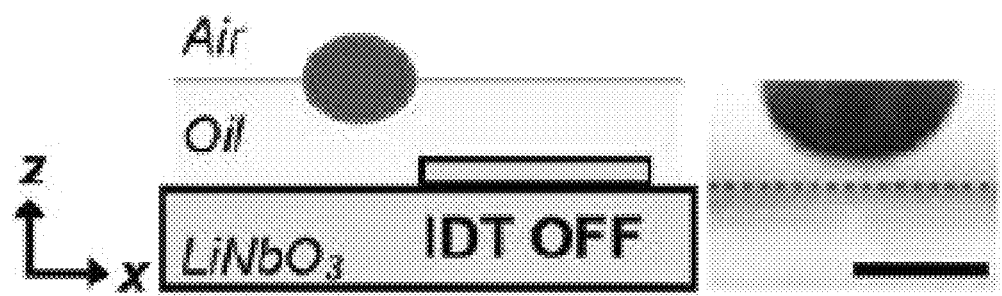
Figure 9C:
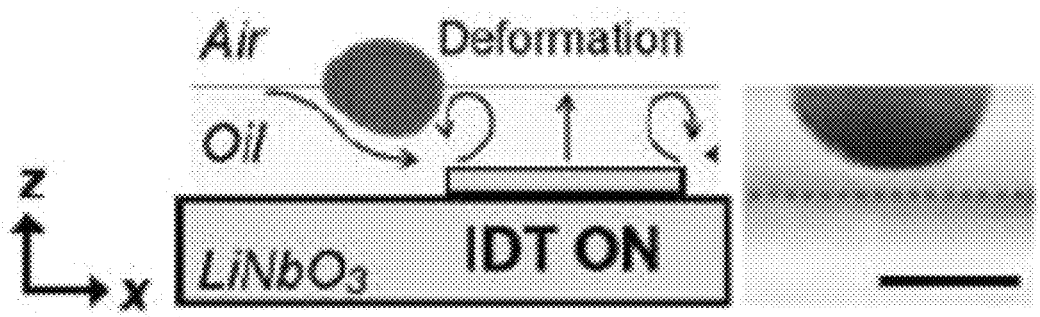
Figure 9D:
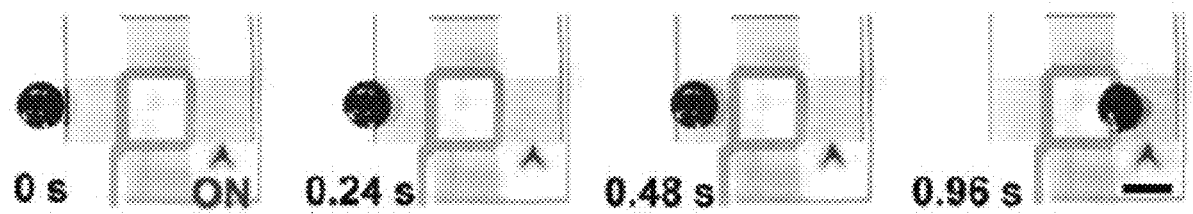
Figure 9E:
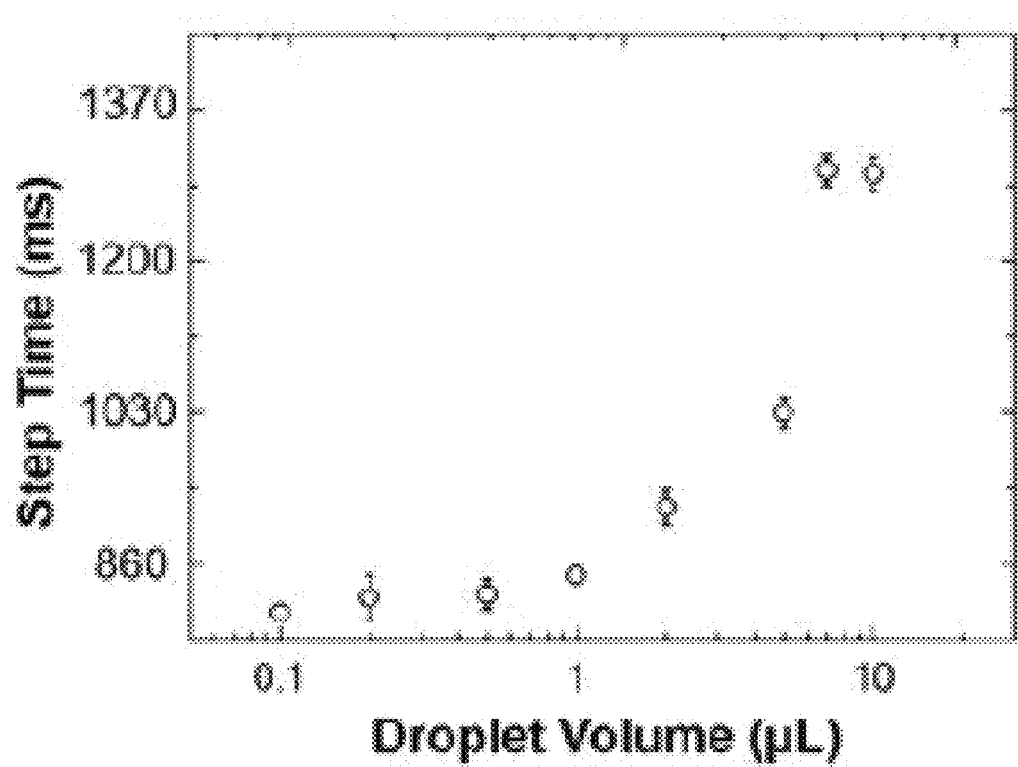
Figure 9F:
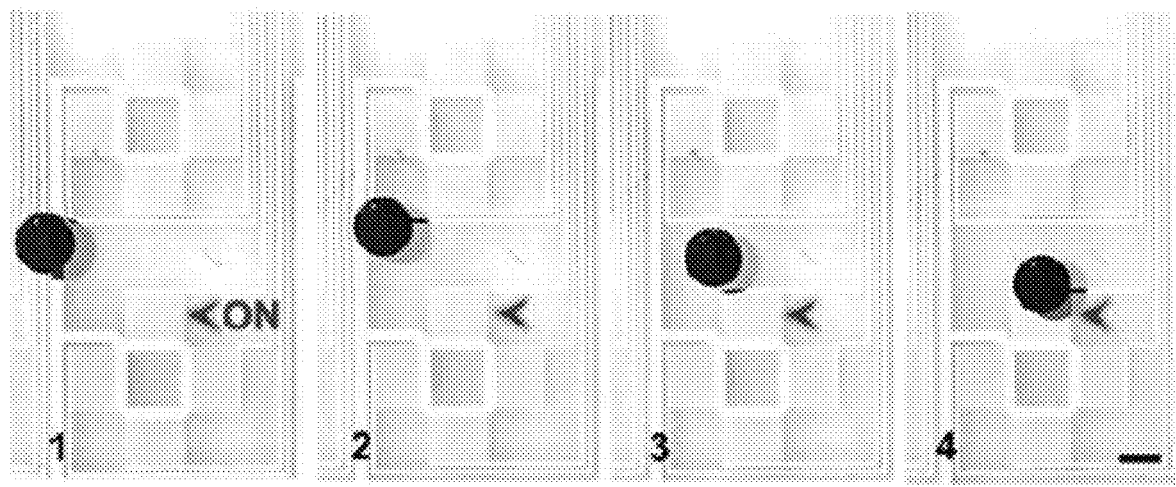
Figure 9G:
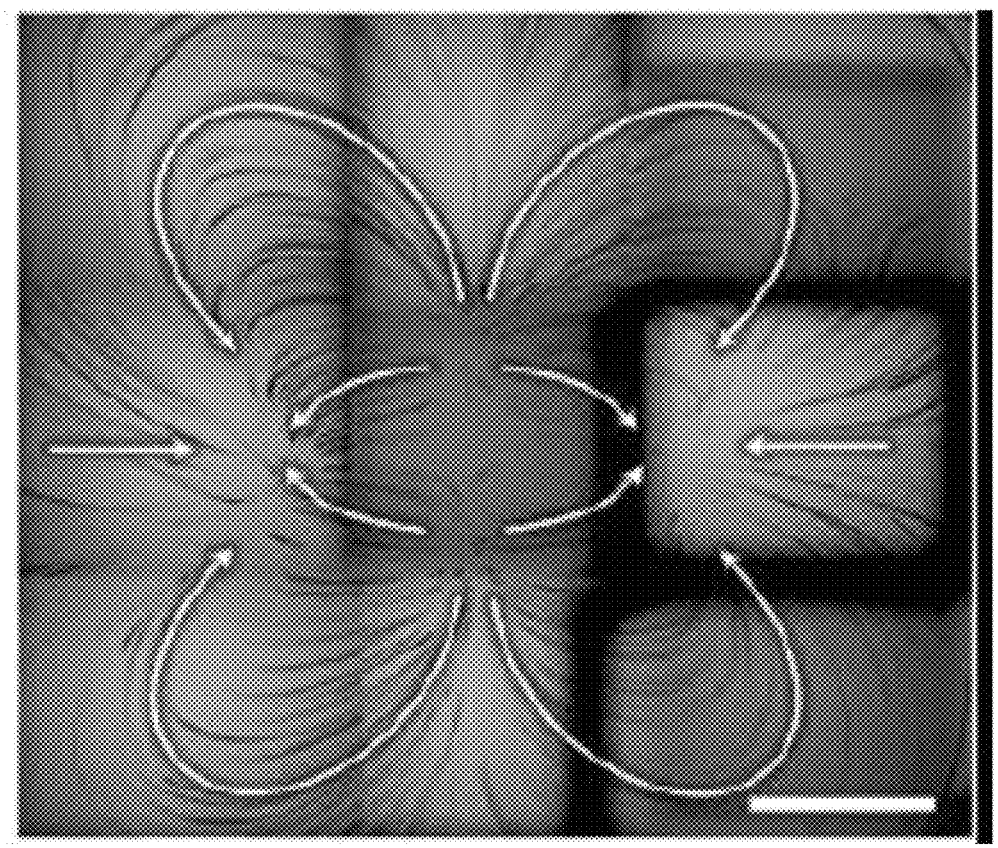
Figure 10:
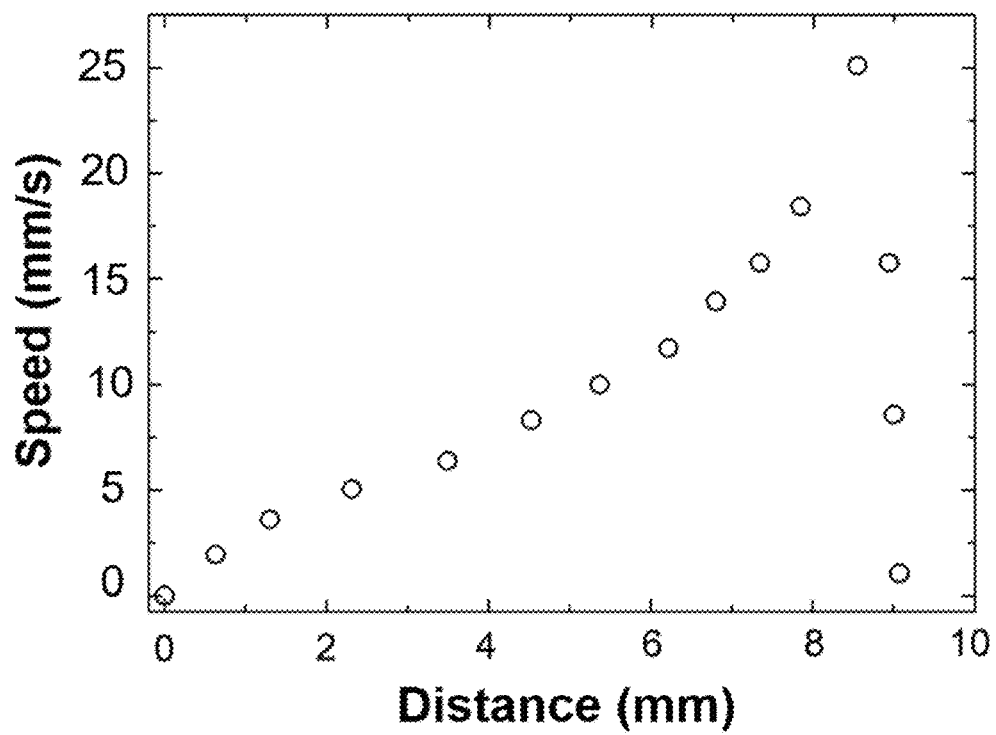
Figure 11:
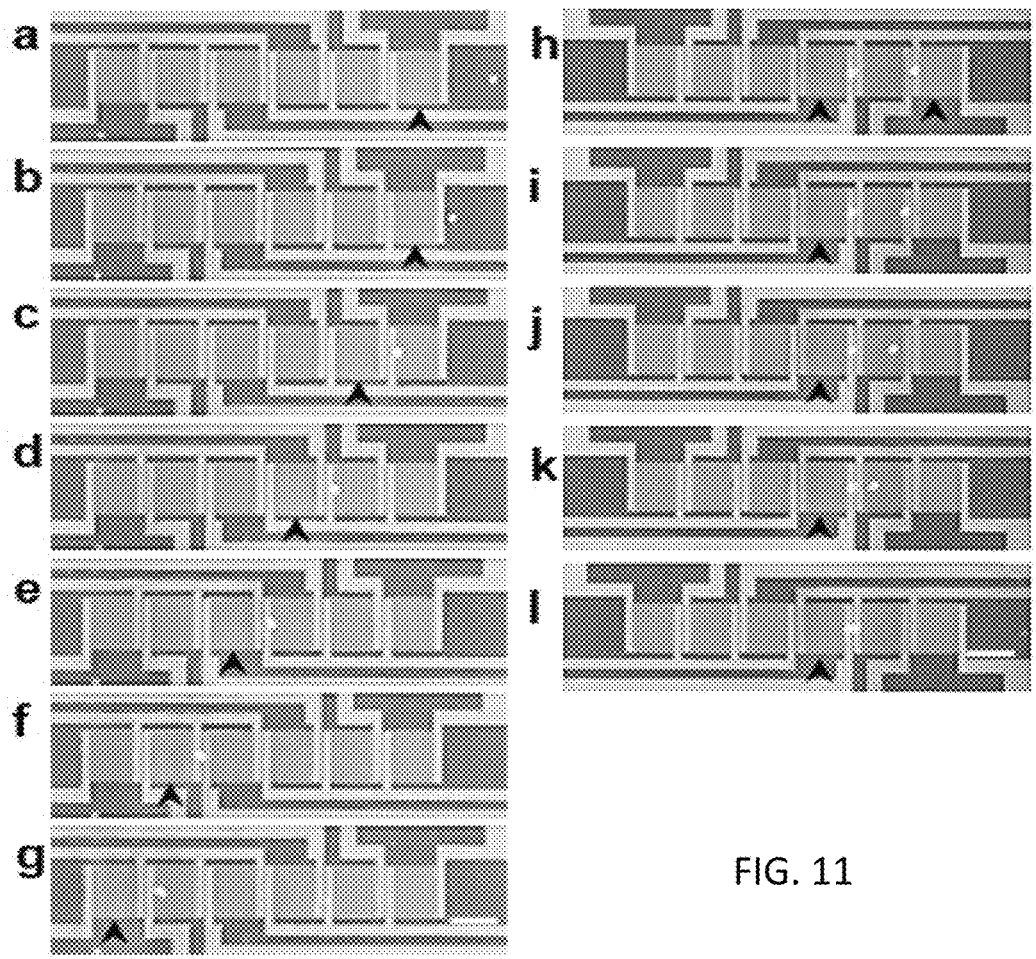
Figure 12:
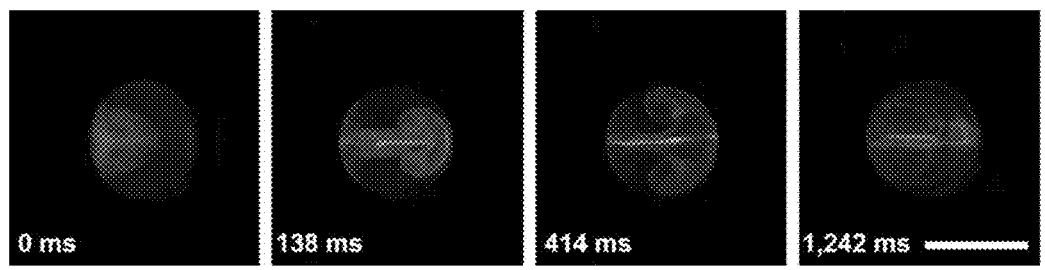
Figure 13:
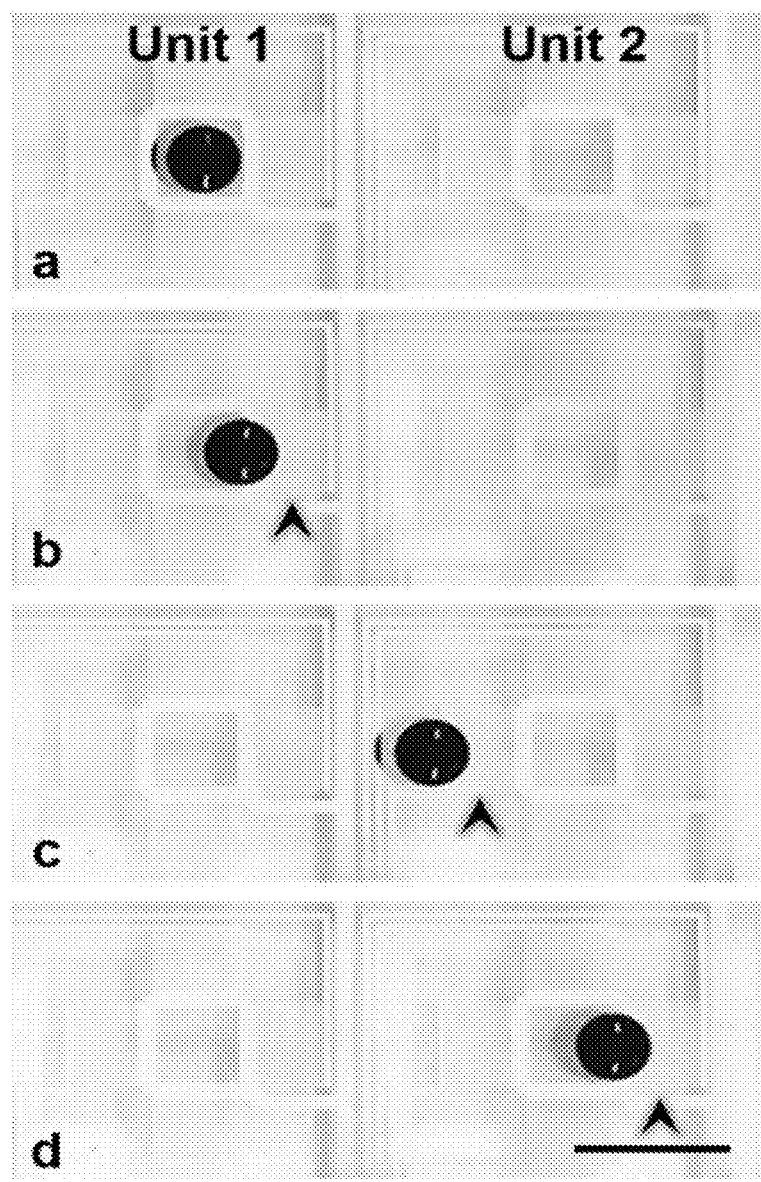
Figure 14:
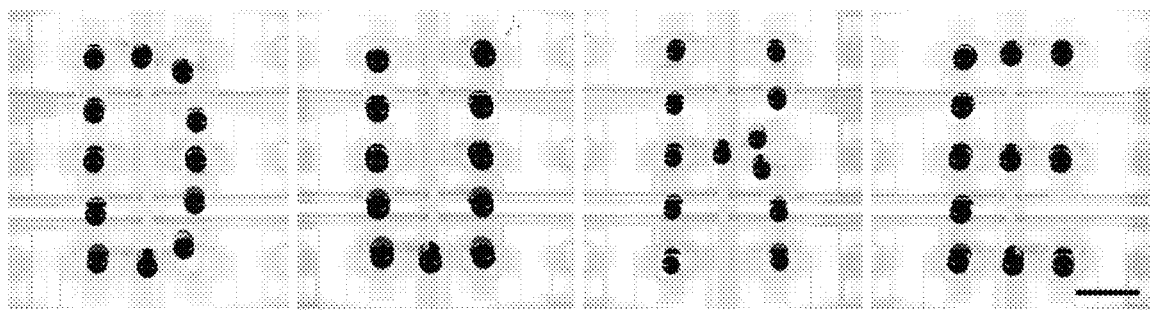
Figure 15:
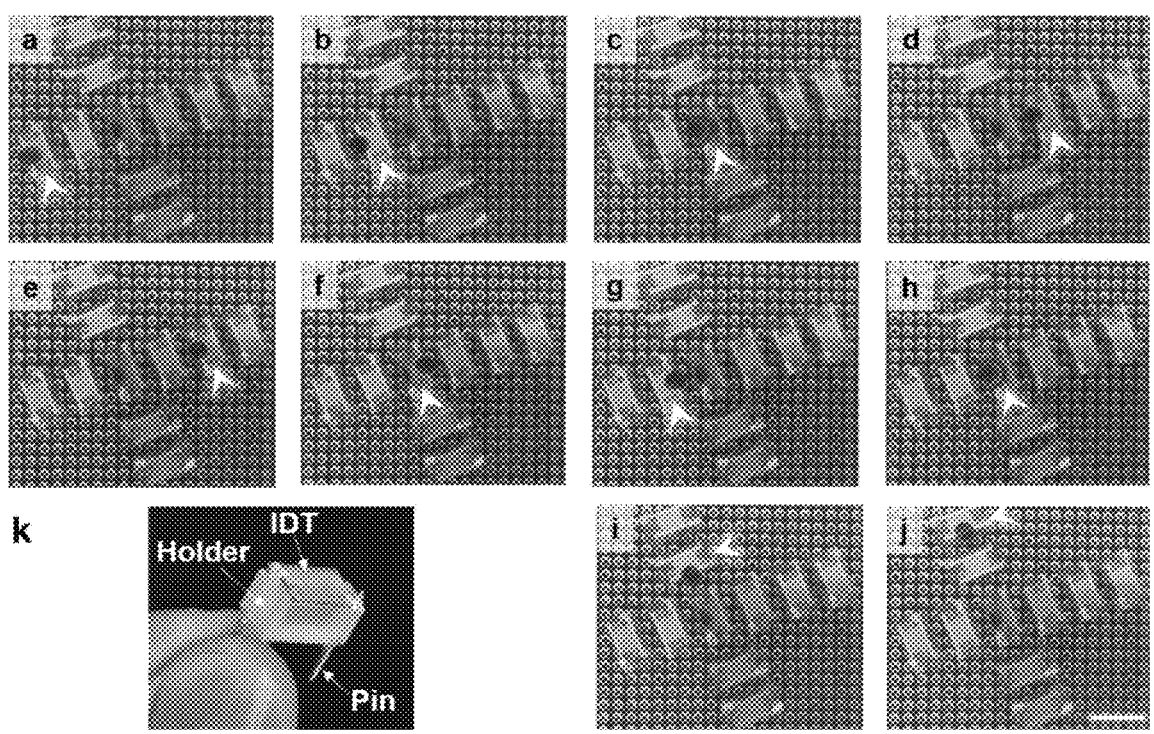
Figure 16:
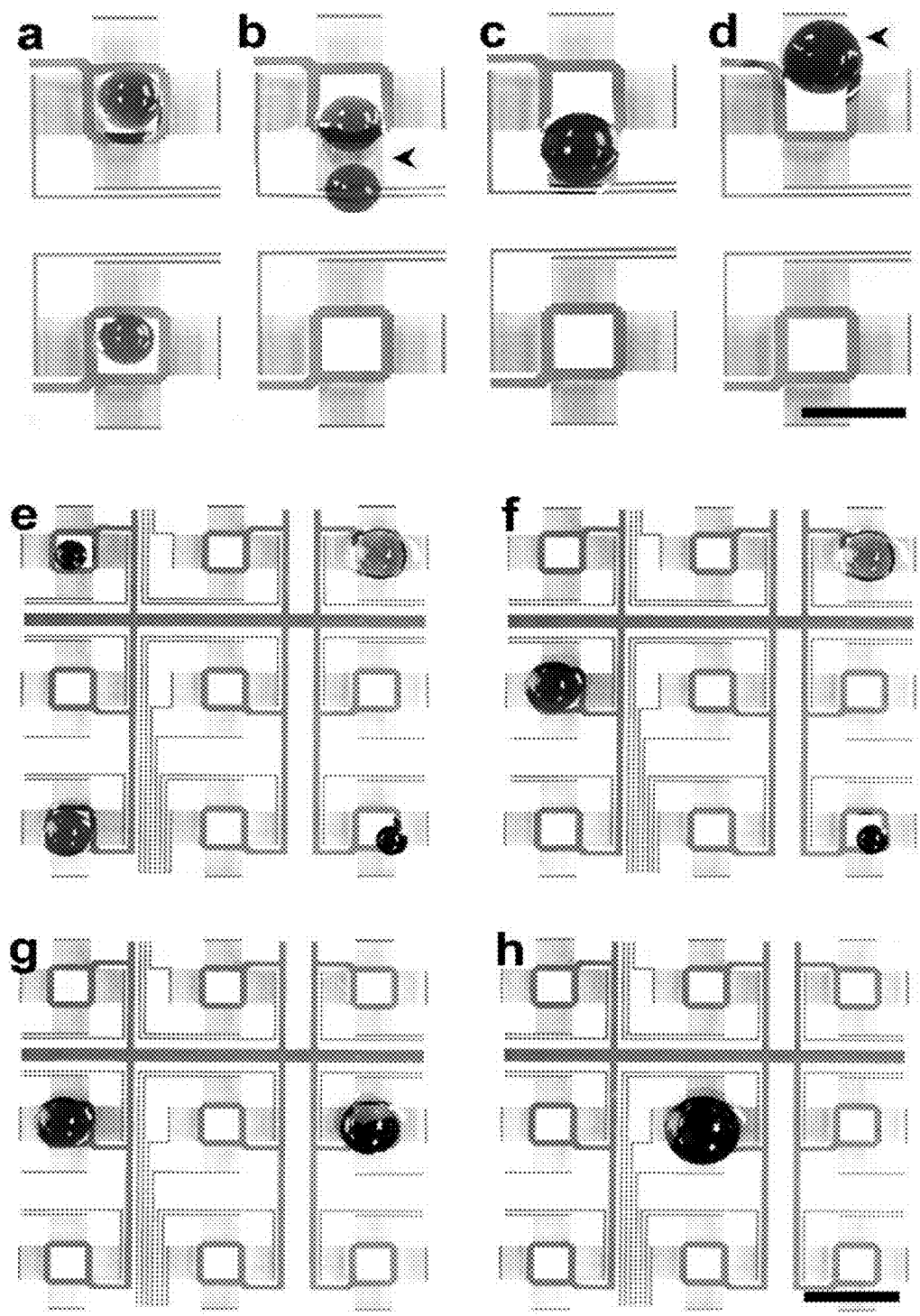
Figure 17A:
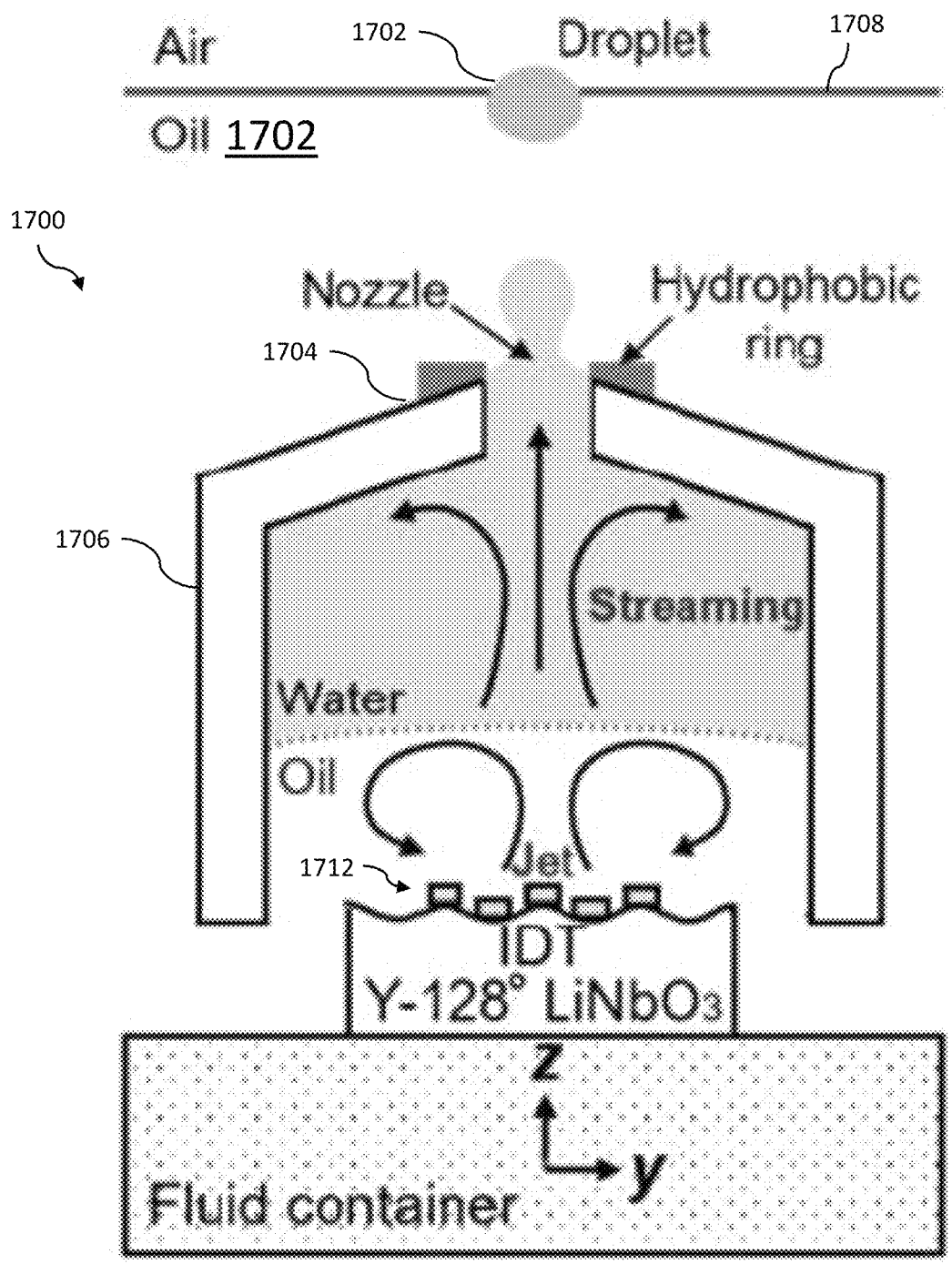
Figure 17B:
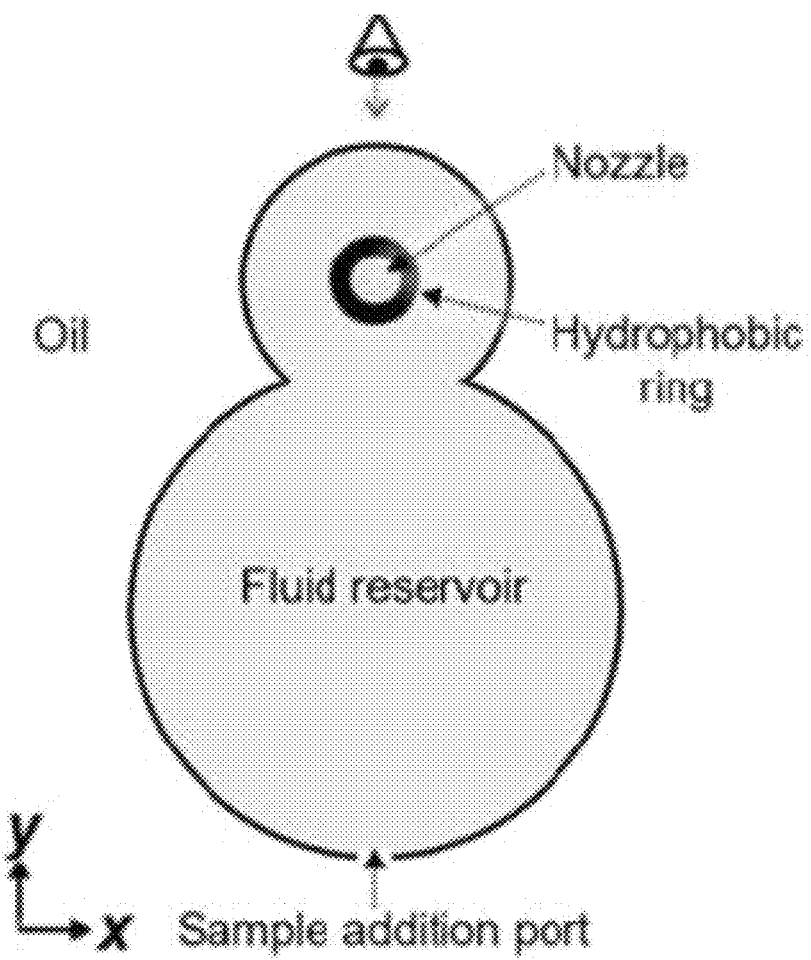
Figure 17C:
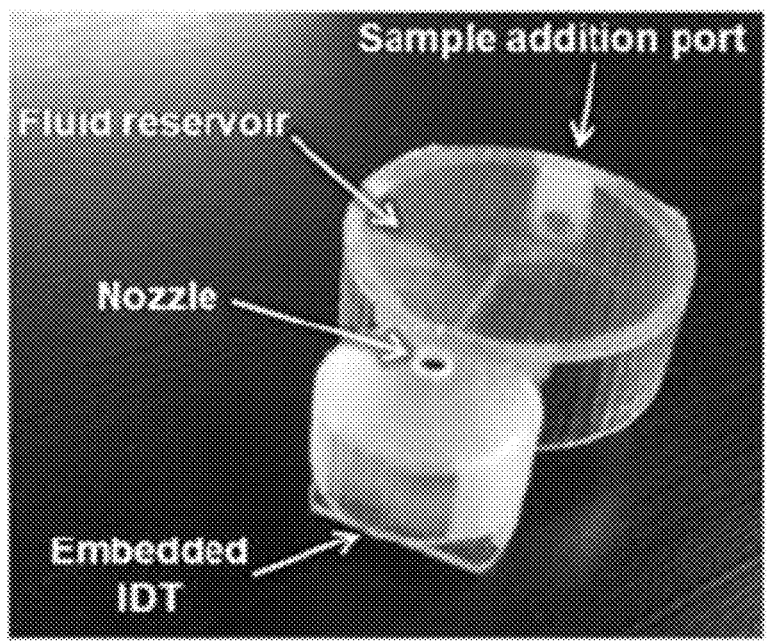
Figure 17D:
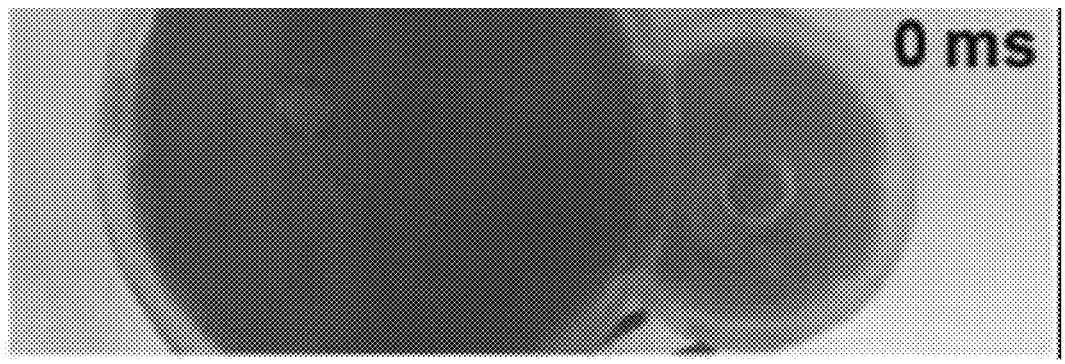
Figure 17E:
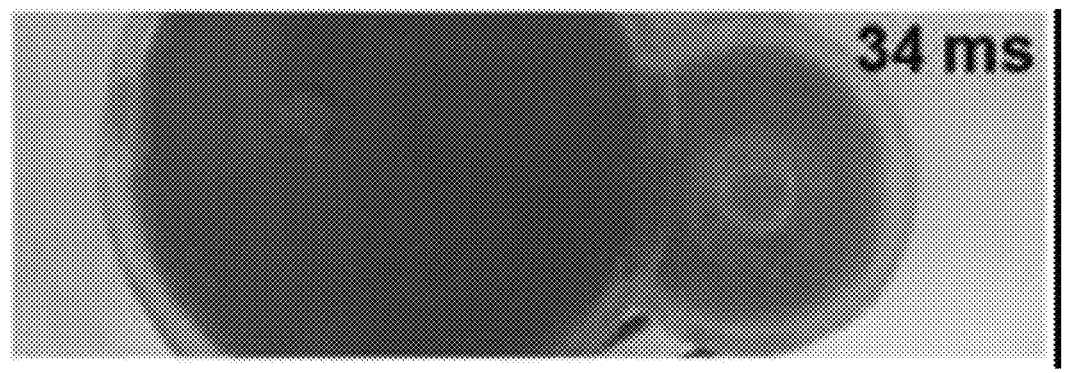
Figure 17F:
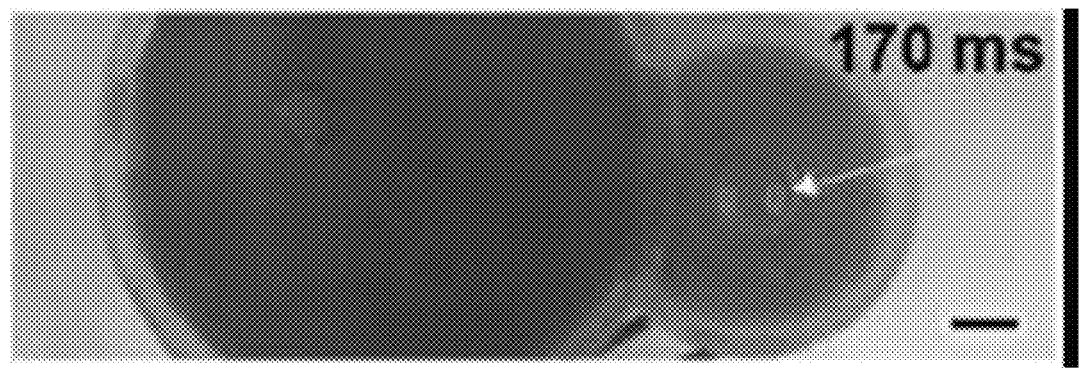
Figure 18:
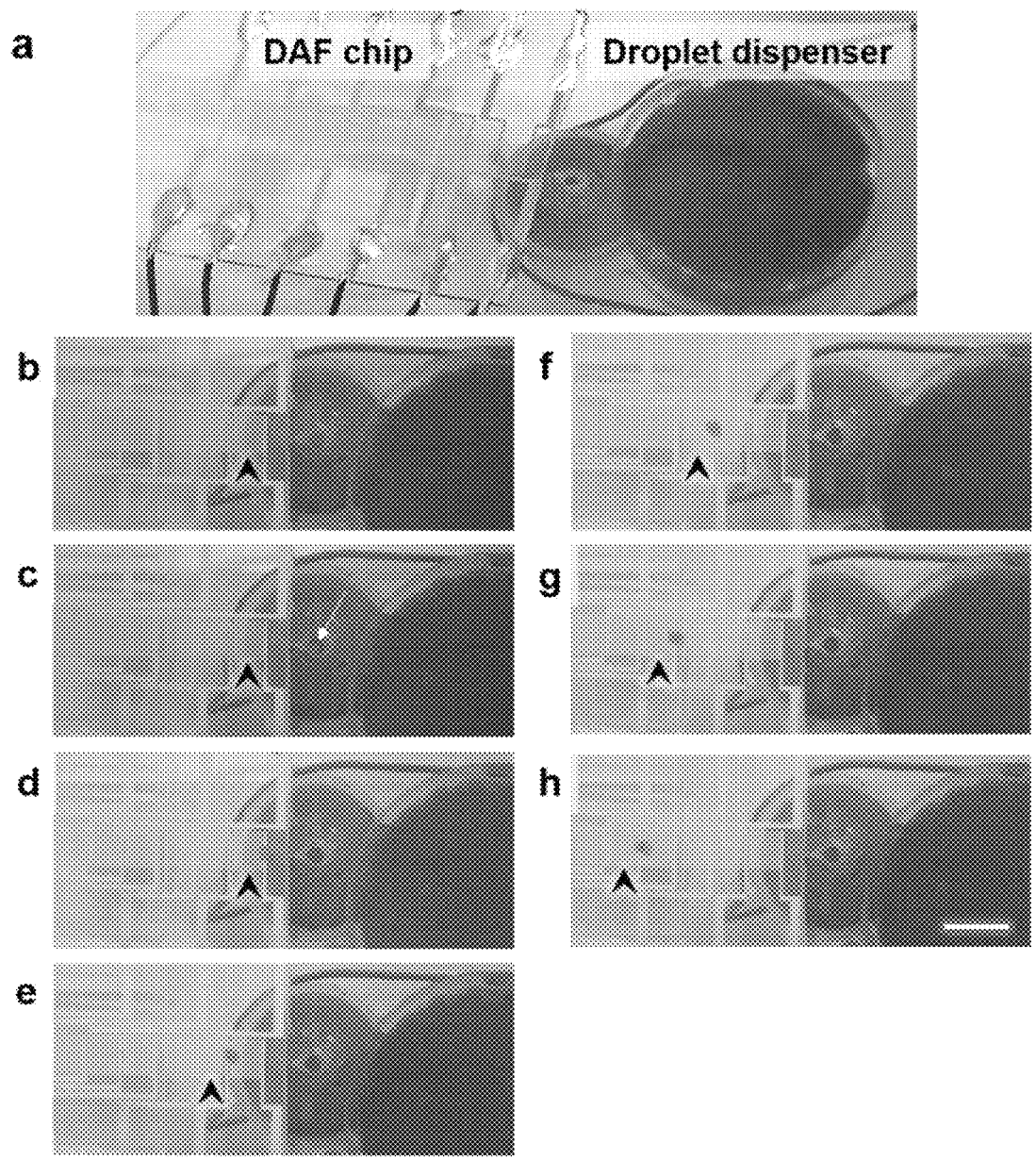
Figure 19:
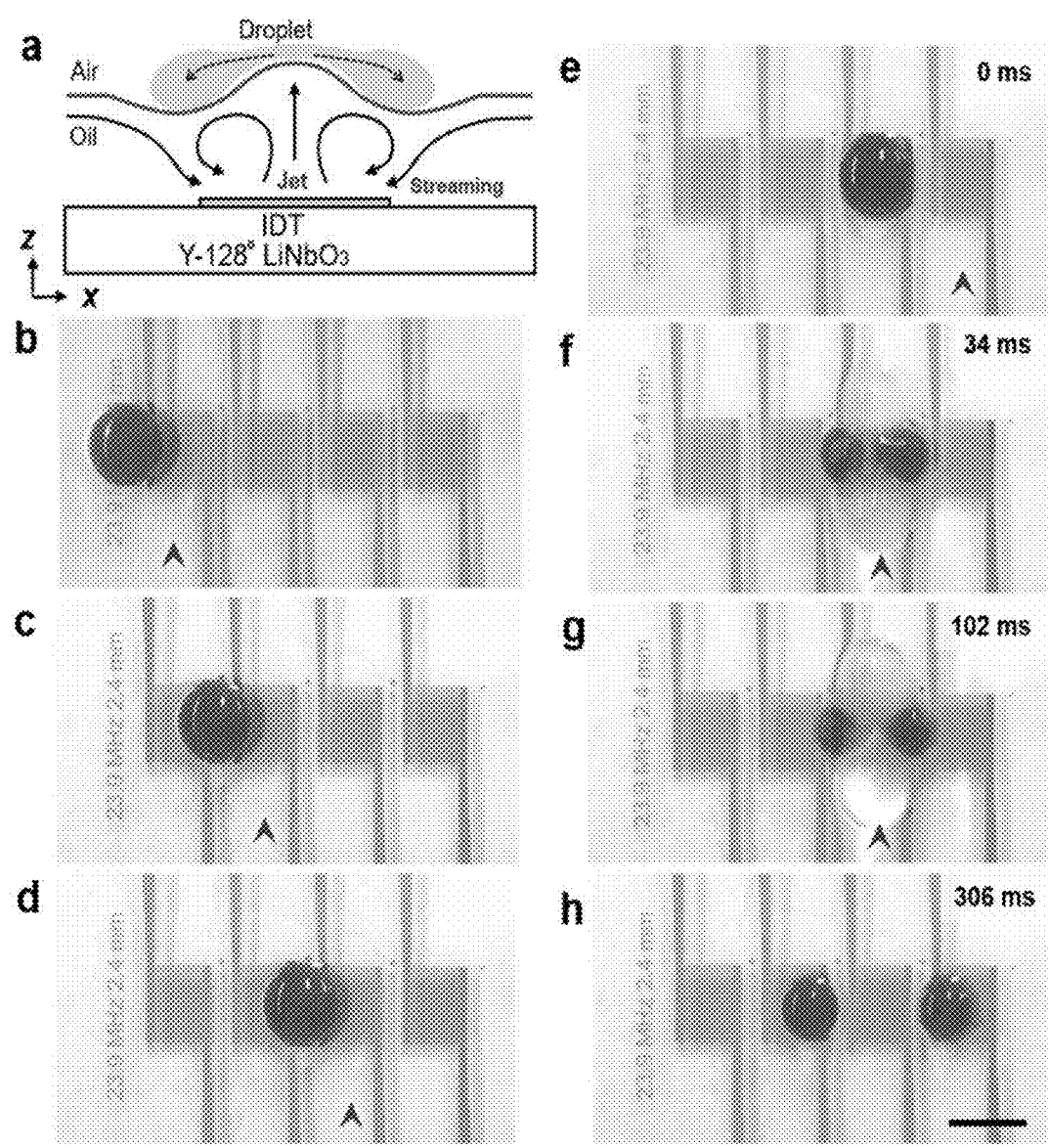
Figure 20:
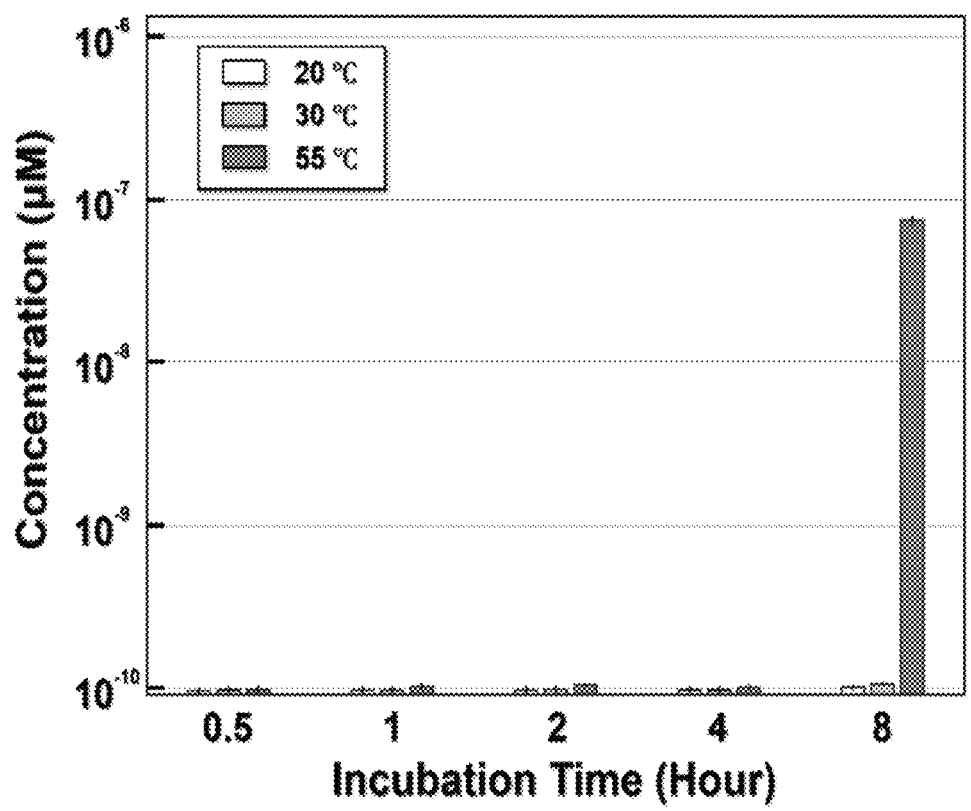
Figure 21:
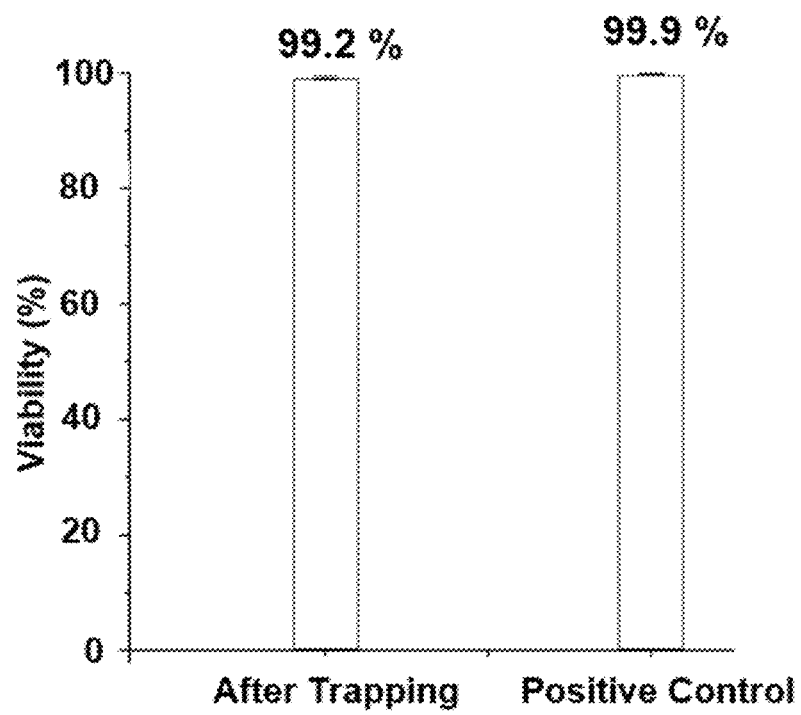
Figure 22:
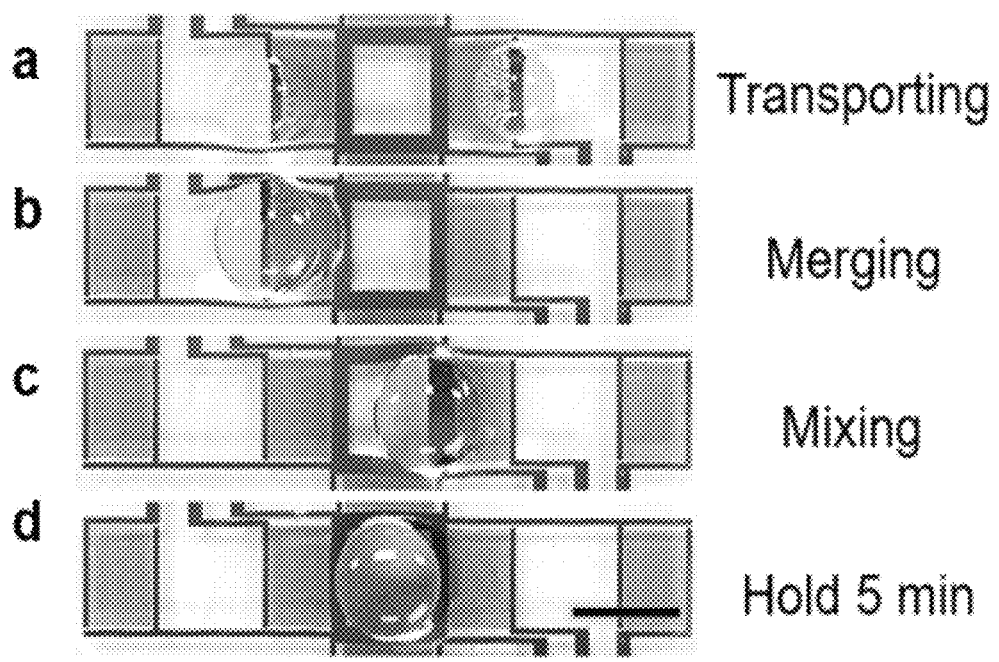
Figure 23A:
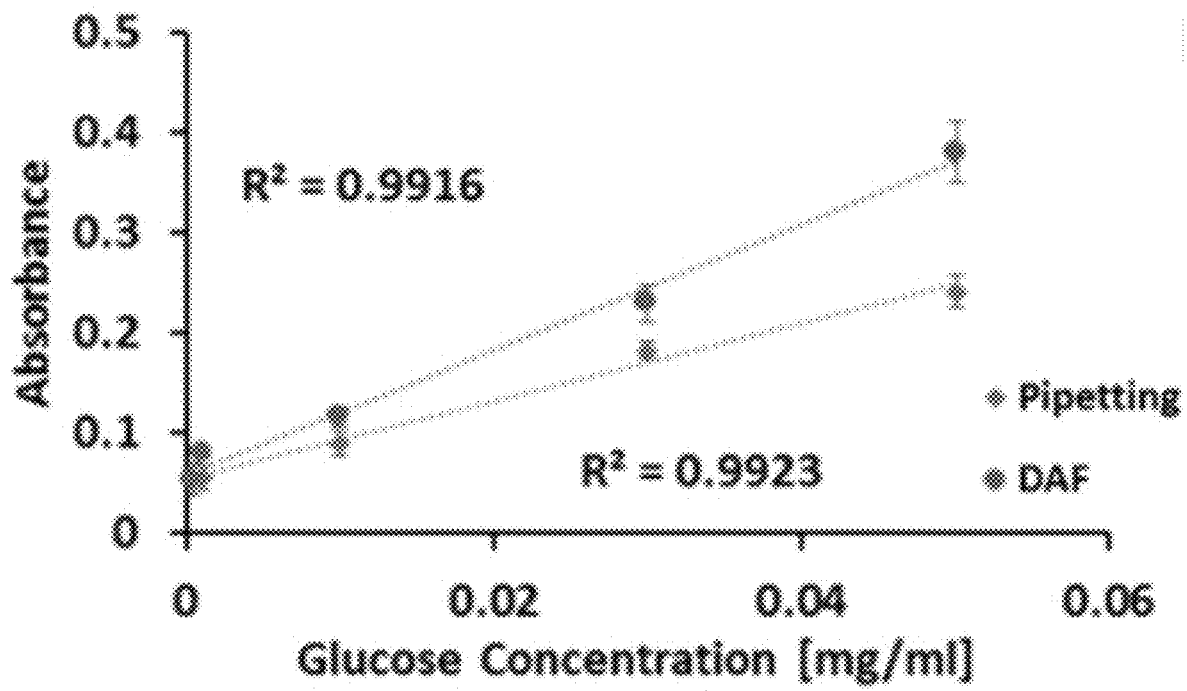
Figure 23B:
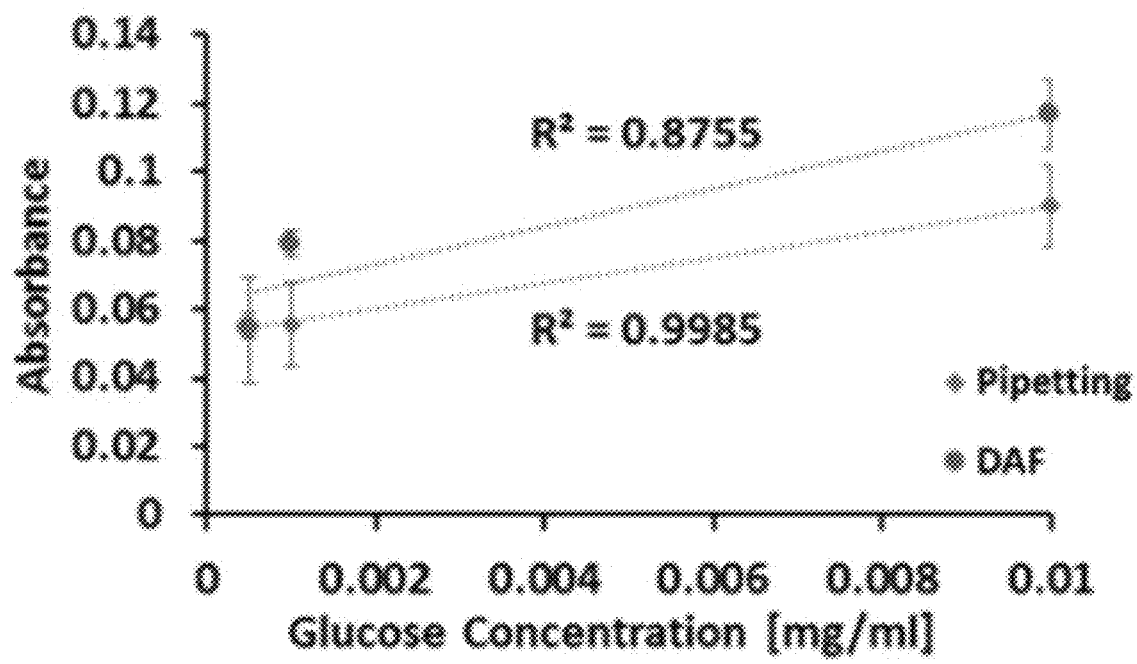
Figures 24A, 24B, 24C:
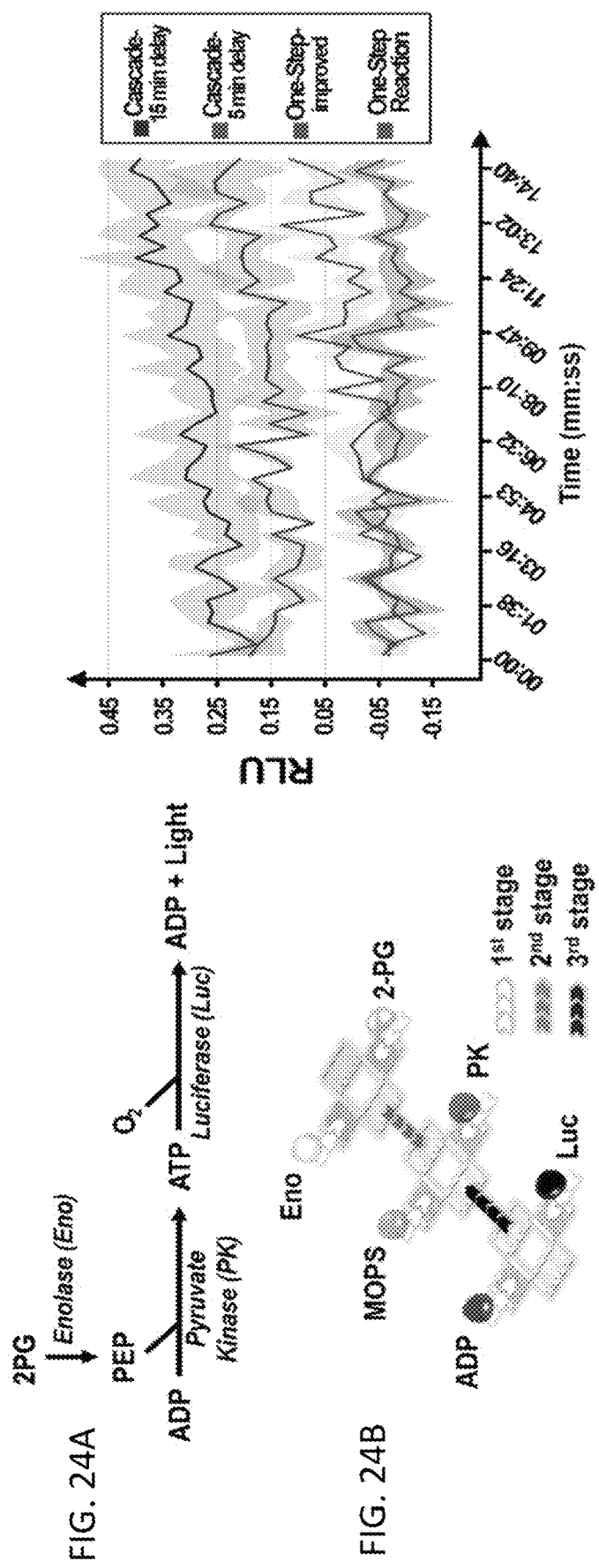
Figure 25:
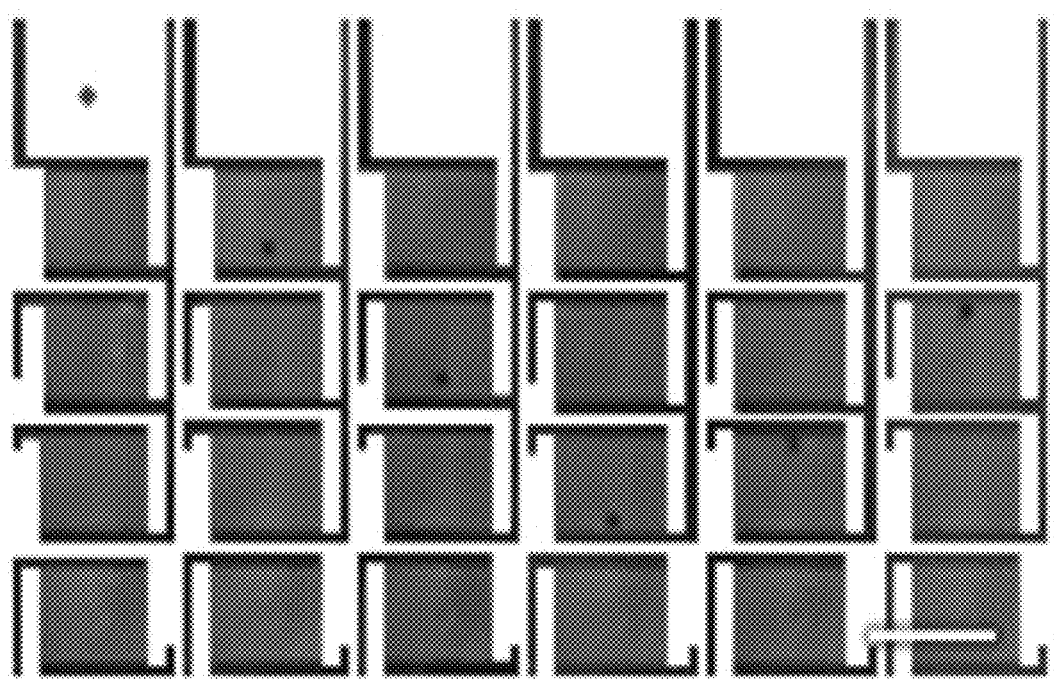
Figure 26:
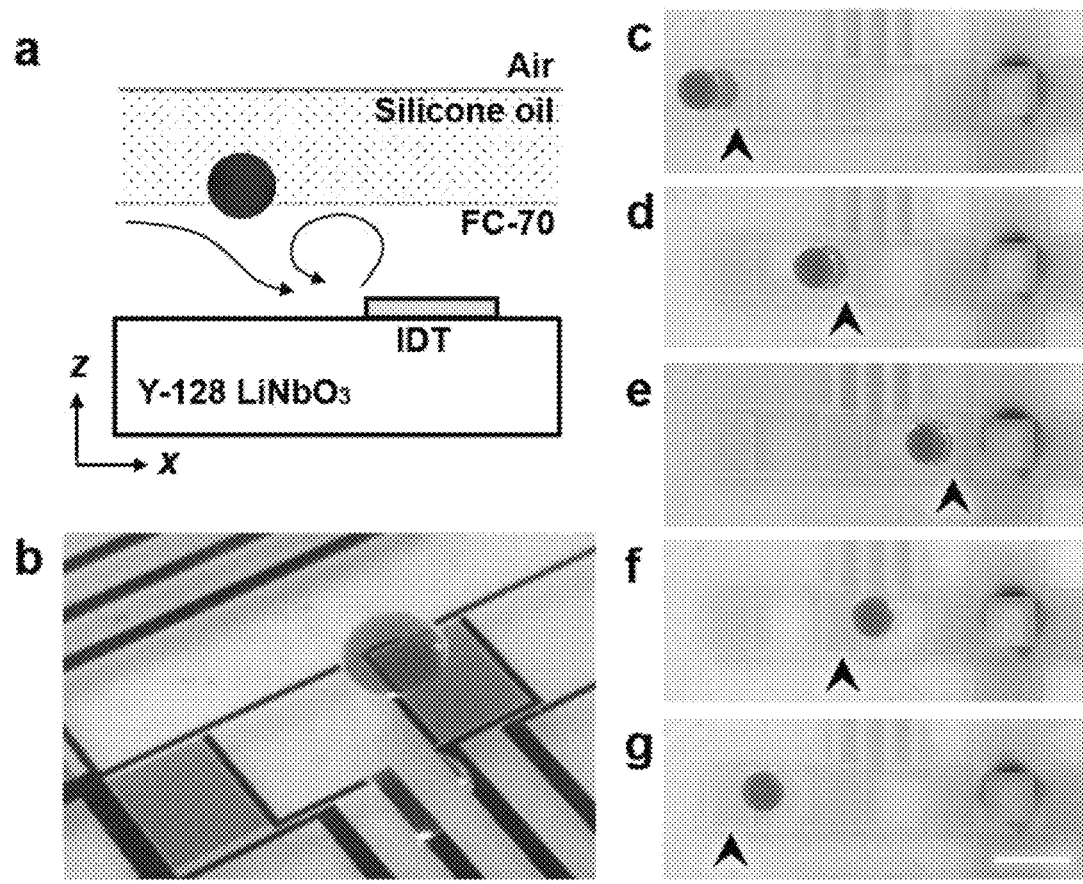
Figure 27:
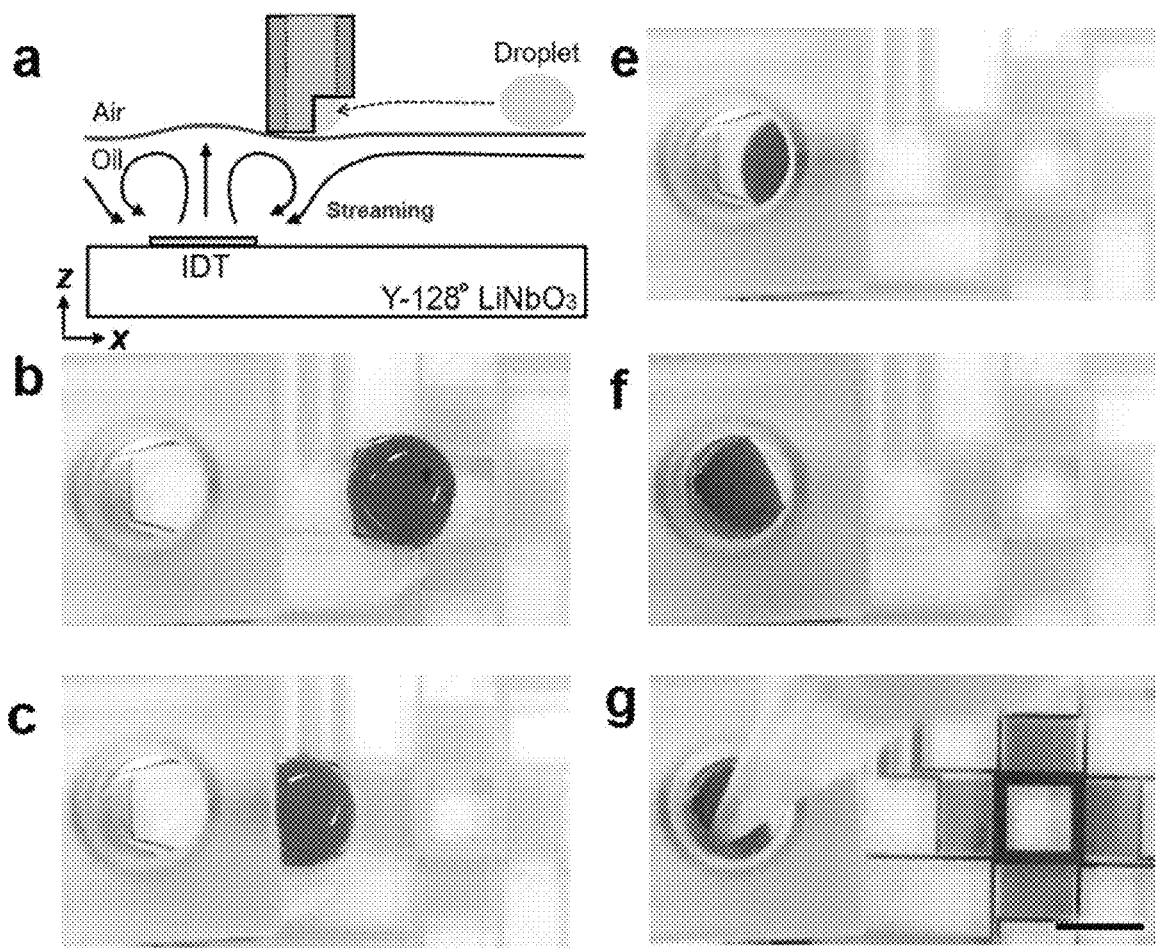
Figure 28:
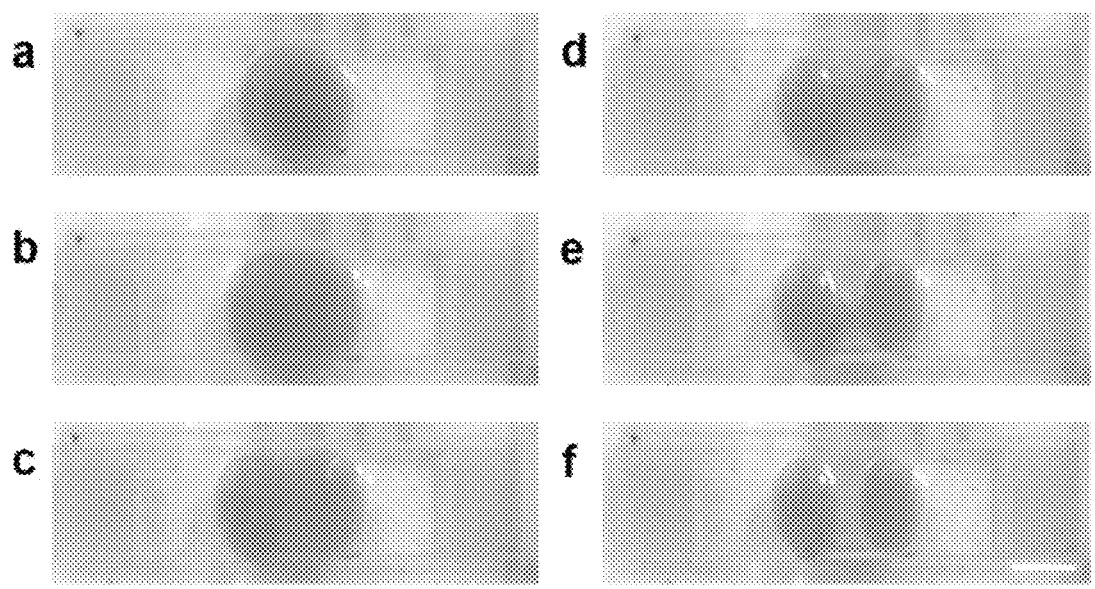
Figure 29:
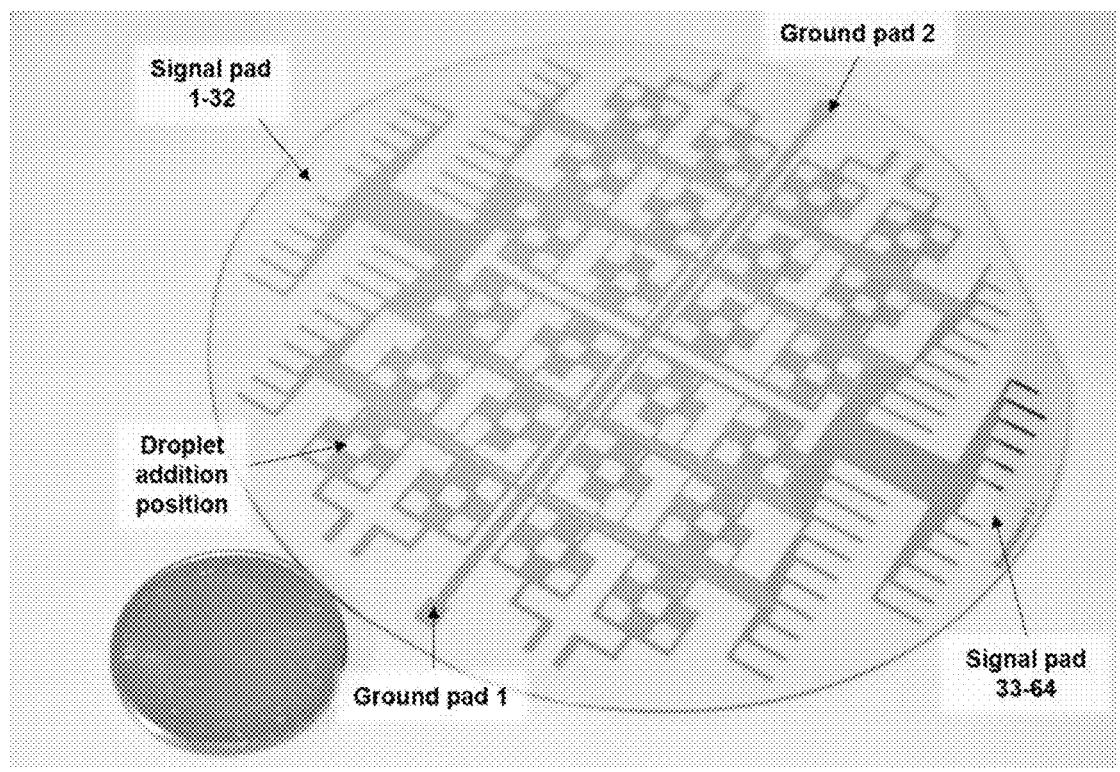
Figure 30:
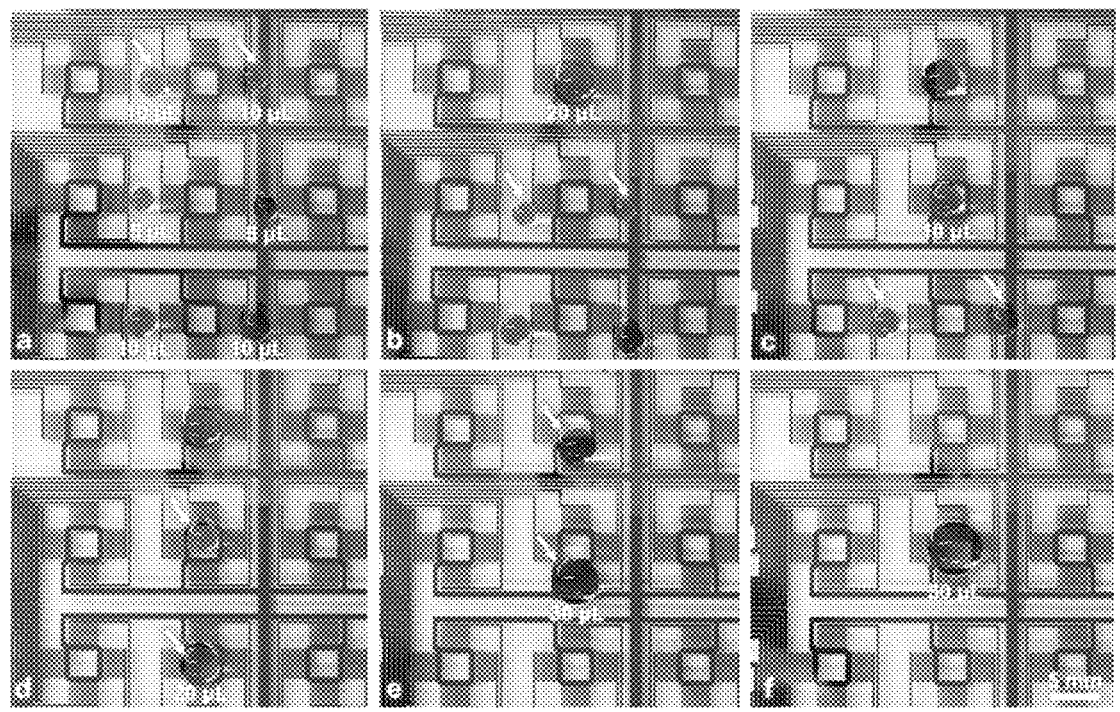
Figure 31:
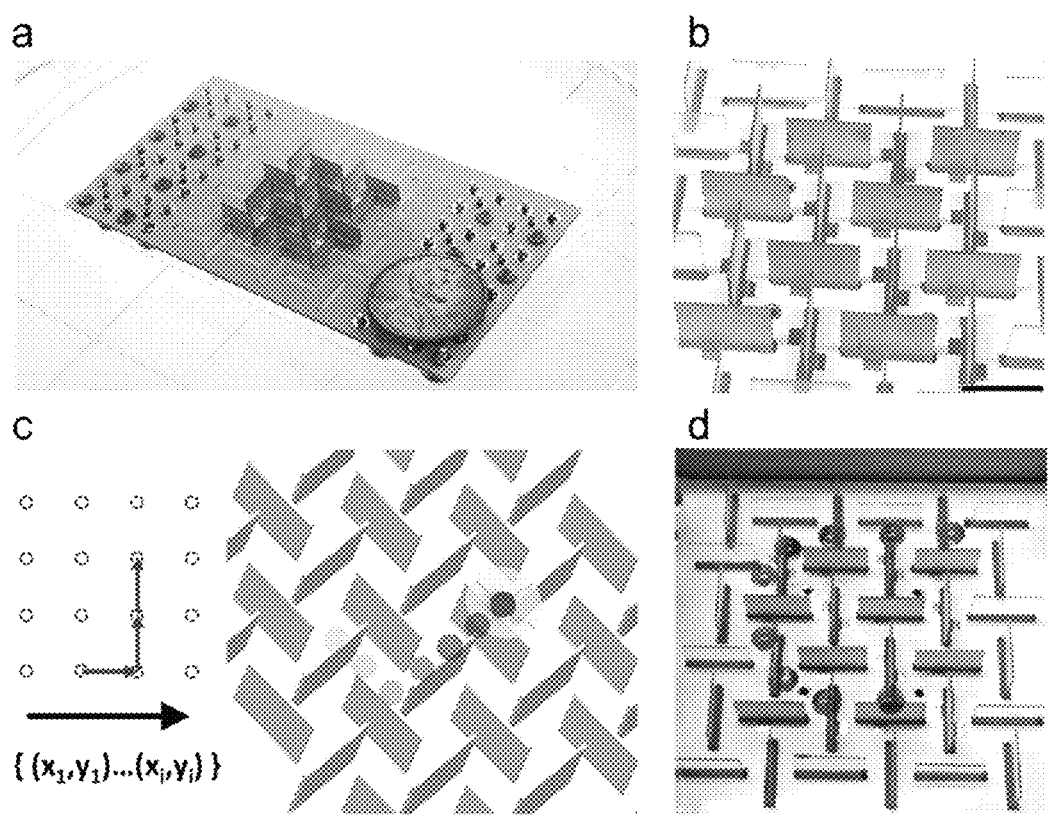
Figure 32:
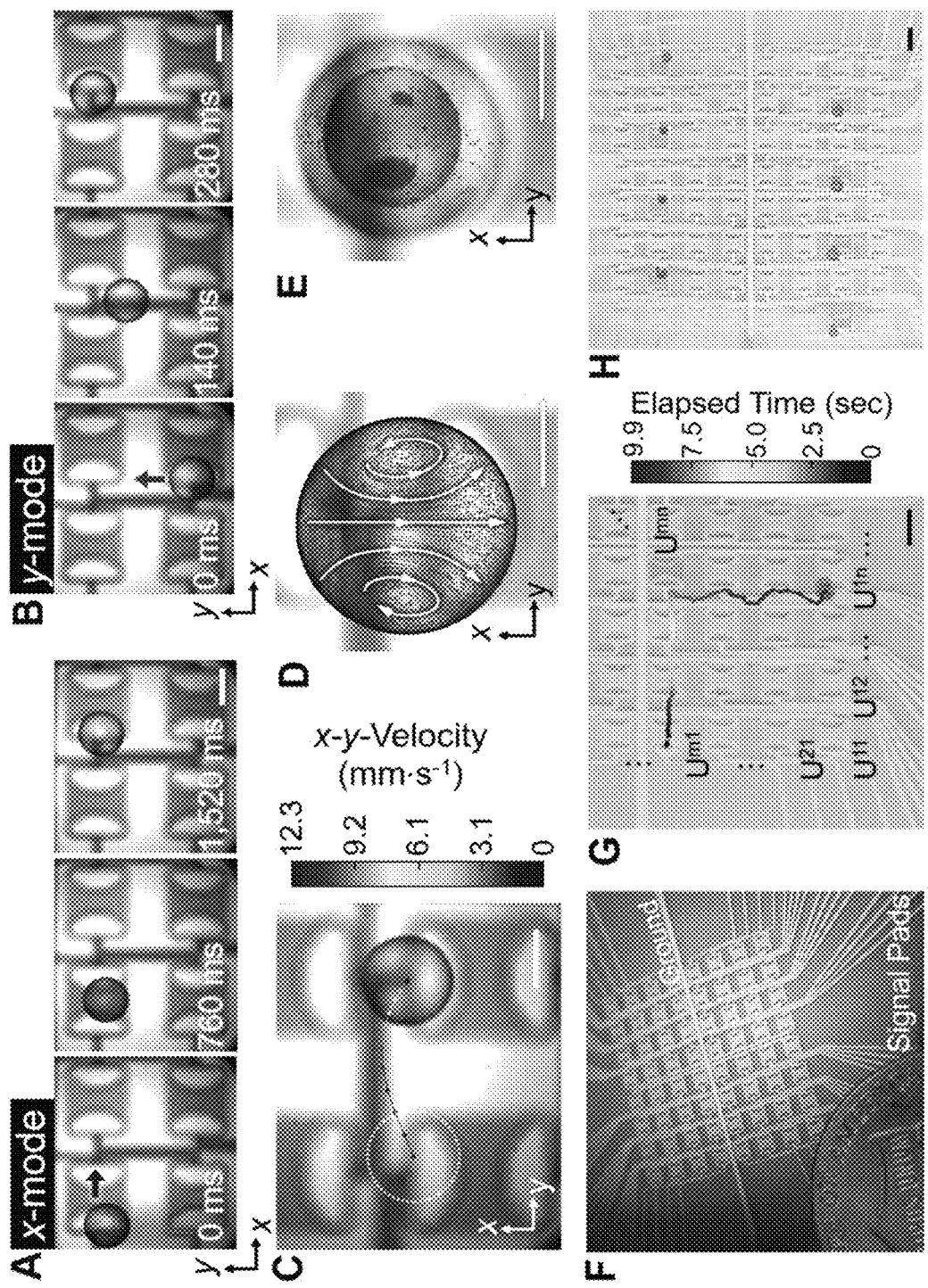
Figure 33:
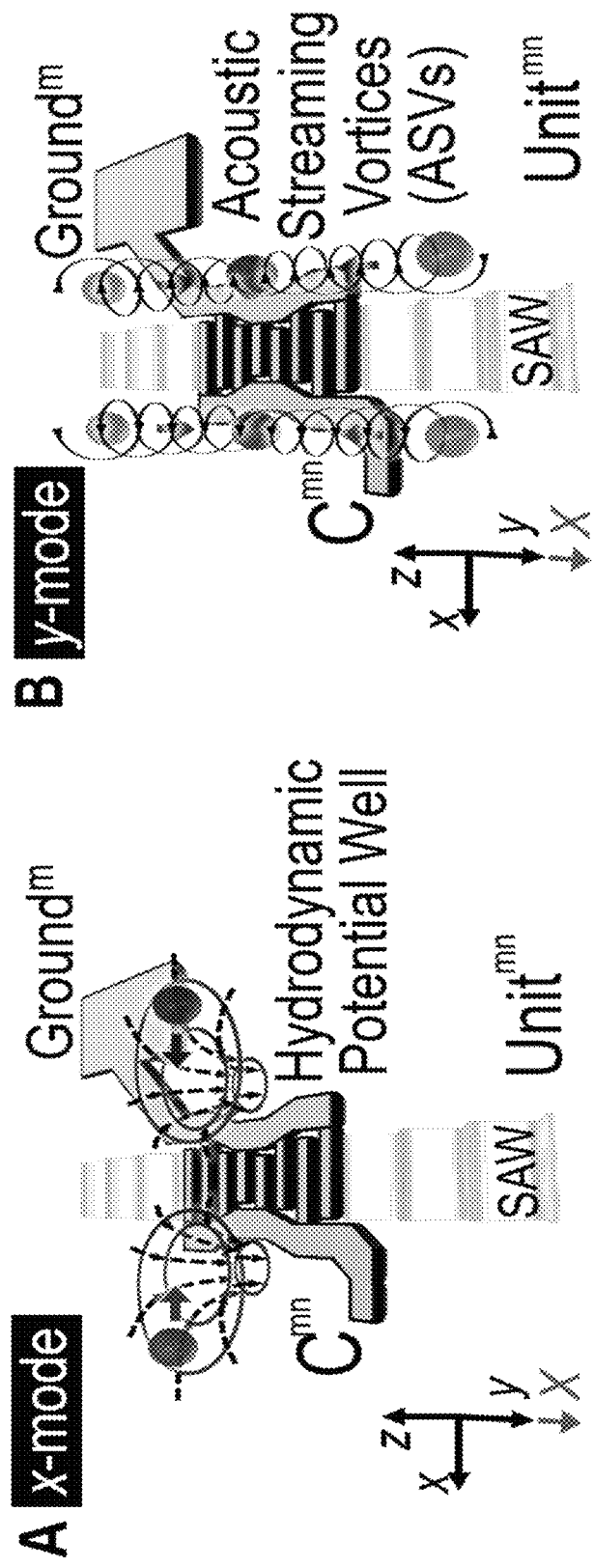
Figure 34:
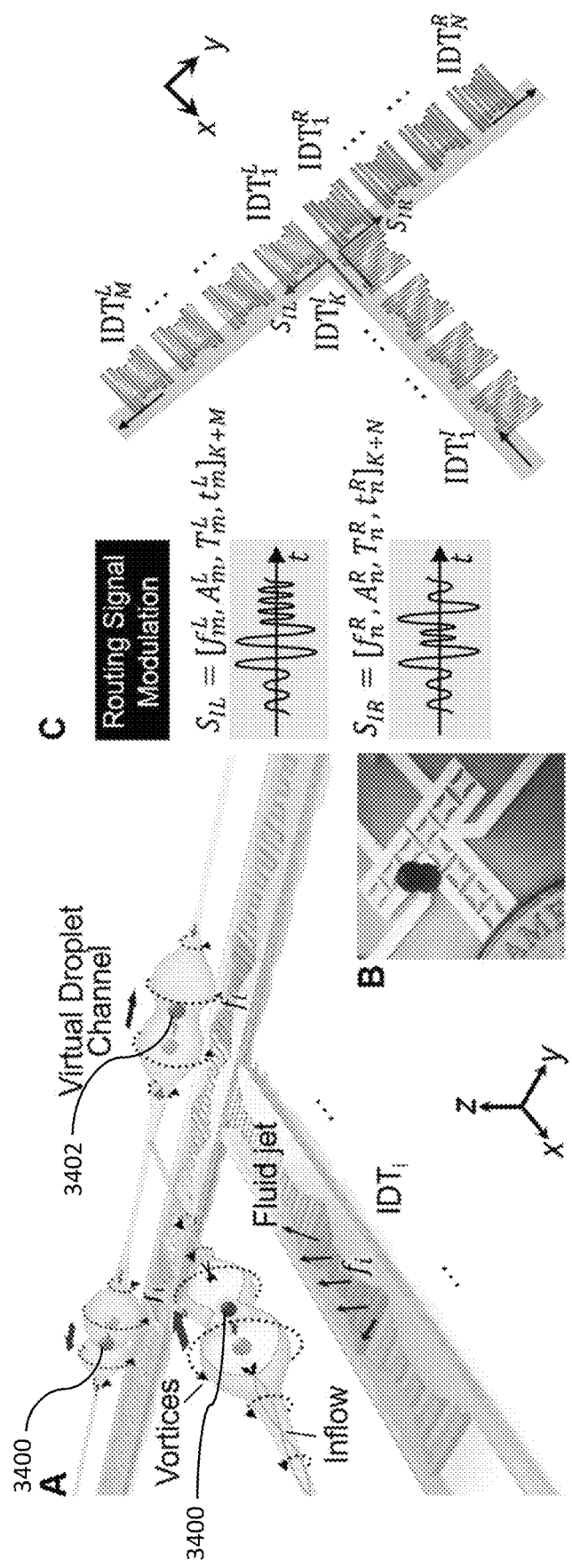
Figure 35A:
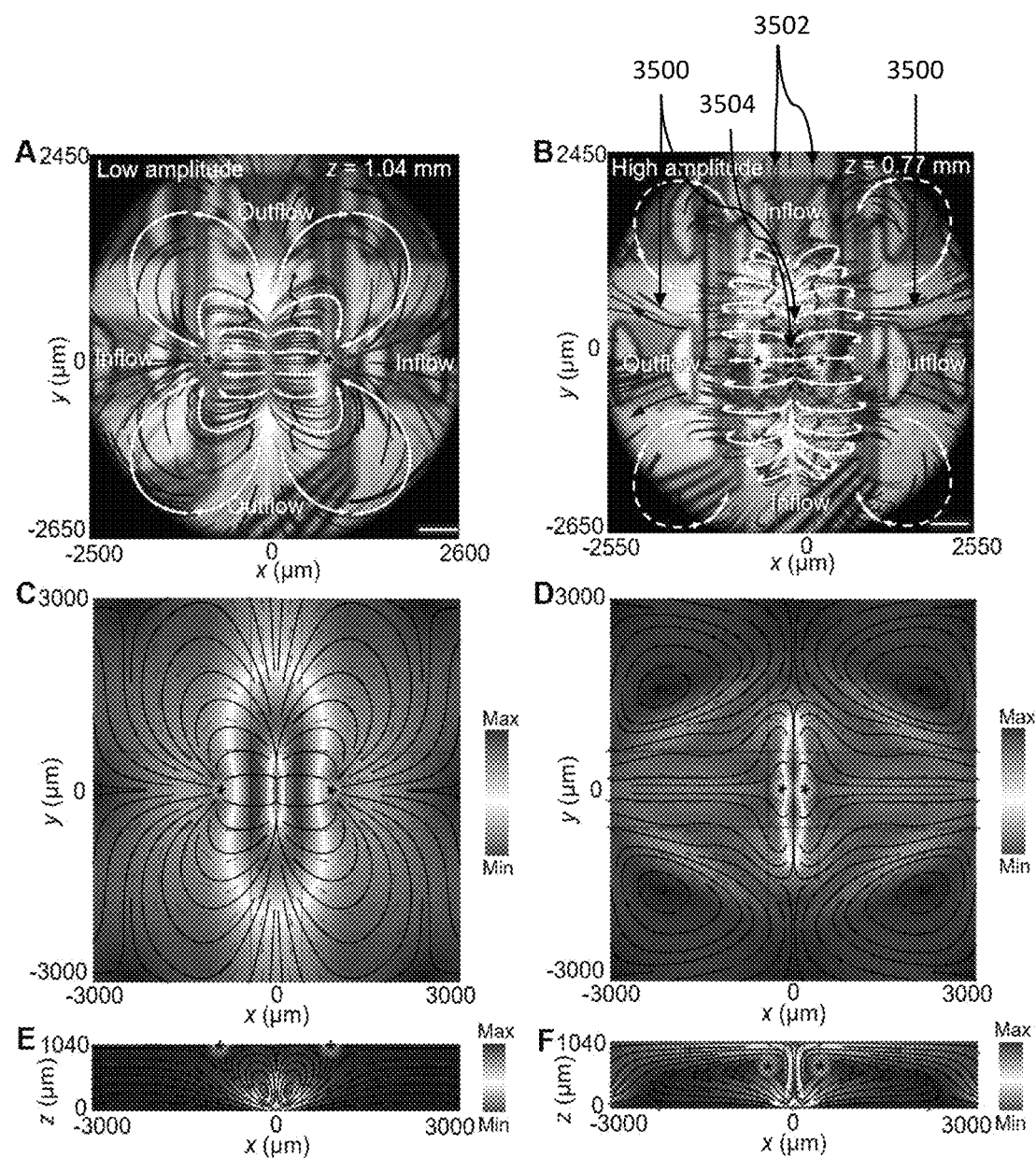
Figure 35B:
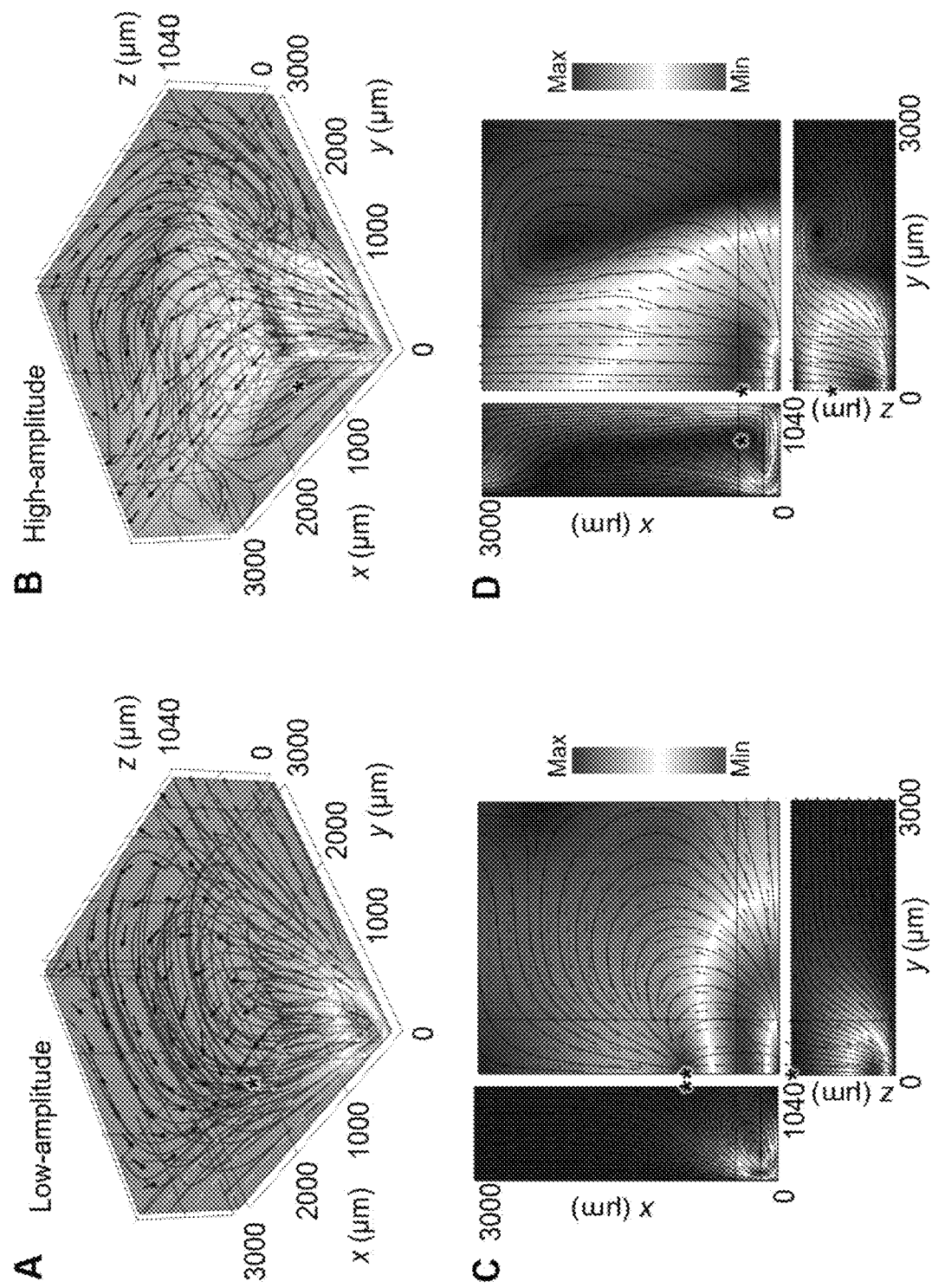
Figure 36A:
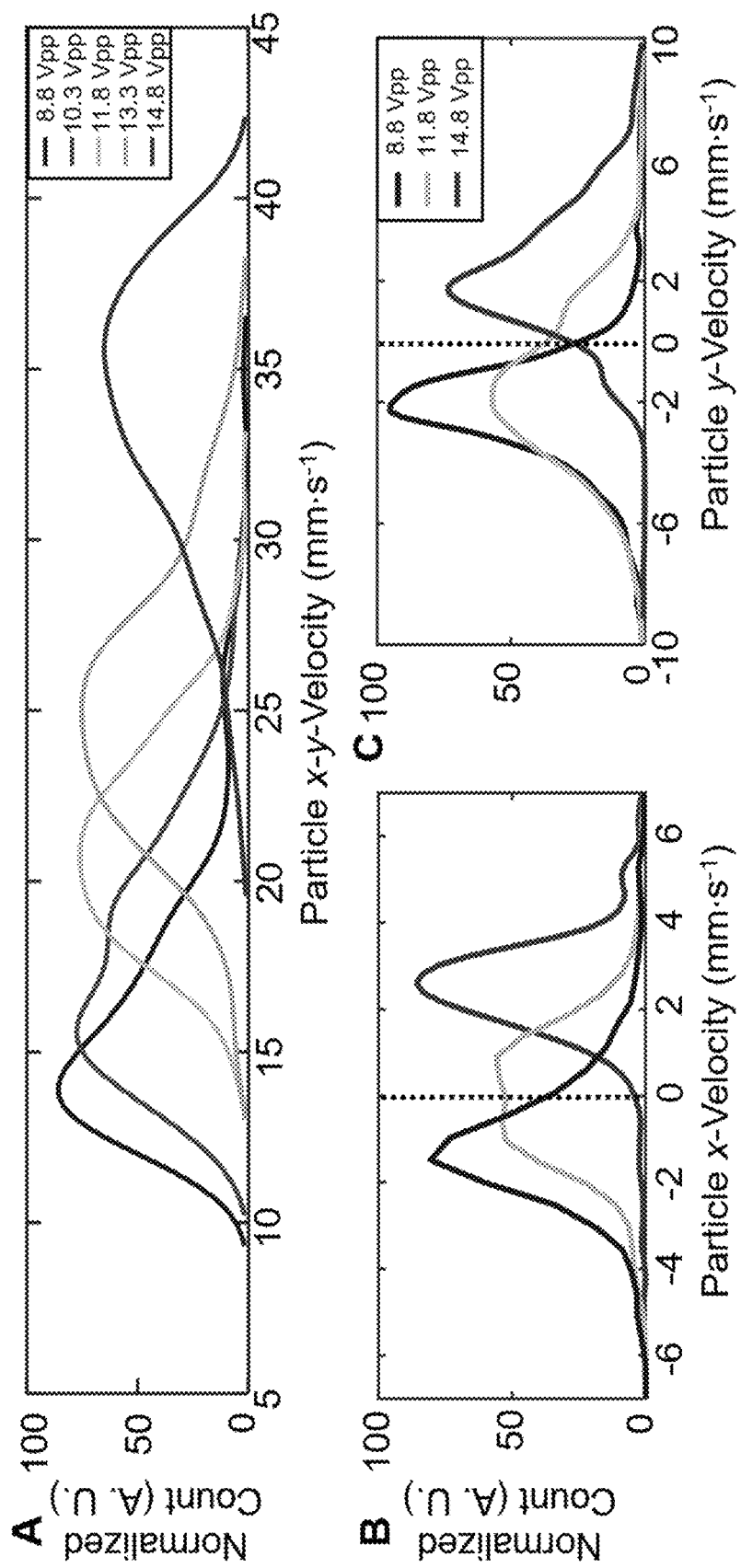
Figure 36B:
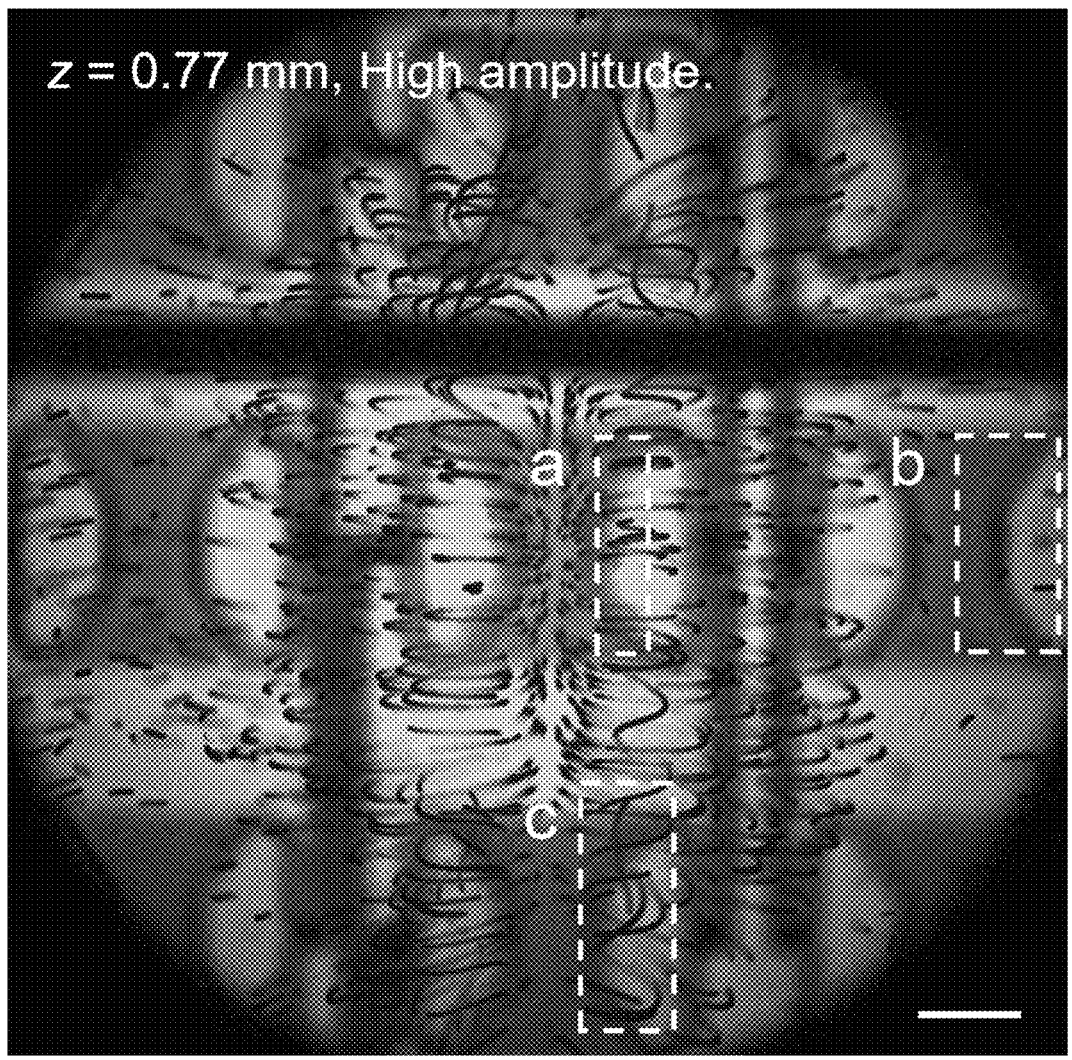
Figure 37A:
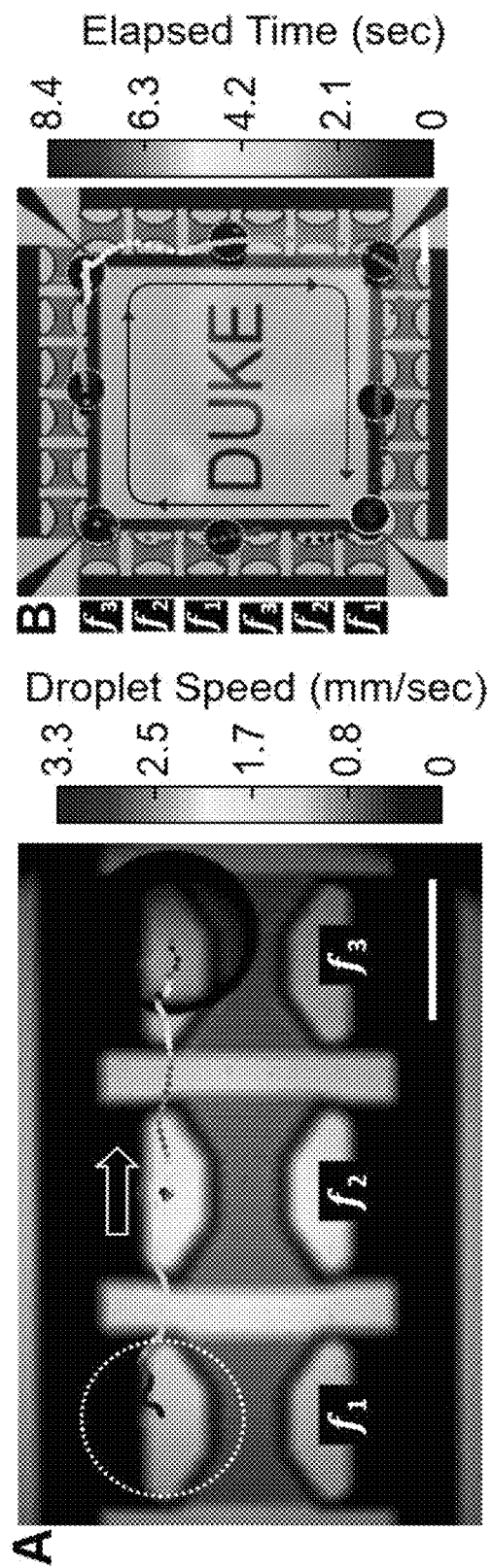
Figure 37B:
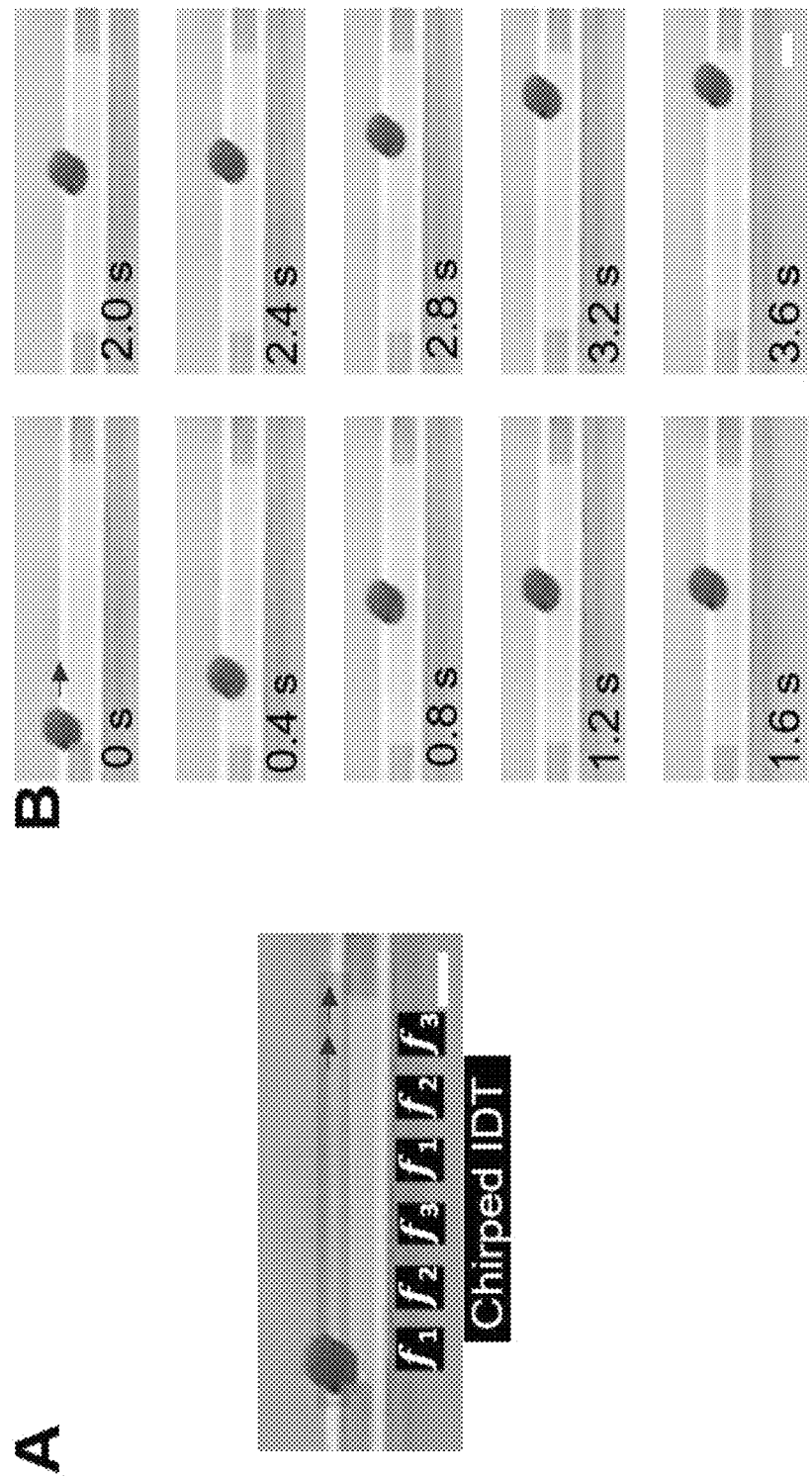
Figure 37C:
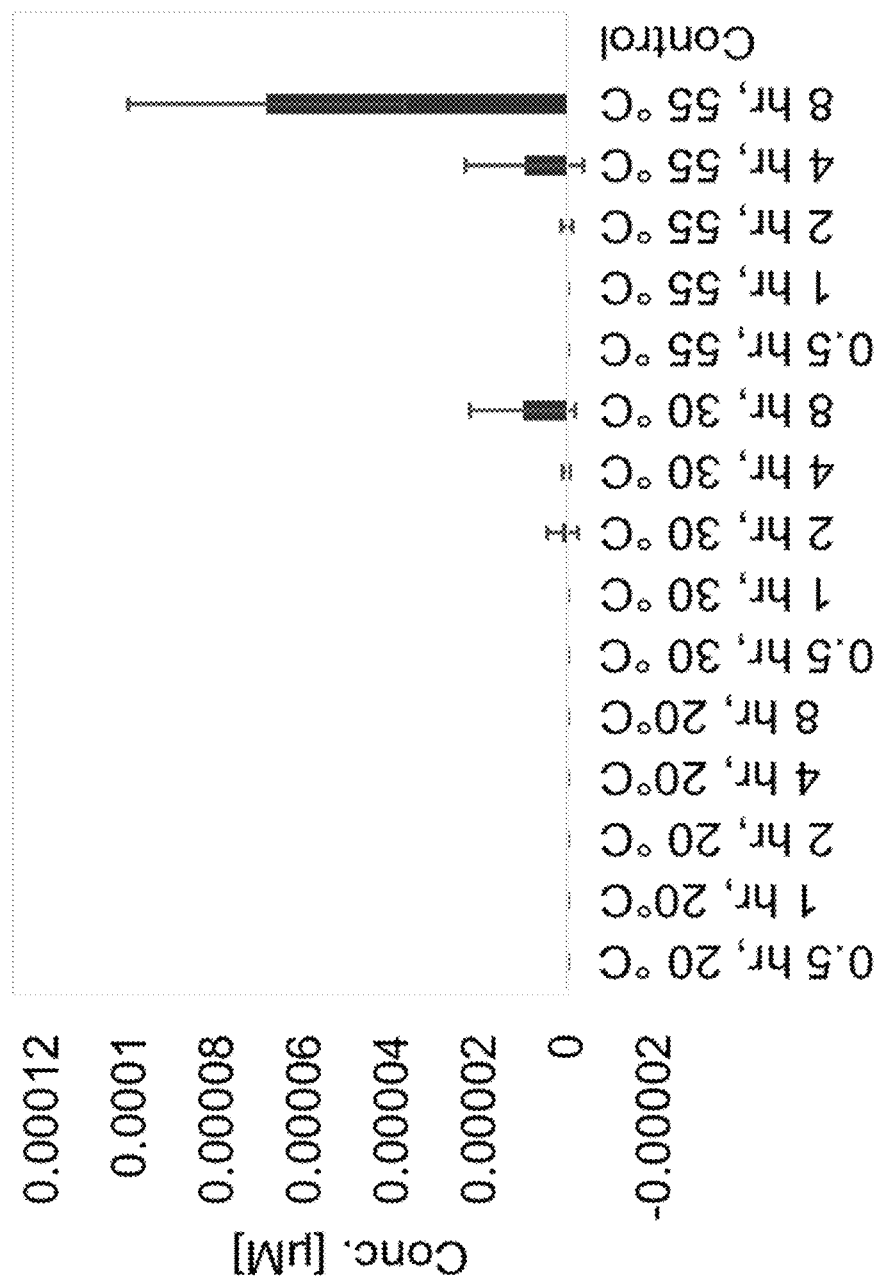
Figure 38:
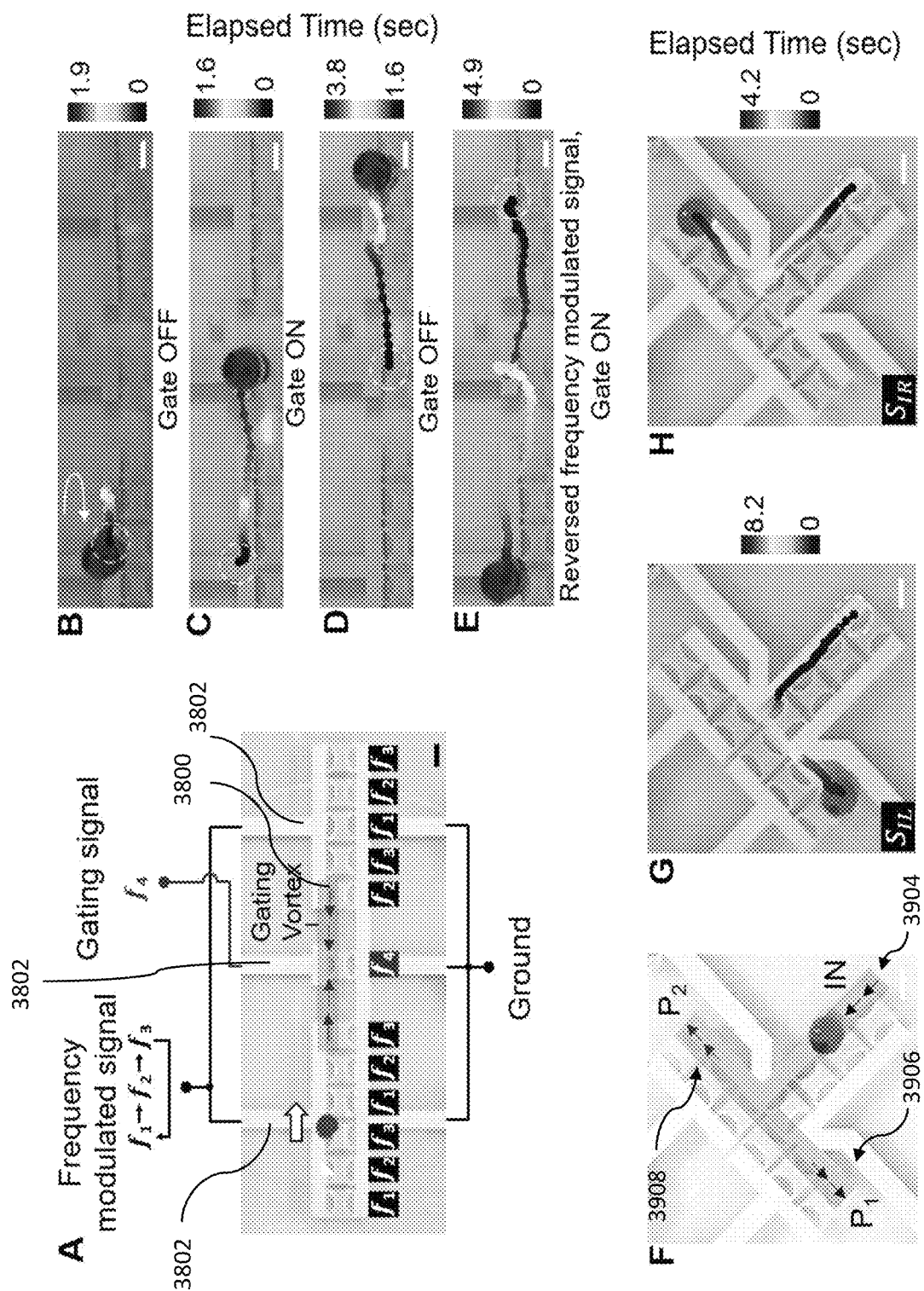
Figure 39:
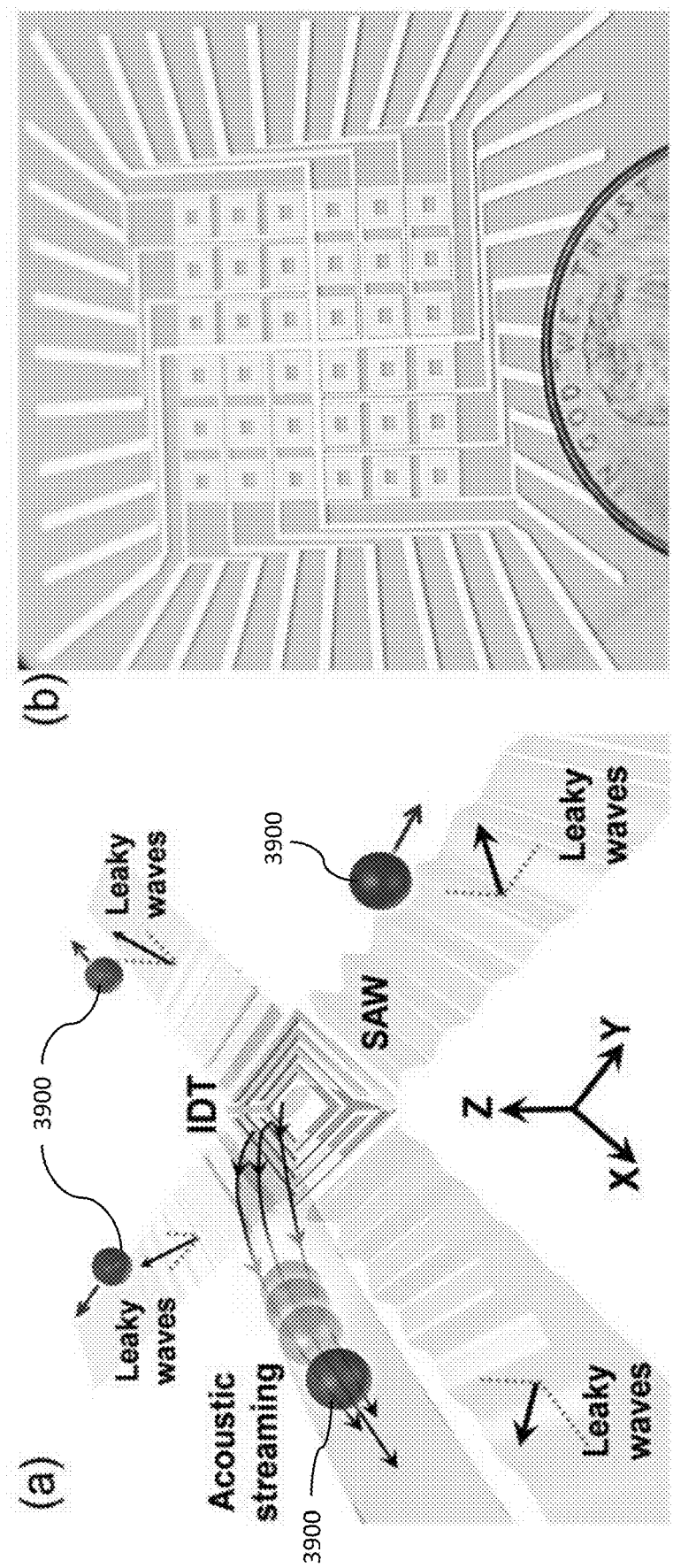
Figure 40:
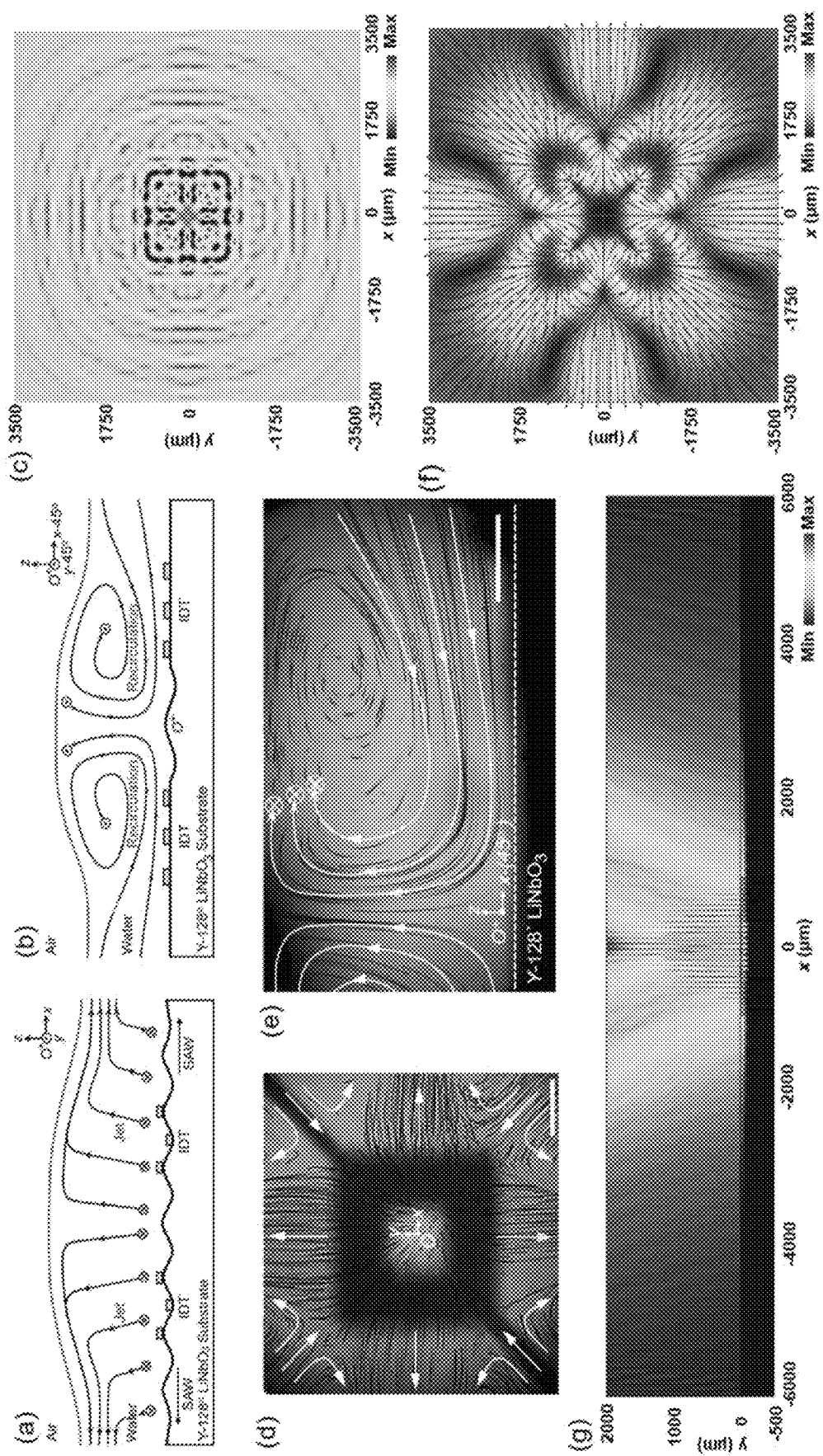
Figure 41:
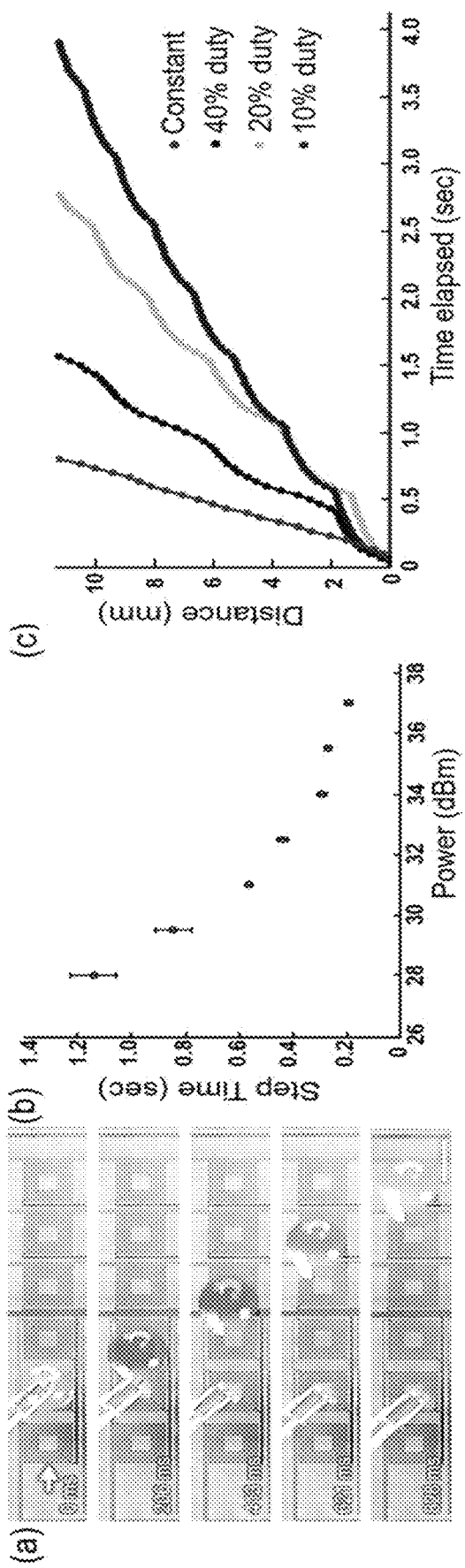
Figure 42:
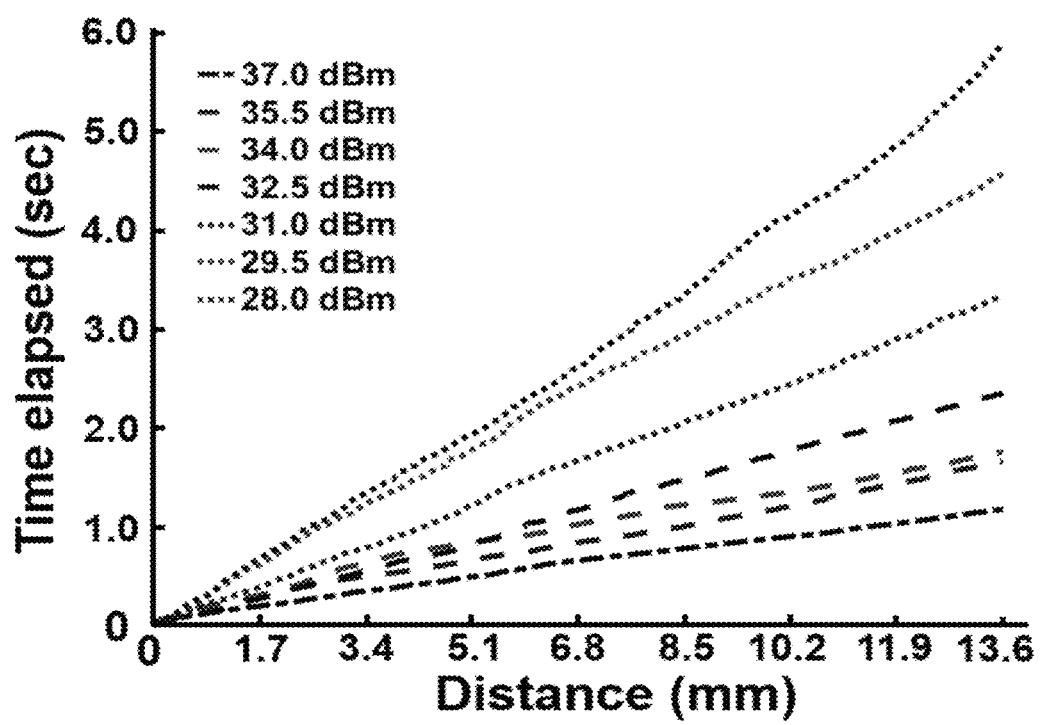
Figure 43:
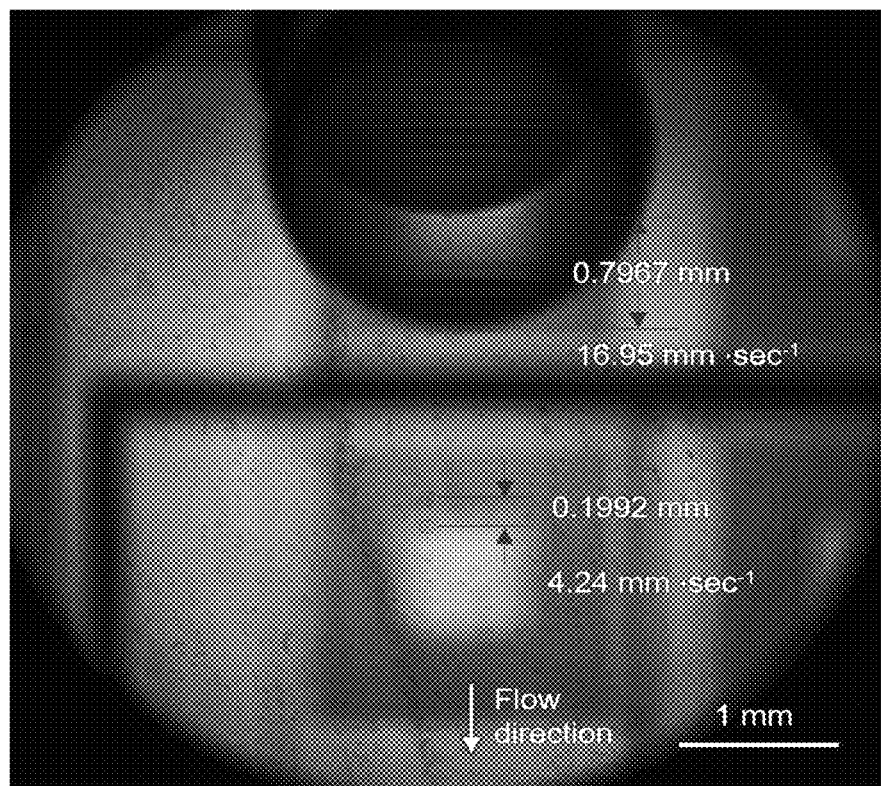
Figure 44:
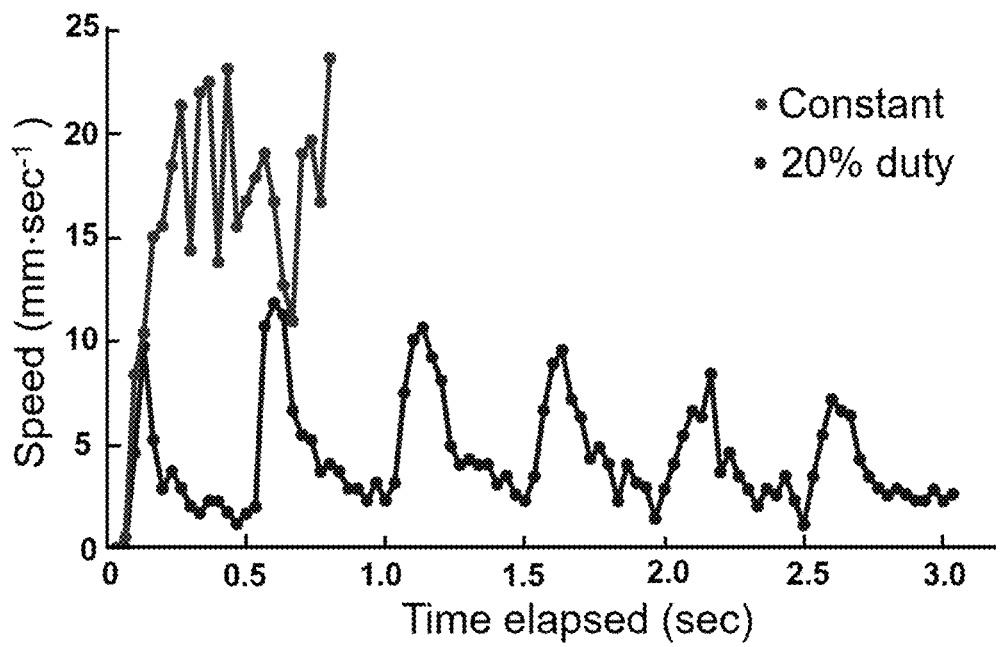
Figure 45:
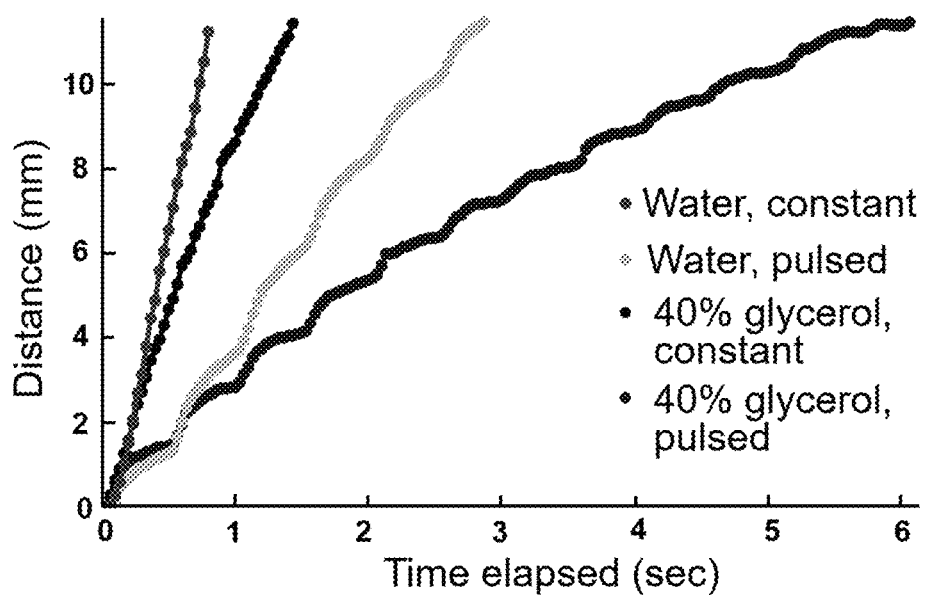
Figure 46:
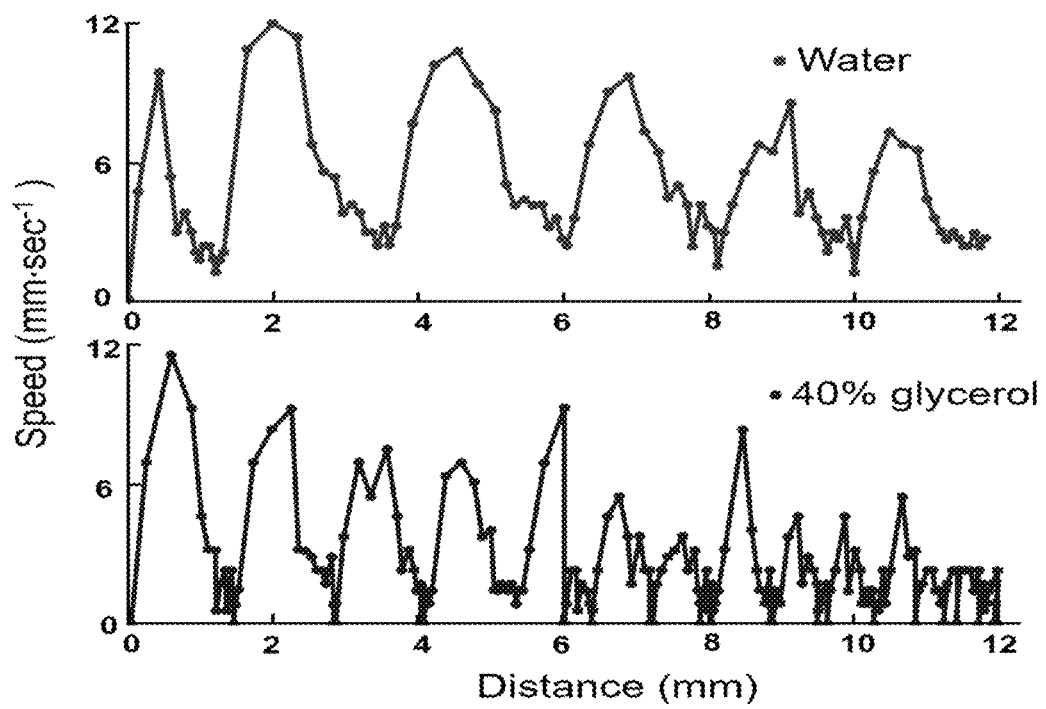
Figure 47:
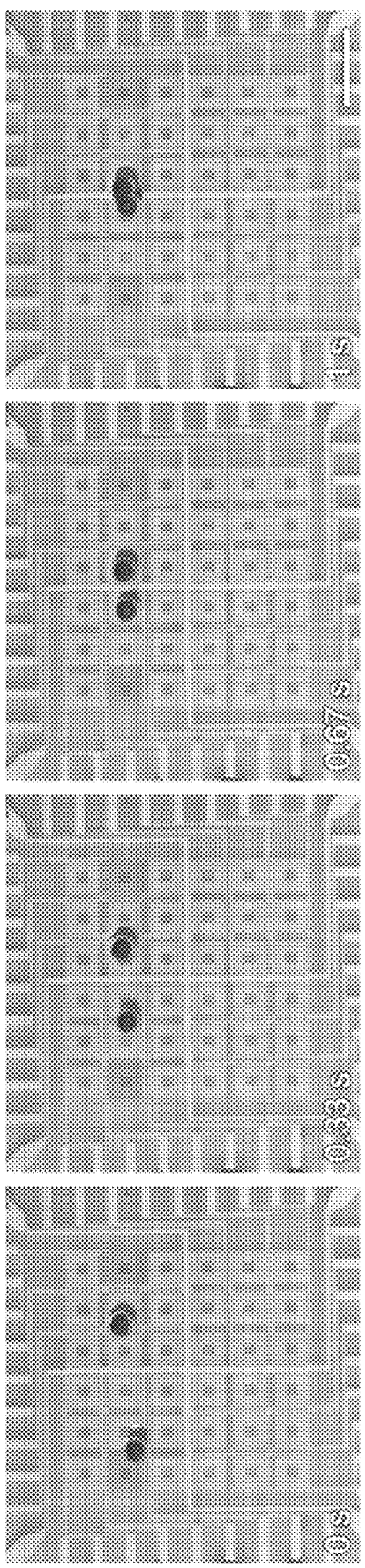
Figure 48:
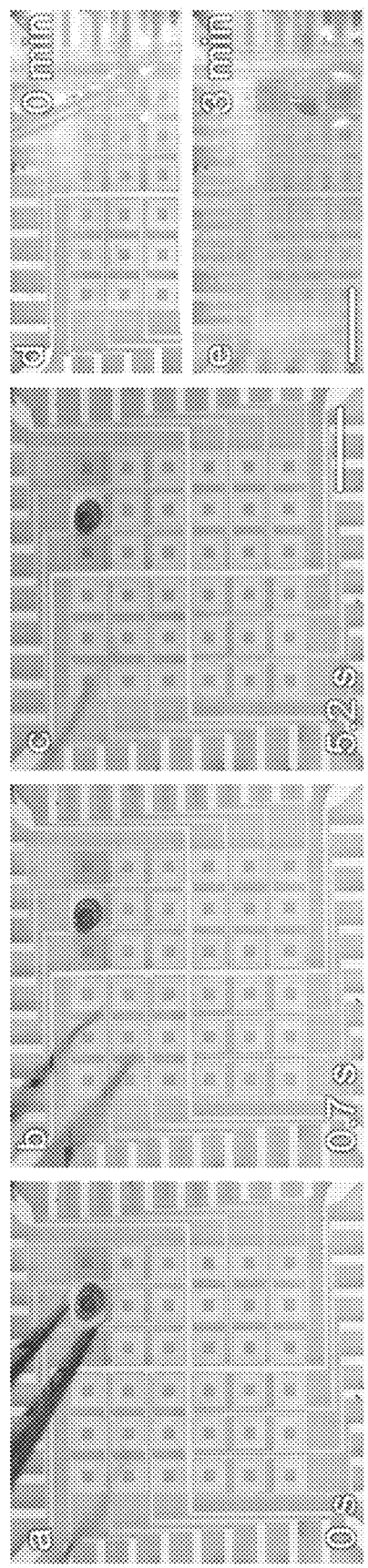
Figure 49:
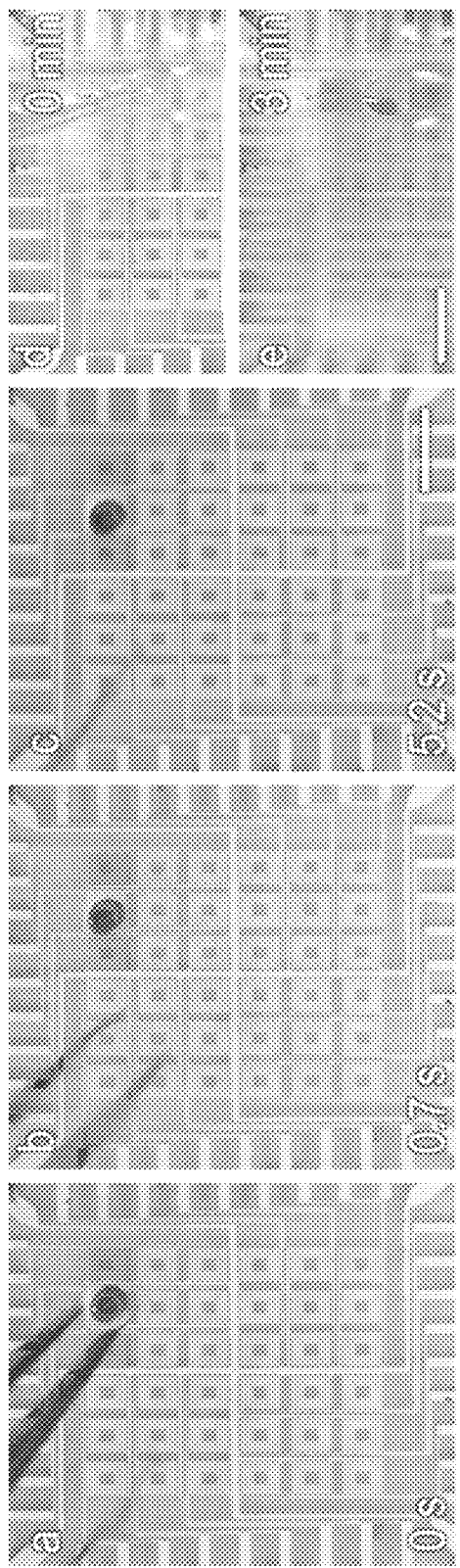
Figure 50:
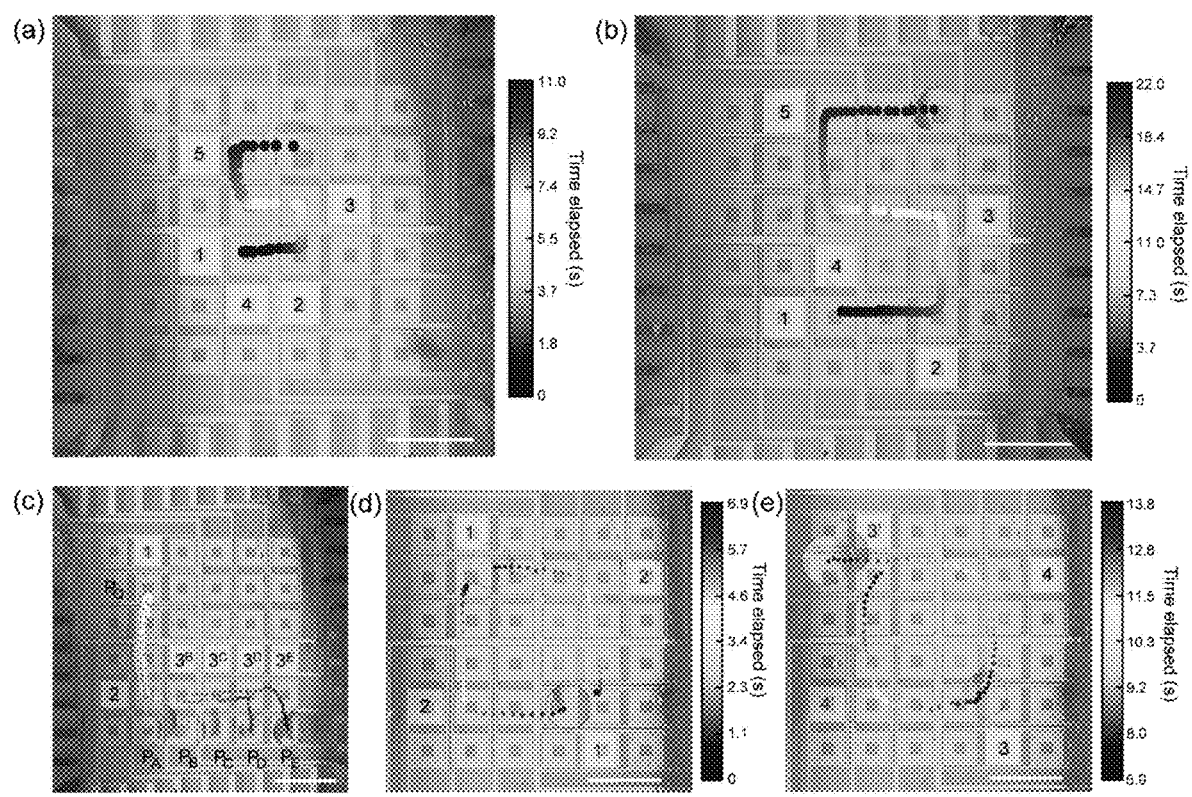
Figure 51:
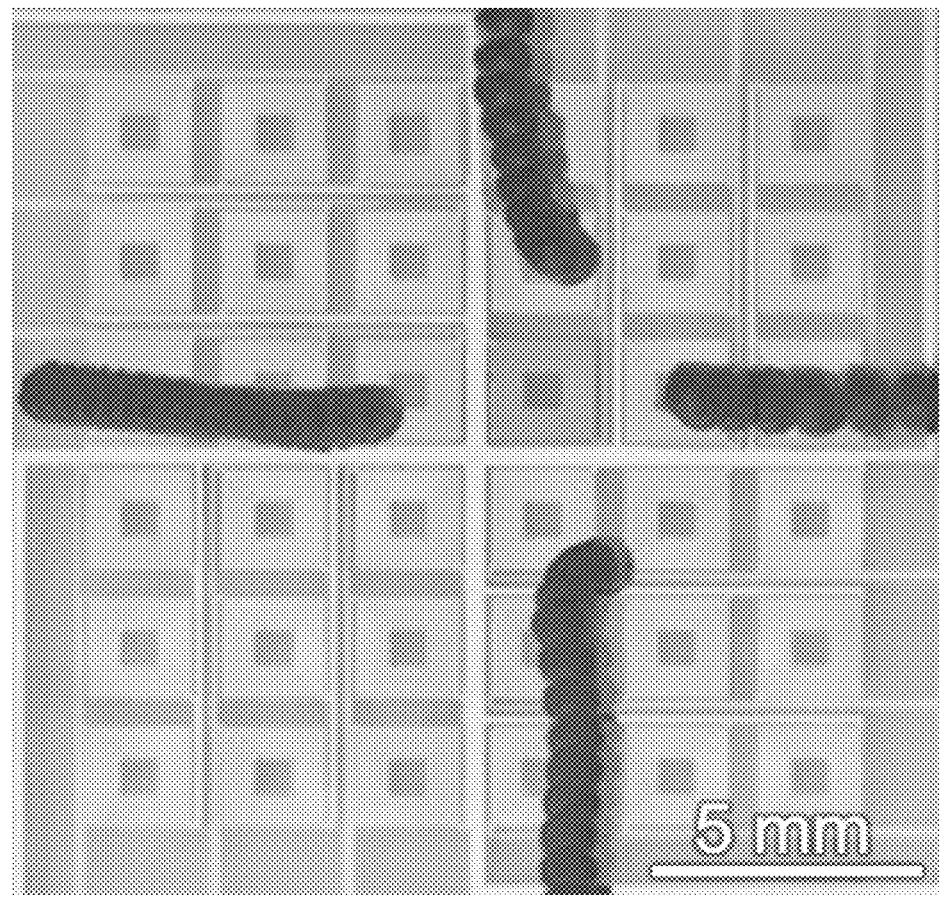
Figure 52:
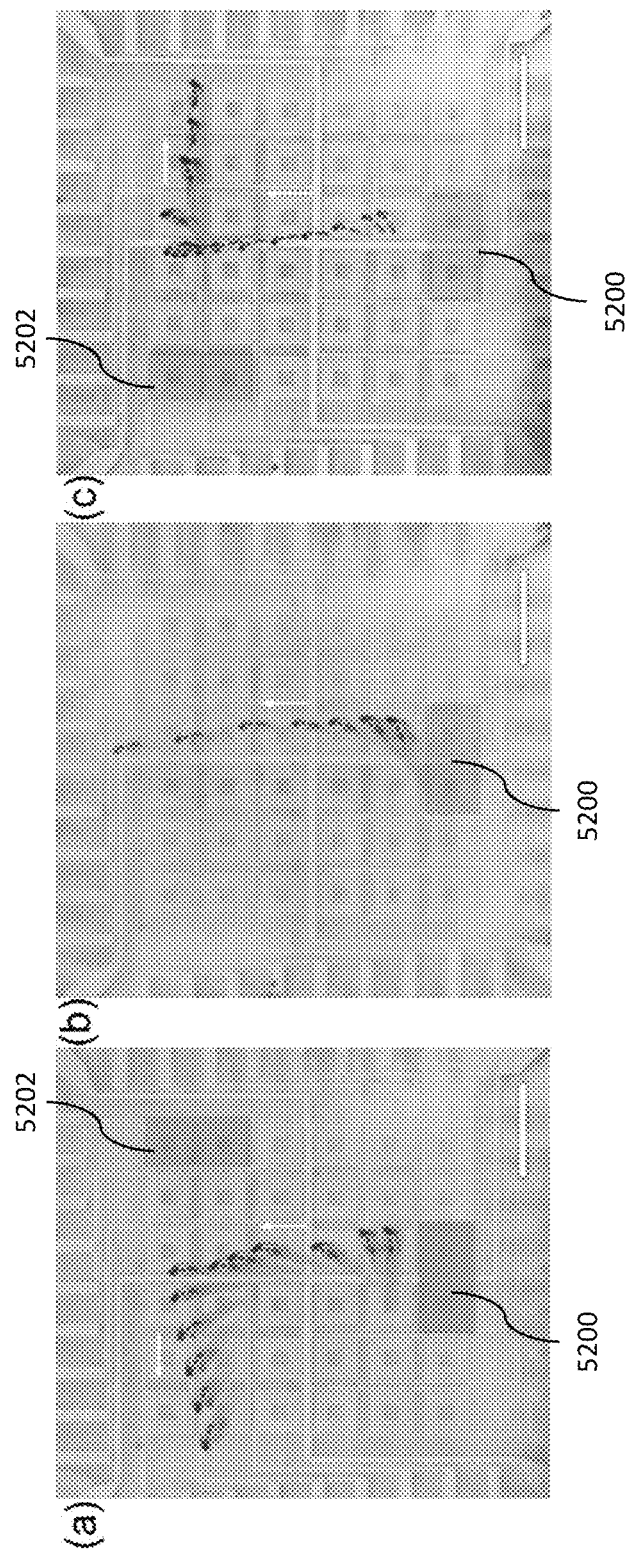
Figure 53:
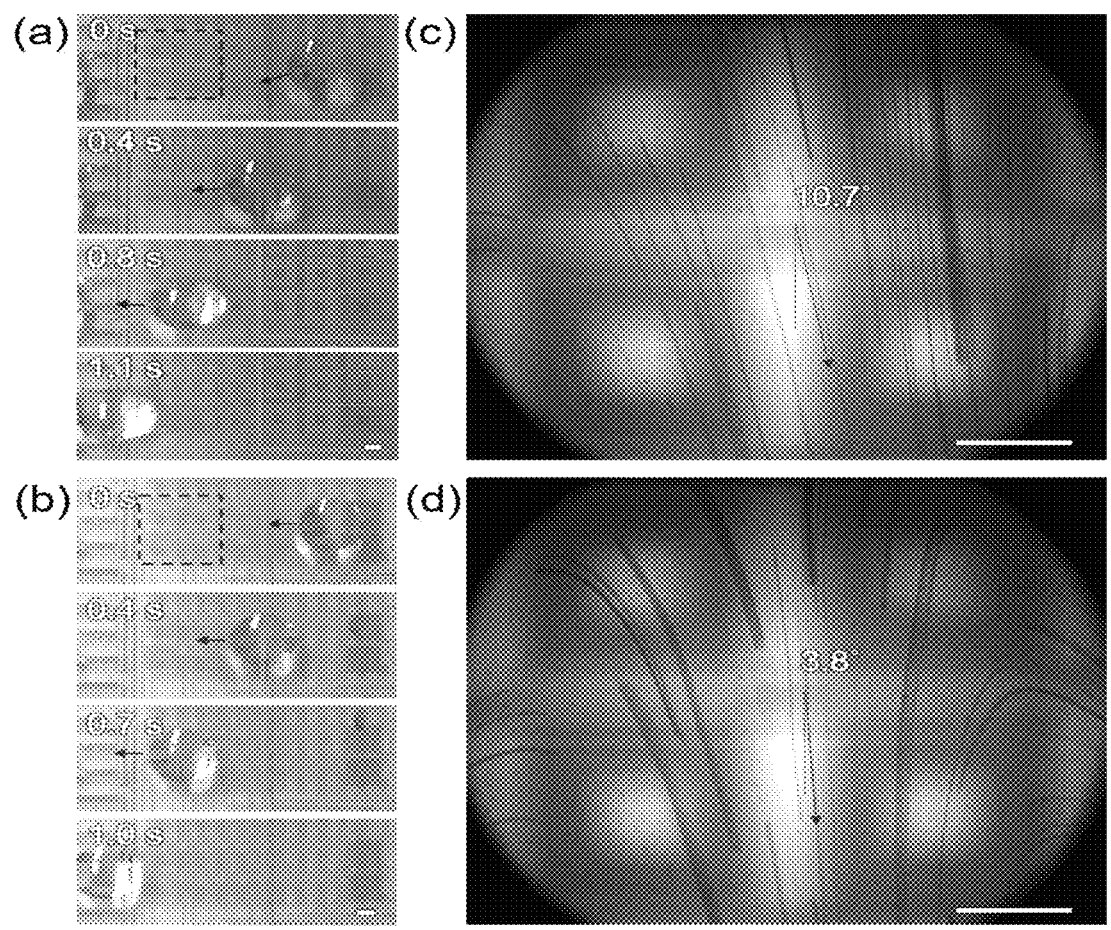
Figure 54:
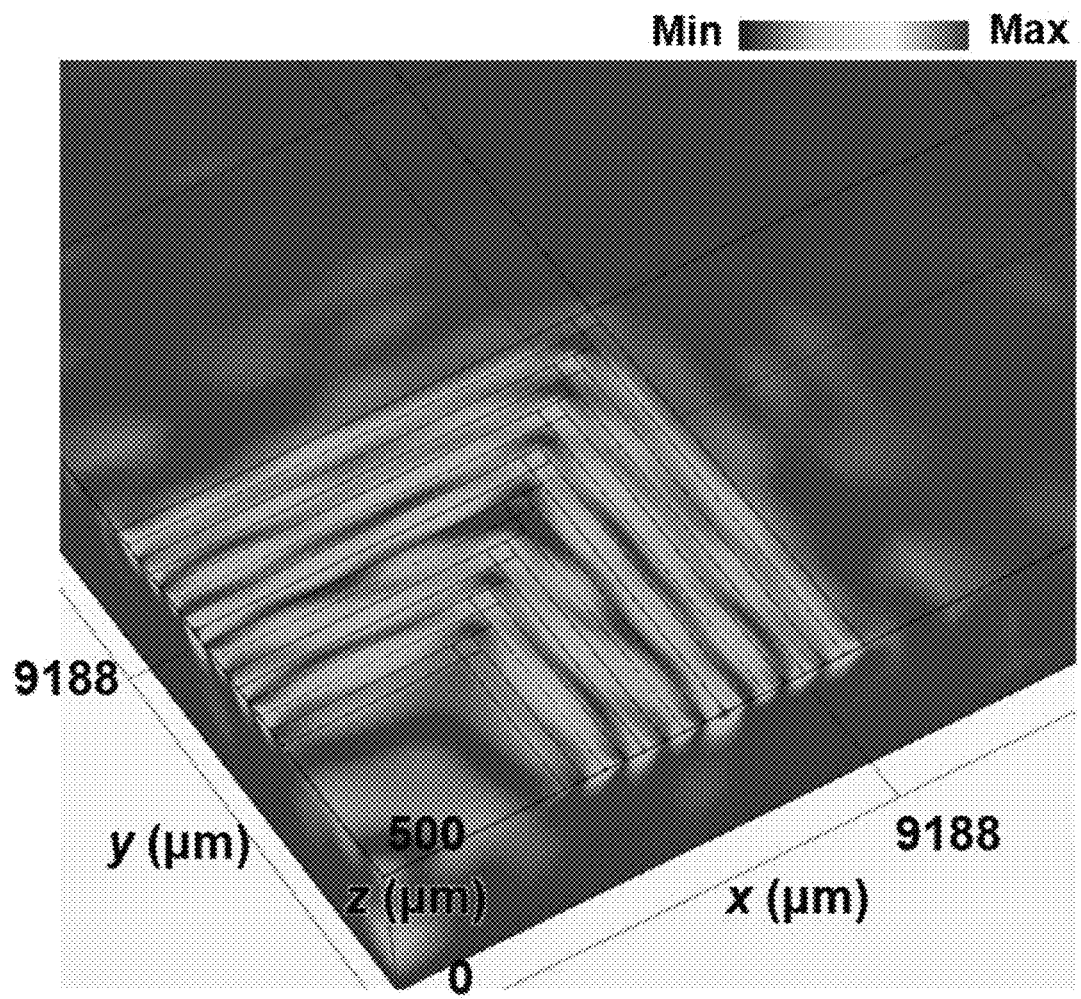
Figure 55:
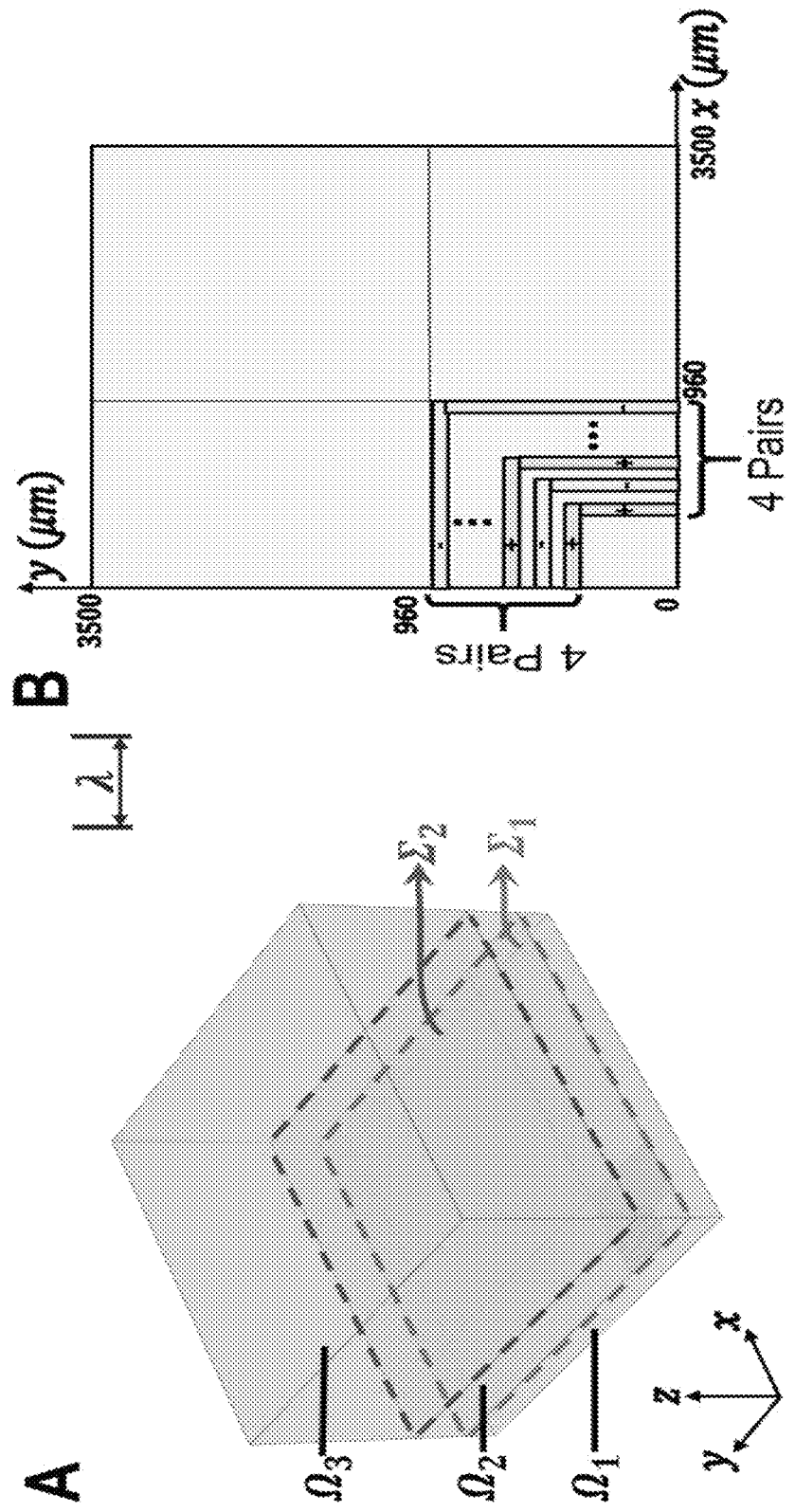
Figure 56:
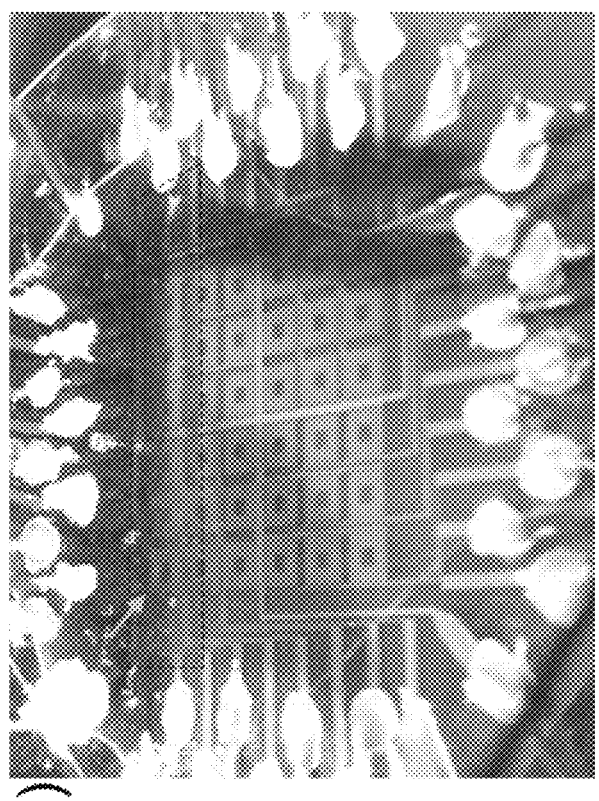
Figure 56:
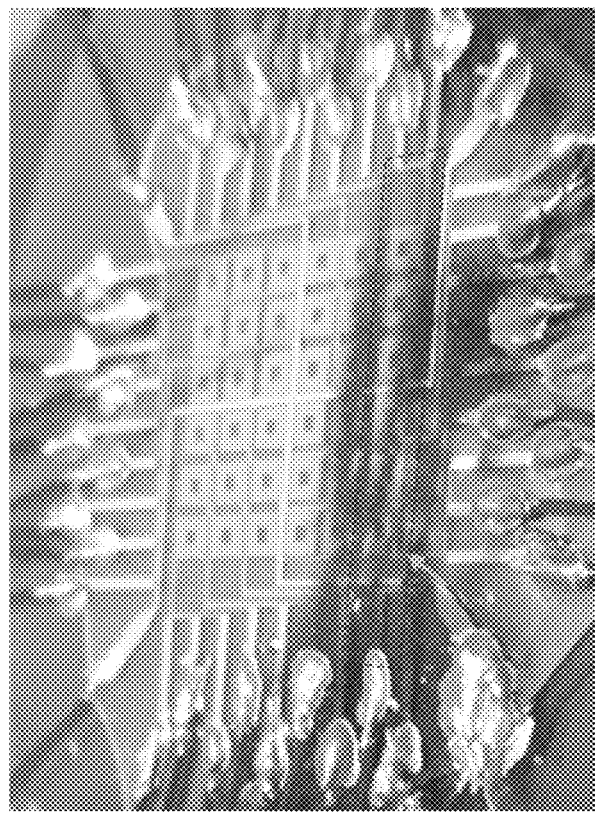
Figure 57:
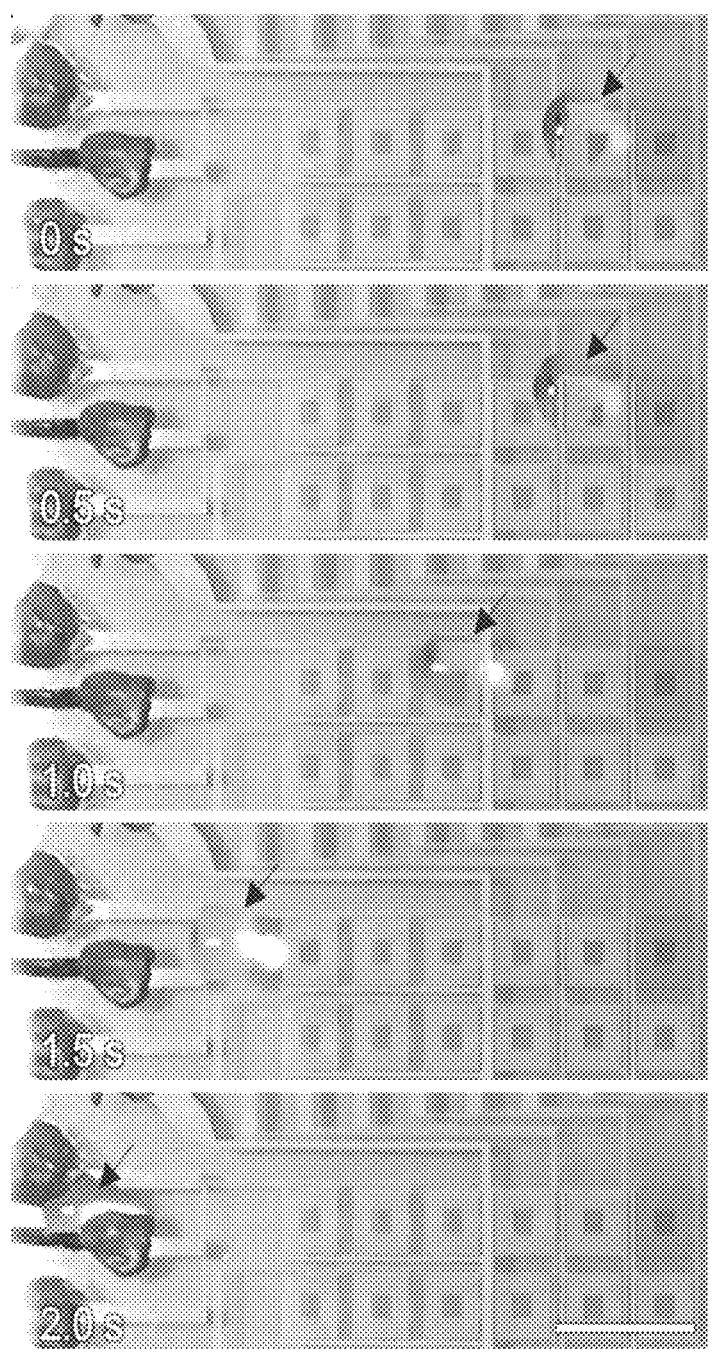

Having thus described the presently disclosed subject matter in general terms, reference will now be made to the accompanying Drawings, which are not necessarily drawn to scale, and wherein:

FIG. 1A is a schematic diagram of an acoustofluidic system for digitally transporting, merging, mixing, and splitting particles and/or fluids in accordance with embodiments of the present disclosure;

FIG. 1B is a side view of another acoustofluidic system for digitally transporting, merging, mixing, and splitting particles and/or fluids in accordance with embodiments of the present disclosure;

FIG. 1C is a side view of acoustofluidic system similar to the system shown in FIG. 1B but with SAW generators in operation for holding or trapping the droplet or micro/nano object in a position in accordance with embodiments of the present disclosure;

FIG. 1D is a top view of another acoustofluidic system with SAW generators in operation for holding or trapping the droplet or micro/nano object in a position in accordance with embodiments of the present disclosure;

FIG. 1E is a side view of an acoustofluidic system similar to the system shown in FIG. 1C but with SAW generators in operation for holding or trapping the droplet or micro/nano object object in a position beneath the top surface of the fluid suspension in accordance with embodiments of the present disclosure;

FIG. 1F is a side view of the acoustofluidic system shown in FIG. 1E but with the center SAW generator in operation for holding or trapping the droplet or micro/nano object object in a position partially submerged in the fluid suspension in accordance with embodiments of the present disclosure;

FIGS. 1G and 1H are top views of an acoustofluidic system with different units having SAW generators for moving a droplet or micro/nano object object at different locations of hydrodynamic traps in accordance with embodiments of the present disclosure;

FIG. 1I is a side view of another acoustofluidic system SAW generators in operation for moving a partially-submerged droplet or micro/nano object object in the direction of the X-axis in accordance with embodiments of the present disclosure;

FIG. 1J is a top view of an acoustofluidic system with different units having acoustofluidic wave generators for moving a droplet or micro/nano object object in a Y direction in accordance with embodiments of the present disclosure;

FIG. 1K is a side view of an acoustofluidic system with different BAW generators for holding a droplet or micro/nano object object in a hydrodynamic trap in accordance with embodiments of the present disclosure;

FIG. 1L is a top view of an acoustofluidic system with different BAW generators for controlling movement of a droplet or micro/nano object object in accordance with embodiments of the present disclosure;

FIG. 2A is a perspective view of a digital acoustofluidic system for contactless and programmable droplet manipulation;

FIG. 2B is an image showing an example digital acoustofluidic system with a drop of blood floating on the carrier layer of fluorinated oil;

FIG. 3 illustrates boundary-layer-driven streaming in the z-plane;

FIG. 4 is an image of a side view of the IDT aperture;

FIGS. 5A and 5B schematically show cross-sections of streamlines in the x-z- and y-z-planes, respectively;

FIG. 6A depicts simulation results showing the acoustic streaming patterns in the x-z-plane;

FIG. 6B depicts simulation results showing the acoustic streaming patterns in the y-z-plane;

FIGS. 7A and 7B are stacked images of particle trajectories near one flank of an activated IDT;

FIGS. 8A-8C are images showing streaming patterns with and without a droplet;

FIG. 9A depicts a grayscale heat map and diagram showing calculated streamlines from a numerical model of the forces generated by acoustic waves in the x-z plane, and an illustration of the force balance along the x-z plane at the trap;

FIG. 9B is a side view of the immersed part of a 5 µL droplet when the IDT is turned off;

FIG. 9C is a side view of the immersed part of a 5 µL droplet when the IDT is turned on;

FIG. 9D are images taken in a time-elapsed sequence of a top view of an example droplet-trapping process;

FIG. 9E is a graph showing the relationship between the droplet volume and the step time;

FIG. 9F shows images of a free-floating droplet being restabilized near an excited IDT;

FIG. 9G shows an image of a particle tracking result showing the streaming pattern on the oil's surface (top view);

FIG. 10 is a graph showing the acceleration of a droplet as it traverses a fixed step distance of 9 mm, as a function of droplet speed for evenly spaced elapsed-time intervals;

FIG. 11 shows different images depicting micro/nano object particle manipulation using digital acoustofluidics;

FIG. 12 shows a sequence of images depicting internal streaming within a droplet;

FIG. 13 shows top view images of an acoustofluidic system implementing trap-and-release mechanism from pixel to pixel;

FIG. 14 is an image of a digital acoustofluidic system that can implement programmable single-droplet transport in accordance with embodiments of the present disclosure;

FIG. 15 are multiple images showing contact free droplet transportation using a reconfigurable transducer array;

FIG. 16 shows a sequence of images of a digital acoustofluidic system in accordance with embodiments of the present disclosure implementing droplet merging;

FIG. 17A is a schematic showing a y-z-plane cross-sectional view of a device for acoustofluidics-based droplet generation in accordance with embodiments of the present disclosure;

FIG. 17B shows a top view schematic of the acoustofluidic droplet generator shown in FIG. 17A;

FIG. 17C is an image of the acoustofluidic droplet generator device without any working fluids;

FIGS. 17D-17F show a sequence of time-lapsed images captured of acoustofluidic droplet generation in accordance with embodiments of the present disclosure;

FIG. 18 are images showing an interface between a digital acoustofluidic chip and a drop generator in accordance with embodiments of the present disclosure;

FIG. 19 depicts images of an acoustofluidic system configured to actively split a water droplet in accordance with embodiments of the present disclosure;

FIG. 20 is a graph showing characterization of diffusion into the carrier oil;

FIG. 21 is a graph showing results of a cell viability test;

FIG. 22 shows images of a glucose detection reaction on a digital acoustofluidic system in accordance with embodiments of the present disclosure;

FIGS. 23A and 23B are graphs showing a comparison of glucose detection between the digital acoustofluidic device and the standard pipetting method, respectively;

FIGS. 24A-24C depict enzyme cascade reaction for detecting enolase on a digital acoustofluidic system;

FIG. 25 is a diagram of a digital acoustofluidic system for sub-nanoliter droplet manipulation;

FIG. 26 depicts a schematic cross-sectional view of an acoustofluidic system, a picture of a trapped droplet, and top views of droplet actuation with extra light oil layer on fluorinated oil layer to prevent evaporation of the aqueous droplet in accordance with embodiments of the present disclosure;

FIG. 27 shows a schematic cross-sectional view of a droplet collector and images of a droplet transportation and collection process in accordance with embodiments of the present disclosure;

FIG. 28 are a sequence of images showing active splitting of an ethanol droplet on the surface of silicone oil using a digital acoustofluidic system in accordance with embodiments of the present disclosure;

FIG. 29 is an image of the layout of the acoustofluidic shown in FIG. 2B;

FIG. 30 are images of a six-droplet cascade reaction with a digital acoustofluidic system;

FIG. 31 shows a different configuration of a 4×4 units digital acoustofluidics prototype with bulk-acoustic-wave (BAW) transducers as the micropump to generate acoustic streaming in the fluorinated oil layer above the transducer array, the repetitive layout of BAW transducers are optimized to generate hydrodynamic traps right above each transducers through the interaction of acoustic streaming and the confining boundaries;

FIG. 32 shows time-elapsed images of the droplet actuation processes along the x direction using a single dmIDT under low-excitation amplitudes, time-elapsed images of the droplet actuation processes along the y axis using high-excitation amplitudes, time-elapsed trajectory of the nano-liter droplets actuated by the ASVs, particles are shown concentrated within the droplet due to internal streaming, an image of a contactless fluid processor with an array of 64 independent dmIDT units, and the time elapsed motion of the droplet along the transducer array;

FIG. 33 are images showing the schematic droplet manipulation mechanism using low and high-excitation amplitudes on the dmIDT, the dmIDT can generate acoustic streaming vortices (ASVs) under high-amplitude excitation in the fluorinated oil layer;

FIG. 34 show examples of acoustic streaming vortices (ASVs)-based droplet manipulation of dmIDT generated under high-voltage excitation in accordance with embodiments of the present disclosure;

FIG. 35A are images of an x-y-plane composite image of particle trajectories generated from stacked, bottom-view images of particles near one flank of a transducer when excited by a low-amplitude signal near the surface of the oil, and an x-y-plane of particle trajectories generated from the stacked, bottom-view images of particles near one flank of a transducer when excited by a high-amplitude signal beneath the surface of the oil;

FIG. 35B show images of simulation results of 3D streamlines over a quarter-transducer excited by low-amplitude in image and high-amplitude signals;

FIG. 36A show the particle velocity distributions around the ASVs (z=1.04 mm, on the oil surface) as the excitation voltage is increased, and the velocity distribution of the particles, escaping from the transducer along x-axis (i.e., x-Velocity) over the flanks of transducer (z=1.04 mm, on the oil surface), shifts towards the right side of the graph as the excitation voltage increases;

FIG. 36B is a microscopic image showing the regions-of-interest (ROIs) selection for the particle image velocimetry (PIV) analysis;

FIG. 37A show contactless, unidirectional droplet diode-like gating and routing via ASVs;

FIG. 37B are images demonstrating contactless, unidirectional translation of a solid particle via the acoustic-streaming vortices generated by the chirped IDT;

FIG. 37C is a graph showing characterization of diffusion of Rhodamine 6G in fluorinert FC-40 oil;

FIG. 38 show a droplet gating device with transistor-like behavior, and time-elapsed droplet trajectories when the gating signal is OFF and ON;

FIG. 39 is a schematic of a system and an image of the system for contactless, programmable acoustofluidic manipulation of objects or droplets on water using hollow-square-shaped IDT array;

FIG. 40 depicts different images and diagrams showing streaming pattern generated upon the activation of hollow-square-shaped IDTs;

FIG. 41 shows images associated with an experimental droplet actuation process;

FIG. 42 is a graph showing the relationships between distance and time for different excitation powers on a single transistor;

FIG. 43 is an image of particle tracking with a 1-μL mineral-oil droplet floating on the surface of water;

FIG. 44 is a graph showing the relationships between the elapsed time and the traveling speed of a droplet upon the activation of the IDT using constant and pulsed input signals;

FIG. 45 is a graph showing the relationships between the elapsed time and the traveling distance of a droplet floating on water and 40% glycerol-water solution upon the activation of the IDT using constant and pulsed input signals;

FIG. 46 are graphs showing the relationships between the traveling distance and speed of a droplet floating on water and 40% glycerol-water solution upon the activation of the IDT using pulsed input signals;

FIG. 47 is a sequence of images showing the time-lapsed merging process of two particle-containing droplets;

FIG. 48 show the trapping of a particle-containing droplet using two transducers, and a droplet being trapped;

FIG. 49 shows a sequence of images of the repeated trap-release process of a particle-containing droplet using surrounding transducers;

FIG. 50 is an image showing the four-way actuation of four particle-containing oil droplets simultaneously using a unit-transducer;

FIG. 51 is an image showing the four-way actuation of four particle-containing oil droplets simultaneously using a unit-transducer;

FIG. 52 shows acoustofluidic-based, contactless actuation and selection of a 5-day post-fertilization (dpf) zebrafish larvae;

FIG. 53 shows images of a time-lapsed translation process of a 4-μL mineral-oil droplet using two adjacent transducer with unbalanced (image (a)) and balanced (image (b)) amplitude of excitation signals;

FIG. 54, which is a simulation image showing a quarter view of the displacement distribution of an excited transducer;

FIG. 55 depicts in image (A) a schematic of the computational domain, and in image (B) an electrode setup on the top of the substrate ($\Sigma_1$);

FIG. 56 are photos showing the crossing ripples over an excited transducer unit; and FIG. 57 are images depicting the translation of a mineral oil droplet on across the transducer array.

SUMMARY

The presently disclosed subject matter includes acoustofluidic systems including immersive acoustic wave generators for manipulating droplets or biosamples floating on the surface of an immiscible carrier fluid layers using acoustic-streaming induced hydrodynamic potential wells, a dense carrier fluid layer and associated methods and supporting devices. According to an aspect, an acoustofluidic system includes a substrate including a substrate surface. The system also includes an acoustic wave generator configured to generate acoustic streaming within an acoustic wave region of the substrate surface. Further, the acoustic wave generator is controllable to change the acoustic streaming for movement of a droplet or other micro/nano object object on a fluid suspension about the acoustic wave region.

According to another aspect, an acoustofluidic system includes an acoustofluidic generator configured to generate acoustic streaming within an acoustic wave region. The system also includes a structural feature for manipulation of movement of a floating droplet or other micro/nano object object. Further, the system includes a controller configured to control the acoustic wave generator to move the droplet or other micro/nano object object towards the structural feature to manipulate movement of the droplet or other object.

According to another aspect, a method includes using an acoustic wave generator to generate acoustic streaming within an acoustic wave region. The method also includes controlling the acoustic wave generator for movement of a droplet or other object floating on a fluid suspension about the acoustic wave region.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

In accordance with embodiments, SAW generation systems, devices, and methods are disclosed for implementing digital acoustofluidics, an acoustic-based, programmable, contactless liquid-handling technology, which provides for digitally transporting, merging, mixing, and splitting reagents within aqueous droplets or other fluids in a contamination-free, biocompatible manner. By implementation of digital acoustofluidics as disclosed herein, fluids can float on an inert, immiscible layer of oil that effectively isolates the fluids above a solid surface. Experiments conducted in accordance with the present disclosure demonstrate fluidic manipulation between potential wells, characterize the acoustic streaming within and around the droplets, integrate the on-demand traps into a digital fluidic processor, evaluate the risk of cross-contamination, and apply digital acoustofluidics using multiple droplets to perform an optimized cascading sequence of enzymatic reactions. Advantageously, for example, digital acoustofluidics platforms as disclosed herein provide rewritability (i.e., reusable fluid-paths), biocompatibility (e.g., 99.2% Hela cell viability), versatility (i.e., suitable for handling a wide range of liquids and solids, such as organic solvents, blood, sputum, reactive fluids, and fecal samples), and uniformity (i.e., minimizing internal polarization in aqueous droplets). Thus, digital acoustofluidics as disclosed herein offer unique pathways for addressing the obstacles in previous liquid-handling systems associated with surface adsorption, surface degradation, and internal polarization. Further, digital acoustofluidic systems, devices, and methods disclosed herein provide a compelling platform for the development of robust, rewritable, and digitally programmable fluidic processors.

As referred to herein, the term "acoustic wave generator" refers to a device or component configured to generate an acoustic wave in a fluid. Example acoustic wave generators include, but are not limited to, a surface acoustic wave (SAW) generator, a standing surface acoustic wave (SSAW) generator, and a bulk acoustic wave (BAW) generator. A SAW generator can move fluid or particles along one horizontal axis with respect to a substrate surface. As SSAW generator can move droplets along 2 horizontal axes with respect to a substrate surface. A particular type of acoustic wave generator is an interdigital transducer (IDT), which can convert an electrical signal to an acoustic wave. As applied to microfluidic technologies, an acoustic wave generator can transfer energy from a megahertz (MHz) wave into a fluid, which is due to the mismatch of sound velocities in a microfluidic substrate and the fluid.

As referred to herein, the terms "interdigital transducer" or "IDT" refer to device comprising interlocking arrays of electrodes. As an example, the IDT may include two metallic electrodes deposited on a piezoelectric substrate surface for converting electric signals to SAWs by generating periodically distributed mechanical forces via a piezoelectric effect (i.e., an input transducer). Following suitable lithography, the comb-shaped metallic fingers can be made of 5 nm Cr adhesion layer and 50-200 nm Au layer deposited on single-crystal lithium niobite wafer used for generating SAWs. The widths of the metallic fingers and gaps can correspond to specific resonance frequency of the IDT which matches the velocity of the SAW on the wafer. During operation of an IDT, an electrical signal is input into the IDT to cause the piezoelectric substrate to contract and expand due to the redistribution of charges. Continuous deformations lead to the launching of a SAW, which has both longitudinal and transverse vibrations along the propagation of the waves. The combined effect can cause the point near the surface to move in an ellipse which is in the plane normal to the surface and parallel to the wave propagation. An IDT may be fabricated onto a substrate using lithography and lift off/wet etching techniques.

As referred to herein, the term "droplet" refers to any small amount or drop of fluid or other object. This small object may be referred to as a "micro/nano object object". The volume of a droplet or other micro/nano object object may be between about 1 picoliter and 1 milliliter. The droplet or micro/nano object object may be immiscible to a fluid suspension.

FIG. 1A illustrates a schematic diagram of an acousto-fluidic system 100 for digitally transporting, merging, mixing, and splitting particles and/or fluids in accordance with embodiments of the present disclosure. Referring to FIG. 1A, the system 100 include multiple SAW generators 102A-102D, 104, 106, 108, and 110 spaced apart from each other and disposed on a top surface of a substrate, generally indicated 112. The SAW generators 102A-102D, 104, 106, 108, and 110 may be IDTs that are suitably disposed on the substrate surface 112 such as by lithography and lift off/wet etching techniques. The substrate may be a LiNbO$_3$ substrate or any other suitable substrate.

The SAW generators 102A-102D, 104, 106, 108, and 110 can be individually actuated and controlled by application of an output (e.g., electrical signal output) of a controller 114 as will be described in more detail herein. Groups of SAW generators may be positioned and controlled by the controller 114 for cooperative movement of a particle or fluid within a fluid suspension (not shown) between SAW regions of SAW generators. For example, SAW generators 102A-102D may referred to as a pixel or unit 116, which may be considered a fluidic "step" for transport of particles and/or fluids, and a processing site for particles and/or fluid. For example, in order to manipulate aqueous particles or fluids (e.g., droplets) along an X-Y plane (shown in FIG. 1A) without direct contact with the substrate surface 112, a denser carrier layer of fluorinated oil or other suitable suspension fluid (not shown) can be added on top of the substrate, not only to function as an isolation layer upon which particles or fluids float, but also as an actuator to drive droplets via the drag force induced by acoustic streaming. For a particular immersed SAW generator such as SAW generator 102D, the controller 114 may control the SAW generator 102D to produce an excitation force that directly loads on the carrier oil layer above that SAW generator and to generate bulk waves in the oil layer. Meanwhile, SAWs are also generated, and these propagate along the substrate surface and leak into the carrier oil as leaky SAWs. The contributions of both bulk waves and leaky SAWs actively creates two symmetric fluid jets out of the substrate plane, in the oil layer. As a result of this activation of the SAW generator 102D and its orientation, the SAW generator 102D functions as a micro-pump that pushes fluid out along the ±Y directions and pumps fluid in along the ±X directions. Therefore, as a result, a particle or fluid floating on the oil surface in proximity to the SAW generator 102D is driven toward the sides of the SAW generator 102D in the ±X directions by the drag force from the oil being pumped in. Thus, SAW generator 102D can control the movement or transport of particles or fluid floating on the oil surface on its left side generally in the directions indicated by double-sided arrow 118. Further, SAW generator 102D can control the movement or transport of particles or fluid floating on the oil surface on its right side generally in the directions indicated by double-sided arrow 120. SAW generator 102D can also control particles or fluid to settle or to be held floating on the oil surface on its left side or right side, generally at the locations of arrows 118 and 120, respectively.

SAW generator 102B is positioned at a side of the pixel 116 that opposes SAW generator 102D. SAW generator 102B may be oriented the same or similarly as SAW generator 102D such that SAW generator 102B can control the movement or transport of particles or fluid floating on the oil surface on its left side generally in the directions indicated by double-sided arrow 122. Further, SAW generator 102B can control the movement or transport of particles or fluid floating on the oil surface on its right side generally in the directions indicated by double-sided arrow 124. SAW generator 102B can also control particles or fluid to settle or to be held floating on the oil surface on its left side or right side, generally at the locations of arrows 122 and 124, respectively.

By control of the controller 114, SAW generators 102B and 102D can cause particles or fluidic droplet floating on the oil surface to translate between a position at the left of SAW generator 102D (generally at the location of arrow 118) and a position at the right of SAW generator 102B (generally at the location of arrow 124). For example, SAW generator 102D may move a droplet held at arrow 118 to a position at arrow 120. Further, the droplet may be moved by SAW generator 102D alone or in cooperation with SAW generator 102B to a position generally designated by circle 126 located between SAW generators 102A-102D. Similar to the movement caused by SAW generator 102D, SAW generator 102B can move the droplet from a position at about or within circle 126 to positions at arrow 122 and at arrow 124.

SAW generators 102A and 102C are oriented orthogonally with respect to the orientations of SAW generators 102B and 102D. Due to their orientation and in contrast to SAW generator's 102B and 102D ability to move particles or fluid in the ±X directions, SAW generators 102A and 102 can move particles or fluid along the ±Y directions as indicated by double-sided arrows 128, 130, 132, and 134. Particularly, for example, SAW generator 102A may move a droplet held at arrow 128 to a position at arrow 130. Further, the droplet may be moved by SAW generator 102A alone or in cooperation with SAW generator 102C to within circle 126. Similar to the movement caused by SAW generator 102A, SAW generator 102C can move the droplet from a position at about or within circle 126 to positions at arrow 132 and at arrow 134.

It is noted that although the acoustic wave generators shown in the example of FIG. 1A are SAW generators, it should be understood that one or more of the acoustic wave generators may be replaced with an acoustic wave generator of another type or operability. For example, standing surface acoustic wave (SSAW) generators or bulk acoustic wave (BAW) generators may be used. In addition, the acoustic wave generators may be arranged in any suitable orientation and in any suitable number for achieving movement of fluid and/or particles as desired.

Systems and methods disclosed herein may be used for particle and fluid characterization. These systems and methods may be used for particle detection, particle analysis, particle counting, and combinations thereof. For example, a radiation source may be used to direct radiation towards manipulated particles within a fluid medium or suspension. The integration of particle manipulation with analytical systems, devices, and methods disclosed herein can allow for improved particle characterization. Particles may be suspended in a fluid medium, which may be a sample flow through a channel. For example, the integration of microfluidic devices with systems, devices, and methods disclosed herein can allow for improved microparticle characterization. Example applications of the systems, devices, and methods disclosed herein include, but are not limited to, flow cytometry, and systems, devices, and methods for counting, analyzing, and sorting of microparticles in a sample flow. Microparticles may be defined as particles having a dimension of less than 1 mm, in particular less than 500 microns, and more particularly less than 100 microns. Microparticles may include cells, molecules, biomolecules, and the like.

Example uses of the presently disclosed subject matter include lab-on-a-chip systems, sample dispensers, sample collectors, and the like. An acoustic wave generator (SAW or BAW) immersed in fluid can be used for dynamic control of single droplet or multiple droplets or other micro/nano objects such as cells, micro/nano particles, extracellular vesicles, micelle, and the like.

Systems, devices, and methods in accordance with embodiments disclosed herein may be used for a wide variety of applications involving liquid handling operations. Examples include, but are not limited to: automation of biochemical reactions; automated bioassays or diagnostics for clinical samples; automated synthesis of materials; cell cultivations; drug screening; model organism incubation; automated enzymatic reactions; DNA/RNA processing; model organism manipulation; and evolution of ligands by exponential enrichment (SELEX) screening.

The presently disclosed systems, devices, and methods disclosed herein may be part of a microfluidic device. Fluids (e.g., including particles, etc.) may be moved through one or more channels of the microfluidic device to receipt by one or more SAW generators for handling in accordance with embodiments of the present disclosure. A channel may have a lower wall parallel to and proximate a substrate, opposed side walls, and an upper wall. A channel width and/or height may be in the range of 100 nm-1 mm, for example, in the range 1 micron-500 microns.

A piezoelectric substrate may include lithium niobite, lithium tantalite, lead zirconium titanate, polymer such as polyvinylidene fluoride (PVdF) or other fluoropolymer, quartz, or other suitable material. An IDT may also form part of a sensor system, for example using time gating or monitoring drive signal properties. In some examples, the substrate may provide a wall of the flow channel, or the flow channel may have a wall bonded to the substrate.

FIG. 1B illustrates a side view of another acoustofluidic system 100 for digitally transporting, merging, mixing, and splitting particles and/or fluids in accordance with embodiments of the present disclosure. Referring to FIG. 1B, the system 100 includes multiple acoustic wave generators 136 placed on a top surface of a substrate 138. A controller 140 can individually actuate the acoustic wave generators 136 for cooperative movement of a particle or fluid within a fluid suspension 142. For example, the acoustic wave generators 136 can move a droplet or micro/nano object 144 by controlled actuation of the acoustic wave generators 136. Arrows on the left and right of the droplet or micro/nano object 144 indicate a direction of surface flow caused by actuation of one or more of the acoustic wave generators 136 when actuated. Also, acoustic streaming is indicated by arrows surrounding each of the acoustic wave generators 136. Air or a light sealing fluid 146 may be located above the fluid suspension 142. The generalized principle of all the variations of digital acoustofluidics system is to employ acoustic streaming induced flow and hydrodynamic gradient inside the dense carrier fluid to manipulate the droplet or micro-droplet that floating on the surface of the carrier fluid layer.

FIG. 1C illustrates a side view of acoustofluidic system 100 similar to the system 100 shown in FIG. 1B but with SAW generators 148 in operation for holding or trapping the droplet or micro/nano object 144 in a position in accordance with embodiments of the present disclosure. Referring to FIG. 1C, the SAW generator 148 positioned at the center is actuated to cause acoustic streaming within the fluid suspension 142. Movement of the acoustic streaming is indicated by the 2 curved arrows depicted to the upper left and the upper right of the center SAW generator 148. The acoustic streaming causes hydrodynamic traps at the surface of the fluid suspension 142. The general location of 2 such hydrodynamic traps are indicated. When at or near a hydrodynamic trap, the droplet or micro/nano object 144 can be biased to remain at the hydrodynamic trap while the corresponding SAW generator 148 remains actuated. This version of digital acoustofluidics system employs planar SAW generator to induce butterfly-like acoustic streaming pattern which spontaneously generates two hydrodynamic potential wells to trap droplets along one horizontal axis (i.e., x-axis).

FIG. 1D illustrates a top view of another acoustofluidic system 100 with SAW generators 148 in operation for holding or trapping the droplet or micro/nano object 144 in a position in accordance with embodiments of the present disclosure. Referring to FIG. 1D, the system 100 includes units (i.e., Unit 1 and 2) of SAW generators 148 that can each be actuated to emit or generate SAWs along the Y-axis. Unit 1 includes a SAW generator 148 (the right-most SAW generator) that is actuated for generating 2 hydrodynamic traps (one its left and right sides) as shown. In the left hydrodynamic trap, the droplet or micro/nano object 144 is held in position while the corresponding SAW generator 148 remains actuated. A typical design for transporting droplet or micro/nano object freely on a 2D plane to integrate 4 SAW generators into 1 unit with the layout shown in FIG. 1D. Under high-amplitude excitation signal, the dmIDT moves the droplet or micro/nano object along y-axis using the hydrodynamic gradient inside the acoustic streaming vortices generated along the two flanks of the dmIDT.

FIG. 1E illustrates a side view of an acoustofluidic system 100 similar to the system 100 shown in FIG. 1C but with SAW generators 148 in operation for holding or trapping the droplet or micro/nano object 144 in a position beneath the top surface of the fluid suspension 142 in accordance with embodiments of the present disclosure. Referring to FIG. 1E, the controller 140 applies high amplitude excitation to the center SAW generator 148 such that hydrodynamic traps are generated beneath the top surface of the fluid suspension 142 as shown. Thereby, the droplet or micro/nano object 144 is pulled beneath the surface of the fluid suspension 142 and to the hydrodynamic trap on the left side as shown. This version of digital acoustofluidics system employs dual-mode interdigital transducer (dmIDT) to move floating droplet or micro/nano object along two horizontal axes using a single transducer. Under low-amplitude excitation signal, the dmIDT moves the droplet or micro/nano object along x-axis using the hydrodynamic potential wells on the surface of the carrier fluid.

FIG. 1F illustrates a side view of the acoustofluidic system 100 shown in FIG. 1E but with the center SAW generator 148 in operation for holding or trapping the droplet or micro/nano object 144 in a position partially submerged in the fluid suspension 142 in accordance with embodiments of the present disclosure. Referring to FIG. 1F, the controller 140 applies low amplitude excitation to the center SAW generator 148 such that hydrodynamic traps are generated at about the top surface of the fluid suspension 142 as shown. Thereby, the droplet or micro/nano object 144 is partially pulled beneath the surface of the fluid suspension 142 as shown.

FIGS. 1G and 1H illustrate top views of an acoustofluidic system 100 with different units (i.e., Units 1-4) having SAW generators 148 for moving a droplet or micro/nano object 144 at different locations of hydrodynamic traps 150 in accordance with embodiments of the present disclosure. Referring to FIG. 1G, the droplet or micro/nano object 144 is moved from a hydrodynamic trap 150 of the lower left SAW generator 148 to a hydrodynamic trap 150 of the upper left SAW generator 148. Subsequently, in FIG. 1H, the droplet or micro-object 144 is moved from a hydrodynamic trap 150 of the upper left SAW generator 148 to a hydrodynamic trap 150 of the upper right SAW generator 148. The dmIDT can be integrated into an array as shown in FIG. 1F to transport a droplet or micro/nano object freely on a 2D plane. The shape of the dmIDT can be varied to enhance trapping stability in the carrier fluid layers of different viscosities, sound speeds, acoustic attenuations, and thicknesses.

FIG. 1I illustrates a side view of another acoustofluidic system 100 SAW generators 148 in operation for moving a partially-submerged droplet or micro/nano object 144 in the direction of the X-axis in accordance with embodiments of the present disclosure. Referring to FIG. 1I, the controller 140 applies excitation to the SAW generator 148 on the left such that acoustic waves are generated as shown to urge droplet or micro/nano object 144 in the direction as shown. This version of digital acoustofluidics system employs the acoustic radiation force and acoustic-streaming-induced surface flow to push droplet or micro/nano object along the direction of acoustic wave propagation on the surface of the carrier fluid.

FIG. 1J illustrates a top view of an acoustofluidic system 100 with different units (i.e., Units 1-4) having acoustofluidic wave generators 148 for moving a droplet or micro/nano object in a Y direction in accordance with embodiments of the present disclosure. Referring to FIG. 1J, the droplet or micro-object 144 is moved in the direction from Unit 2 to Unit 1 by activation of an acoustofluidic wave generator 148 of Unit 2. The SAW generator is hollow-square shaped IDT which can emit acoustic waves and move droplets or micro/nano objects along 4 directions (+x, -x, +y, -y) simultaneously.

FIG. 1K illustrates a side view of an acoustofluidic system 100 with different BAW generators 152 for holding a droplet or micro/nano object 144 in a hydrodynamic trap in accordance with embodiments of the present disclosure. Referring to FIG. 1K, the droplet or micro/nano object 144 is held in the hydrodynamic trap by application of acoustic waves generated by one of the BAW generators 152 as shown. The hydrodynamic trap is produced as a result of the acoustic streams generated by the BAW generator 152 as shown. This version of digital acoustofluidics system employs BAW transducers and spatial confinements to generate acoustic streaming inside the carrier fluid and the associated hydrodynamic potential wells on the top surface of the carrier fluid. A droplet near the excited BAW generator can be transported along all 2D directions toward the hydrodynamic potential well.

FIG. 1L illustrates a top view of an acoustofluidic system 100 with different BAW generators 152 for controlling movement of a droplet or micro/nano object 144 in accordance with embodiments of the present disclosure. Referring to FIG. 1L, the BAW generator 152 can be activated by the controller 140 to generate a hydrodynamic trap as shown. The droplet or micro/nano object 144 can be moved in the direction opposing the direction of X to move into the generated hydrodynamic trap as shown. The BAW transducers can be integrated into the iterative layout shown in FIG. 1L to achieve the spatial confinement of the generated acoustic-streaming-induced body flow to form a stable hydrodynamic potential well on the surface of the carrier fluid.

In accordance with embodiments, FIG. 2A illustrates a perspective view of a digital acoustofluidic system for contactless and programmable droplet manipulation. Referring to FIG. 2A, the system includes one unit having four IDTs 200A, 200B, 200C, and 200D that each operate as a SAW. The four IDTs 200A, 200B, 200C, and 200D may be referred to as a single "pixel" in the digital acoustofluidic system, which may include other such pixels that are the same or similar for translating droplets along the ±x and ±y directions. Particularly, the four IDTs 200A, 200B, 200C, and 200D of the pixel shown in FIG. 2A can be selectively excited to translate aqueous droplets along the ±x and ±y directions. The droplets are isolated from a piezoelectric substrate (not shown), upon which the IDTs 200A, 200B, 200C, and 200D are disposed, by an inert carrier fluid to prevent direct contact with surfaces of the substrate. The IDT 200D is embedded beneath the carrier fluid and can generate, upon input of an electrical signal, SAWs that pumps out fluid in the ±y directions and pumps in fluid in the ±x directions for manipulating the movement of a droplet. In FIG. 2A, droplets 202 and 204 are separately trapped at the two symmetric hydrodynamic wells near the flanks of IDT 200D and 200B, respectively. Droplet 204 is translated toward a well on the other side of the excited IDT 200D. Directions of flow of reflux streamlines are depicted by the curved arrows near droplets 202 and 204. FIG. 2B is an image showing an example digital acoustofluidic system with a drop of blood floating on the carrier layer of fluorinated oil. As illustrated in FIG. 2A, IDTs fabricated on a LiNbO$_3$ substrate may be employed for generating acoustic waves. Each array of four IDTs in this example can be considered as a single pixel, a fluidic "step" for transport of a droplet, particle, or fluid or as a processing site for a droplet, particle, or fluid.

In order to manipulate aqueous droplets along a horizontal plane without direct contact with the surface, a denser carrier layer of fluorinated oil may be added to the LiNbO$_3$ substrate, not only as an isolation layer upon which the droplets float, but also as an actuator to drive droplets via the drag force induced by acoustic streaming. For example, the oil or another fluid suspension may be layered on top of the SAW generators 102A-102D shown in FIG. 1A or the IDTs 200A-200D shown in FIG. 2A and their respective substrates for carrying droplets, fluids, or particles. For an immersed IDT (or acoustic wave generator), its excitation force directly loads on the carrier oil layer above the IDT and generates bulk waves in the oil layer. Meanwhile, SAWs are also generated, and these propagate along the substrate surface and leak into the carrier oil as leaky SAWs. The contributions of both bulk waves and leaky SAWs can actively create two symmetric fluid jets out of the substrate plane in the oil layer. For example, FIG. 3 illustrates boundary-layer-driven streaming in the z-plane. In this example, the measured jetting angle with respect to the IDT apertures is 34 degrees, which matches with the Rayleigh wave mode on the Y-128° cut LiNbO$_3$ substrate (longitudinal-to-transverse amplitude ratio of 0.7). Those two symmetric fluid jets impinge on the air-liquid interface, recirculate back, interact with each other and the bottom boundary, and finally complete a butterfly-wing-shaped streaming pattern in the far field (see FIG. 4, which is an image of a side view of the IDT aperture), as well as two localized symmetric hydrodynamic traps near the flanks of the transducer (See e.g., FIG. 2A). In FIG. 4, the jetting streamlines within the oil layer are visualized using 105 μm diameter fluorescent particles and a small prism. The jetting angle at the IDT aperture is 34 degrees. The scale bar is 1 mm in FIG. 4. The IDT acts as a micro-pump that pushes fluid out along the ±y directions and pumps fluid in along the ±x directions (See e.g., FIG. 2A). As a result, in a digital acoustofluidic device (See e.g., FIG. 2B), a droplet floating on the oil surface can be driven toward the sides of the IDT in the ±x directions by the drag force from the oil being pumped in.

FIGS. 5A and 5B schematically show cross-sections of streamlines in the x-z- and y-z-planes, respectively, with the corresponding numerical simulation results given in FIGS. 6A and 6B, respectively. Particularly, FIG. 5A shows x-z-plane cross-sectional view of the streaming pattern at an IDT (at y=0⁺). The IDT pumps out the carrier fluid in ±x directions. The origin (O) is located at the center of the IDT on the x-y-plane. The reflux pulls the droplet toward the IDT in the far field, and then the counter-rotating vortex near the side of the IDT resists this reflux and finally stabilizes the droplet. The asterisks indicate the symmetric hydrodynamic equilibrium positions on the surface of the carrier oil. FIG. 5B shows y-z-plane cross-sections of the streaming pattern at an IDT (at x=0⁺). The IDT pumps in the carrier fluid in the ±y directions. The waves propagating around the carrier fluid generated two symmetric jet flows with an incident angle of 34 degrees with respect to the IDT aperture. The floating droplet near a side of the IDT can be automatically translated in the ±x directions toward the IDT following a hydrodynamic gradient. Eventually, the droplet is stabilized at one of the hydrodynamic equilibrium positions due to the force balance in the x directions between the 'reflux' from the far field and the two counter-rotating vortices near the flanks of the transducer (See FIGS. 5A and 7A). The streamlines from these two counter-rotating vortices gradually extend in the +y and −y directions and then recirculate back, finally forming a three-dimensional clamp-like shape (See FIG. 7B) near the surface of the oil, which traps the droplets from escaping in the +y or −y directions.

FIG. 6A depicts simulation results showing the acoustic streaming patterns in the x-z-plane. The counter-rotating vortices resist the reflux and form two hydrodynamic traps near the sides of the transducer (as indicated by the red asterisks). FIG. 6B depicts simulation results showing the acoustic streaming patterns in the y-z-plane. The acoustic energy from the IDT coupled into the oil layer above it and pumped out fluid in the ±y directions. FIGS. 7A and 7B are stacked images of particle trajectories near one flank of an activated IDT. This region corresponds to the area highlighted by the circle 206 in FIG. 2A. The reference perspective is also indicated by the eye symbol in FIG. 5A. Referring to FIG. 7A, z=1.3 mm, the focal plane is in the middle of the carrier fluid layer. In this composite image, the reflux and the vortices of the counter flow are clearly visualized. The asterisk indicates the hydrodynamic equilibrium position on the surface of the carrier layer of oil. Referring to FIG. 7B, z=2 mm, the focal plane of the microscope is fixed to the surface of the oil layer. The counter-rotating vortices form a clamp-like pattern which pinches the droplet and keeps it from escaping in +y and −y directions. In FIGS. 7A and 7B, the scale bar is 750 μm.

During the droplet-trapping process, the far-field reflux first pulls the droplet toward the transducer, then the counter-rotating vortex resists the reflux and finally pinches the droplet at one of the flanks of transducer. The hydrodynamic potential well on the surface of the oil is clearly visualized in the image of the particle trajectories (see FIG. 7B). Once a potential well is occupied by a droplet, the streamline pattern in the oil layer equilibrates spontaneously, yet maintains a similar pattern. For example, FIGS. 8A-8C are images showing streaming patterns with and without a droplet. Particularly, FIG. 8A is an image of a top view of the streaming patterns of a hydrodynamic trap. The focal plane of the microscope is at the surface of the oil. FIG. 8B shows that once the trap is filled with a droplet, the streaming patterns changed spontaneously but retains a similar pattern. In FIG. 8B, the microscope imaging focal plane is on the surface of oil. FIG. 8C shows the streaming patterns of a hydrodynamic trap that is filled with a droplet. In FIG. 8C, the focal plane is now 0.5 mm below the oil surface. The scale bar is 1 mm in FIGS. 8A-8C.

In accordance with embodiments, systems and methods disclosed herein may be used to trap droplets via acoustic streaming. An illustration of the force balance on a trapped droplet is shown in FIG. 9A, which depicts a grayscale heat map and diagram showing calculated streamlines from a numerical model of the forces generated by acoustic waves in the x-z plane, and an illustration of the force balance along the x-z plane at the trap. The counter-rotating vortices are clearly seen. Reflux and counter-rotating vortices cancel each other out and stabilized the droplet in the ±x directions. The drag force represents the sum of z-components of drag forces from counter rotating vortex and reflux. Before trapping, the free-floating droplet has a flat-shaped geometry due to the balance between the forces of gravity, buoyancy, and surface tension (See e.g., FIG. 9B, which illustrates a side view of the immersed part of a 5 μL droplet when the IDT is turned off. The gray dashed line indicates the plane of the LiNbO₃ substrate). Once trapped, the droplet is dragged down and is slightly deformed (See e.g., FIG. 9C, which illustrates a side view of the immersed part of a 5 μL droplet when the IDT is turned on) mainly by the streaming, but still is not in direct contact with the substrate. In FIG. 9C, the droplet slightly deforms upon the activation of acoustic streaming but remains floating on the oil layer, and above the substrate. The experimental droplet-trapping process is shown in FIG. 9D, which are images taken in a time-elapsed sequence of a top view of an example droplet-trapping process. In FIG. 9D, the arrow indicates the activated IDT. Two symmetrical hydrodynamic traps are created on opposite sides of the transducer, and the nearby droplet is transported by following the hydrodynamic gradient. Note that at 960 ms, the trapped droplet is mildly pinched and deformed by the counter-rotating vortices near the two transducer apertures. The 5 μL droplet's shape conforms with the streamline distribution in FIG. 7B. The droplet is first pulled toward an excited IDT (indicated by the arrow) and then is stabilized directly above the left flank of IDT. In the far field, with respect to the excited IDT, the reflux dominates and gradually pulls the droplet towards the hydrodynamic equilibrium position (See 0 mm~8.5 mm in FIG. 10, which illustrates a graph showing the acceleration of a droplet as it traverses a fixed step distance of 9 mm, as a function of droplet speed for evenly spaced elapsed-time intervals. The droplet gradually accelerates in the first 8.5 mm and drastically decelerates in the final 0.5 mm). As the droplet approaches the hydrodynamic equilibrium position, the opposing force from the counter-rotating vortices increases sharply (See FIG. 10, 8.5 mm~9 mm) and finally balances with the pulling force from the reflux. As a result, the droplet accelerates gradually in the first 8.5 mm and then drastically decelerates to a static state within the next 0.5 mm. The dependence between the droplet volume and a given step time (e.g., the travel time for a droplet to traverse a single step of 6.5 mm) is shown in FIG. 9E, which is a graph showing the relationship between the droplet volume and the step time, where "step time" represents the time needed for translating 6.5 mm and stopping a droplet, the distance of a single step). The step time increases from 819 ms to 1,337 ms as the droplet volume increases from 0.1 µL to 10 µL. The resolution of the digital acoustofluidic device for a single planar translation is determined by the spacing between two adjacent IDTs. For example, for the chip shown in FIG. 2B, the spacing between two adjacent IDTs is 6.5 mm. The minimum translation distance between two adjacent IDTs is 1.0 mm, as shown in FIG. 11, which shows different images depicting micro-particle manipulation using digital acoustofluidics. In images (a)-(g) of FIG. 11, single-particle manipulation using digital acoustofluidics is shown. The device configuration is the same as for sub-nanoliter droplet manipulation. In images (h)-(i) of FIG. 11, particle pairing using digital acoustofluidics is shown. The particle density is 1.1 g·cm$^{-3}$ and the diameter is 105 µm. The black arrows indicate the excited transducer. The scale bar is 0.7 mm. Notably, even for a droplet that is not initially well-aligned with the transducer, it will still be gradually re-aligned by the hydrodynamic gradient and eventually be trapped by the potential well (see FIG. 9F), which is consistent with the description of the streaming pattern on the surface of the oil (see FIG. 9G).

Aside from the movement of the droplet, two symmetric vortices (internal streaming) are also induced inside of the trapped droplet (see FIG. 12 and its description herein), due to momentum continuity at the immiscible interface between the aqueous droplet and the carrier oil. These internal vortices enable rapid and uniform mixing (shorter than 216 ms for complete mixing) and the detachment of particles from the polar-nonpolar interface at the water-and-oil boundary. FIG. 12 shows a sequence of images depicting internal streaming within a droplet. Referring to FIG. 12, a trapped 50 µL droplet with super-signal ELISA luminescent substrate is merged with a droplet containing horseradish peroxidase (HRP). Two symmetric vortices are visualized by the luminescence emitted upon oxidization of the luminol substrate. The luminol-containing droplet was first stabilized at one-pixel unit and then merged with an HRP-containing droplet. Luminescence was emitted instantly upon merging. Digital acoustofluidics generates strong internal fluidic streaming within the trapped droplets, thereby minimizing internal polarization in aqueous droplets and enabling efficient mixing of merged droplets. In FIG. 12 the scale bar is 5 mm.

In accordance with embodiments, a programmable microfluidic processor with 16 individual pixel units can be provided by arranging IDTs into an 8×8 array on a LiNbO$_3$ wafer. By selectively activating the nearest IDT in adjacent pixel units, each droplet can be individually x- or y-translated from pixel to pixel following the triggering of the appropriate hydrodynamic gradients. For example, FIG. 13 shows top view images of an acoustofluidic system implementing trap-and-release mechanism from pixel to pixel (Unit 1 to Unit 2). At image (a), an off-chip electromechanical relay controller located on a separate printed circuit board is used. In the images, the black arrow indicates the activated transducer. In image (a), the droplet was first moved and trapped by the IDT on the right side of pixel-unit 1 as indicated by the black arrow. At image (b), immediately after the droplet was released when the IDT on the right side of pixel-unit 1 was turned off, the IDT on the left side of pixel-unit 2 was excited and the droplet was continuously translated and trapped by the excited IDT. At image (c), following a similar relaying principle, the droplet was finally trapped by the IDT on the right side of pixel-unit 2. At image (d), transport of the droplet from pixel-unit 1 to pixel-unit 2 was completed. The scale bar is 6 mm in the images of FIG. 13. Based on this principle, sophisticated manipulation and routing for the droplets may be achieved. For example, FIG. 14 illustrates a digital acoustofluidic system that can implement programmable single-droplet transport in accordance with embodiments of the present disclosure. Referring to FIG. 14, the hydrodynamic traps are activated following a pre-programmed movement sequence, resulting in the digital hydroacoustic formation of the letters 'DUKE'. Each pixel consists of four independent IDTs; therefore, each droplet can be transported dynamically in any direction on the x-y-plane using a trap-and-release mechanism using an off-chip electromechanical relay controller. The scale bar in FIG. 14 is 8 mm.

Furthermore, due to the contact-free manipulation feature, the acoustic transducers require no continuous surface and can be discretized into multiple individual transducers that are compatible with a printed circuit board (PCB) for easier re-configurability and simpler electric connections. FIG. 15 are multiple images showing contact free droplet transportation using a reconfigurable transducer array. Images (a)-(j) of FIG. 15 show droplet translation using discrete transducers on a PCB which provides electrical connectivity. In images (a)-(j), the scale bar is 10 mm. Image (k) of FIG. 15 shows a picture of a discrete transducer on an adaptor.

Droplet fusion is a major functional capability in this digital acoustofluidic device which enables automating an entire reaction test matrix. Briefly, two droplets are first transported into two neighboring pixels. FIG. 16 shows a sequence of images of an acoustofluid system in accordance with embodiments of the present disclosure implementing droplet merging. The Scale bar is 5 mm. The black arrows indicate the activated transducers. The first-stage brings the vertically aligned droplets together along the center line where they are then horizontally combined for the second-stage reaction at the center pixel. They are then moved and localized within the two symmetric hydrodynamic traps generated on each side of a single IDT (see image (a) of FIG. 16). Once the IDT is deactivated and the hydrodynamic traps vanished, the two droplets move towards each other and merge following the Cheerios effect. In addition to the fusion of two droplets, a programmed multi-step reaction was also demonstrated, which can be important for reactions that require the serial addition of reagents. For visual clarity, two black colored droplets are separately first merged with other droplets. Then these two product droplets are moved and are merged with each other (See image (b) of FIG. 16).

With digital acoustofluidic systems disclosed herein, microliter-scale droplets, microparticles, nanoliter-scale droplets, and even sub-nanoliter droplets can be manipulated by further minimizing the droplet dimensions and optimizing the arrangement of transducers (e.g., IDT dimension: 600 µm×400 µm, frequency: 49.125 MHz, voltage: 5.0-7.0 Vp-p). Successful manipulation of droplets with over a 1000 times difference in volumes reveals the potential of the digital acoustofluidic systems disclosed herein for multi-scale integration as well as massively parallel processing of test matrices.

FIGS. 17A-17F are diagrams and images depicting acoustofluidic-based on-demand droplet generation via acoustic streaming. Referring to FIG. 17A, the figure is a schematic showing a y-z-plane cross-sectional view of a device 1700 for acoustofluidic-based droplet generation in accordance with embodiments of the present disclosure. With acoustic streaming, a droplet 1702 can be generated on-demand by squeezing aqueous solution out of a nozzle 1704 of a fluid reservoir 1706 embedded beneath a surface 1708 of oil layer 1710. It is noted that the nozzle may be placed with any other structural feature for manipulating movement of fluid when the fluid flows thereto. An IDT, generally designated 1712, at the bottom of the reservoir 1706 can generate acoustic waves and jets oil upward, thereby impinging on and pushing the aqueous solution through the nozzle 1704, which serves as a surface tension barrier to restrict spontaneous flow from buoyancy.

Now referring to FIG. 17B, the figure shows a top view schematic of the acoustofluidic droplet generator shown in FIG. 17A. The structures in FIG. 17A are aligned underneath the nozzle shown in this top view. Aqueous sample is added through the sample addition port on the side-wall of fluid reservoir. FIG. 17C is an image of the acoustofluidic droplet generator device without any working fluids.

FIGS. 17D-17F show a sequence of time-lapsed images captured of acoustofluidic droplet generation in accordance with embodiments of the present disclosure. The IDT underneath was excited at 300 Vpp for 30 ms to generate one droplet. A fluid jet can be seen in the nozzle region in image the image of FIG. 17E. The white arrow in the image of FIG. 17F indicates the position of the generated droplet, which is now floating on the oil surface. In FIG. 17F the scale bar is 2 mm.

FIG. 18 are images showing an interface between a digital acoustofluidic chip and a drop generator in accordance with embodiments of the present disclosure. Particularly, image (a) of FIG. 18 shows the interface between the acoustofluidic droplet generator and the digital acoustofluidic (DAF) chip. Interface between a digital acoustofluidic chip and a droplet generator. Both the DAF chip and the droplet generator are embedded beneath the oil layer. The nozzle is aligned with a hydrodynamic trap on the DAF chip. Images (b)-(h) of FIG. 18 show droplet generation and transportation on the DAF chip. The white arrow in image (c) indicates the position of the generated droplet. The scale bar in FIG. 18 is 5 mm. The generated droplet floated to the surface of oil, and then was manipulated by the digital acoustofluidic chip (See FIG. 18, images (b)-(h)). Droplet splitting via acoustic streaming is preliminarily achieved with a droplet floating directly above the geometric center of an IDT.

FIG. 19 depicts images of an acoustofluidic system configured to actively split a water droplet in accordance with embodiments of the present disclosure. Particularly, image (a) is a schematic, x-z-plane cross-sectional view of the streaming pattern at a transducer. Images (b)-(d) of FIG. 19 show the transducer implementing droplet transportation process. Further, images (b)-(d) show the transducer implementing on-demand splitting process. In this example, the excitation voltage for splitting is 150 Vpp, and the duration is 150 ms. The scale bar in the images is 5 mm. As shown in image (a) of FIG. 19, the IDT is excited at a high voltage (i.e., 150 Vpp) and forms an ascending flow-jet in the center as well as two symmetric hydrodynamic traps on both flanks of IDT. A droplet positioned directly above the geometric center of IDT can be halved into two smaller droplets.

It is noted that Fluorinert FC-70 is a fluorinated oil and is immiscible in water, chemically inert, and has been widely applied in droplet microfluidics and liquid breathing experiments due to these properties and its oxygen-permeability. In systems disclosed herein, since there is no direct liquid-solid contact by the droplet, the dominant potential source of cross-contamination may come from the diffusion of reagents. Fluorescein and Rhodamine 6G may be selected as the indicators to characterize the diffusion. Experimental details are described in further detail herein. After an eight-hour co-incubation experiment (100 µM dye solution and oil) at 55° C., the detected diffusion of fluorescein in FC-70 oil was below $10^{-10}$ µM (lower than $10^{-10}$%), indicating that any fluorescein which diffused into the fluorinert was below the detection limit of the plate reader. Although Rhodamine 6G diffused more effectively than fluorescein in the fluorinated oil, the oil showed excellent resistance to diffusion within 4 hours at 20 to 55° C. (lower than $10^{-10}$%). This diffusion value is equivalent to, or lower than, the natural fluorescent background noise level. For example, FIG. 20 is a graph showing characterization of diffusion into the carrier oil. In this example, Rhodamine 6G (100 µM, 500 µL) is used to characterize the diffusion. The dye solution is co-incubated with a fluorinert oil for different incubation times (0.5, 1, 2, 4, and 8 hrs) and at different temperatures (20, 30, and 55° C.). After incubation, 200 µL of oil is carefully transferred to a new plate for fluorescence detection. The diffusion of rhodamine 6G is below the limit of detection (lower than $10^{-10}$ µM) in all co-incubation experiments at a typical range of room temperatures (20-30° C.). Even for 8-hr co-incubation experiments at 55° C., the detected Rhodamine 6G did not exceed $10^{-7}$ µM (lower than $10^{-7}$%) in FC-70 (See FIG. 20). Note that Rhodamine 6G is considered as the worst-case scenario for diffusion in a fluorinert (Novec 7500) in Gruner's 2016 study. These results support the claim that the FC-70 carrier oil is highly resistant to diffusion of reagents and, for the time scales associated with typical reaction matrices in microfluidics, is sufficient to prevent diffusion-induced cross-contamination. Therefore, this low risk of cross-contamination allows one to freely program a complex cascade of reactions with overlapping fluidic paths, especially when dealing with routine reagents that already have a low molecular diffusivity.

Furthermore, a Hela S3 cell suspension is used to evaluate the impact of acoustic streaming with a digital acoustofluidic device on cell viability. After 20 min of trapping, a propidium iodide (PI)-calcein AM (CAM) double staining assay indicated the viability was 99.2%, which has almost no difference when compared against the control group (99.9%, See FIG. 21). FIG. 21 is a graph showing results of a cell viability test. In the test, 50 µL droplet of Hela S3 cell suspension ($10^6$ cell·mL$^{-1}$) is trapped and mixed for 20 min by a single IDT. Then the cell suspension is double-stained by CAM and PI to determine viability via flow cytometry (Beckman, FC 500). The counting result indicates there is not any considerable viability loss in the cells after being trapped and mixed on a digital acoustofluidic device for 20 min.

Enzymes play an important role in catalyzing many biomedical reactions and accelerating routine detection and diagnostic protocols. However, with sensitive protein binding sites, enzymes are generally chemically sticky and sensitive to contamination. Therefore, a trace amount of a target protein or other interfering reagent adsorbed on the physical surface could lead to cross-contamination and unpredictable results in a reaction. In addition, due to their sticky nature, enzymes may undergo conformational changes or denaturation when in contact with a solid surface. Accordingly, digital acoustofluidic systems disclosed herein for performing enzymatic reactions can be advantageous because of its non-contact characteristics eliminates surface adsorption. As a calibration standard, a suitable glucose detection experiment was chosen as a model to validate the use of floating droplets for enzymatic reactions. The colorimetric readings from glucose detection reactions on the digital acoustofluidic devices are correlated to the glucose concentration and are compared to that of the standard method, which uses bulk catalysis in a 96-well plate. For example, FIG. 22 shows images of a glucose detection reaction on a digital acoustofluidic system in accordance with embodiments of the present disclosure. A 1 M glucose droplet (30 μL) and a droplet containing an HRP reaction mixture (20 μL) are merged and mixed by sequentially activating the transducers beneath the oil in images (a)-(c) of FIG. 22. The product droplet is held for 5 min afterwards on chip to ensure a complete reaction in image (d) of FIG. 22. In FIG. 22, the scale bar is 3 mm. The correlation (higher than 0.99) and linear regression coefficients ($R^2$ is higher than 0.99 when the glucose concentration is higher than 0.01 mg·ml$^{-1}$, $R^2$ is higher than 0.87 when the glucose concentration is less than 0.01 mg·mL$^{-1}$, See FIGS. 23A and 23B) of the digital-acoustofluidic-based reactions match well with the standard method. FIGS. 23A and 23B are graphs showing a comparison of glucose detection between the digital acoustofluidic device and the standard pipetting method, respectively. The predetermined glucose concentrations are within the physiological concentration ranges in human saliva, urine, and serum. The linearity coefficient and determination coefficient are both greater than 0.99, which indicates the floating droplets can accurately mediate enzymatic reactions. However, the determination coefficient of the digital acoustofluidic platform ($R^2$ is higher than 0.87) is not as good as the plate when the glucose concentration is less than 0.01 mg·mL$^{-1}$. This indicates that the floating droplets are reliable containers suitable for enzymatic reactions. It is noted that the colorimetric readings in these floating reactors are generally greater than the standard reactions by 30%, which could imply that the reactions are faster due to the rapid mixing from the internal-streaming effect within the droplet.

In order to demonstrate the capability of the digital acoustofluidics to handle a cascade of reactions with multiple reagents, the detection of neuron-specific enolase (NSE) was selected as a proof-of-concept experiment with real-world applications. The glycolytic enzyme NSE is typically released from damaged neurons and has been suggested to be used as a biomarker for rapid diagnosis of various brain injuries (e.g., stroke and concussions) and for prognosis after brain surgery. Generally, only a short window (i.e., 3-4 hour) is available for the most effective treatments after the onset of brain damage, so a 15 min enzyme-based reaction will provide timely diagnostic evidence for deciding treatment options. FIGS. 24A-24C depict enzyme cascade reaction for detecting enolase on a digital acoustofluidic system. Particularly, FIG. 24A depicts a diagram of a mechanism of enolase detection. FIG. 24B illustrates the six-droplet-merging sequence of the cascade reaction for enolase detection. FIG. 24C is a graph showing a comparison of the results for detecting 50 ng·mL$^{-1}$ of enolase with respect to elapsed time, performed using the one-step reaction on a plate and the cascade reaction using digital acoustofluidics. The relative luminescence units (RLU) are normalized to the negative control (no enolase) case. For the classic one-step reaction, the entire reaction mixture is applied to enolase sample immediately. In the improved one-step reaction configuration (labeled 'One-Step-improved'), the reaction mix is incubated for 5 min to wait for the background from 2-PG, ADP, Luc to fade before adding the enolase sample. For the cascade reactions, the enolase sample is firstly incubated with 2-PG for 5 min (green curve, labeled 'Cascade-5 min delay') or 15 min (blue curve, labeled 'Cascade-15 min delay') to produce an extra amount of PEP, which can then trigger a more intense signal increase with the other enzymes and substrates. As shown in FIG. 24A, a three-step coupled-cascade reaction is employed to detect the enolase: step 1, enolase catalyzes 2-phosphoglycerate (2-PG) to phosphoenolpyruvate (PEP); step 2, pyruvate kinase (PK) converts PEP and adenosine diphosphate (ADP) to pyruvate and adenosine triphosphate (ATP); and step 3, luciferase (Luc) consumes an ATP molecule to generate a photon which is detected.

In biochemistry, enolase may be detected by applying a 5-reagent reaction mix (i.e., 2-PG, ADP, PK, Luc, and MOPS buffer) to enolase samples to generate a detectable luminescent signal. This one-step reaction is simple and accommodating to manual operations in clinical use. However, in the simple reaction mix, 2-PG and ADP produce a strong background with Luc, which obscures the signal originating from the enolase. At low concentrations (enolase lower than 100 ng·mL$^{-1}$), this protocol typically requires 40-60 min to reveal the small luminescence difference between test groups and control groups. This delay may introduce false-negative results or critical delays in the urgent delivery of medical treatment.

Using digital acoustofluidics, multiple droplets with six different reagents are transported and merged following an optimized schedule (see FIG. 24B). The 2-PG is incubated with enolase (50 ng·mL$^{-1}$) for 5-15 min to produce an extra amount of PEP, which will then react with the other enzymes and substrates. This extra amount of PEP produces bonus ATP with ADP and PK, which subsequently triggers a more intense luminescence signal with Luc. In the classic one-step reaction, the Luc receives less ATP at any given time and hence the luminescence signal is weaker than in the case of the cascade reaction (see FIG. 24C). This cascade configuration on the digital acoustofluidic device enhances the signal-to-noise ratio (SNR) by more than three times, improving the limit-of-detection, and makes 50 ng·mL$^{-1}$ enolase detectable at the beginning of the reaction, which significantly shortens the diagnosis cycle for acute stroke patients. Furthermore, since using digital acoustofluidics it is now not necessary to pipette samples from container to container, our platform is suitable for the scalable automation of routine fluidic-processing tasks.

Disclosed herein are acoustofluidic systems and methods for handling and processing fluid particles, including droplets, based on the use of acoustic streaming to allow reagent transport over shared, overlapping paths without cross-contamination. Such systems and methods may thus function as a rewritable and programmable fluidic processor. Acoustofluidic systems and methods in accordance with embodiments disclosed herein may have the following example advantages:

Rewritability:

The contactless liquid-handling mechanism inherently eliminates cross-contamination associated with surface adsorption and the need for surface modification. Since the aqueous droplets are isolated from the substrate by a fluorinated oil that is highly inert and immiscible, different reagents can float along the same path in any sequence of fluidic transport and mixing. This feature enables reusable paths for the 'fluidic inputs' (i.e., droplets) to be dynamically processed on arbitrary routes without cross-talk between each other. It also enables unprecedented rewritability and scalability. This rewritability exponentially increases the allowable number of combinations of reagent inputs on the same device as the array dimensions, due to the number of independent inputs, and the levels of cascading layers of the reactions increases. For a fluidic processor with N×N pixels, a non-rewritable processor can only render less than $N^2$ combinations for single-step reactions. Whereas in the digital acoustofluidic system, a rewritable processor can exploit all the possible combinations: $_{4N}C_M$, of arbitrary M agents among 4N inputs on the same processor. For reactions with M arbitrary reagents among different chemical inputs in one step (i.e., 4N types of chemicals for an N×N array with inputs on its four edges), the possible number of combinations C is calculated by the following equation:

$$_{4N}C_M = \binom{4N}{M} = \frac{(4N)!}{(M)!(4N-M)!}$$

Furthermore, this strategy also eliminates the need for chemical or physical surface modifications and the surface does not degrade due to continuous contact with possibly reactive or sticky liquids (e.g., blood), which results in a durable fluidic processor for performing successive, time-consuming experiments involving a wide variety of samples and reagents.

Biocompatibility:

The droplets, instead of being directly subjected to strong acoustic pressure or high electric fields, are manipulated gently by hydrodynamic forces in which the flow speed is comparable to vortexing via manual shaking (i.e., mm/s level). This biocompatible liquid-handling process maximizes the potential for biological samples to retain their native states and properties. A PI-CAM protocol was used with Hela S3 cells to demonstrate that acoustic-streaming-based manipulation mechanism had excellent biocompatibility with no statistically significant effect on the viability of cells. These aqueous droplets are also ideal containers for preserving fragile bio-specimens (e.g., protein crystals[50]) that are sensitive to a solid-liquid interface. Additionally, the carrier oil, which is oxygen-permeable and inert with a wide range of biological samples (e.g., blood, urine, saliva, and fecal), indicating that these biological samples can access oxygen and will not interact with the oil.

Versatility:

This fluidic actuation mechanism does not require extra modifications or labels in the droplets, suggesting digital acoustofluidics is not restricted to fluids with specific acoustic, electrical, hydrodynamic, or magnetic properties. This versatility makes digital acoustofluidics suitable for handling a wide range of liquids, even for challenging fluids such as low-polarity fluids (e.g., organic solvents), sticky or viscous samples (e.g., blood and sputum), and solids (e.g., fecal samples).

Uniformity:

Digital acoustofluidics generates strong internal fluidic streaming within the trapped droplets, thereby minimizing internal polarization in aqueous droplets and enabling efficient mixing of merged droplets.

Another promising result is that with the same digital acoustofluidics mechanism, sub-nanoliter droplets can be actuated using IDTs with smaller dimensions and lower driving voltages. For example, a smaller version of the IDT (e.g., FIG. 25) requires a lower operating voltage (i.e., 5-7 Vpp) to actuate droplets, which is promising for scaling up and increasing the number of droplets that can be simultaneously controlled. This has a positive impact on the scalability potential of digital acoustofluidics in terms of large-scale integration, process parallelization, and high-throughput automation of micro-reactions with extremely low reagent consumption. FIG. 25 illustrates a diagram of a digital acoustofluidic system for sub-nanoliter droplet manipulation. The operating parameters for the IDTs (e.g., frequency, dimensions, and spacing) are optimized. The droplets are generated using a T-junction in a conventional microfluidic chip and then are re-injected onto the carrier oil. The measured volume of the droplet is 624 µL. The scale bar in FIG. 25 is 0.8 mm.

Since the droplets are manipulated in a contact-free manner by use of the presently disclosed systems and methods, transducers can be cross-connected three-dimensionally. The transducer array can be discretized into multiple individual transducer elements mounted on electric board (See e.g., FIG. 15), demonstrating the advantages of scalability due to multi-layer connections, easy re-configurability, and uniform performance.

Unexpected evaporation can be suppressed by covering the droplet and carrier fluid with an extra oil layer (see e.g., FIG. 26), or via feedback control of the humidity similar to Poulikakos' study, which can culture cells in levitated droplets in air for 24 hrs. FIG. 26 depicts a schematic cross-sectional view of an acoustofluidic system, a picture of a trapped droplet, and top views of droplet actuation in accordance with embodiments of the present disclosure. Referring to image (a) of FIG. 26, the image shows a schematic cross-section view of the system implementing droplet manipulation with minimal evaporation. The system traps the droplet at the interface between FC-oil and silicone oil (density: 0.913 g·cm$^{-3}$, viscosity: 5 cSt at 25° C.). Image (b) of FIG. 26 shows a trapped floating droplet covered with silicone oil. Images (c)-(g) show top views of droplet actuation between three IDTs with silicone oil layer. The scale bar in images (c)-(g) is 5 mm. It is noted that humidity of the air may be suitably controlled so that evaporation is minimized or reduced.

For droplet generation, the fluid reservoir (see e.g., FIG. 27) may be made of a disposable plastic material and be detachable from the IDT substrate underneath. The fluid reservoir can be designed on the same cartridge for product droplet recovery using a pipette and a hydrophobic oil absorber. As an example, FIG. 27 shows a schematic cross-sectional view of a droplet collector and images of a droplet transportation and collection process in accordance with embodiments of the present disclosure. Particularly, image (a) of FIG. 27 shows a droplet collector. Images (b)-(g) of FIG. 27 are top view images of the droplet transportation and collection process. The scale bar in images (b)-(g) is 5 mm.

FIG. 28 are a sequence of images showing active splitting of an ethanol droplet on the surface of silicone oil using a digital acoustofluidic system in accordance with embodiments of the present disclosure. Viscosity of silicone oil in this example 50 cSt. The scale bar is 4 mm. As shown in FIG. 28, it is demonstrated that this acoustofluidic system can easily split ethanol droplets (22 dynes·cm$^{-1}$, air) on a silicone oil surface, due to its lower surface tension, using the two symmetric hydrodynamic traps that spontaneously form on both sides of the ascending jet.

Acoustofluidic systems and methods disclosed herein can provide an excellent strategy for a durable, rewritable, and fully programmable fluid processor. It can significantly simplify liquid-handling and minimize protocol-routing bottlenecks in many biomedical applications such as automating enzymatic reactions, high-throughput aptamer-based systematic evolution of ligands by exponential enrichment (SELEX) screening, automated DNA/RNA sample preparation, drug testing, and programmable biomaterial synthesis.

Formulation, model description, force analysis, and parametric assessment are provided. Particularly, the acoustic streaming, driven by SAWs as they propagate from the IDTs into the fluidic layer is a type of boundary-driven acoustic streaming. In order to simplify the numerical calculations and to minimize computational time, the acoustic streaming can be modeled by defining a slip velocity, which is the velocity on the top of the inner streaming structure induced by SAWs within the boundary layer of the fluorinated oil. Hence, outside of the boundary layer, the Navier-Stokes equations and the continuity equation are solved by applying the slip velocity as the boundary condition at the bottom of the outer streaming field. The Navier-Stokes equations and continuity equation are:

$$\frac{\partial \rho}{\partial L} + \nabla \cdot (\rho v) = 0,$$

$$\rho \frac{\partial v}{\partial t} = -\nabla p - \rho(v \cdot \nabla)v + \mu \nabla^2 v + \left(\frac{1}{3}\mu + \mu_B\right)\nabla(\nabla \cdot v),$$

where $\rho$, $\mu$ and $\mu_B$ are the density, dynamic viscosity, and bulk viscosity of fluid, respectively, and p and v are the velocity and pressure in the fluid.

The slip velocity is determined by solving the first-order and second-order continuity and Navier-Stokes equations within the boundary layer area. The first-order and time-averaged second-order equations are:

$$\frac{\partial \rho_1}{\partial t} + \rho_0 \nabla \cdot \langle v_1 \rangle = 0$$

$$\rho_0 \frac{\partial v_1}{\partial t} = -c_0^2 \nabla \rho_1 + \mu \nabla^2 v_1 + \left(\frac{1}{3}\mu + \mu_B\right)\nabla(\nabla \cdot v_1),$$

$$\rho_0 \nabla \cdot \langle v_2 \rangle = -\nabla \cdot \langle \rho_1 v_1 \rangle,$$

$$-\nabla \langle P_2 \rangle + \mu \nabla^2 \langle v_2 \rangle + \left(\frac{1}{3}\mu + \mu_B\right)\nabla(\nabla \cdot \langle v_2 \rangle) = \rho_0 \left\langle \frac{\partial v_1}{\partial t} \right\rangle + \rho_0 \langle (v_1 \cdot \nabla) v_1 \rangle.$$

The second-order velocity ($v_2$) on the top of boundary layer is defined herein as the slip velocity.

Based on this model, the finite element method-based software package COMSOL 5.2a or another suitable software may be used for numerical simulations. Within COMSOL in implemented experiments, the "piezoelectric devices" modeling interface was used to model the surface vibration of the $LiNbO_3$ substrate that provides the activation energy to the fluid field. The "thermoviscous acoustics" and the "laminar flow" modeling interfaces solve for the physics within the boundary layer, whereas another "laminar flow" interface solves the physics without the boundary layer. The numerical interface between the substrate and the oil layer were coupled by the "thermoviscous acoustic-structure boundary" condition in the COMSOL Multiphysics module. Taking advantage of symmetry, only a quarter of the fluid domain atop a quarter of a single IDT is modeled. The dimensions of the fluid domain model is 4 mm×400 mm×2 mm (W×L×H). The region with SAW propagation within the IDTs area at the bottom is 1.1 mm×1.6 mm. As for the other boundaries, a symmetrical plane and wall boundary conditions are defined. The parameters used in the calculation are given as follows: f(frequency), 24 MHz; c, 640 m·s$^{-1}$; $\rho_0$, 1940 kg·m$^{-3}$; $\mu$, 0.024 Pa·s.

In embodiments, the carrier oil may be Fluorinert FC-70 (Hampton Research Corp., Calif., USA). The viscosity of the carrier oil can be increased by dissolving Teflon® (AF1600, Dupont Co., Del., USA) to enhance the spatial stability of the floating droplets. The glucose detection kit, the SuperSignal® Femto-ELISA substrate, and the NSE detection kit are available from Sigma-Aldrich Corp. (Oakville, ON, USA).

The digital acoustofluidic system may be powered with a 23.9 MHz sinusoidal AC signal from a function generator (DG 3012C, Teletronics Technology Corporation, Pa., USA) and an amplifier (25A250A, Amplifier Research, USA) or other suitable equipment. A relay array (USB24Mx, EasyDAQ, UK) may be used to control the power input for individual transducers. The control program may be written in Visual C++ (Microsoft Corp., USA) or other suitable software.

For fabrication, a layer of 5 nm Cr/50 nm Au was deposited on 128° Y-cut lithium niobate wafer (Precision Micro-Optics, USA) after standard photolithography. The electrical connections between the chip and external wires may be made using silver epoxy (MG Chemicals, USA). A network analyzer may be used to determine the optimal device operating frequency prior to operation. It may vary from device to device (23.7-24.5 MHz, 40.0-57.2 Vpp) due to manual errors during fabrication (e.g., wafer-mask alignment). The dimensions of the transducer may be 3.124 mm in length and 2.240 mm in width. The pitch distance between pixels may be 3.124 mm. An example layout for electric connections is shown in FIG. 29, which is an image of the layout of the acoustofluidic shown in FIG. 2B. The 64 IDTs share the same ground plane and can be actuated by 64 individual signal pads.

In experiments, a sub-nL droplet was generated via a T-junction microfluidic chip. The generated droplets were guided to the digital acoustofluidic device through a capillary tube. The dimensions of the individual acoustic transducers may be minimized to 1.1 mm×0.8 mm. The transducer may operate at 49.125 MHz, 5.0-7.0 Vpp. The fluid reservoir was 3D-printed in Rainbow Flexible plastic (J750 Stratasys, Ltd., USA). The IDT has the same dimensions and resonant frequency as the IDT unit shown in FIG. 2B but is excited at 24.5 MHz for oil jetting (excitation voltage: 300 Vpp, duration, 30 ms). An IDT substrate was attached to at the bottom of fluid reservoir and its geometric center was aligned with the center of nozzle. A hydrophobic ring made of hot-melt adhesive is attached to the nozzle (diameter: 2 mm) as a surface-tension barrier to prevent the aqueous solution from escaping spontaneously due to buoyancy. The droplet volume was 25 µL. 2.7 mm thick FC-70 oil layer was used to isolate the substrate and the floating droplets. The IDT was excited for 150 ms at 150 Vpp, 23.9 MHz for droplet splitting. The fluorescein and rhodamine 6G were dissolved in pure water to a final concentration of 100 µM. 500 µL of dye solution was dispensed with 700 µL of carrier oil into a 96-well plate for incubation. The incubation tests had different elapsed times (0.5 hr, 1 hr, 2 hrs, 4 hrs, and 8 hrs) and environment temperatures (20° C., 30° C., and 55° C.). After incubation, 500 µL of carrier oil was carefully transferred from each well to a new plate for fluorescence measurement by a plate reader (480 nm excitation/500 nm emission, Synergy HT, BioTek Instruments, Inc., USA). 50 L of Hela S3 cells (density of $10^6$ cell·mL$^{-1}$) in a suspension was dispensed onto the carrier oil and trapped by an activated IDT. The cells were double-stained with calcein-AM (CAM) and propidium iodide (PI) after the 20 min incubation. The viability was measured by counting CAM-positive and PI-negative cells using flow cytometry (FC500, Beckman Coulter, Inc., USA).

In glucose detection experiments, six droplets, each with a volume of 30 µL, with different glucose concentrations (0 mg·mL$^{-1}$, 0.0005 mg·mL$^{-1}$, 0.001 mg·mL$^{-1}$, 0.01 mg·mL$^{-1}$, 0.03 mg·mL$^{-1}$, and 0.05 mg·mL$^{-1}$) were first sorted into six separate digital acoustofluidic traps, and then were separately, sequentially merged with a L reaction mix (containing ODD, MOPS buffer, and HRP). A positive control was run on a round-bottomed 96-well plate. The temperature of the plate-based reaction was calibrated to be the same as the floating droplets at room temperature by using a Peltier plate. After reacting for 20 min, 40 µL of the product from this colorimetric reaction was transferred to the round-bottomed 96-well plate for detection by a plate reader (425 nm, Synergy HT, BioTek Instruments, Inc., USA). During the reaction, hydrogen peroxide was generated upon oxidization with glucose oxidase (GOx) and FAD/FADH$_2$ mediated electron transfer. The reporter molecule o-dianisidine dihydrochloride (ODD) was subsequently oxidized by the hydrogen peroxide via the HRP catalyst and this produced a colorimetric (optical absorbance) change that can be used to quantify glucose concentrations.

For neuron specific enolase (NSE) detection experiments, 2-phosphoglycerate (2-PG) barium salt, rabbit pyruvate kinase (PK), adenosine diphosphate (ADP), 3-morpholino-propane-1-sulfonic acid (MOPS), and enolase were purchased from Sigma Aldrich Corp., USA. The barium in 2-PG needed to be replaced with sodium to become soluble in water. The ATP luciferase assay kit was purchased from Promega Corp., USA. In order to minimize unwanted electromagnetic interference effects from the 23.9 MHz actuation signal, a quasi-simultaneous strategy was implemented via the controlling software to alternatively excite multiple IDTs to maintain and control the positions of 6 droplets. $1^{st}$ stage reaction: an enolase-droplet (50 ng·mL$^-$, 10 µL) was merged and mixed with a 2-PG-droplet (30 mM, 10 µL) and is labeled as the Product Droplet 1; a MOPS-droplet (10 µL) was merged with a PK-droplet (20 unit·mL$^-$, 5 µL) and labeled as Product Droplet 2; an ADP-droplet (60 mM, 5 µL) was merged with a luciferase-droplet (10 µL) and labeled Product Droplet 3. $2^{nd}$ stage reaction: Product Droplet 1 (20 µL) merged with Product Droplet 2 (10 µL) to produce Product Droplet 4 which was incubated for 5-15 min to minimize the background fluorescence. $3^{rd}$ stage reaction: Product Droplet 3 (20 µL) was merged and mixed with Product Droplet 4 (30 L) to produce the final reaction product. The liquid handling process is demonstrated in the images of FIG. 30, which show a six-droplet cascade reaction with a digital acoustofluidic system in images (a)-(f). In FIG. 30, the white arrows indicate the droplet to be merged. The scale bar in FIG. 30 is 5 mm. 45 µL of the final reaction product was transferred from the chip to the plate reader (gain: 200, integration time: 1 s, detector height: 1 mm) by pipette for luminescence detection after 15 minutes. The luminescence values were then normalized with respect to the control group and then plotted.

In accordance with embodiments, acoustofluidic systems disclosed herein may include acoustic wave generators that are bulk acoustic wave (BAW) generators. In an example, standing piezoelectric plates (sPZT) merged in base liquid can generate certain pattern of acoustic streaming. During experiments, it was found that by modifying the acoustic streaming with boundary geometry, an all-attraction node can formed at the liquid-air interface above the sPZT. As this all-directional attraction effect extends to nearby units when the sPZT unit is actuated, it can serve as a uniform and robust manipulation function for droplets floating on the base fluid. Experiment results have shown that this potential well can trap liquid droplets with the size comparable to floating on the base liquid layer without significant effect on the surrounding flow field, and the change on flow field can be adjusted quickly to steady state after the actuation of the sPZT unit is turned on and off. Accordingly, this hydrodynamic trap can be controlled to follow a pre-programmed spatial and sequential manner by actuating different units, thus the droplet floating on the base liquid can be moved in a specific trajectory trace. For example, FIG. 31 shows different images of a setup demonstration of the 4×4 units prototype. Image (a) of FIG. 31 shows a real image of the 4×4 units sPZT prototype. Image (b) of FIG. 31 shows the sPZT array with the scale bar being 7 mm. Image (c) of FIG. 31 shows a schematic of droplet control function. The target droplet is moved in a pre-designed route by actuating specific unit in a time sequence. Image (d) of FIG. 31 shows serial movement of droplet with manual step control. The droplet can be clearly observed to float on the liquid-air interface. With this unit structure scaled up and each sPZT unit connected uniformly to a radio frequency (RF) source, they can be actuated in a pre-programmable manner to move the droplet floating on the surface.

For experiments, a 4×4=16 units prototype platform was designed and fabricated based on the system shown in FIG. 31 as a first-stage demonstration of the BAW-based DAF platform. This platform had three main components including the sPZT plates. A PCB with carved holes sized at 7.2*1 mm$^2$ was designed to constrain the pattern and serve as a base to stabilize the whole platform. 3D-printed joints containing narrow slots with size of 7.1*0.25 mm$^2$ can well prevent the sPZT plates from tilting, and sustain the electric connection at the same time. Plastic plates at the same size of 7 mm×7 mm were used as non-functional barriers surrounding the sPZT units to maintain the barrier geometry structure around individual units. After the sPZT units and surrounding plastic plates were plugged in, the whole system was stabilized using silver epoxy. The electric impedance of each connection circuit to be 50 ohm and the connection points of sPZTs are regulated and filled with silver epoxy to maintain the uniformity in electrical connection. Based on this design, all sPZT units can be surrounded by identical fluid modification barrier structure, and the prototype platform can be merged into the carrier fluid and function. Since there is no direct liquid-solid contact by the droplet, the dominant potential source of cross-contamination comes from the diffusion of reagents. Thus, the carrier fluid should have high density to carry the droplet, high stability and low diffusion at the operating surface to maintain low cross contamination rate of the platform. Considering all these requirement, fluorinated oil Fluorinert FC-40 is ideal to be used in the testing experiments, for it is immiscible in water, chemically inert, oxygen-permeable, and has been widely applied in droplet microfluidics and liquid breathing experiments due to these properties. After setting up the controlling program and other environmental parameters, a floating droplet is controlled to pass a "U" shaped route in the platform as preliminary experiment (see image (d) of FIG. 31).

In embodiments, SAW-based digital acoustofluidics systems are disclosed that have interdigitated transducer (dmIDT) that can actuate droplets along both the x and y axes using one transducer. By applying different excitation amplitudes, the immersed transducer can exhibit two distinct acoustic streaming patterns with reversed flow directions in the far field and can actuate droplets along x- and y-axis (i.e., x-mode and y-mode, respectively). At a low excitation voltage (i.e., 8.8 $V_{pp}$), the transducer can pump fluid outwards along the y-axis and pumps fluid inwards along x-axis. Two hydrodynamic potential wells can be formed on the surface of the oil near the two flanks of the transducer. In this situation, a droplet near the flanks of the dmIDT can move towards one of the hydrodynamic potential wells located along x-axis, and be repulsed along the y-axis. When a high excitation voltage (i.e., 14.8 $V_{pp}$) is applied, two pairs of symmetric ASVs are formed along the y-axis near the two apertures of the dmIDT and extend to the flanks of the dmIDT. In this mode, a droplet near the two apertures can be translated along the y-axis inside the ASVs and reach an equilibrium position near the midpoints of the flanks of the dmIDT (see image (B) of FIG. 33, y-mode). Notably, the direction of the horizontal movement of the droplet is the opposite direction of the propagation directions of the SAWs on the $LiNbO_3$ substrate. Images (A) and (B) of FIG. 32 show the experimentally obtained, time-elapsed images of droplet trapping using a single dmIDT (see e.g., FIG. 11) under x- and y-mode actuation along x- and y-axes, respectively. The trajectory of a droplet under y-mode actuation is shown in image (C) of FIG. 32. The droplet is rotated and translated to the flank of transducer following the inflow vortices, rendering a curved trajectory with high acceleration at the beginning and gradual deceleration as it approaches the equilibrium point. Due to conservation of momentum at the immiscible oil-water interface and the small size of the droplet, the internal streaming (see image (D) of FIG. 32) within a trapped droplet enables efficient mixing of liquids and micro-particles. The particles become concentrated to two separate equilibrium positions inside the droplet (see image (E) of FIG. 32) when trapped by a y-mode actuated dmIDT.

As shown in image (F) of FIG. 32, a fluidic processor including an 8×8 array of independent dmIDT units is realized on a 2 cm×2 cm area on the $LiNbO_3$ wafer. The actual measured operating voltage is below 10 $V_{pp}$ for the x-mode actuation and 15 $V_{pp}$ for y-mode due to the lower viscosity of the carrier fluid (1.8 cSt) and the smaller actual dimensions of the transducer. The horizontal movement of a droplet can be dynamically programmed by exciting the adjacent transducers with different amplitudes in a relayed manner, as shown by the time-elapsed droplet trajectory in image (G) of FIG. 32. Generally, the droplet actuation speed in the y-mode is faster than the speed in the x-mode. Thus, the excitation duration of the dmIDTs may need to be changed when moving the droplet along the different axes. Due to the low operating voltages (8.8-14.8 $V_{pp}$) to actuate the dmIDTs, simultaneous trapping (see image (H) of FIG. 32) and movement of multiple droplets is realized.

Image (A) of FIG. 32 shows a sequence of images of movement along the x direction using a single dmIDT under low-excitation amplitudes (i.e., 8.8 $V_{pp}$, 49.125 MHz). Image (B) of FIG. 32 shows a sequence of images of movement along the y axis using high-excitation amplitudes (i.e., 14.8 $V_{pp}$, 49.125 MHz). The arrows indicate the direction of droplet movement. Image (C) of FIG. 32 shows the time-elapsed trajectory of the nano-liter droplets actuated by the ASVs. The grayscale indicates the horizontal velocity of the droplet. Image (D) of FIG. 32 is a diagram showing internal streaming inside a trapped droplet (observed from the bottom) is visualized by stacking the time-elapsed trajectory of 10 m polystyrene particles. Two symmetric vortices can be observed inside the droplet. Image (E) of FIG. 32 shows an image of particles concentrated within the droplet due to internal streaming. The clusters of 10 μm diameter polystyrene particles are formed at the two hydrodynamic equilibrium positions after 60 s of droplet trapping. The t shading indicates the transducers being excited. The scale bars are 500 μm. Image (F) of FIG. 32 shows a contactless fluid processor with an array of 64 independent dmIDT units. The transducer units share the same ground pad. Image (G) of FIG. 32 shows images of the time elapsed motion of the droplet along the transducer array. The dashed white circle indicates the initial position of the droplet. The dmIDT units in the array is denoted as $U^{mn}$ (m, n=1, 2, 3 . . . ). The purple shading indicates that transducer unit ($U^{44}$) initiates the change in the direction of droplet movement. As the droplet is being held by unit U, the excitation signal is switched from x-mode to y-mode actuation. Image (H) of FIG. 32 shows an image of simultaneous trapping of 8 droplets with 8 transducers operating in the y mode. The excited transducers are shaded. The scale bars is 500 m in images (A)-(E). Scale bars are 1 mm in images (F) and (G).

With reference to FIG. 33, image (A) shows with low-excitation amplitude on the dmIDT, the droplet can be translated in ±x directions (i.e., x-mode). Image (B) shows with high-excitation amplitude, the droplet can be translated in ±y directions inside the extended vortices (i.e., y-mode). The arrow attached to the coordinates represents the orientation of the x-axis of Y–128° $LiNbO_3$ substrate. For an array contains m×n transducers, the label "$Unit^{mn}$" represents the unit in the $m^{th}$ row and the $n^{th}$ column in an array. "$Ground^m$" represents the ground wire of the $m^{th}$ row. "$C^{mn}$" represents the controlling signal wire of $Unit^{mn}$. The spheres represent the floating droplets on the fluorinert oil.

FIG. 34 show examples of acoustic streaming vortices (ASVs)-based droplet manipulation in accordance with embodiments of the present disclosure. Image (A) of FIG. 34 is a schematic depicting a droplet processing unit which generates ASVs. As shown in this image, the interconnected array of IDTs may be fabricated on a Y–128° cut $LiNbO_3$ wafer which is immersed in a dense carrier oil (i.e., FC-40, p=1.85 g·$cm^{-3}$). The localized acoustic streaming can be generated by the acoustic attenuation of leaky SAWs and BAWs inside the thin layer of carrier fluid which covers the excited transducer. The droplet processing unit includes several interconnected IDTs operating at various sequences of working frequencies. These aligned transducers share the same signal and ground ports. The droplets (i.e., spheres 3400 and 3402) over the transducers are guided into the center between the "barrel-like" acoustic streaming vortices (labeled as "Vortices") following the recirculating inflow. These droplets are unidirectionally routed along the linear array of IDTs by shifting the sequence of working frequencies. The portions of the IDTs shaded in purple (e.g., $IDT_i$) indicate that they are being excited by a high-amplitude signal with frequency $f_i$. Image (B) is a photo that shows a bifurcated device with a particle floating above the transparent carrier oil layer. Image (C) shows a general control signal into the droplet processing unit. The unit has K+M+N interconnected IDTs [denoted as $IDT_k^I$, $IDT_m^L$, $IDT_n^R$ (k=1, 2, . . . , K; m=1, 2, . . . , M; n=1, 2, . . . , N)] with tuned working frequencies. Multi-tonal signals (i.e., $S_{IL}$ or $S_{IR}$) encoded with a series of different frequencies, amplitudes, durations, and initiation times (i.e., $[f_m^L, A_m^L, T_m^L, t_m^L]_{K+M}$ or $[f_n^R, A_n^R, T_n^R, t_n^R]_{K+N}$) are the excitation signals into the droplet processing unit and can direct the droplet from $IDT_1^I$ to the left or the right port, respectively. By combining the multitoned signals, an input droplet (e.g., at $IDT_1^I$) can be translated towards either of the two output ports (e.g., $IDT_M^L$ or $IDT_N^R$). The shaded area in image (C) indicates the resulting virtual bifurcated channel for droplet translation.

Once a high-amplitude excitation signal is applied to the transducer, strong fluid jets can be generated in the oil layer above the transducer. When these fluid jets impinge on the air-oil interface, they can recirculate vigorously, and form "barrel-like" acoustic streaming vortices (labeled as "Vortices" in image (A) of FIG. 34) along the two flanks of the transducer. Conversely, in the far-field, the immersed transducer acts to pump oil inwards (labeled as "Inflow" in FIG. 1A) along the directions opposite to the SAW propagation. Therefore, a droplet near one aperture of an excited IDT will be rotated and guided into the ASVs by the inflow (FIG. 1A), and eventually be trapped at an equilibrium position. The transducers in the T-shape array in image (A) of FIG. 34 have different working frequencies ($f_1$, $f_2$, $f_3$ . . . ) but share the same signal input ports, and thus can be synchronized to generate ASVs for droplet trapping at designated times and positions via frequency-modulated signals. These resulting spatially overlapping ASVs regions form a virtual channel to translate the droplet along the transducer array. The droplets 3400 and 3402 floating on the virtual channel will be guided into the ASVs following the inflow, and then are automatically routed along the IDT array, following the shifting of the input signals. The bifurcate device is shown in image (B) of FIG. 34. As shown in FIG. 1C, the input signal for exciting the bifurcated path consists of four independent parameters: frequency, amplitude, duration, and initiation time. Using the multi-tonal signals with predetermined parametric signal combinations, the droplet can be routed from $IDT_1^I$ to $IDT_M^L$ or $IDT_N^R$ using modulated signals of $S_{IL}$ or $S_{IR}$, respectively, with minimum external feedback control.

In order to better understand this ASVs-based droplet actuation mechanism, a finite-element method (FEM) simulation of the 3D acoustic streaming pattern for high-amplitude acoustic-wave-fluid interactions (33, 34) was calculated in a 3 mm (x)×3 mm (y)×1.04 mm (z) space. Particularly, image (A) of FIG. 35A is an x-y-plane composite image of particle trajectories generated from stacked, bottom-view images of particles near one flank of a transducer when excited by a low-amplitude signal near the surface of the oil (z=1.04 mm). Images shown in FIG. 35A were acquired using an inverted optical microscope. Image (B) is an x-y-plane of particle trajectories generated from the stacked, bottom-view images of particles near one flank of a transducer when excited by a high-amplitude signal beneath the surface of the oil (z=0.77 mm). The directions of the streamlines in image (B) are indicated by arrows. Arrows generally designated 3500 indicate the trajectories of fluid being pumping outwards. Arrows generally designated 3502 indicate the trajectories of fluid pumping inwards. White arrows indicate the trajectories of re-circulating flows. The shaded areas generally designated 3504 indicate the location of the actuated transducers. Image (C) shows numerical simulation results showing the acoustic streaming pattern in the x-y-plane (z=1.04 mm) with a low-amplitude excitation signal. Image (D) shows numerical simulation results showing the acoustic streaming pattern in the x-y-plane (z=0.77 mm) with a high-amplitude excitation signal. Simulation results are provided in images (E) and (F) that show the acoustic streaming pattern in the x-z-plane (y=0 mm) with a low-amplitude and a high-amplitude excitation signal, respectively. Interestingly, the flowing direction near the flanks of transducer on the oil surface are reversed in these two scenarios. The white dashed contours in images (A) and (B) correspond to the regions displayed in image (C) and (D), respectively. The black asterisks indicate the hydrodynamic equilibrium positions. The grayscale scale corresponds to the magnitude of acoustic streaming speed with the upper portions of the scale indicating higher values. The scale bars are 500 µm. This is spatially consistent with the particle tracing experiments using both low- and high-amplitude excitations. Here only several 2D cross-sections of the model are shown to simplify the visualization. Images (A) and (B) of FIG. 35A show the acoustic-induced streaming pattern in the x-y-plane obtained from the particle tracing experiments for low-amplitude and high-amplitude excitation, respectively. The corresponding simulation results are presented in images (C), (D), (E), and (F). The immersed transducer serves as a micro-pump that pushes fluid outwards following the trajectories of arrows 3500 and arrows 3502 indicate inward flow. Under low-amplitude excitations (image (A)), a butterfly-shaped streaming pattern forms, and the fluid is pumped inwards along the ±x directions and outwards in the ±y directions, following the directions of SAW propagation. Under high-amplitude excitations (image (B)), the streaming pattern changes drastically. The directions of inflow and outflow are reversed (image (A) and (B)) and the ASVs can be generated along the two flanks of the immersed transducer. Simulation results in images (C)-(F) confirm the reversal of flow directions in the far field of the x-z-plane on the surface of oil layer under high-amplitude excitations; however, the positions of the symmetric hydrodynamic equilibrium points, or traps, remain similar (black asterisks).

As seen in image (B), the ASVs can be decomposed into two parts: the inflow vortices (arrows 3500) and the channel vortices (white arrows outlining a barrel shape) along the two flanks of the transducer. Inside the two channel vortices, two pairs of inflow vortices (arrows 3500) gradually converge to the mid-points of the two flanks of the transducer near the surface of oil. Following the inflow vortices, a droplet near one aperture of the transducer can be rotated and guided inside the channel vortices toward the equilibrium position at the mid-point of the flanks of transducer. At one equilibrium position, the ASVs converge and form highly localized vortices with gradually diminishing y-velocities. This stabilizes the droplet in the y-direction. In the x and z directions, a droplet, with a comparable size to the vortices, can be stably confined inside the vortices due to the zero time-averaged x- and z-acceleration.

FIG. 35B show images of simulation results of 3D streamlines over a quarter-transducer excited by low-amplitude in image (A) and high-amplitude signals in image (B). Images (C) and (D) of FIG. 35B show the cross-sectional views of the 3D streaming lines when x, y, and z=0. The hydrodynamic equilibrium positions are indicated by the black asterisks.

2D particle image velocimetry (PIV) analysis was performed to characterize the transition of the acoustic streaming patterns from image (A) of FIG. 35A (low-amplitude) to image (B) of FIG. 35A (high-amplitude). FIG. 36A depicts graphs showing particle image velocimetry analysis with increasing excitation amplitude. Particularly, image (A) of FIG. 36A shows the particle velocity distributions around the ASVs (z=1.04 mm, on the oil surface) as the excitation voltage is increased. Image (B) of FIG. 36 shows the velocity distribution of the particles, escaping from the transducer along x-axis (i.e., x-Velocity) over the flanks of transducer (z=1.04 mm, on the oil surface), shifts towards the right side of the graph as the excitation voltage increases. Image (C) of FIG. 36A shows the velocity distribution of the particles escaping from the transducer along y-axis (i.e., y-Velocity) near the aperture of the transducer (z=0.77 mm, inside the carrier oil) also shifts to the right in the graph as the excitation voltage increases. The dashed line indicates zero particle velocity (i.e., static particles). Note that the particle trajectories of the higher speed inflow are obscured by those of the overlapping channel vortices. Images (B) and (C) share the same legend. The normalized particle count is derived through PIV analysis on small regions of interest and then normalized simplified visualization of the data. Image (A) of FIG. 36A shows the distribution of particle x-y-velocities in the region around the acoustic streaming vortices region on the top surface of oil layer. The peak of the particle velocity distribution gradually shifts from 14 mm·s$^{-1}$ to 36 mm·s$^{-1}$ as the excitation voltage increases from 8.8 $V_{pp}$ (image (A)) to 14.8 $V_{pp}$ (image (B)). A switch in the directions of the inflow and outflow (image (A) and (B)) is clearly measured when sweeping the excitation voltages. As shown in image (B) of FIG. 36A, the peak of the x-velocity distribution of the flow away from the flanks of the transducer shifts from 1.8 mm·s$^{-1}$ to 2.5 mm·s$^{-1}$. At the threshold excitation voltage (i.e., $V_t$, 11.8 Vpp), particles are both approaching toward (x-velocity<0) and escaping from (x-velocity>0) the transducer, as observed in the particle tracking experiments and velocimetry analysis. A similar transition in the peak of the y-velocity distributions can be observed near the aperture region of the transducer as measured in image (C) of FIG. 36A. A mixed acoustic streaming pattern combining both low and high amplitude patterns can be observed at the threshold excitation voltage (i.e., $V_t$). The gradual transition of the acoustic streaming pattern from image (A) to image (B) is confirmed in our 3D acoustic-wave-fluid interaction model as the SAW amplitude increases in a stepwise manner.

FIG. 36B is a microscopic image showing the regions-of-interest (ROIs) selection for the particle image velocimetry (PIV) analysis. Dashed box (a) of FIG. 36B indicates the ROI of FIG. 36A (acoustic streaming vortices on oil surface). Dashed box (b) indicates the ROI of FIG. 36B. Dashed box (c) indicates the ROI of FIG. 36C. The excited transducer is located at the center of the figure. The scale bar is 0.5 mm.

To further characterize the two acoustic streaming modes, the typical acoustic pressures and streaming velocities were measured under different excitation amplitudes from 2.8 to 14.8 $V_{pp}$ and calculated the nonlinear Reynolds number in our device. For the low-amplitude streaming pattern, the average acoustic pressure was 25 kPa (at 8.8 $V_{pp}$) and increased to 40 kPa for high-amplitude streaming (at 14.8 $V_{pp}$). Calculated using the measured streaming velocity, the nonlinear Reynolds number for the low-amplitude excitation scenario was 0.04 and for the high-amplitude excitation scenario was 0.1. Although both cases seem to correspond to slow streaming, at the higher acoustic power, the acoustic streaming shows an unusual experimentally-observed phenomenon by generating a reverse fluid motion (image (B) of FIG. 35)). A possible explanation is that when the nonlinear Reynolds number is approximately 0.1, the acoustic streaming is within the transition between slow and fast streaming. This may generate the irregular fluidic response under the relatively high acoustic excitation. An FEM simulation solved for the flow pattern for both cases, and these results show that the calculated flow fields indeed matched the experimental results.

In accordance with embodiments, under high-amplitude acoustic excitations, the ASVs can extend to adjacent transducers to rotate and translate droplets inside the channel vortices. Those vortices can effectively form a short, virtual channel for droplet transportation. In order to achieve unidirectional diode-like gating behavior, different working frequencies can be input into the transducers (i.e., $f_1$, $f_2$, $f_3$, ...) to form a longer virtual path via acoustic streaming. In this configuration, the ASVs generated by different transducers can overlap co-axially in space to form a longer path for droplet transport. In accordance with embodiments, the images of FIG. 37A show contactless, unidirectional droplet gating and routing via ASVs. Image (A) of FIG. 37A shows contactless, unidirectional droplet gating with diode-like behavior. The "f" indicates the working frequency of the corresponding transducer, from left to right: 45.125 MHz, 52.125 MHz, and 49.125 MHz. The initial position of the droplet is marked by the white dashed circle. Image (B) shows the time-elapsed unidirectional circular routing of a droplet using eight interconnected dmIDTs as diodes triggered by periodical frequency-modulated signals. The device background is removed in order to show the droplets more clearly. The black arrows and lines indicate the directions of droplet motion. Scale bars in FIG. 37A are 1 mm. As shown in image (A) of FIG. 37A, the three aligned transducers each have different working frequencies although they share the same electrical connections. When a periodic frequency-modulated signal (e.g., $f_1$–$f_2$–$f_3$–$f_1$– ... ) is applied to any row or column of transducers in the array, the immersed transducers are excited and ASVs are generated sequentially along the flanks of the series of excited transducers at the appropriate corresponding working frequency. Thus, the hydrodynamic equilibrium position will be periodically shifted from left to right along the flanks of the transducers, establishing a contact-free, unidirectional, virtual channel for droplet transportation. The design has been further refined using a long, chirped IDT with a similar modulated frequency signal as it propagates along the transducer array to reduce non-specific actuation and to enhance robustness.

FIG. 37B are images demonstrating contactless, unidirectional translation of a solid particle via the acoustic-streaming vortices generated by the chirped IDT. Image (A) of FIG. 37B shows a device picture of chirped IDT. Image (B) of FIG. 37B shows time-elapsed image of the particle being translated from left to right. A periodical frequency modulated signal is applied to the chirped IDT device. The scale bars are 1 mm.

Image (A) of FIG. 37A demonstrates the time-elapsed trajectory of a droplet being transported unidirectionally. This gating direction can be reversed by reversing the frequency-shifting sequence of the frequency-modulated signal. The droplet transport speed can be tuned by adjusting the power and the time interval of the frequency shifting of the applied frequency-modulated signal. Expanding on this diode-like control, by generating these ASVs in a virtual closed loop (i.e., using 8 interconnected dmIDT units), the droplet can be automatically transported in a circular path in a contact-free manner with no external relay control (see image (B) of FIG. 37A). It is noted that all the transducers share the same two electrical connections (i.e., the same signal path and the same ground wire) and the frequency-modulated signal synchronizes the transducers to shift the positions of the ASVs. The layout of the dmIDT units could be re-configured to perform contactless, unidirectional droplet gating on programmable paths without external feedback control.

To validate the rewritability of these logic units, any diffusion induced contamination in the FC-40 carrier oil was measured. Different from commonly used carrier oils used in microfluidics (e.g., mineral oil, silicone oil), fluorinert FC-40 is oxygen permeable, chemically inert, and highly resistant to the diffusion of small molecules. Therefore, it is an ideal fluid to contain bio-samples and to isolate the droplet from the piezoelectric substrate. Fluorescent dyes (i.e., Fluorescein and Rhodamin 6G) were used in the co-incubation experiments with FC-40 to characterize diffusion. Co-incubation test results indicated that the signal from any diffused Fluorescein into the FC-39 is close to the detection limit; therefore, it cannot be regarded as a viable marker to measure diffusion. The diffusion of Rhodamine 6G is close to the detection limit of the plate reader at room temperature and does not exceed $8 \times 10^{-5}\%$ in the worst-case scenario (8 hr, 55° C.). Note that Rhodamine 6G diffused most effectively in a lighter version of fluorinert oil (Novec 7500) according to Gunner's study in 2016 (31), indicating a minimum risk of diffusion-induced cross-contamination for routine reagents that have a low molecular diffusivity. Thus, droplets filled with common reagents can be repetitively processed reusing the same fluidic paths with minimum diffusion into, and consequently cross-contamination from, the FC-40 carrier layer.

FIG. 37C is a graph showing characterization of diffusion of Rhodamine 6G in fluorinert FC-40 oil. Rhodamine 6G are dissolved in pure water to a final concentration of 100 μM. 500 μL of dye solution was dispensed with 700 μL of fluorinert FC-40 oil into 1.5 ml tubes for incubation. The incubation tests had different elapsed times (0.5 hr, 1 hr, 2 hr, 4 hr, and 8 hr) and environment temperatures (20° C., 30° C., and 55° C.). After incubation, triplicate 200 μL of FC-40 oil were carefully transferred from each tube from bottom to top to a 96-well plate for fluorescence measurement by a plate reader. The concentrations are derived from a standard concentration-fluorescence curve.

Gating and sorting along reusable paths can be important functions for optimized, automated fluidic processing. In accordance with embodiments, contactless droplet gating and sorting by programmed ASVs are disclosed. Transistor-like gating and sorting of droplets via ASVs. The image (A) of FIG. 38 show a droplet gating device with transistor-like behavior. The small arrows indicate the direction of droplet movement once the gating vortex is formed. The semi-transparent rectangle 3800 indicates the attraction area of the gating vortex. As indicated by the interconnect lines 3802 in the schematics, all the transducers in the gating device share the same electrical ground wire, and the input and output channel transducer arrays share the same signal wire with multi-tonal signal inputs ($f_1-f_2-f_3-f_1- \ldots$). The signal wire of the gating transducer is electrically separated and it has a working frequency of $f_4$. The white, large arrow indicates the default droplet movement direction. Images (B)-(E) of FIG. 38 show time-elapsed droplet trajectories when the gating signal (i.e., $f_{gate}$, 41.59 MHz) is OFF in image (B) and ON in images (C)-(E). Image (B) of FIG. 38 shows that the droplet cannot pass the gate and remain in the input channel when the gate is OFF. Images (C) and (D) show that the droplet passes the gate when the gating signal is ON. Image (E) shows that when the frequency-shifting signal is reversed, the droplet can move from the output channel to the input channel. Image (F) show a device image of a droplet-sorting unit via ASVs. The shaded area indicates the location of the ASVs which form the virtual path for droplet transportation. Arrows generally designated 3804 droplet movement direction in the input channel. Arrows 3806 and 3808 indicate droplet movement directions towards the output port$_1$ (left-turn) and output port$_2$ (right-turn), respectively. Images (G) and (H) show automatic droplet sorting using different frequency-modulated signals, $S_{JL}$ (left-turn, image (G)) and $S_{JR}$ (right-turn, image (H)). The white dashed circles indicate the initial positions of the droplets. Scale bars are 500 μm. The droplet gating unit (i.e., droplet-based transistor) includes 3 sub-parts (image (A) of FIG. 38): (i) the input transducer array, (ii) the gating transducer, and (iii) the output transducer array. Similar to the unidirectional droplet transport in the previous section, for the input/output transducer arrays, the immersed transducers with different working frequencies are arranged periodically on the wafer (i.e., Input array: $f_1-f_2-f_3-f_1-f_2-f_3$, Output array: $f_2-f_3-f_1-f_2-f_3$, image (A) of FIG. 38) so that the droplet is automatically translated along the virtual paths following the sequence of different frequency components of the input signal. Then a gap is added between the input and output transducer arrays to prevent the droplet from passing through the gate without the gating signal. A gating transducer with a working frequency of $f_4$ is placed at the gap between the input and output channels, of which the ASVs (image (A) of FIG. 39, area 3800) can extend to the two adjacent transducers. Note that the input and output transducer arrays share the same two electrical connections (i.e., signal wire and ground wire) and thus all the transducers can receive the synchronized frequency-modulated signals. When applying a periodic series of multi-tonal signals ($f_1-f_2-f_3-f_1 \ldots$) to the input and output channel transducer arrays, the droplet on the input path (image (A) of FIG. 38, left) can be automatically translated to the right and then remain in the input path since the gating signal is OFF (image (B) of FIG. 38). When the gating pulse is ON, the ASVs are generated over the gating transducer and connect the ends of input and output channels allowing the droplet to cross the gap (image (C) of FIG. 38). When the gating signal pulse is OFF, the droplet can be trapped by the 1$^{st}$ transducer ($f_2$) on the right side of the gap and then spontaneously move along the output path (image (D) of FIG. 38), demonstrating a transistor-like behavior. Note that to release and transmit the trapped droplet through the gap, the timing of gating pulse needs to be synchronized with that of $f_1$ in the periodic frequency-modulated signal to avoid interfering with $f_3$, which is easily achieved using the same synchronized clock cycles. Similarly, this transistor-like gating behavior can be demonstrated in a reversed direction (image (E) of FIG. 38) by simply reversing the periodic multi-tonal signals ($f_3-f_1-f_2-f_3- \ldots$) on the input and output paths.

An example of the bifurcated droplet sorting unit is shown in image (F) of FIG. 38. All the transducers share the same electrical connections. The working frequencies of the transducer array of the channel on the left are arranged differently thus the distribution of ASVs can be changed by two series of multi-tonal signals with different frequencies and frequency sequences. The droplet can be guided to the left path (See e.g., image (G) of FIG. 38) with the $S_{JL}$ excitation signal or to the right path (See image (H) of FIG. 38) with the $S_{JR}$ excitation signal. By actively controlling the spatial and temporal distribution of the ASVs with periodical and synchronized signals, these basic functional units (e.g., droplet-diodes and -transistors) have also enabled reusability of the same droplet paths. This has the potential of scaling-up to create complex fluid processors by the rational stacking of these functional switching units with minimal external feedback control.

Demonstrated herein is contactless manipulation of individual droplets on rewritable units with diode and transistor-like switching functionality similar to electronics via programmable control of ASVs. In principle, the transducer immersed in oil demonstrates a counter-intuitive flow-pattern with scalable features of ASVs as the excitation voltage is increased over a critical voltage ($V_f$, at a non-linear Reynolds number near 0.07). At the high-amplitudes, two symmetric ASVs are established along the flanks of the immersed transducer and extend to adjacent transducers. Those vortices force a droplet near the transducer's aperture area to be rotated, translated, and finally trapped near the mid points of the flanks of transducer, allowing for droplet motion along the y-axis, which is counterintuitively in the opposite direction to the propagation directions of the SAWs in the x-y-plane.

The ASVs are barrel-shaped and, when multiple transducers are sequentially actuated under high-amplitude excitation, can be connected to form a long virtual channel for droplet translation. By applying different working frequencies in a frequency-modulated signal to a linear array of high-amplitude-mode transducers connected electrically in parallel, the generated ASVs enable unidirectional routing and gating of the droplet along the transducer array. This is similar to the function of a diode in an electrical circuit that can be used for the passive gating and synchronized routing of individual droplets. Based on the units with diode-like behavior, droplets can be routed in an arbitrary, prescribed pattern without external feedback control. As a simple demonstration, those virtual channels can also be designed in a bifurcated manner to allow the sorting or spontaneous distribution of droplets using two sets of multi-tonal signals. Furthermore, by adding an independent gating transducer in the gap between two virtual paths, an active, contact-free droplet gating unit has been developed with transistor-like functionalities. Specifically, in electronics, a transistor can be described as a voltage-controlled device that regulates and amplifies a current; whereas in our analogy, an alternating-voltage-controlled dmIDT can regulate and "amplify" the droplet flow "current" by ASVs. This effectively allows the dmIDT to digitally regulate a fluidic droplet in a transistor-like manner. Conclusively, these contact-free droplet functional units (i.e., routing, gating, and sorting) allows for rewritable, fundamental droplet processing units on reusable paths with minimized unit size and the need for external control, and can potentially scale to functional fluidic processors by rational stacking like early-stage electronics.

Additionally, under low-amplitude excitations, the flow directions are reversed in the far field and can translate droplets along x-axis. Therefore, with these two different types of acoustic streaming patterns, droplets can be actuated along the x- and y-axes with low- and high-amplitude excitations using only one transducer. Moreover, our device's ability to reuse virtual paths, which leads to "droplet rewritability," is a major advantage of this fluidic handling method. With our approach, the floating droplets are isolated from the piezoelectric substrate and thus cross-contamination is effectively eliminated due to surface adsorption. In addition, the oil, FC-40, utilized in experiments has a low surface tension (16 dynes $cm^{-1}$) compared with water (72 dynes $cm^{-1}$); therefore, it can easily be wetted by the droplets which serves as a protection layer from evaporation, especially for nano-liter scale droplets.

From the experiments on unidirectional droplet gating and routing using multi-toned signals, each transducer unit will not have identical actuation under the same excitation amplitude due to frequency-dependent wave attenuation in the carrier oil. Therefore, it is necessary to compensate for this performance variation by adjusting the amplitudes of the excitation signals for individual transducers by using a programmable function generator. This is why a series of different frequencies may be needed for the frequency-modulated input signal into the dmIDT array. Additionally, the variation in the parasitic inductances and impedances from the electric interconnections of different transducers can be compensated by tuning the signal amplitude or adjusting the inductance and impedance of the transducers off-chip.

Example advantages of contactless droplet routing, gating, and sorting provided by this ASVs-based design enables automated processing of fluids on rewritable paths with minimal external feedback control. As more ASVs-based functional units are developed, they can be integrated into compact, rewritable, fluidic processors. Leveraging the scalability of microelectronics fabrication techniques combined with the design analogy of computational logic units and reusable paths, ASVs based devices as disclosed herein can be used as the basic functional units of complex fluidic processors for biomedical and biochemical applications.

In experiments, fluorinert FC-40 carrier oil was made available from Millipore Sigma Co., Merck KGaA, Darmstadt, Germany. The $LiNbO_3$ substrates were made available from Precision Micro-Optics Inc., Mass., USA. The flow tracers were silver-coated PMMA particles that are 30 m in diameter (density: 1.8 g $cm^{-3}$), and they were made available from Cospheric Inc., Calif., USA.

Further, in experiments, the device was powered and controlled with a sinusoidal AC signal from a function generator (DG 3012C, Teletronics Technology Corporation, Pa., USA) and an amplifier (25A250A, Amplifier Research, USA). A customized Matlab code was developed to control the function generator to generate the appropriate periodic frequency-modulated signals.

Further, in experiments, 5 nm thick Cr and 125 nm thick Au was deposited on a Y–128° cut lithium niobate wafer (Precision Micro-Optics, USA) after patterning using standard photolithography. The electrical connections between the chip and external wires were made using silver epoxy (MG Chemicals, USA). A network analyzer was used to determine the optimum device operating frequency prior to operation. The dimensions of the transducer were 1.18 mm in length and 0.87 mm in width. The pitch distance between transducers was 1.95 mm. The 64 IDTs share two ground wires and can be actuated individually via 64 signal wires. For the transducer array and droplet gating devices, the wave propagation direction is coincident with the X-axis of the Y–128° $LiNbO_3$ single crystal wafer. For the circular droplet translation and sorting device, the SAW propagation direction is 45° rotated with respect to the X-axis of the Y–128° $LiNbO_3$ single crystal wafers.

In experiments, silver-coated PMMA particles with a density similar to that of the fluorinert oil were used for tracing the acoustic streaming. The bottom-view videos were captured by a digital camera at 500 fps in the bright-field. Small regions of interest (ROIs) were selected to calculate the x-y-velocity of particles passing through the ROIs. The ROIs were meshed and the velocity vectors were averaged in each element. The element counting results were normalized for display clarity.

Also, in experiments, the acoustic pressure generated by the dmIDT was measured by a hydrophone (HNC0100, Onda Corporation, USA) mounted on a customized 3D motorized stage with an oscilloscope (DPO4104, Tektronix, USA). It was found that there was no significant change in acoustic pressure when changing the immersed medium (i.e., FC-40 or water) and when changing the position of the hydrophone within our amplitude range. Therefore, water was used for acoustic pressure measurements instead of oil and positioned the hydrophone directly above the dmIDT (1 mm) in order to avoid damaging the hydrophone. The measured amplitudes of the electric pulses were processed using a Fourier transform and then were calibrated to derive the acoustic pressure.

Fluorescein and Rhodamine 6G were dissolved in pure water to a final concentration of 100 µM. 500 µL of dye solution was dispensed with 700 µL of fluorinert FC-40 oil into 1.5 ml tubes for incubation. The incubation tests had different elapsed times (0.5 hr, 1 hr, 2 hr, 4 hr, and 8 hr) and environment temperatures (20° C., 30° C., and 55° C.). After incubation, triplicate 200 µL of FC-40 oil were carefully transferred from each tube from bottom to top to a 96-well plate for fluorescence measurement by a plate reader (490 nm excitation/525 nm emission for fluorescein, 480 nm excitation/550 nm emission for Rhodamine 6G, Synergy HT, BioTek Instruments, Inc., USA).

Also, in experiments for droplet manipulation using the transducer array, the transducers are excited in a relayed manner to move the droplets horizontally. The signal used for x-mode droplet actuation is 8.8 Vpp at 49.125 MHz for a single transducer. The signal used for y-mode droplet actuation is 14.8 Vpp at 49.125 MHz for a single transducer. The oil thickness is 1.17 mm. For the devices in which the wave propagation direction is rotated 45° with respect to the X-axis of the Y–128° LiNbO$_3$ single crystal wafer, the signal frequency is changed to 44.59 MHz due to the change in the wave velocity in this direction. The wavelengths of the transducers used for droplet rotation are as follows: 74.5 µm ($f_1$), 80 µm ($f_2$), and 85.5 µm ($f_3$). The wavelengths of the transducers used for the gating device are as follows: 85.5 µm ($f_1$ and $f_{gate}$), 80 µm ($f_2$), and 74.5 µm ($f_3$). The wavelengths of the transducers used for the droplet sorting device are as follows: 74.5 µm, 80 µm, 85.5 µm, and 112 m.

In accordance with embodiments, disclosed herein are systems for implementing programmable, contactless manipulation of small objects via the combined effect of acoustic streaming and acoustic radiation forces. Acoustic streaming generates a unidirectional flow upon the gradient of time-averaged, acoustic momentum flux, and is generated accompanying acoustic attenuation. As a proof-of-concept, floating micro-liter mineral oil droplets were tested. The disclosed system includes an array of hollow-square-shaped IDTs on a LiNbO$_3$ substrate embedded beneath a carrier water layer, which isolates the floating objects from the solid surfaces. Each IDT unit in the array can be excited independently to generate acoustic waves and the associated acoustic streaming in the water layer by applying resonant sinusoidal alternate current. Therefore, a floating microliter mineral oil droplet near the excited IDT can be driven along the ±x or ±y orthogonal directions following the hydrodynamic gradients and the propagation directions of SAW in water. This system can actuate droplets by pushing while confining them within unidirectional paths. This is instead of focusing objects to pressure nodes or transporting objects via relayed hydrodynamic trapping wells. Using this technique, contactless, programmable manipulation of oil droplets and Zebrafish larvae on water has been demonstrated. This mechanism provides an alternative technique for the contactless acoustic manipulation of materials and bio-samples on water, and it will benefit applications involving emulsions, immiscible solvents, and biological samples.

FIG. 39 illustrates a schematic (image (a)) of a system and an image of the system (image (b)) for contactless, programmable acoustofluidic manipulation of objects or droplets on water. Referring to image (a) of FIG. 39, the schematic shows one unit of the acoustofluidic device. The oil droplets 3900 are isolated in water to prevent direct contact with surfaces. This unit IDT has a hollow square structure and generates SAWs in ±x and ±y directions. The acoustic waves propagate, leak into the carrier liquid to form jets which propulse droplets along orthogonal axes on the surface of water. Image (b) of FIG. 39 is a top view of the system. The acoustofluidic chip includes 36 pixels, each individually excitable.

Referring particularly to image (a) of FIG. 39, a hollow-square-shaped IDT on a Y–128° cut LiNbO$_3$ substrate is employed for generating acoustic waves in the water layer. Once a resonant excitation signal is applied to the IDT, periodically distributed displacements can be generated over the arrays of metallic fingers via a piezoelectric effect. These local displacement distributions of IDT finger pairs propagate as SAWs. They are super-positioned and emitted through the IDT apertures as resonant vibrations of which correlate with the pitch distances. On one hand, an immersed IDT on the Y–128° LiNbO$_3$ substrate can generate SAWs and propagate along the surface of the LiNbO$_3$ substrate following the opening directions of two apertures. The SAWs propagate and couple into the water layer as leaky waves. On the other hand, besides SAW, local vibrations-transverse and oblique waves—also leak into the water layer. The contribution of both leaky waves creates four symmetric flow jets in 3D space in the water layer. As a result, the hollow square IDT pumps fluid out along the x- and y-axes and pumps in fluids along both diagonal directions in the top view. These fluid jets gradually extend to the surface of the water and form a three-dimensional hydrodynamic gradient that actuates the floating droplets on the surface of the water layer in four directions on the 2D plane. Therefore, an array including 6×6 IDTs (see image (b) of FIG. 39) can move the floating droplets on arbitrary routes by activating different unit IDTs adjacent to droplets. Different from a previously demonstrated digital acoustofluidics system which uses a relayed hydrodynamic potential well to trap and transport droplets, in the current device the droplets adjacent to an excited IDT can be pushed unidirectionally on the surface of water along the directions of SAW propagation.

FIG. 40 depicts different images and diagrams showing streaming pattern generated upon the activation of IDTs. Image (a) of FIG. 40 is a schematic x-z-plane cross-sectional view of the streaming pattern at an acoustic transducer (at y=0⁺). The origin (O) is located at the geometrical center of the hollow square transducer. The acoustic waves propagating around the water layer generated symmetrical fluid jets in ±x and ±y directions. Those fluid jets extend to the surface of water and push the floating oil droplets horizontally. Image (b) of FIG. 40 is a schematic 45°-rotated x-z cross-sectional view of the streaming pattern at the transducer (at y–45°=0⁺). The circles with crosses indicate the tendency of flow going inside the display plane (i.e., the −y–45° direction). Image (c) of FIG. 40 is an image of simulated acoustic pressure distribution in a fluid slice right above the IDT area.

Image (d) of FIG. 40 is a top view (x-y-plane, z=2 mm) of stacked images of particle trajectories over an activated transducer. The focal plane is on the surface of the water. The transducer pumps fluid out along the x- and y-axes, and pumps fluid from the four corners of the transducer. The black hollow square is the IDT's image, which is out of focus. Image (e) of FIG. 40 is a 45°-rotated x-z cross-sectional view (i.e., y−45°=0⁺) of stacked images of particle trajectories. The white lines and arrows indicate the direction of streamlines. The circles with a cross indicate the tendency of flow going inside the displayed plane. 10-µm polystyrene particles show the streaming pattern in the focal plane. Scale bars are 800 µm. Image (f) of FIG. 41 is a simulated x-y-plane (z=2 mm) cross-sectional view of acoustic streaming velocity on the surface of the water. The liquid deformation is not considered in this model. Image (g) of FIG. 40 is a simulated x-z-plane (y=0 mm) cross-sectional view of absolute acoustic pressure distribution in the water layer over an excited IDT.

More particularly, images (a) and (b) of FIG. 40 schematically show the cross-sections of streamlines in the x-z and 45° y-rotated x-z planes. A symmetrical, 3D streaming pattern is established upon the activation of the IDT. The hollow-square-shaped IDT serves as a micro-pump that pumps fluid out following four horizontal directions of SAW propagation (i.e., ±x and ±y) (image (a), (c), and (d) of FIG. 40) and pumps in fluid along diagonal axes (images (b) and (e) of FIG. 40) to replenish fluids, which agrees with our simulation results as shown in image (f) of FIG. 40. The top view of a streaming pattern on the water's surface is shown in image (d) of FIG. 40. The 45° y-rotated x-z cross-sectional view is shown in image (e) of FIG. 40. Image (g) of FIG. 40 numerically demonstrates the propagation of the leaky waves in the water layer.

With a low attenuation coefficient of acoustic waves in water, the waves reaching the liquid surface can still have considerable amplitude and impinge the interface. Therefore, beside moving the droplets, they also create a path well as a static 'ripple' (i.e., water-air interface deformation) on the water's surface along the wave propagation direction. The height of this 'ripple' may be proportional to the incident pressure amplitude upon the balance between the 'ripple' gravity and acoustic radiation force. Moreover, the reflected and incident waves form a standing wave in the loading fluid; this contains a pressure node near the surface. A droplet positioned on a 'ripple' is constrained in a local minimum energy state within the path. It moves along the direction of wave propagation upon the combination of acoustic radiation force and acoustic streaming-induced hydrodynamic drag force, allowing the unidirectional droplet translation.

An experimental droplet actuation process is shown in image (a) of FIG. 41. Particularly, image (a) shows time-lapsed droplet trajectories at constant input power. The droplet is added manually via pipette. Power is 34 dBm. Frequency is 24 MHz. The scale bar is 2.5 mm. Image (b) of FIG. 41 is a graph showing the relationship between the excitation power and step time (i.e., the travel time for a droplet traverse from unit to unit at a distance of 2.7 mm). Image (c) of FIG. 41 is a graph showing the relationships between the elapsed time and the traveling distance of a droplet in water upon the activation of the IDT using constant and pulsed input signals (i.e., 2 Hz, 10%, 20%, and 40% duty ratios). The dots indicate the positions of the geometric center of a droplet with respect to the initial position. The dot-to-dot time interval is 34 ms. The power is 34 dBm. The frequency is 24.2 MHz. Once an IDT is activated (indicated by the white arrow), the droplet adjacent to the aperture of IDT first quickly accelerates and then moves to adjacent pixels (i.e., independent IDTs) following the direction of wave propagation at a roughly constant speed (see image (a) of FIG. 41). An immersed IDT unit can swiftly move droplets near its four apertures in ±x and ±y directions. The relationship between acoustic power and droplet actuation step time (i.e., the travel time for a droplet to traverse 2.7 mm from unit to unit) is shown in image (b) of FIG. 41. The time for moving a droplet from unit to unit can be tuned from 1.2 s to 0.2 s by changing the power of the signal from 28 dBm to 37 dBm. The corresponding relationship of the traveling time for five unit-to-unit distances, as well as the displacement with different powers, are quantitatively illustrated in FIG. 42, which is a graph showing the relationships between distance and time for different excitation powers on a single transistor. The particle tracking experiments show that the droplet moves approximately 4-fold faster than the flow on the water's surface (see FIG. 43, which is an image of particle tracking with a 1-µL mineral-oil droplet floating on the surface of water. The observed area is located at the $2^{nd}$ and $3^{rd}$ unit transducer from the excited IDT in the path of droplet translation). This droplet moves 6.75 mm to the excited transducer, which suggests that the mixed effect of acoustic streaming and radiation force is the main mechanism for the unidirectional droplet translation.

The droplet can also be actuated piecewise with a pulsed signal (see image (c) of FIG. 41) to achieve precise displacement control. The time-dependent speed change of both constant and pulsed (2 Hz, 20% duty ratio) propelling of droplets by a unit transducer is in FIG. 44, which is a graph showing the relationships between the elapsed time and the traveling speed of a droplet upon the activation of the IDT using constant (top line) and pulsed (bottom line) input signals (i.e., 2 Hz, 20% duty ratio). Using the constant excitation signal, the droplet accelerated drastically within the first 0.3 seconds and reached a stable speed. Using the pulsed excitation signal, the speed of droplet oscillates periodically but with decreasing amplitude as travelling away from the transducer.

The travelling speed of droplets can decrease dramatically when the viscosity of the carrier fluid is increased (e.g., 40% glycerol solution) For example, FIG. 45 is a graph showing the relationships between the elapsed time and the traveling distance of a droplet floating on water and 40% glycerol-water solution upon the activation of the IDT using constant and pulsed input signals (i.e., 2 Hz, 20% duty ratio). With 40% glycerol, the viscosity of the carrier fluid increases to 3.72 cSt (20° C.), which is 3.7-fold higher than the viscosity of water (1 cSt, 20° C.). The droplet accelerates slower in the glycerol solution and can be used for the manipulation of droplets with higher positional resolution.

FIG. 46 are graphs showing the relationships between the traveling distance and speed of a droplet floating on water (top) and 40% glycerol-water solution (bottom) upon the activation of the IDT using pulsed input signals (i.e., 2 Hz, 20% duty ratio). This figure demonstrates the distance-dependent droplet travelling speed under a pulsed excitation signal (i.e., 2 Hz, 20% duty ratio) with different carrier fluids (i.e., water, 40% glycerol water solution).

FIG. 47 is a sequence of images showing the time-lapsed merging process of two particle-containing droplets. The excited transducers are indicated by the squares. The scale bar is 5 mm. As shown in FIG. 47, two particle-containing oil droplets translated toward each other, then they merged per the "Cheerios effect." Maintaining the droplet position depends on the viscosity of the carrier fluid; the droplet drifted with environmental air flow.

Alternatively, a droplet's position can be maintained actively by exciting two opposing transducers (FIG. 48) or eight surrounding transducers (FIG. 49), where the viscous drag and acoustic radiation forces were balanced. Images (a)-(b) of FIG. 48 show the trapping of a particle-containing droplet using two transducers (squares). Images (d) and (e) of FIG. 48 show a droplet being trapped for 3 minutes. The sale bars are 5 mm. Now referring to FIG. 49, this figure shows a sequence of images of the repeated trap-release process of a particle-containing droplet using surrounding transducers. The scale bar is 5 mm.

By arranging the IDTs into a 6×6 array on a $LiNbO_3$ wafer, a programmable droplet processor with 36 independent pixels was developed. A droplet can thereby be translated in x and y directions from unit to unit along the hydrodynamic gradients triggered by adjacent transducers. By selectively activating the IDT units in a predetermined schedule, sophisticated routes can be realized. FIG. 50 are images showing programmable acoustic actuation of droplets. The time interval between dots is 180 ms. Power is 28 dBm. Frequency is 24.2 MHz. Scale bars are 5 mm. Image (a) of FIG. 50 shows a time-lapsed droplet trajectory for writing a small letter 's'. The grayscale indicates the elapsed time. The activation sequences and corresponding positions of IDTs are indicated in grayscaled numbers from 1 to 5. Image (b) of FIG. 50 shows a time-lapsed droplet trajectory writing a large letter 'S'. Image (c) of FIG. 50 shows a multiportal translation of droplets. The droplet was translated from pixels $P_o$ to other pixels ($P_A$, $P_B$, $P_C$, $P_D$, and $P_E$) by following different activation sequences of IDT; these are indicated by numbers. The dots mark the positions of droplets on different routes. The interval between dots was 180 ms. A deeper color indicates a longer elapsed time. The dashed circle indicates the final positions of the droplets. (d)-(e) Parallel rotation of two droplets. (d) Droplet trajectory of the first half of the circle (0-6.9 s). The circles indicate the end positions of two specific droplets droplet in images (a) and (b). The dots indicate the positions of droplets at specific times. Warmer colors are for longer elapsed times. The activation sequences and corresponding positions of IDTs are indicated in numbers from 1 to 4. The numbers with and without a prime sign (') indicate two independent IDT activation sequences. Image (e) of FIG. 50 shows droplet trajectory of the second half of the circle (6.9-13.8 s). Image (a) of FIG. 50 shows an oil droplet translated on a trajectory of a small letter 's' by sequentially turning on and off 1~5 transducers. Similarly, there was a trajectory of a large 'S' (see image (b) of FIG. 50); it has a translation distance twice as large as the small 's' for a single IDT. As shown in image (c) of FIG. 50, by alternating the combination and sequences of IDT activation (1-2, 1-2-$3^B$, 1-2-$3^C$, 1-2-$3^D$, and 1-2-$3^E$), the droplet is translated from an initial position (port $P_o$) to different positions ($P_A$, $P_B$, $P_C$, $P_D$, and $P_E$) on the fluidic processor. The time-serial trajectories of droplets on five different routes are indicated by colored dots, respectively. This function is critical for the multipath routing and sorting of free objects on a planar device. This also demonstrates good maneuverability with the device. Two droplets were used to demonstrate the parallel manipulation capability of our acoustofluidic droplet processor. two mineral oil droplets were manually dispensed at the initial positions, as indicated by blue dots in image (d) of FIG. 50. After the IDT units 1 and 1' were turned on at the same time, the droplets moved along the y-axis in opposite directions. After 4.1 s, units 2 and 2' were turned on, and the two droplets moved along the x-axis in opposite directions (image (d) of FIG. 50). The process was repeated after 6.9 s, resulting in two closed-loop trajectories (image (e) of FIG. 51). The two droplets were synchronously rotated from 1 to 2 to 3 to 4 and 1' to 2' to 3' to 4'. Since the four outward fluid-jets generated by the immersed transducer extended across the transducer array (see FIG. 51), spatiotemporal planning of the routing of droplets was needed to avoid interference between unit-transducers or collisions when actuating multiple objects.

FIG. 51 is an image showing the four-way actuation of four particle-containing oil droplets simultaneously using a unit-transducer (indicated by the square). Unit-to-unit interference needs to be avoided for the simultaneous manipulation of multiple objects (i.e., more than one), potentially by spatiotemporal planning for droplet routing.

Zebrafish (*Danio rerio*) have desirable attributes for experimentation, such as production of large numbers of externally fertilized eggs. Also, they have relatively small and transparent larvae with rapid organ formation. Zebrafish can be genetically manipulated, so there are many mutant and transgenic reports. About 70% of zebrafish genes have an identifiable human ortholog, which makes the zebrafish amenable to model human genetic disease and also makes this model organism relevant for high-throughput, small-molecule screening for drug treatment. The development of an acoustic-based, biocompatible, contact-free manipulation mechanism can provide a unique alternative for zebrafish manipulation and the automation of drug screening within a compact device. In experiments, the contactless manipulation of zebrafish larvae was demonstrated via acoustic streaming. The 5-day post-fertilization zebrafish larvae were anesthetized in 1× tricaine solution prior to loading to the device using a pipette.

FIG. 52 shows acoustofluidic-based, contactless actuation and selection of a 5-day post-fertilization (dpf) zebrafish larvae. Squares 5200 indicate the excited IDTs at the $1^{st}$ stage. Squares 5202 indicate the excited IDTs at the $2^{nd}$ stage. The zebrafish larva was moved to the left, middle, or right following the configurations of IDT excitation shown in (a), (b), or (c), respectively. The dots indicate the position of the larvae otic vesicles. The dot-to-dot interval was 400 ms. The arrows indicate the directions of larva translation. Power is 28 dBm. Frequency is 24.2 MHz. Scale bars are 5 mm. As shown in FIG. 52, the anesthetized zebrafish larvae were loaded at the apertures of two neighboring IDT units, as indicated by the squares 53—($1^{st}$-stage actuation). Because the larva had an irregular, spindle-like shape, two IDT units were used to ensure consistent actuation of the larvae. Upon the excitation of the two units, the zebrafish larvae were translated upward following the direction of SAW propagation, as indicated by the arrows. Once the larvae reached the opposite side of the array, the $1^{st}$-stage IDT units were turned off and the $2^{nd}$-stage IDT units (marked with blue squares) were turned on. With different configurations of IDT excitation, the selection of zebrafish larvae was realized by translating them to the left (image (a) of FIG. 52), middle (image (b) of FIG. 52), or right (image (c) of FIG. 52). The otic vesicles of the larvae are marked using dots to illustrate consistent tracking of their positions. Notably, the larvae were reoriented following the acoustic streaming with minimal hydrodynamic resistance, regardless of their initial orientations. The associated acoustic streaming pattern of the excitation of two adjacent transducers is shown in FIG. 53. The acoustic streaming flow was tilted when the output of one transducer was significantly weaker than the other.

FIG. 53 shows images of a time-lapsed translation process of a 4-μL mineral-oil droplet using two adjacent transducer with unbalanced (image (a)) and balanced (image (b)) amplitude of excitation signals. The corresponding flow-patterns on water-surface (dashed boxes) are visualized by the stacked particle trajectories in (images (c) and (d)). The unbalanced scenario has higher tilted angle (10.7°) than the balanced scenario (3.8°). Two images with a time interval of 47 ms are stacked together to calculate the speed of the surface flow and the droplet. The flow direction is indicated by the white arrow.

All data was acquired with the same zebrafish larva. After 50 repetitions of action during 1.5 hr experiments, the larva was recovered in egg water for 5 min and checked by microscope. The larva demonstrated normal mobility in the egg water and cardiac activity.

In experiments, 5 nm Cr/50 nm Au were deposited on a 128° Y-cut lithium niobate wafer (Precision Micro-Optics, USA) using an e-beam evaporator after standard photolithography. The hollow-square-shaped IDT array was rotated by 45° with respect to the x-axis of the single crystal wafer for uniform SAW speed, which meant the diagonal axis of the IDT was parallel to the x-axis of $LiNbO_3$. Silver epoxy (MG Chemicals, USA) bonded 32-gauge wires to our acoustofluidic chip. The dimensions of the hollow square transducer were 1.8375 mm for the outer length and 0.7125 mm for the inner length. The pitch distance between pixels was 0.8625 mm.

Further, in experiments, network analyzer was used to determine the optimal device operating frequency prior to operation, because it varied from device to device due to manual error during fabrication. The typical working frequency was 24-24.2 MHz. The chip was immersed in 2 mm-thick DI water and powered by a sinusoidal AC signal from a function generator (DG 3102C, Teletronics Technology Corporation, Pa., USA) and an amplifier (25A250A, Amplifier Research, USA). 1 μL mineral oil droplet was dispensed with a pipette to a designated position on the surface of the water. The unit transducers were connected and disconnected manually to move droplets.

In experiments, mineral oil was purchased from Sigma-Aldrich Corp. (Oakville, ON, USA). Tricaine (MS-222) was also purchased from Sigma-Aldrich, and it was made at 20× (4 g/L ethyl 3-aminobenzoate methanesulfonate salt, pH adjusted to 7.4 with 1 M Tris) and used at 1× prior to anesthetization. Blue polystyrene particles (BLPMS 0.85-1.00 mm) were purchased from Cospheric LLC., USA.

Further, in experiments, videos were decomposed into frames and analyzed with ImageJ (National Institutes of Health, USA). Derived positions were plotted with MATLAB 2016a (Mathworks, Mass., USA); the code is available from the corresponding authors upon request.

Also, in experiments, 10-μm polystyrene particles (density: 1.05 $g/cm^3$, Bangs Lab Inc., USA) were used to streamline characterization. The video was recorded with a fast camera (Mini AX200, Photron Inc., USA). For the particle-tracking experiments at 45° rotational view, the transducer was placed perpendicular to the bottom surface of the liquid container on a microscope. The focal plane was chosen to be coincident with the geometric center of the IDT by tuning the fine scale on the z-axis knob. The derived high-speed video was decomposed and stacked with ImageJ to illustrate the streamlines.

It is noted that to understand the flow patterns induced by the hollow-square-shaped interdigital transducers in the water, a numerical simulation of acoustic streaming was conducted. The computational domain is shown in FIG. 54, which is a simulation image showing a quarter view of the displacement distribution of an excited transducer. Only a quarter of the interdigital transducer electrodes was studied in the simulation because the geometry of the IDTs is symmetric about both the x and y axes. The substrate vibration activated by the hollow-square-shaped IDTs was governed by the constructive equations of piezoelectric material in the stress-charge form. The acoustic field and acoustic streaming pattern were governed by the first- and second-order equations, respectively, as deduced from perturbation theory based on the fluid mass and momentum continuity equations. The "slip velocity method" based on the boundary-driven streaming theory was applied to reduce the calculation amount for the simulation. COMSOL Multiphysics 5.2a was employed for the simulation. First, the coupled substrate vibration in $\Omega_1$ and acoustic field in the inner streaming domain ($\Omega_2$) was solved in the frequency domain. Then, the stationary inner streaming was solved based on the acoustic field in $\Omega_1$. At last, applying the inner streaming pattern on $\Sigma_2$ as the actuation, the outer streaming in the $\Omega_3$ was solved. The details of the theoretical model and simulation strategy are stated elsewhere. The numerical result shows that the water loading on the IDTs flows away from the side of the IDT perpendicularly to the IDT electrodes. As such, the objects (oil droplets) loading on the water will be pushed along the direction of the streaming pattern.

FIG. 55 depicts in image (A) a schematic of the computational domain, and in image (B) an electrode setup on the top of the substrate (27). Particularly, image (A) shows a $LiNbO_3$ substrate and fluid domain containing a quarter of the interdigital transducers. The $\Omega_1$ is the 0.5-mm thick $LiNbO_3$ substrate, the $\Omega_2$ indicates inner streaming domain of thickness four times that of the boundary streaming layer, and $\Omega_3$ is the outer streaming domain. $\Sigma_1$ indicates the top of the substrate and $\Sigma_2$ indicates the top of the inner streaming domain ($\Omega_2$). Image (B) shows the geometry of four pairs of IDTs setup on $\Sigma_1$. The finger width is 37.5 μm which corresponds to the 24.2 MHz frequency.

FIG. 56 are photos showing the crossing ripples over an excited transducer unit. The green arrow indicates the position of the excited transducer. The ripples on the surface of water are visualized by the reflection of illumination on the gold electrodes whiling manually shedding a shadow over the region of interest on the camera. Photos (a) and (b) were taken from two different angles. The dashed boxes indicate the position of the ripples.

FIG. 57 are images depicting the translation of a mineral oil droplet on across the transducer array. The scale bar is 5 mm.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

REFERENCES

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents and other references are referred to herein, such reference does not constitute an admission that any of these documents forms part of the common general knowledge in the art.

1. Ramsey, J. M. The burgeoning power of the shrinking laboratory. *Nat. Biotech.* 17, 1061-1062 (1999).
2. Squires, T. M. & Quake, S. R. Microfluidics: Fluid physics at the nanoliter scale. *Rev. Mod. Phys.* 77, 977 (2005).
3. Marx, V. Pouring over liquid handling. *Nat. Methods* 11, 33-38 (2014).
4. Check, H. E. The automated lab. *Nature* 516, 131-132 (2014).
5. Thorsen, T., Roberts, R. W., Arnold, F. H. & Quake, S. R. Dynamic pattern formation in a vesicle-generating microfluidic device. *Phys. Rev. Lett.* 86, 4163 (2001).
6. Teh, S. Y., Lin, R., Hung, L. H. & Lee, A. P. Droplet microfluidics. *Lab Chip* 8, 198-220 (2008).
7. Klein, A. M., Mazutis, L., Akartuna, I., Tallapragada, N., Veres, A., Li, V., Peshkin, L., Weitz, I). A. & Kirschner, M. W. Droplet barcoding for single-cell transcriptomics applied to embryonic stem cells. *Cell* 161, 1187-1201 (2015).
8. Unger M. A., Chou H. P., Thorsen T., Scherer A., Quake S. R. Monolithic Microfabricated Valves and Pumps by Multilayer Soft Lithography. *Science* 288, 113-116 (2000).
9. Thorsen, T., Maerkl, S. J. & Quake, S. R. Microfluidic large-scale integration. *Science* 298, 580-584 (2002).
10. Treutlein, B., Brownfield, D. G., Wu, A. R., Neff, N. F., Mantalas, G. L., Espinoza, F. H., Desai, T. J., Krasnow, M. A. & Quake, S. R. Reconstructing lineage hierarchies of the distal lung epithelium using single-cell RNA-seq. *Nature* 509, 371-375 (2014). Squires, T. M. & Quake, S. R. Microfluidics: Fluid physics at the nanoliter scale. *Rev. Mod. Phys.* 77, 977 (2005).
11. Pollack, M. G., Fair, R. B. & Shenderov, A. D. Electrowetting-based actuation of liquid droplets for microfluidic applications. *Appl. Phys. Lett.* 77, 1725-1726 (2000).
12. Srinivasan, V., Pamula, V. K. & Fair, R. B. An integrated digital microfluidic lab-on-a-chip for clinical diagnostics on human physiological fluids. *Lab Chip* 4, 310-315 (2004).
13. Wheeler, A. R. Putting electrowetting to work. *Science* 322, 539-540 (2008).
14. Cho, S. K., Moon, H. & Kim, C. J. Creating, transporting, cutting, and merging liquid droplets by electrowetting-based actuation for digital microfluidic circuits. *J. Microelectromech. Syst.* 12, 70-80 (2003).
15. Lee, J., Moon, H., Fowler, J., Schoellhammer, T. & Kim, C. J. Electrowetting and electrowetting-on-dielectric for microscale liquid handling. *Sens. Actuators*, A 95, 259-268 (2002).
16. Choi, K., Ng, A. H., Fobel, R. & Wheeler, A. R. Digital microfluidics. *Annu. Rev. Anal. Chem.* 5. 413-440 (2012).
17. Velev, O. D., Prevo, B. G. & Bhatt, K.-H. On-chip manipulation of free droplets. *Nature* 426, 515-516 (2003).
18. Elrod, S. A., Hadimioglu, B., Khuri-Yakub, B. T., Rawson, E. G., Richley, E., Quate, C. F., Mansour, N. N. & Lundgren, T. S. Nozzleless droplet formation with focused acoustic beams. *J. Appl. Phys.* 65, 3441-3447 (1989).
19. Trinh, E. H. Compact acoustic levitation device for studies in fluid dynamics and material science in the laboratory and microgravity. *Rev. Sci. Instrum.* 56, 2059-2065 (1985).
20. Wixforth, A., Gauer, C., Scriba, J., Wassermeier, M. & Kirchner, R. January. Flat fluidics: A new route toward programmable biochips. *Micromach. Microfabr.* 235-242 (2003).
21. Guttenberg, Z., Müller, H., Habermüller, H., Geisbauer, A., Pipper, J., Felbel, J., Kielpinski, M., Scriba, J. & Wixforth, A. Planar chip device for PCR and hybridization with surface acoustic wave pump. *Lab Chip* 5, 308-317 (2005).
22. Collignon, S., Friend, J. & Yeo, L. Planar microfluidic drop splitting and merging. *Lab Chip* 15, 1942-1951 (2015).
23. Gedge, M. & Hill, M. Acoustofluidics 17: Theory and applications of surface acoustic wave devices for particle manipulation. *Lab Chip* 12, 2998-3007 (2012).
24. Wiklund, M., Green, R. & Ohlin, M. Acoustofluidics 14: Applications of acoustic streaming in microfluidic devices. *Lab Chip* 12, 2438-2451 (2012).
25. Reboud, J., Bourquin, Y., Wilson, R., Pall, G. S., Jiwaji, M., Pitt, A. R., Graham, A., Waters, A. P. & Cooper, J. M. Shaping acoustic fields as a toolset for microfluidic manipulations in diagnostic technologies. *Proc. Natl. Acad. Sci.* 109, 15162-15167 (2012).
26. Rezk, A. R., Manor, O., Friend, J. R. & Yeo, L. Y. Unique fingering instabilities and soliton-like wave propagation in thin acoustowetting films. *Nat. Commun.* 3, 2168 (2012).
27. Stroock, A. D., Dertinger, S. K., Ajdari, A., Mezić, I., Stone, H. A. & Whitesides, G. M. Chaotic mixer for microchannels. *Science* 295, 647-651 (2002).
28. Kim, H., Min, K. I., Inoue, K., Kim, D. P. and Yoshida, J. I. Submillisecond organic synthesis: Outpacing Fries rearrangement through microfluidic rapid mixing. *Science* 352, 691-694 (2016).
29. Gossett, D. R., Henry, T. K., Lee, S. A., Ying, Y., Lindgren, A. G., Yang, O. O., Rao, J., Clark, A. T. & Di Carlo, D. Hydrodynamic stretching of single cells for large population mechanical phenotyping. *Proc. Natl. Acad. Sci.* 109, 7630-7635 (2012).
30. Paulsen, K. S., Di Carlo, D. & Chung, A. J. Optofluidic fabrication for 3D-shaped particles. *Nat. Commun.* 6 (2015).
31. Qasaimeh, M. A., Gervais, T. & Juncker, D. Microfluidic quadrupole and floating concentration gradient. *Nat. Commun.* 2, 464 (2011).
32. Katsikis, G., Cybulski, J. S. and Prakash, M. Synchronous universal droplet logic and control. *Nat. Phys.* 11, 588-596 (2015).
33. Aussillous, P. & Quéré, D. Liquid marbles. *Nature* 411, 924-927 (2001).
34. Luk, N. V., Mo, C. G., Wheeler, A. R. Pluronics Additives: A Solution to Sticky Problems in Digital Microfluidics. *Langmuir* 24, 6382-6389, (2008).
35. Li, P., Mao, Z., Peng, Z., Zhou, L., Chen, Y., Huang, P. H., Truica, C. I., Drabick, J. J., El-Deiry, W. S., Dao, M. and Suresh, S., Acoustic separation of circulating tumor cells. *Proc. Natl. Acad. Sci.* 112, 4970-4975, (2015).
36. Guo, F., Mao, Z., Chen, Y., Xie, Z., Lata, J. P., Li, P., Ren, L., Liu, J., Yang, J., Dao, M. and Suresh, S., 2016.

Three-dimensional manipulation of single cells using surface acoustic waves. *Proc. Natl. Acad. Sci.* 113, 1522-1527, (2016).
37. Ding, X., Li, P., Lin, S. C. S., Stratton, Z. S., Nama, N., Guo, F., Slotcavage, D., Mao, X., Shi, J., Costanzo, F. & Huang, T. J. Surface acoustic wave microfluidics. *Lab Chip* 13, 3626-3649 (2013).
38. Wu, M., Ouyang, Y., Wang, Z., Zhang, R., Huang, P. H., Chen, C., Li, H., Li, P., Quinn, D., Dao, M. & Suresh, S. Isolation of exosomes from whole blood by integrating acoustics and microfluidics. *Proc. Natl. Acad. Sci. U.S.A.* 201709210 (2017).
39. Ahmed, D., Ozcelik, A., Bojanala, N., Nama, N., Upadhyay, A., Chen, Y., Hanna-Rose, W. & Huang, T. J. Rotational manipulation of single cells and organisms using acoustic waves. *Nat. Commun.* 7, 11085 (2016).
40. Marzo, A., Seah, S. A., Drinkwater, B. W., Sahoo, D. R., Long, B. & Subramanian, S. Holographic acoustic elements for manipulation of levitated objects. *Nat. Comm.* 6, 8661 (2015).
41. Melde, K., Mark, A. G., Qiu, T. & Fischer, P. Holograms for acoustics. *Nature* 537, 518-522 (2016).
42. Zhang, P., Li, T., Zhu, J., Zhu, X., Yang, S., Wang, Y., Yin, X. & Zhang, X. Generation of acoustic self-bending and bottle beams by phase engineering. *Nat. Commun.* 5, 4316 (2014).
43. Foresti, D., Nabavi, M., Klingauf, M., Ferrari, A. & Poulikakos. D. Acoustophoretic contactless transport and handling of matter in air. *Proc. Natl. Acad. Sci. U.S.A.* 110, 12549-12554 (2013).
44. Du, X. Y., Swanwick, M. E., Fu, Y. Q., Luo, J. K., Flewitt, A. J., Lee, D. S., Maeng, S. & Milne, W. I. Surface acoustic wave induced streaming and pumping in 128 Y-cut LiNbO3 for microfluidic applications. *J. Micromech. Microeng.* 19, 035016 (2009).
45. Fu, Y. Q., Du, X. Y., Luo, J. K., Flewitt, A. J., Milne, W. I., Lee, D. S., Park, N. M., Maeng, S., Kim, S. H., Choi, Y. J. & Park, J. SAW streaming in ZnO surface acoustic wave micromixer and micropump. *Sensors* 478-483 (2007).
46. Vella, D. & Mahadevan, L. The 'Cheerios effect'. *Am. J. Phys.* 73, 817 (2005).
47. Mattiasson, B. & Adlercreutz, P. Perfluorochemicals in biotechnology. *Trends Biotechnol.* 5, 250-254 (1987).
48. Gruner, P., Riechers, B., Semin, B., Lim, J., Johnston, A. Short, K. & Baret, J. C. Controlling molecular transport in minimal emulsions. *Nat. Commun.* 7, (2016).
49. Dash, P. K., Zhao, J., Hergenroeder, G. & Moore, A. N. Biomarkers for the diagnosis, prognosis, and evaluation of treatment efficacy for traumatic brain injury. *Neurotherapeutics* 7, 100-114 (2010).
50. Adachi, H., Takano, K., Matsumura, H., Inoue, T., Mori, Y. & Sasaki, T. Protein crystal growth with a two-liquid system and stirring solution. *J. Synchrotron Radiat.* 11, 121-124 (2004).
51. Manor, O. et al. The appearance of boundary layers and drift flows due to high-frequency surface waves. *J. Fluid Mech.* 707, 482-495 (2012).
52. Guo, F. et al. Three-dimensional manipulation of single cells using surface acoustic waves. *Proc. Natl. Acad. Sci.* 113, 1522-1527 (2016).
53. Friend, J. et al. Microscale acoustofluidics: Microfluidics driven via acoustics and ultrasonics. *Rev. Mod. Phys.* 83, 647 (2011).
54. J. Bardeen, W. H. Brattain, The Transistor, A Semi-Conductor Triode. *Phys. Rev.* 74, 230-231 (1948).
55. G. Katsikis, J. S. Cybulski, M. Prakash, Synchronous universal droplet logic and control. *Nat. Phys.* 11, 588-596 (2015).
56. J. C. Baret, O. J. Miller, V. Taly, M. Ryckelynck, A. El-Harrak, L. Frenz, C. Rick, M. L. Samuels, J. B. Hutchison, J. J. Agresti, D. R. Link, D. A. Weitz, A. D. Griffiths, Fluorescence-activated droplet sorting (FADS): Efficient microfluidic cell sorting based on enzymatic activity. *Lab Chip.* 9, 1850-1858 (2009).
57. O. D. Velev, B. G. Prevo, K. H. Bhatt, On-chip manipulation of free droplets. *Nature.* 426, 515-516 (2003).
58. M. G. Pollack, R. B. Fair, A. D. Shenderov, Electrowetting-based actuation of liquid droplets for microfluidic applications. *Appl. Phys. Lett.* 77, 1725-1726 (2000).
59. A. R. Wheeler, Chemistry: Putting electrowetting to work. *Science.* 322, 539-540 (2008).
60. J. Li, N. S. Ha, T. Liu, R. M. van Dam, C.-J. Kim, Ionic-surfactant-mediated electro-dewetting for digital microfluidics. *Nature.* 572, 507-510 (2019).
61. E. H. Trinh, Compact acoustic levitation device for studies in fluid dynamics and material science in the laboratory and microgravity. *Rev. Sci. Instrum.* 56, 2059-2065 (1985).
62. A. Marzo, B. W. Drinkwater, Holographic acoustic tweezers. *Proc. Natl. Acad. Sci.* 116, 84-89 (2019).
63. A. Wixforth, C. Gauer, J. Scriba, M. Wassermeier, R. Kirchner, Flat fluidics: A new route toward programmable biochips. *Microfluidics, BioMEMS, and Medical Microsystems*, 4982, 235 (2003).
64. S. Collignon, J. Friend, L. Yeo, Planar microfluidic drop splitting and merging. *Lab Chip.* 15, 1942-1951 (2015).
65. P. Li, Z. Ma, Y. Zhou, D. J. Collins, Z. Wang, Y. Ai, Detachable Acoustophoretic System for Fluorescence-Activated Sorting at the Single-Droplet Level. *Anal. Chem.* 91, 9970-9977 (2019).
66. D. J. Collins, T. Alan, K. Helmerson, A. Neild, Surface acoustic waves for on-demand production of picoliter droplets and particle encapsulation. *Lab Chip.* 13, 3225-3231 (2013).
67. J. Reboud, Y. Bourquin, R. Wilson, G. S. Pall, M. Jiwaji, A. R. Pitt, A. Graham, A. P. Waters, J. M. Cooper, Shaping acoustic fields as a toolset for microfluidic manipulations in diagnostic technologies. *Proc. Natl. Acad. Sci. U.S.A.* 109, 15162-15167 (2012).
68. D. Foresti, M. Nabavi, M. Klingauf, A. Ferrari, D. Poulikakos, Acoustophoretic contactless transport and handling of matter in air. *Proc. Natl. Acad. Sci. U.S.A.* 110, 12549-12554 (2013).
69. C. N. Baroud, M. R. de Saint Vincent, J.-P. Delville, An optical toolbox for total control of droplet microfluidics. *Lab Chip.* 7, 1029 (2007).
70. C. Yang, G. Li, A novel magnet-actuated droplet manipulation platform using a floating ferrofluid film. *Sci. Rep.* 7, 15705 (2017).
71. E. De Jong, Y. Wang, J. M. J. Den Toonder, P. R. Onck, Climbing droplets driven by mechanowetting on transverse waves. *Sci. Adv.* 5, eaaw0914 (2019).
72. T. Thorsen, R. W. Roberts, F. H. Arnold, S. R. Quake, Dynamic Pattern Formation in a Vesicle-Generating Microfluidic Device. *Phys. Rev. Lett.* 86, 4163-4166 (2001).
73. S.-Y. Teh, R. Lin, L.-H. Hung, A. P. Lee, Droplet microfluidics. *Lab Chip.* 8, 198 (2008).
74. J. Li, Q. H. Qin, A. Shah, R. H. A. Ras, X. Tian, V. Jokinen, Oil droplet self-transportation on oleophobic surfaces. *Sci. Adv.* 2, e1600148 (2016).

75. J. Li, X. Zhou, J. Li, L. Che, J. Yao, G. McHale, M. K. Chaudhury, Z. Wang, Topological liquid diode. *Sci. Adv.* 3, eaao3530 (2017).
76. W. Lei, G. Hou, M. Liu, Q. Rong, Y. Xu, Y. Tian, L. Jiang, High-speed transport of liquid droplets in magnetic tubular microactuators. *Sci. Adv.* 4, eaau8767 (2018).
77. A. M. Klein, L. Mazutis, I. Akartuna, N. Tallapragada, A. Veres, V. Li, L. Peshkin, D. A. Weitz, M. W. Kirschner, Droplet barcoding for single-cell transcriptomics applied to embryonic stem cells. *Cell.* 161, 1187-1201 (2015).
78. R. H. Cole, S.-Y. Tang, C. A. Siltanen, P. Shahi, J. Q. Zhang, S. Poust, Z. J. Gartner, A. R. Abate, Printed droplet microfluidics for on demand dispensing of picoliter droplets and cells. *Proc. Natl. Acad. Sci.* 114, 8728-8733 (2017).
79. M. Prakash, N. Gershenfeld, Microfluidic bubble logic. *Science.* 315, 832-835 (2007).
80. P. N. Duncan, T. V Nguyen, E. E. Hui, Pneumatic oscillator circuits for timing and control of integrated microfluidics. *Proc. Natl. Acad. Sci.* 110, 18104-18109 (2013).
81. H. Mertaniemi, R. Forchheimer, O. Ikkala, R. H. A. Ras, Rebounding Droplet-Droplet Collisions on Superhydrophobic Surfaces: from the Phenomenon to Droplet Logic. *Adv. Mater.* 24, 5738-5743 (2012).
82. T. Thorsen, S. J. Maerkl, S. R. Quake, Microfluidic large-scale integration. *Science.* 298, 580-584 (2002).
83. V. N. Luk, G. C. H. Mo, A. R. Wheeler, Pluronic Additives: A Solution to Sticky Problems in Digital Microfluidics. *Langmuir.* 24, 6382-6389 (2008).
84. P. Gruner, B. Riechers, B. Semin, J. Lim, A. Johnston, K. Short, J. C. Baret, Controlling molecular transport in minimal emulsions. *Nat. Commun.* 7, 10392 (2016).
85. A. S. Basu, Y. B. Gianchandani, A 128-pixel digitally-programmable microfluidic platform for non-contact droplet actuation using marangoni flows. *Transducers Eurosens. XXVII, Int. Conf. Solid-State Sens., Actuators Microsyst.* 771-774 (2007).
86. X. Y. Du, M. E. Swanwick, Y. Q. Fu, J. K. Luo, A. J. Flewitt, D. S. Lee, S. Maeng, W. I. Milne, Surface acoustic wave induced streaming and pumping in 128° Y-cut LiNbO 3 for microfluidic applications. *J. Micromech. Microeng.* 19, 35016 (2009).
87. M. Alghane, B. X. Chen, Y. Q. Fu, Y. Li, J. K. Luo, A. J. Walton, Experimental and numerical investigation of acoustic streaming excited by using a surface acoustic wave device on a 128° YX—LiNbO3 substrate. *J. Micromech. Microeng.* 21, 15005 (2011).
88. A. Karimi, S. Yazdi, A. M. Ardekani, Hydrodynamic mechanisms of cell and particle trapping in microfluidics. *Biomicrofluidics.* 7, 21501 (2013).
89. S. Boluriaan, P. J. Morris, Acoustic Streaming: From Rayleigh to Today. *Int. J. Aeroacoustics.* 2, 255-292 (2003).
90. M. K. Aktas, B. Farouk, Numerical simulation of acoustic streaming generated by finite-amplitude resonant oscillations in an enclosure. *J. Acoust. Soc. Am.* 116, 2822-2831 (2004).
91. L. Menguy, J. Gilbert, Non-linear acoustic streaming accompanying a plane stationary wave in a guide. *Acustica.* 86, 249-259 (2000).
92. G. D. West, Circulations occurring in acoustic phenomena. *Proc. Phys. Soc. Sect. B.* 64, 483-487 (1951).
93. U. Ingrd, S. Labate, Acoustic Circulation Effects and the Nonlinear Impedance of Orifices. *J. Acoust. Soc. Am.* 22, 211-218 (1950).

What is claimed is:

1. An acoustofluidic system comprising:
a substrate including a substrate surface;
a plurality of first acoustic wave generators configured to generate acoustic streaming within acoustic wave regions of the substrate surface for movement of one or more droplets or micro/nano objects along a first direction;
a plurality of second acoustic wave generators configured to generate acoustic streaming within acoustic wave regions of the substrate surface for movement of the one or more droplets or micro/nano objects along a second direction, different than the first direction; and
a controller configured to input different amplitudes, frequencies, or phases into the plurality of first acoustic wave generators and the plurality of second acoustic wave generators to generate acoustic streaming.

2. The acoustofluidic system of claim 1, wherein the plurality of first acoustic wave generators and the plurality of second acoustic wave generators are made of $LiNbO_3$ or another piezoelectric material.

3. The acoustofluidic system of claim 1, wherein the one or more droplets or micro/nano objects move on a fluid suspension that is immiscible to the droplet or micro/nano object.

4. The acoustofluidic system of claim 1, wherein the plurality of first acoustic wave generators and the plurality of second acoustic wave generators are one of a surface acoustic wave (SAW) generator, a standing surface acoustic wave (SSAW) generator, and a bulk acoustic wave (BAW) generator.

5. The acoustofluidic system of claim 1, wherein the one or more droplets or micro/nano objects move on a fluid suspension comprises fluorinated oil.

6. The acoustofluidic system of claim 1, wherein the plurality of first acoustic wave generators and the plurality of second acoustic wave generators are each controllable for holding the droplet or other micro/nano object at approximately a respective predetermined position within the acoustic wave regions.

7. The acoustofluidic system of claim 1, wherein the controller configured to input electrical signals into the plurality of first acoustic wave generators and the plurality of second acoustic wave generators in accordance with a predetermined control sequence for controlling movement of the droplet or other micro/nano object.

8. The acoustofluidic system of claim 1, wherein the acoustic wave regions comprise a first acoustic wave region and a second acoustic wave region,
wherein the acoustic wave generator is configured to generate acoustic streaming within the second acoustic wave region of the substrate surface,
wherein the controller is configured to control the plurality of first acoustic wave generators and the plurality of second acoustic wave generators for movement of the droplet or other micro/nano objects between the first acoustic wave region and the second acoustic wave region.

9. The acoustofluidic system of claim 1, wherein the input of the different frequencies, phases, or powers thereby generates vortices in the acoustic stream.

10. The acoustofluidic system of claim 1, wherein the plurality of first acoustic wave generators and the plurality of second acoustic wave generators are configured to input the different frequencies, phases, or powers to implement a gating function for the droplet or other micro/nano objects.

11. The acoustofluidic system of claim 1, wherein the plurality of first acoustic wave generators and the plurality of second acoustic wave generators are configured to input reverse the frequency-shifting sequence of the different frequencies to change movement of the droplet or other micro/nano objects.

12. An acoustofluidic system comprising:
a substrate including a substrate surface;
a plurality of first acoustic wave generators configured to generate acoustic streaming within acoustic wave regions of the substrate surface for movement of one or more droplets or micro/nano objects along a first direction;
a plurality of second acoustic wave generators configured to generate acoustic streaming within acoustic wave regions of the substrate surface for movement of the one or more droplets or micro/nano objects along a second direction, different than the first direction; and
a controller configured to controllably input a first excitation amplitude or a second excitation amplitude into each of the plurality of first acoustic wave generators and the plurality of second acoustic wave generators to move the one or more droplets or other micro/nano objects in either the first direction or the second direction.

13. The acoustofluidic system of claim 1, further comprising a temperature-control system configured to maintain constant temperature during acoustic manipulation.

14. The acoustofluidic system of claim 1, wherein the device is sterilized.

15. The acoustofluidic system of claim 1, wherein the device is manufactured with a process selected from the group consisting of photolithography, injection molding, chemical etching, CNC machining, laser cutting, vacuum molding, other mass-production methods, and combinations thereof.

16. The acoustofluidic system of claim 1, further comprising an acoustic matching layer positioned between the to-be-manipulated object and the transducer.

17. The acoustofluidic system of claim 1, further comprising a base system operably connected to the transducer, the base system being arranged and disposed to adjust at least one property selected from the group consisting of electrical driving power provided from the base system to the transducer, driving frequency of the sound waves provided by the transducer, phase of the sound waves provided by the transducer, a shape of the sound waves provided by the transducer, and combinations thereof.

18. The acoustofluidic system of claim 1, further comprising an electrical matching circuit, the electrical matching circuit being arranged and disposed to suppress frequencies outside of a bandwidth used by the transducer to generate the sound waves.

19. The acoustofluidic system of claim 1, wherein the transducer is driven by at least one of a pulse-width-modulation and a square wave drive.

20. An acoustofluidic system comprising:
a plurality of first acoustofluidic wave generators configured to generate acoustic streaming within acoustic wave regions for movement of one or more droplets or micro/nano objects along a first direction;
a plurality of second acoustic wave generators configured to generate acoustic streaming within acoustic wave regions of the substrate surface for movement of the one or more droplets or micro/nano objects along a second direction, different than the first direction;
a structural feature having a shape to manipulate movement of a droplet or other micro/nano object; and
a controller configured to control the plurality of first acoustic wave generators and the plurality of second acoustic wave generators to move the droplet or other micro/nano object towards the structural feature to manipulate movement of the droplet or other micro/nano object.

21. The acoustofluidic system of claim 20, wherein the structural feature is a nozzle.

22. The acoustofluidic system of claim 20, further comprising a container for holding the droplet or other micro/nano object, and
wherein the plurality of first acoustofluidic wave generators and the plurality of second acoustic wave generators move the droplet or other micro/nano object from the container to an interior of the nozzle and through an end of the nozzle when activated.

23. The acoustofluidic system of claim 21, wherein the interior of the nozzle holds water and oil.

24. The acoustofluidic system of claim 21, wherein the nozzle comprises a hydrophobic ring on a tip end thereof.

25. The acoustofluidic system of claim 21, wherein a tip end of the nozzle is positioned for receipt of the droplet or other micro/nano object.

26. The acoustofluidic system of claim 20, wherein the plurality of first acoustofluidic wave generators and the plurality of second acoustofluidic wave generators are one of a surface acoustic wave (SAW) generator, a standing surface acoustic wave (SSAW) generator, and a bulk acoustic wave (BAW) generator.

27. A method comprising:
providing an acoustofluidic system comprising:
a plurality of first acoustic wave generators configured to generate acoustic streaming within acoustic wave regions of a substrate surface for movement of one or more droplets or micro/nano objects along a first direction;
a plurality of second acoustic wave generators configured to generate acoustic streaming within acoustic wave regions of the substrate surface for movement of the one or more droplets or micro/nano objects along a second direction, different than the first direction; and
a controller configured to input different electrical signals into the plurality of first acoustic wave generators and the plurality of second acoustic wave generators to generate acoustic streaming; and
using the controller to input the different electrical signals into the plurality of first acoustic wave generators and the plurality of second acoustic wave generators to generate acoustic streaming within acoustic wave regions for movement of the one or more droplets or micro/nano objects along the first direction or the second direction.

28. An acoustofluidic system comprising:
a substrate including a substrate surface; and
a dual-mode acoustic transducer controlled by a controller configured to manipulate droplets, cells, micro/nano particles or other micro/nano objects within the acoustic wave region, wherein the transducer is operable in a first mode for moving an object or particle along a top surface of the substrate in one direction, and wherein the transducer is operable in a second mode for moving the object or particle along the top surface over the substrate in another direction.

* * * * *